(12) United States Patent
Son et al.

(10) Patent No.: US 12,535,658 B2
(45) Date of Patent: Jan. 27, 2026

(54) OPTICAL SYSTEM AND CAMERA MODULE COMPRISING SAME

(71) Applicant: LG INNOTEK CO., LTD., Seoul (KR)

(72) Inventors: Chang Gyun Son, Seoul (KR); Ki Cheol Kim, Seoul (KR); Jun Young Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 239 days.

(21) Appl. No.: 18/264,682

(22) PCT Filed: Feb. 9, 2022

(86) PCT No.: PCT/KR2022/001987
§ 371 (c)(1),
(2) Date: Aug. 8, 2023

(87) PCT Pub. No.: WO2022/173223
PCT Pub. Date: Aug. 18, 2022

(65) Prior Publication Data
US 2024/0111130 A1 Apr. 4, 2024

(30) Foreign Application Priority Data

Feb. 9, 2021 (KR) .................. 10-2021-0018549
Jul. 13, 2021 (KR) .................. 10-2021-0091809
(Continued)

(51) Int. Cl.
*G02B 13/00* (2006.01)
*B60R 11/04* (2006.01)
(Continued)

(52) U.S. Cl.
CPC .......... *G02B 13/0035* (2013.01); *B60R 11/04* (2013.01); *G02B 1/041* (2013.01);
(Continued)

(58) Field of Classification Search
CPC ...... G02B 13/0035; G02B 1/041; G02B 3/00; G02B 9/12; G02B 2003/0093;
(Continued)

(56) References Cited

U.S. PATENT DOCUMENTS 6,804,067 B2    10/2004 Sato
8,792,184 B2    7/2014 Matsui et al.
(Continued)

FOREIGN PATENT DOCUMENTS

CN    111061046 A    4/2020
JP    4-255814 A     9/1992
(Continued)

OTHER PUBLICATIONS

Smith, W., "Modern Lens Design: a resource manual," Modern Lens Design, Jan. 1, 1992, pp. 1-5, McGraw-Hill, Inc.
(Continued)

*Primary Examiner* — James C. Jones
(74) *Attorney, Agent, or Firm* — Saliwanchik, Lloyd & Eisenschenk

(57) ABSTRACT

An optical system according to an embodiment includes first to third lenses disposed along an optical axis from an object side to a sensor side direction, wherein the first lens has a meniscus shape convex toward the object side, and satisfies $1.7 \leq nt\_1 \leq 2.3$ and TTL$\leq$6 mm.

(nt_1 is the refractive index of the first lens with respect to the light of the t-line wavelength band, and TTL is the distance on the optical axis from the object-side surface of the first lens to the upper surface of the image sensor.)

20 Claims, 111 Drawing Sheets

(30) Foreign Application Priority Data

Dec. 13, 2021 (KR) .................. 10-2021-0177903
Dec. 20, 2021 (KR) .................. 10-2021-0183195

(51) Int. Cl.
*G02B 1/04* (2006.01)
*G02B 3/00* (2006.01)
*G02B 9/12* (2006.01)
*H04N 23/12* (2023.01)
*H04N 23/55* (2023.01)

(52) U.S. Cl.
CPC .................. *G02B 3/00* (2013.01); *G02B 9/12* (2013.01); *H04N 23/12* (2023.01); *H04N 23/55* (2023.01); *G02B 2003/0093* (2013.01)

(58) Field of Classification Search
CPC ......... G02B 7/028; G02B 13/14; B60R 11/04; H04N 23/12; H04N 23/55; H04N 23/54
See application file for complete search history.

(56) References Cited

U.S. PATENT DOCUMENTS

| | | | |
|---|---|---|---|
| 9,244,254 | B2 | 1/2016 | Kubota et al. |
| 2004/0061953 | A1 | 4/2004 | Sato |
| 2006/0043010 | A1 | 3/2006 | Faram et al. |
| 2008/0225411 | A1 | 9/2008 | Kim et al. |
| 2012/0293874 | A1 | 11/2012 | Matsui et al. |
| 2015/0029603 | A1 | 1/2015 | Kubota et al. |
| 2021/0048618 | A1* | 2/2021 | Huang .................. G02B 5/208 |

FOREIGN PATENT DOCUMENTS

| | | |
|---|---|---|
| JP | 5-34591 A | 2/1993 |
| JP | 2003-22180 A | 1/2003 |
| JP | 2004-163849 A | 6/2004 |
| JP | 2004-163851 A | 6/2004 |
| JP | 2004-252312 A | 9/2004 |
| JP | 2010-145648 A | 7/2010 |
| JP | WO2011/092983 A1 | 5/2013 |
| JP | WO2012/114970 A1 | 7/2014 |
| JP | 2015-25998 A | 2/2015 |
| JP | WO2013/145989 A1 | 12/2015 |
| JP | 2018-84704 A | 5/2018 |
| KR | 2003-0008835 A | 1/2003 |
| KR | 10-2006-0050511 A | 5/2006 |
| KR | 10-2007-0010926 A | 1/2007 |
| KR | 10-2007-0025981 A | 3/2007 |
| KR | 10-0723220 B1 | 5/2007 |
| KR | 10-0843467 B1 | 7/2008 |

OTHER PUBLICATIONS

Supplementary European Search Report dated Dec. 9, 2024 in European Application No. 22752983.1.
Office Action dated Oct. 25, 2024 in Korean Application No. 10-2022-0114332.
Office Action dated Apr. 3, 2025 in Korean Application No. 10-2022-0173683.
Office Action dated Feb. 8, 2024 in Korean Application No. 10-2022-0114332.
International Search Report dated May 17, 2022 in International Application No. PCT/KR2022/001987.

* cited by examiner

| Temperature(℃) | refractive index according to the wavelength of the first lens | | | | | |
|---|---|---|---|---|---|---|
| | 656.3nm (C-line) | 632.8nm | 587.6nm (d-line) | 546.1nm (e-line) | 486.1nm (F-line) | 435.8nm (g-line) |
| -40 | 2.0396 | 2.043 | 2.0599 | 2.06 | 2.0784 | 2.102 |
| -20 | 2.0396 | 2.043 | 2.0599 | 2.06 | 2.0785 | 2.1021 |
| -10 | 2.0396 | 2.043 | 2.0600 | 2.0601 | 2.0786 | 2.1022 |
| 0 | 2.0397 | 2.0431 | 2.0600 | 2.0601 | 2.0787 | 2.1023 |
| 10 | 2.0397 | 2.0431 | 2.0600 | 2.0601 | 2.0787 | 2.1023 |
| 20 | 2.0397 | 2.0431 | 2.0601 | 2.0601 | 2.0787 | 2.1023 |
| 30 | 2.0397 | 2.0431 | 2.0601 | 2.0602 | 2.0788 | 2.1025 |
| 40 | 2.0397 | 2.0431 | 2.0602 | 2.0603 | 2.0789 | 2.1026 |
| 50 | 2.0398 | 2.0432 | 2.0603 | 2.0603 | 2.0789 | 2.1026 |
| 60 | 2.0398 | 2.0432 | 2.0604 | 2.0603 | 2.079 | 2.1027 |
| 70 | 2.0398 | 2.0432 | 2.0605 | 2.0604 | 2.079 | 2.1028 |
| 80 | 2.0398 | 2.0432 | 2.0605 | 2.0604 | 2.0791 | 2.1029 |
| 90 | 2.0398 | 2.0433 | 2.0606 | 2.0604 | 2.0791 | 2.1029 |

Fig. 6

| Temperature(℃) | refractive index according to the wavelength of the first and second lens ||||||
| --- | --- | --- | --- | --- | --- | --- |
| | 1014nm (t-line) | 643.8nm (C'-line) | 587.6nm (d-line) | 546.1nm (e-line) | 480nm (F'-line) | 435.8nm (g-line) |
| -40 | 1.6373 | 1.6584 | 1.6684 | 1.6740 | 1.6924 | 1.7121 |
| -20 | 1.6348 | 1.6557 | 1.6657 | 1.6711 | 1.6893 | 1.7088 |
| -10 | 1.6336 | 1.6544 | 1.6644 | 1.6696 | 1.6877 | 1.7072 |
| 20 | 1.6324 | 1.6530 | 1.6603 | 1.6682 | 1.6861 | 1.7056 |
| 30 | 1.6288 | 1.6489 | 1.6590 | 1.6637 | 1.6814 | 1.7006 |
| 40 | 1.6276 | 1.6476 | 1.6577 | 1.6623 | 1.6799 | 1.6990 |
| 50 | 1.6263 | 1.6462 | 1.6563 | 1.6608 | 1.6783 | 1.6973 |
| 60 | 1.6251 | 1.6449 | 1.6550 | 1.6593 | 1.6767 | 1.6957 |
| 70 | 1.6239 | 1.6435 | 1.6536 | 1.6578 | 1.6752 | 1.6940 |
| 80 | 1.6227 | 1.6422 | 1.6523 | 1.6564 | 1.6736 | 1.6924 |
| 90 | 1.6215 | 1.6408 | 1.6510 | 1.6549 | 1.6720 | 1.6907 |

Fig. 9

| lens | surface | radius of curvature (mm) | thickness or interval (mm) | Refractive index | Abbe's number | the size of the effective diameter (mm) |
|---|---|---|---|---|---|---|
| first lens | first surface | 2.842 | 1.478 | 2.013 | 26.900 | 2.788 |
| | second surface(stop) | 4.145 | 0.673 | | | 1.460 |
| second lens | third surface | -8.270 | 1.052 | 1.632 | 20.400 | 1.993 |
| | fourth surface | -3.830 | 0.375 | | | 2.700 |
| third lens | fifth surface | 1.748 | 0.591 | 1.632 | 20.400 | 3.166 |
| | sixth surface | 1.560 | 0.279 | | | 3.940 |
| filter | seventh surface | 1.E+18 | 0.300 | 1.513 | 54.500 | 4.168 |
| | eighth surface | 1.E+18 | 0.500 | | | 4.275 |
| cover glass | ninth surface | 1.E+18 | 0.400 | 1.513 | 54.500 | 4.548 |
| | tenth surface | 1.E+18 | 0.045 | | | 4.689 |
| image sensor | eleventh surface | 1.E+18 | 0.000 | | | 4.529 |

Fig. 10

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0 | 0 | 0 |
| 0.2 | 0.007 | 0.2 | 0.0048 |
| 0.4 | 0.0283 | 0.4 | 0.0193 |
| 0.6 | 0.0641 | 0.6 | 0.0437 |
| 0.8 | 0.1149 | 0.8 | 0.0595 |
| 1 | 0.1817 | 1 | 0.0595 |
| 1.2 | 0.2658 | 1.2 | 0.0595 |
| 1.3 | 0.3147 | 1.3 | 0.0595 |
| 1.5 | 0.3147 | 1.5 | 0.0595 |
| 1.7 | 0.3147 | 1.7 | 0.0595 |
| 1.9 | 0.3147 | 1.9 | 0.0595 |

Fig. 11

| vertical height of the optical axis from the optical axis (mm) | thickness of the first lens in the optical axis direction (mm) |
|---|---|
| 0 | 1.4777 (TL1) |
| 0.2 | 1.4755 |
| 0.4 | 1.4687 |
| 0.6 | 1.4573 |
| 0.8 | 1.4223 |
| 1 | 1.3555 |
| 1.2 | 1.2714 |
| 1.3 | 1.2225 (TL1_ET) |
| 1.5 | 1.2225 |
| 1.7 | 1.2225 |
| 1.9 | 1.2225 |

Fig. 12

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0 | 0 | 0 |
| 0.2 | -0.0025 | 0.2 | -0.0055 |
| 0.4 | -0.0114 | 0.4 | -0.0256 |
| 0.6 | -0.0304 | 0.6 | -0.0678 |
| 0.8 | -0.0672 | 0.8 | -0.1399 |
| 1 | -0.0951 | 1 | -0.2479 |
| 1.2 | -0.0951 | 1.2 | -0.3928 |
| 1.3 | -0.0951 | 1.3 | -0.4733 |
| 1.5 | -0.0951 | 1.5 | -0.4733 |
| 1.7 | -0.0951 | 1.7 | -0.4733 |
| 1.9 | -0.0951 | 1.9 | -0.4733 |

Fig. 13

| vertical height of the optical axis from the optical axis(mm) | thickness of the second lens in the optical axis direction(mm) |
|---|---|
| 0 | 1.0522 (D_2) |
| 0.2 | 1.0492 |
| 0.4 | 1.0380 |
| 0.6 | 1.0148 |
| 0.8 | 0.9795 |
| 1 | 0.8994 |
| 1.2 | 0.7545 |
| 1.3 | 0.6740 (D_2_ET) |
| 1.5 | 0.6740 |
| 1.7 | 0.6740 |
| 1.9 | 0.6740 |

Fig. 14

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0 | 0 | 0 |
| 0.2 | 0.0109 | 0.2 | 0.0125 |
| 0.4 | 0.0377 | 0.4 | 0.0469 |
| 0.6 | 0.0663 | 0.6 | 0.0931 |
| 0.8 | 0.0771 | 0.8 | 0.1378 |
| 1 | 0.0541 | 1 | 0.1693 |
| 1.2 | -0.0089 | 1.2 | 0.1799 |
| 1.3 | -0.0535 | 1.3 | 0.1757 |
| 1.5 | -0.1632 | 1.5 | 0.1452 |
| 1.7 | -0.1632 | 1.7 | 0.0798 |
| 1.9 | -0.1632 | 1.9 | -0.0366 |

Fig. 15

| vertical height of the optical axis from the optical axis(mm) | thickness of the third lens in the optical axis direction(mm) |
|---|---|
| 0 | 0.5908 (D_3) |
| 0.2 | 0.5924 |
| 0.4 | 0.6000 |
| 0.6 | 0.6176 |
| 0.8 | 0.6515 |
| 1 | 0.7060 |
| 1.2 | 0.7796 |
| 1.3 | 0.8200 |
| 1.5 | 0.8992 |
| 1.7 | 0.8338 |
| 1.9 | 0.7154 (D_3_ET) |

Fig. 16

|  | first surface(S1) | second surface(S2) | third surface(S3) | fourth surface(S4) | fifth surface(S5) | sixth surface(S6) |
|---|---|---|---|---|---|---|
| K |  |  | 41.46635 | 6.15608 | -23.92412 | -1.07733 |
| A |  |  | -0.06687 | -0.18981 | 0.13438 | -0.16382 |
| B |  |  | 0.13208 | 0.14023 | -0.80885 | -0.05903 |
| C |  |  | -0.56906 | 0.05054 | 1.38693 | 0.18777 |
| D |  |  | 1.10284 | -0.40022 | -1.52161 | -0.15288 |
| E |  |  | -7.41E-01 | 6.75E-01 | 1.12E+00 | 8.16E-02 |
| F |  |  | -9.97E-01 | -6.16E-01 | -5.47E-01 | -2.73E-02 |
| G |  |  | 2.43E+00 | 3.28E-01 | 1.67E-01 | 5.61E-03 |
| H |  |  | -1.86E+00 | -9.49E-02 | -2.91E-02 | -6.49E-04 |
| J |  |  | 5.16E-01 | 1.16E-02 | 2.19E-03 | 3.23E-05 |

Fig. 17

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 0.6729 | 0 |
| 0.2 | 0.6656 | 0.2 |
| 0.4 | 0.6422 | 0.4 |
| 0.6 | 0.5988 | 0.6 |
| 0.8 (L1) | 0.5462 | 0.8 (L1) |
| 1 | 0.5183 | 1 |
| 1.2 | 0.5183 | 1.2 |
| 1.3 | 0.5183 | 1.3 |
| 1.5 | 0.5183 | 1.5 |
| 1.7 | 0.5183 | 1.7 |
| 1.9 | 0.5183 | 1.9 |

Fig. 18

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.3746 | 0 |
| 0.2 | 0.3910 | 0.2 |
| 0.4 | 0.4379 | 0.4 |
| 0.6 | 0.5087 | 0.6 |
| 0.8 | 0.5916 | 0.8 |
| 1 | 0.6766 | 1 |
| 1.2 | 0.7585 | 1.2 |
| 1.3 (L2) | 0.7944 | 1.3 (L2) |
| 1.5 | 0.6847 | 1.5 |
| 1.7 | 0.6847 | 1.7 |
| 1.9 | 0.6847 | 1.9 |

Fig. 19

|  | First embodiment |
|---|---|
| Diopter of first lens (Diop_L1) at room temperature (22°C) | 176.720 |
| Diopter of second lens (Diop_L2) at room temperature (22°C) | 97.118 |
| Diopter of third lens (Diop_L3) at room temperature (22°C) | 9.814 |
| L_1_ET | 1.222 mm |
| L_2_ET | 0.674 mm |
| L_3_ET | 0.715 mm |
| f1 at room temperature (22°C) | 5.658 mm |
| f2 at room temperature (22°C) | 10.297 mm |
| f3 at room temperature (22°C) | 104.019 mm |
| d23_max | 7.944 mm |
| d23_Sag_L3S1_max | 0.5816 mm |
| L_Sag_L3S1 | 0.8 mm |
| L_Sag_L3S2 | 1.2 mm |
| L3S2_max_sag to Sensor | 1.344 mm |
| CA_Smax | 3.940 mm |
| CA_Smin | 1.460 mm |
| CA_Aver | 2.679 mm |
| EFL at room temperature (22°C) | 3.9308 mm |
| EFL at room low temperature (-40°C) | 3.9070 mm |
| EFL at room high temperature (90°C) | 3.9606 mm |
| TTL at room temperature (22°C) | 5.6925 mm |
| TTL at room low temperature (-40°C) | 5.6817 mm |
| TTL at room high temperature (90°C) | 5.7059 mm |
| F# at room temperature (22°C) | 2.0075 |
| F# at room low temperature (-40°C) | 1.9550 |
| F# at room high temperature (90°C) | 2.0226 |
| ImgH at room temperature (22°C) | 4.6992 mm |
| ImgH at room low temperature (-40°C) | 4.7029 mm |
| ImgH at room high temperature (90°C) | 4.6932 mm |
| BFL at room temperature (22°C) | 1.5243 mm |
| FOV at room temperature (22°C) | 61.3574 ° |
| FOV at room low temperature (-40°C) | 61.6952 ° |
| FOV at room high temperature (90°C) | 60.9010 ° |

Fig. 20

| | First embodiment |
|---|---|
| equation1 | 2.013 |
| equation2 | satisfy |
| equation3 | satisfy |
| equation4 | satisfy |
| equation5 | 5.693 |
| equation7 | satisfy |
| equation8 | 1.820 |
| equation9 | 18.382 |
| equation10 | satisfy |
| equation11 | 1.478 |
| equation12 | 0.26 |
| equation13 | 1.404 |
| equation14 | 2.501 |
| equation15 | satisfy |
| equation16 | 0.550 |
| equation18 | 18.382 |
| equation19 | 0.686 |
| equation20 | 2.159039 |
| equation21 | 1.120527 |
| equation22 | 0.708 |
| equation23 | satisfy |
| equation24 | 0.455 |
| equation25 | 0.839 |
| equation26 | satisfy |
| equation27 | satisfy |
| equation28 | 1.212 |
| equation29 | 0.324 |
| equation30 | 3.734 |
| equation31 | 0.691 |
| equation32 | 2.579 |
| equation33 | 0.837 |
| equation34 | 0.827 |
| equation35 | 0.641 |
| equation36 | 1.211 |
| equation37 | 0.472 |
| equation38 | 1.579 |
| equation39 | 0.502 |
| equation40 | 0.771 |
| equation41 | 0.609 |
| equation42 | 0.1799 |
| equation43 | 0.882 |
| equation44 | 5.278 |
| equation45 | 12.826 |
| equation46 | 2.699 |
| equation47 | 1.471 |
| equation48 | 0.545 |
| equation49 | 0.839 |
| equation50 | 0.733 |

Fig. 33

| lens | surface | radius of curvature (mm) | thickness or interval (mm) | Refractive index | Abbe's number | the size of the effective diameter (mm) |
|---|---|---|---|---|---|---|
| first lens | first surface | 2.836 | 1.430 | 2.013 | 26.900 | 2.784 |
| | second surface (stop) | 4.195 | 0.695 | | | 1.470 |
| second lens | third surface | -7.801 | 1.021 | 1.632 | 20.400 | 2.030 |
| | fourth surface | -3.725 | 0.389 | | | 2.696 |
| third lens | fifth surface | 1.769 | 0.598 | 1.632 | 20.400 | 3.091 |
| | sixth surface | 1.538 | 0.278 | | | 3.973 |
| filter | seventh surface | 1.E+18 | 0.300 | 1.513 | 54.500 | 4.205 |
| | eighth surface | 1.E+18 | 0.500 | | | 4.304 |
| cover glass | ninth surface | 1.E+18 | 0.400 | 1.513 | 54.500 | 4.558 |
| | tenth surface | 1.E+18 | 0.045 | | | 4.689 |
| image sensor | eleventh surface | 1.E+18 | 0.000 | | | 4.531 |

Fig. 34

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0.0000 | 0 | 0.0000 |
| 0.2 | 0.0071 | 0.2 | 0.0048 |
| 0.4 | 0.0284 | 0.4 | 0.0191 |
| 0.6 | 0.0642 | 0.6 | 0.0431 |
| 0.8 | 0.1152 | 0.8 | 0.0588 |
| 1 | 0.1822 | 1 | 0.0588 |
| 1.2 | 0.2664 | 1.2 | 0.0588 |
| 1.4 | 0.3155 | 1.4 | 0.0588 |
| 1.6 | 0.3155 | 1.6 | 0.0588 |
| 1.8 | 0.3155 | 1.8 | 0.0588 |

Fig. 35

| vertical height of the optical axis from the optical axis(mm) | thickness of the first lens in the optical axis direction(mm) |
|---|---|
| 0 | 1.4304 (D_1) |
| 0.2 | 1.4281 |
| 0.4 | 1.4211 |
| 0.6 | 1.4093 |
| 0.8 | 1.3740 |
| 1 | 1.3070 |
| 1.2 | 1.2228 |
| 1.4 | 1.1737 (D_1_ET) |
| 1.6 | 1.1737 |
| 1.8 | 1.1737 |

Fig. 36

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0.0000 | 0 | 0.0000 |
| 0.2 | -0.0027 | 0.2 | -0.0057 |
| 0.4 | -0.0121 | 0.4 | -0.0264 |
| 0.6 | -0.0323 | 0.6 | -0.0698 |
| 0.8 | -0.0722 | 0.8 | -0.1442 |
| 1 | -0.1036 | 1 | -0.2571 |
| 1.2 | -0.1036 | 1.2 | -0.4142 |
| 1.4 | -0.1036 | 1.4 | -0.5092 |
| 1.6 | -0.1036 | 1.6 | -0.5092 |
| 1.8 | -0.1036 | 1.8 | -0.5092 |

Fig. 37

| vertical height of the optical axis from the optical axis(mm) | thickness of the second lens in the optical axis direction(mm) |
|---|---|
| 0 | 1.0205 (D_2) |
| 0.2 | 1.0175 |
| 0.4 | 1.0062 |
| 0.6 | 0.9830 |
| 0.8 | 0.9485 |
| 1 | 0.8670 |
| 1.2 | 0.7099 |
| 1.4 | 0.6149 (D_2_ET) |
| 1.6 | 0.6149 |
| 1.8 | 0.6149 |

Fig. 38

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0.0000 | 0 | 0.0000 |
| 0.2 | 0.0108 | 0.2 | 0.0127 |
| 0.4 | 0.0373 | 0.4 | 0.0473 |
| 0.6 | 0.0649 | 0.6 | 0.0935 |
| 0.8 | 0.0739 | 0.8 | 0.1379 |
| 1 | 0.0475 | 1 | 0.1688 |
| 1.2 | -0.0218 | 1.2 | 0.1787 |
| 1.4 | -0.1336 | 1.4 | 0.1619 |
| 1.6 | -0.1336 | 1.6 | 0.1122 |
| 1.8 | -0.1336 | 1.8 | 0.0150 |

Fig. 39

| vertical height of the optical axis from the optical axis(mm) | thickness of the third lens in the optical axis direction(mm) |
|---|---|
| 0 | 0.5981 (D_3) |
| 0.2 | 0.6000 |
| 0.4 | 0.6081 |
| 0.6 | 0.6267 |
| 0.8 | 0.6621 |
| 1 | 0.7194 |
| 1.2 | 0.7986 |
| 1.4 | 0.8336 |
| 1.6 | 0.8439 |
| 1.8 | 0.7467 (D_3_ET) |

Fig. 40

| | first surface(S1) | second surface(S2) | third surface(S3) | fourth surface(S4) | fifth surface(S5) | sixth surface(S6) |
|---|---|---|---|---|---|---|
| K | | | 46.71759 | 5.57887 | -18.95138 | -1.34236 |
| A | | | -0.06605 | -0.20082 | 0.04547 | -0.17337 |
| B | | | 0.11766 | 0.17821 | -0.54939 | -0.02195 |
| C | | | -0.55000 | -0.06063 | 0.89338 | 0.11721 |
| D | | | 1.33904 | -0.21234 | -0.90230 | -0.10908 |
| E | | | -1.93E+00 | 4.76E-01 | 6.05E-01 | 5.71E-02 |
| F | | | 1.49E+00 | -4.84E-01 | -2.59E-01 | -1.86E-02 |
| G | | | -3.25E-01 | 2.74E-01 | 6.60E-02 | 3.69E-03 |
| H | | | -2.84E-01 | -8.30E-02 | -8.51E-03 | -4.11E-04 |
| J | | | 1.46E-01 | 1.04E-02 | 3.45E-04 | 1.96E-05 |

Fig. 41

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 0.6949 | 0 |
| 0.2 | 0.6874 | 0.2 |
| 0.4 | 0.6637 | 0.4 |
| 0.6 | 0.6195 | 0.6 |
| 0.8 (L1) | 0.5639 | 0.8 (L1) |
| 1 | 0.5825 | 1 |
| 1.2 | 0.5825 | 1.2 |
| 1.4 | 0.5825 | 1.4 |
| 1.6 | 0.5825 | 1.6 |
| 1.8 | 0.5825 | 1.8 |

Fig. 42

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.3892 | 0 |
| 0.2 | 0.4057 | 0.2 |
| 0.4 | 0.4529 | 0.4 |
| 0.6 | 0.5239 | 0.6 |
| 0.8 | 0.6073 | 0.8 |
| 1 | 0.6938 | 1 |
| 1.2 | 0.7816 | 1.2 |
| 1.3 (L2) | 0.8262 | 1.3 (L2) |
| 1.4 | 0.7648 | 1.4 |
| 1.6 | 0.7648 | 1.6 |
| 1.8 | 0.7648 | 1.8 |

Fig. 43

| | second embodiment |
|---|---|
| Diopter of first lens (Diop_L1) at room temperature (22°C) | 177.806 |
| Diopter of second lens (Diop_L2) at room temperature (22°C) | 97.659 |
| Diopter of third lens (Diop_L3) at room temperature (22°C) | 0.328 |
| D_1_ET | 1.174 mm |
| D_2_ET | 0.615 mm |
| D_3_ET | 0.747 mm |
| f1 at room temperature (22°C) | 5.625 mm |
| f2 at room temperature (22°C) | 10.240 mm |
| f3 at room temperature (22°C) | 3049.434 mm |
| d23_max | 0.8262 mm |
| d23_Sag_L3S1_max | 0.6073 mm |
| L_Sag_L3S1 | 0.8 mm |
| L_Sag_L3S2 | 1.2 mm |
| L3S2_max_sag to Sensor | 0.1345 mm |
| CA_Smax | 3.973 mm |
| CA_Smin | 1.470 mm |
| CA_Aver | 2.674 mm |
| EFL at room temperature (22°C) | 3.9530 mm |
| EFL at room low temperature (-40°C) | 3.9297 mm |
| EFL at room high temperature (90°C) | 3.9823 mm |
| TTL at room temperature (22°C) | 5.6566 mm |
| TTL at room low temperature (-40°C) | 5.6458 mm |
| TTL at room high temperature (90°C) | 5.6699 mm |
| F# at room temperature (22°C) | 2.0269 |
| F# at room low temperature (-40°C) | 2.0150 |
| F# at room high temperature (90°C) | 2.0417 |
| ImgH at room temperature (22°C) | 4.7274 mm |
| ImgH at room low temperature (-40°C) | 4.7328 mm |
| ImgH at room high temperature (90°C) | 4.7214 mm |
| BFL at room temperature (22°C) | 1.5234 mm |
| FOV at room temperature (22°C) | 61.3596 ° |
| FOV at room low temperature (-40°C) | 61.7190 ° |
| FOV at room high temperature (90°C) | 60.9228 ° |

Fig. 44

| | second embodiment |
|---|---|
| equation1 | 2.013 |
| equation2 | satisfy |
| equation3 | satisfy |
| equation4 | satisfy |
| equation5 | 5.657 |
| equation7 | satisfy |
| equation8 | 1.821 |
| equation9 | 542.207 |
| equation10 | satisfy |
| equation11 | 1.430 |
| equation12 | 0.253 |
| equation13 | 1.402 |
| equation14 | 2.391 |
| equation15 | satisfy |
| equation16 | 0.549 |
| equation18 | 542.207 |
| equation19 | 0.676 |
| equation20 | 2.094 |
| equation21 | 1.150 |
| equation22 | 0.701 |
| equation23 | satisfy |
| equation24 | 0.486 |
| equation25 | 0.846 |
| equation26 | satisfy |
| equation27 | satisfy |
| equation28 | 1.204 |
| equation29 | 0.324 |
| equation30 | 3.713 |
| equation31 | 0.695 |
| equation32 | 2.580 |
| equation33 | 0.837 |
| equation34 | 0.821 |
| equation35 | 0.603 |
| equation36 | 1.248 |
| equation37 | 0.471 |
| equation38 | 1.560 |
| equation39 | 0.518 |
| equation40 | 0.0739 |
| equation41 | 0.604 |
| equation42 | 0.1787 |
| equation43 | 0.883 |
| equation44 | 5.278 |
| equation45 | 12.826 |
| equation46 | 2.702 |
| equation47 | 1.486 |
| equation48 | 0.550 |
| equation49 | 0.840 |
| equation50 | 0.724 |

Fig. 57

| lens | surface | radius of curvature (mm) | thickness or interval (mm) | Refractive index | Abbe's number | the size of the effective diameter (mm) |
|---|---|---|---|---|---|---|
| first lens | first surface | 3.2234 | 1.6405 | 2.0508 | 26.9000 | 3.2434192 |
| | second surface | 5.1886 | 1.0226 | | | 1.8388800 |
| second lens | third surface | -5.5682 | 1.1625 | 1.6605 | 20.4000 | 2.1763927 |
| | fourth surface | -3.4295 | 0.3312 | | | 2.9165629 |
| third lens | fifth surface | 1.6060 | 0.5885 | 1.6605 | 20.4000 | 3.50 |
| | sixth surface | 1.3912 | 0.3332 | | | 4.04680634 |
| filter | seventh surface | 1.E+18 | 0.300 | 1.513 | 54.500 | 4.169 |
| | eighth surface | 1.E+18 | 0.500 | | | 4.275 |
| cover glass | ninth surface | 1.E+18 | 0.400 | 1.513 | 54.500 | 4.548 |
| | tenth surface | 1.E+18 | 0.045 | | | 4.689 |
| image sensor | eleventh surface | 1.E+18 | 0.000 | | | 4.529 |

Fig. 58

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0 | 0 | 0 |
| 0.2 | 0.0062 | 0.2 | 0.0039 |
| 0.4 | 0.0249 | 0.4 | 0.0154 |
| 0.6 | 0.0563 | 0.6 | 0.0348 |
| 0.8 | 0.1009 | 0.8 | 0.0620 |
| 0.9 | 0.1282 | 0.9 | 0.0787 |
| 1.0 | 0.1590 | 1.0 | |
| 1.2 | 0.2317 | 1.2 | |
| 1.4 | 0.3199 | 1.4 | |
| 1.6 | 0.4251 | 1.6 | |
| 1.7 | 0.1847 | 1.7 | |

Fig. 59

| vertical height of the optical axis from the optical axis(mm) | thickness of the first lens in the optical axis direction(mm) |
|---|---|
| 0 | 1.6405 (D_1) |
| 0.2 | 1.6506 |
| 0.4 | 1.6808 |
| 0.6 | 1.7316 |
| 0.8 | 1.8034 |
| 1 | 1.8782 |
| 1.2 | 1.8722 |
| 1.4 | 1.2864 (D_1_ET) |
| 1.6 | 1.2864 |
| 1.8 | 1.2864 |

Fig. 60

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0 | 0 | 0 |
| 0.2 | -0.0025 | 0.2 | -0.0055 |
| 0.4 | -0.0114 | 0.4 | -0.0256 |
| 0.6 | -0.0304 | 0.6 | -0.0678 |
| 0.8 | -0.0672 | 0.8 | -0.1399 |
| 1 | -0.0951 | 1 | -0.2479 |
| 1.2 | -0.0951 | 1.2 | -0.3928 |
| 1.3 | -0.0951 | 1.3 | -0.4733 |
| 1.5 | -0.0951 | 1.5 | -0.4733 |
| 1.7 | -0.0951 | 1.7 | -0.4733 |
| 1.9 | -0.0951 | 1.9 | -0.4733 |

Fig. 61

| vertical height of the optical axis from the optical axis(mm) | thickness of the second lens in the optical axis direction(mm) |
|---|---|
| 0 | 1.1625 (D_2) |
| 0.2 | 1.1526 |
| 0.4 | 1.1186 |
| 0.6 | 1.0503 |
| 0.8 | 0.9350 |
| 1 | 0.7581 |
| 1.2 | 0.7652 |
| 1.4 | 0.7228 (D_2_ET) |
| 1.6 | 0.7228 |
| 1.8 | 0.7228 |

Fig. 62

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0 | 0 | 0 |
| 0.2 | 0.0109 | 0.2 | 0.0125 |
| 0.4 | 0.0377 | 0.4 | 0.0469 |
| 0.6 | 0.0663 | 0.6 | 0.0931 |
| 0.8 | 0.0771 | 0.8 | 0.1378 |
| 1 | 0.0541 | 1 | 0.1693 |
| 1.2 | -0.0089 | 1.2 | 0.1799 |
| 1.3 | -0.0535 | 1.3 | 0.1757 |
| 1.5 | -0.1632 | 1.5 | 0.1452 |
| 1.7 | -0.1632 | 1.7 | 0.0798 |
| 1.9 | -0.1632 | 1.9 | -0.0386 |

Fig. 63

| vertical height of the optical axis from the optical axis(mm) | thickness of the third lens in the optical axis direction(mm) |
|---|---|
| 0 | 0.5885 (D_3) |
| 0.2 | 0.6143 |
| 0.4 | 0.6812 |
| 0.6 | 0.7648 |
| 0.8 | 0.8368 |
| 1 | 0.8758 |
| 1.2 | 0.8703 |
| 1.4 | 0.8173 |
| 1.6 | 0.7102 |
| 1.8 | 0.7590 (D_3_ET) |

Fig. 64

| | first surface(S1) | second surface(S2) | third surface(S3) | fourth surface(S4) | fifth surface(S5) | sixth surface(S6) |
|---|---|---|---|---|---|---|
| K | | | -85.3931311990 | 3.6004028966 | -16.2793930794 | -5.4540829504 |
| A | | | -0.1206052388 | -0.2149865821 | 0.0182397387 | -0.0366534479 |
| B | | | 0.1902561585 | 0.2864270818 | -0.3662777008 | -0.0838393786 |
| C | | | -0.6959289863 | -0.3208775537 | 0.5811675710 | 0.1242785413 |
| D | | | 1.6989017134 | 0.2633783869 | -0.5515633758 | -0.0935547388 |
| E | | | -2.7771058949 | -0.1432923078 | 0.3485318705 | 0.0437610559 |
| F | | | 2.9836717165 | 0.0467896755 | -0.1456026481 | -0.0131008994 |
| G | | | -2.0137511595 | -0.0067990207 | 0.0383835377 | 0.0024346328 |
| H | | | 0.7736532018 | -0.0003408374 | -0.0057628438 | -0.0002555038 |
| J | | | -0.1288902592 | 0.0001733965 | 0.0003742239 | 0.0000115499 |

Fig. 65

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 1.0226 | 0 |
| 0.2 | 1.01496 | 0.2 |
| 0.4 | 0.99146 | 0.4 |
| 0.6 | 0.94856 | 0.6 |
| 0.8 | 0.87956 | 0.8 |
| 1 (L1) | 0.79276 | 1 (L1) |
| 1.2 | | 1.2 |
| 1.4 | | 1.4 |
| 1.6 | | 1.6 |
| 1.8 | | 1.8 |
| 2.0 | | 2.0 |

Fig. 66

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.33117 | 0 |
| 0.2 | 0.34917 | 0.2 |
| 0.4 | 0.40027 | 0.4 |
| 0.6 | 0.47747 | 0.6 |
| 0.8 | 0.57087 | 0.8 |
| 1 | 0.67347 | 1 |
| 1.2 | 0.78447 | 1.2 |
| 1.4 (L2) | 0.90467 | 1.4 (L2) |
| 1.6 | 0.91367 | 1.6 |
| 1.8 | 0.75907 | 1.8 |
| 2.0 | | 2.0 |

Fig. 79

| lens | surface | radius of curvature (mm) | thickness or interval (mm) | Refractive index | Abbe's number | the size of the effective diameter (mm) |
|---|---|---|---|---|---|---|
| first lens | first surface | 3.2482104 | 1.4188 | 2.0508 | 26.9000 | 3.2809 |
| | second surface | 5.5918743 | 1.0911 | | | 1.8573 |
| second lens | third surface | -5.9935087 | 1.2642 | 1.6605 | 20.4000 | 2.2120 |
| | fourth surface | -4.2991767 | 0.3048 | | | 2.9778 |
| third lens | fifth surface | 1.59149417 | 0.6552 | 1.6605 | 20.4000 | 3.5 |
| | sixth surface | 1.4493618 | 0.3648 | | | 4.2504 |
| filter | seventh surface | 1.E+18 | 0.300 | 1.513 | 54.500 | 4.205 |
| | eighth surface | 1.E+18 | 0.500 | | | 4.304 |
| cover glass | ninth surface | 1.E+18 | 0.400 | 1.513 | 54.500 | 4.558 |
| | tenth surface | 1.E+18 | 0.045 | | | 4.689 |
| image sensor | eleventh surface | 1.E+18 | 0.000 | | | 4.531 |

Fig. 80

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0.0000 | 0 | 0.0000 |
| 0.2 | 0.00620 | 0.2 | 0.0360 |
| 0.4 | 0.02470 | 0.4 | 0.01430 |
| 0.6 | 0.05590 | 0.6 | 0.03330 |
| 0.8 | 0.10010 | 0.8 | 0.05750 |
| 1 | 0.15780 | 1 | 0.09010 |
| 1.2 | 0.22980 | 1.2 | |
| 1.4 | 0.31720 | 1.4 | |
| 1.6 | 0.42140 | 1.6 | |

Fig. 81

| vertical height of the optical axis from the optical axis(mm) | thickness of the first lens in the optical axis direction(mm) |
|---|---|
| 0 | 1.4188 (D_1) |
| 0.2 | 1.4286 |
| 0.4 | 1.4578 |
| 0.6 | 1.5070 |
| 0.8 | 1.5764 |
| 1 | 1.6667 |
| 1.2 | 1.7387 |
| 1.4 | 1.1140 (D_1_ET) |
| 1.6 | 1.1140 |

Fig. 82

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0.0000 | 0 | 0.0000 |
| 0.2 | −0.00340 | 0.2 | −0.00500 |
| 0.4 | −0.01450 | 0.4 | −0.02380 |
| 0.6 | −0.03570 | 0.6 | −0.6350 |
| 0.8 | −0.07230 | 0.8 | −0.13010 |
| 1 | −0.13200 | 1 | −0.22730 |
| 1.2 | −0.22110 | 1.2 | −0.35750 |
| 1.4 | | 1.4 | −0.52000 |
| 1.6 | | 1.6 | −0.70090 |

Fig. 83

| vertical height of the optical axis from the optical axis(mm) | thickness of the second lens in the optical axis direction(mm) |
|---|---|
| 0 | 1.2643 (D_2) |
| 0.2 | 1.2559 |
| 0.4 | 1.226 |
| 0.6 | 1.1651 |
| 0.8 | 1.0619 |
| 1 | 0.9050 |
| 1.2 | 0.6857 |
| 1.4 | 0.8335 (D_2_ET) |
| 1.6 | 0.8335 |

Fig. 84

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0.0000 | 0 | 0.0000 |
| 0.2 | 0.01200 | 0.2 | 0.01350 |
| 0.4 | 0.04250 | 0.4 | 0.05090 |
| 0.6 | 0.07860 | 0.6 | 0.10360 |
| 0.8 | 0.10480 | 0.8 | 0.15990 |
| 1 | 0.10870 | 1 | 0.20970 |
| 1.2 | 0.08430 | 1.2 | 0.24610 |
| 1.4 | 0.03130 | 1.4 | 0.26410 |
| 1.6 | -0.05230 | 1.6 | 0.25790 |
| 1.7 | -0.11240 | 1.7 | 0.24320 |
| 1.9 | | 1.9 | 0.18020 |
| 2.1 | | 2.1 | 0.04370 |

Fig. 85

| vertical height of the optical axis from the optical axis(mm) | thickness of the third lens in the optical axis direction(mm) |
|---|---|
| 0 | 0.6553 (D_3) |
| 0.2 | 0.6808 |
| 0.4 | 0.7487 |
| 0.6 | 0.8375 |
| 0.8 | 0.9200 |
| 1 | 0.9737 |
| 1.2 | 0.9857 |
| 1.4 | 0.9507 |
| 1.6 | 0.8609 |
| 1.8 | 0.8721 (D_3_ET) |

Fig. 86

| | first surface(S1) | second surface(S2) | third surface(S3) | fourth surface(S4) | fifth surface(S5) | sixth surface(S6) |
|---|---|---|---|---|---|---|
| K | | | -98.7902577110 | 5.7144888821 | -12.3632077479 | -0.6121663902 |
| A | | | -0.1078616604 | -0.2311646429 | -0.0060540489 | -0.1862966213 |
| B | | | 0.1713597318 | 0.3048025675 | -0.2453602947 | 0.0210854841 |
| C | | | -0.5575725984 | -0.3566291064 | 0.3470183601 | 0.0323485829 |
| D | | | 1.2324931963 | 0.3286000818 | -0.2860397873 | -0.0302636566 |
| E | | | -1.8151910133 | -0.2188993420 | 0.1563241471 | 0.0132208670 |
| F | | | 1.7486024173 | 0.1002006335 | -0.0563954556 | -0.0033978224 |
| G | | | -1.0533230369 | -0.0294409842 | 0.0127922346 | 0.0805134975 |
| H | | | 0.3594045465 | 0.0049525300 | -0.0016428934 | -0.0000415632 |
| J | | | -0.0529167634 | -0.0003563266 | 0.0000903158 | 0.0000013338 |

Fig. 87

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 1.09114 | 0 |
| 0.2 | 1.08414 | 0.2 |
| 0.4 | 1.06234 | 0.4 |
| 0.6 | 1.02314 | 0.6 |
| 0.8 (L1) | 0.96134 | 0.8 (L1) |
| 1 | 0.86904 | 1 |
| 1.2 | 0.77994 | 1.2 |
| 1.4 | | 1.4 |
| 1.6 | | 1.6 |

Fig. 88

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.30482 | 0 |
| 0.2 | 0.32182 | 0.2 |
| 0.4 | 0.37112 | 0.4 |
| 0.6 | 0.44692 | 0.6 |
| 0.8 | 0.53972 | 0.8 |
| 1 | 0.64082 | 1 |
| 1.2 | 0.74662 | 1.2 |
| 1.4 | 0.85612 | 1.4 |
| 1.6 (L2) | 0.95342 | 1.6 (L2) |
| 1.7 | 0.89332 | 1.7 |
| 2.0 | | 2.0 |

Fig. 101

| lens | surface | radius of curvature (mm) | thickness or interval (mm) | Refractive index | Abbe's number | the size of the effective diamete (mm) |
|---|---|---|---|---|---|---|
| first lens | first surface | 3.2293 | 1.5265 | 2.0508 | 26.0000 | 3.1702 |
| | second surface | 5.3525 | 1.0679 | | | 1.8001 |
| second lens | third surface | -5.6250 | 1.2245 | 1.6605 | 20.4000 | 2.2400 |
| | fourth surface | -3.6516 | 0.3231 | | | 2.9940 |
| third lens | fifth surface | 1.5162 | 0.5764 | 1.6605 | 20.4000 | 3.4655 |
| | sixth surface | 1.3354 | 0.3666 | | | 4.0561 |
| filter | seventh surface | 1.E+18 | 0.300 | 1.513 | 54.500 | 4.205 |
| | eighth surface | 1.E+18 | 0.500 | | | 4.304 |
| cover glass | ninth surface | 1.E+18 | 0.400 | 1.513 | 54.500 | 4.558 |
| | tenth surface | 1.E+18 | 0.045 | | | 4.689 |
| image sensor | eleventh surface | 1.E+18 | 0.000 | | | 4.531 |

Fig. 102

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0.0000 | 0 | 0.0000 |
| 0.2 | 0.00620 | 0.2 | 0.00370 |
| 0.4 | 0.02490 | 0.4 | 0.01500 |
| 0.6 | 0.05620 | 0.6 | 0.03370 |
| 0.8 | 0.10070 | 0.8 | 0.06010 |
| 1 | 0.15870 | 1 | 0.09420 |
| 1.2 | 0.23120 | 1.2 | |
| 1.4 | 0.31030 | 1.4 | |
| 1.6 | 0.42420 | 1.6 | |

Fig. 103

| vertical height of the optical axis from the optical axis(mm) | thickness of the first lens in the optical axis direction(mm) |
|---|---|
| 0 | 1.5265 (D_1) |
| 0.2 | 1.5364 |
| 0.4 | 1.5664 |
| 0.6 | 1.6164 |
| 0.8 | 1.6873 |
| 1 | 1.7704 |
| 1.2 | 1.8519 |
| 1.4 | 1.1948 (D_1_ET) |
| 1.6 | 1.1948 |

Fig. 104

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0.0000 | 0 | 0.0000 |
| 0.2 | -0.00360 | 0.2 | -0.00580 |
| 0.4 | -0.01550 | 0.4 | -0.02690 |
| 0.6 | -0.03850 | 0.6 | -0.06990 |
| 0.8 | -0.07830 | 0.8 | -0.14050 |
| 1 | -0.14340 | 1 | -0.24240 |
| 1.2 | -0.24000 | 1.2 | -0.37810 |
| 1.4 | | 1.4 | -0.54400 |
| 1.5 | | 1.5 | -0.63320 |

Fig. 105

| vertical height of the optical axis from the optical axis(mm) | thickness of the second lens in the optical axis direction(mm) |
|---|---|
| 0 | 1.2245 (D_2) |
| 0.2 | 1.2152 |
| 0.4 | 1.1821 |
| 0.6 | 1.1161 |
| 0.8 | 1.0057 |
| 1 | 0.8387 |
| 1.2 | 0.6055 |
| 1.4 | 0.7917 (D_2_ET) |
| 1.6 | 0.7917 |

Fig. 106

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0.0000 | 0 | 0.0000 |
| 0.2 | 0.01260 | 0.2 | 0.01460 |
| 0.4 | 0.04440 | 0.4 | 0.05440 |
| 0.6 | 0.08170 | 0.6 | 0.10930 |
| 0.8 | 0.10880 | 0.8 | 0.16670 |
| 1 | 0.11350 | 1 | 0.21610 |
| 1.2 | 0.09070 | 1.2 | 0.25090 |
| 1.4 | 0.04230 | 1.4 | 0.26630 |
| 1.6 | -0.02860 | 1.6 | 0.25750 |
| 1.8 | -0.13460 | 1.8 | 0.21570 |
| 2.0 | | 2.0 | 0.12150 |
| 2.1 | | 2.1 | 0.04210 |

Fig. 107

| vertical height of the optical axis from the optical axis(mm) | thickness of the third lens in the optical axis direction(mm) |
|---|---|
| 0 | 0.5764 (D_3) |
| 0.2 | 0.6036 |
| 0.4 | 0.6752 |
| 0.6 | 0.7674 |
| 0.8 | 0.8519 |
| 1 | 0.9060 |
| 1.2 | 0.9180 |
| 1.4 | 0.8850 |
| 1.6 | 0.8053 |
| 1.8 | 0.6575 |
| 2.0 | 0.7749 (D_3_ET) |

Fig. 108

| | first surface(S1) | second surface(S2) | third surface(S3) | fourth surface(S4) | fifth surface(S5) | sixth surface(S6) |
|---|---|---|---|---|---|---|
| K | | | -99.0000000000 | 3.8563096028 | -12.3024364384 | -5.1334267693 |
| A | | | -0.1336221263 | -0.2210886481 | 0.0091831334 | -0.0151926684 |
| B | | | 0.2923871644 | 0.2993630334 | -0.3061146604 | -0.1087915987 |
| C | | | -1.1141230579 | -0.3320458963 | 0.4586771987 | 0.1383517982 |
| D | | | 2.8375024522 | 0.2665059365 | -0.4060320638 | -0.0950914360 |
| E | | | -4.7224925963 | -0.1416266406 | 0.2381428532 | 0.0410199646 |
| F | | | 5.0477884158 | 0.0461628290 | -0.0920415417 | -0.0113541549 |
| G | | | -3.3250641177 | -0.0076077050 | 0.0224114799 | 0.0019550289 |
| H | | | 1.2266946025 | 0.0001935823 | -0.0031084530 | -0.0001906466 |
| J | | | -0.1936851359 | 0.0000783884 | 0.0001868853 | 0.0000080407 |

Fig. 109

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 1.06795 | 0 |
| 0.2 | 1.06065 | 0.2 |
| 0.4 | 1.03745 | 0.4 |
| 0.6 | 0.99575 | 0.6 |
| 0.8 (L1) | 0.92955 | 0.8 (L1) |
| 1 | 0.83035 | 1 |
| 1.2 | 0.73285 | 1.2 |
| 1.4 | | 1.4 |

Fig. 110

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.32312 | 0 |
| 0.2 | 0.34152 | 0.2 |
| 0.4 | 0.39442 | 0.4 |
| 0.6 | 0.47472 | 0.6 |
| 0.8 | 0.57242 | 0.8 |
| 1 | 0.67902 | 1 |
| 1.2 | 0.79192 | 1.2 |
| 1.4 | 0.91032 | 1.4 (L2) |
| 1.6 (L2) | 0.92772 | 1.6 (L2)4 |
| 1.8 | 0.82712 | 1.8 |
| 2.0 | | 2.0 |

Fig. 123

| lens | surface | radius of curvature (mm) | thickness or interval (mm) | Refractive index | Abbe's number | the size of the effective diameter (mm) |
|---|---|---|---|---|---|---|
| first lens | first surface | 3.1117 | 1.7515 | 2.0508 | 26.9000 | 1.7032 |
| | second surface | 4.6624 | 0.9852 | | | 0.9133 |
| second lens | third surface | -4.5084 | 0.9102 | 1.6605 | 20.4000 | 1.0539 |
| | fourth surface | -2.5385 | 0.5255 | | | 1.3644 |
| third lens | fifth surface | 1.8859 | 0.5000 | 1.6605 | 20.4000 | 1.8000 |
| | sixth surface | 735054 | 0.3221 | | | 2.0819 |
| filter | seventh surface | 1.E+18 | 0.300 | 1.513 | 54.500 | 4.169 |
| | eighth surface | 1.E+18 | 0.500 | | | 4.275 |
| cover glass | ninth surface | 1.E+18 | 0.400 | 1.513 | 54.500 | 4.548 |
| | tenth surface | 1.E+18 | 0.045 | | | 4.689 |
| image sensor | eleventh surface | 1.E+18 | 0.000 | | | 4.529 |

Fig. 124

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0 | 0 | 0 |
| 0.2 | 0.00640 | 0.2 | 0.00430 |
| 0.4 | 0.02580 | 0.4 | 0.01720 |
| 0.6 | 0.05840 | 0.6 | 0.03880 |
| 0.8 | 0.10460 | 0.8 | 0.06910 |
| 0.9 | 0.13300 | 0.9 | 0.08770 |
| 1.1 | 0.20090 | 1.1 | |
| 1.3 | 0.28460 | 1.3 | |
| 1.5 | 0.38540 | 1.5 | |
| 1.7 | 0.50540 | 1.7 | |

Fig. 125

| vertical height of the optical axis from the optical axis(mm) | thickness of the first lens in the optical axis direction(mm) |
|---|---|
| 0 | 1.7515 (D_1) |
| 0.2 | 1.7622 |
| 0.4 | 1.7945 |
| 0.6 | 1.8487 |
| 0.8 | 1.9252 |
| 1 | 2.0043 |
| 1.2 | 1.9022 |
| 1.4 | 2.0842 |
| 1.6 | 2.1944 |
| 1.7 | 1.3342 (D_1_ET) |

Fig. 126

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0 | 0 | 0 |
| 0.2 | −0.00460 | 0.2 | −0.00810 |
| 0.4 | −0.01970 | 0.4 | −0.03430 |
| 0.6 | −0.05000 | 0.6 | −0.08380 |
| 0.8 | −0.10530 | 0.8 | −0.16330 |
| 1 | −0.19890 | 1 | −0.28040 |
| 1.2 | | 1.2 | −0.44190 |
| 1.4 | | 1.4 | −0.62610 |

Fig. 127

| vertical height of the optical axis from the optical axis(mm) | thickness of the second lens in the optical axis direction(mm) |
|---|---|
| 0 | 0.9102 (D_2) |
| 0.2 | 0.8975 |
| 0.4 | 0.8562 |
| 0.6 | 0.7764 |
| 0.8 | 0.6416 |
| 1 | 0.4309 |
| 1.2 | 0.4683 |
| 1.4 | 0.5451 (D_2_ET) |

Fig. 128

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0 | 0 | 0 |
| 0.2 | 0.01020 | 0.2 | 0.01300 |
| 0.4 | 0.03700 | 0.4 | 0.04860 |
| 0.6 | 0.06980 | 0.6 | 0.09810 |
| 0.8 | 0.09460 | 0.8 | 0.14980 |
| 1 | 0.09820 | 1 | 0.19250 |
| 1.2 | 0.07440 | 1.2 | 0.21770 |
| 1.4 | 0.02660 | 1.4 | 0.22200 |
| 1.6 | -0.03630 | 1.6 | 0.19430 |
| 1.8 | -0.11250 | 1.8 | 0.13330 |
| 2.0 | | 2.0 | 0.01990 |
| 2.1 | | 2.1 | -0.07160 |

Fig. 129

| vertical height of the optical axis from the optical axis(mm) | thickness of the third lens in the optical axis direction(mm) |
|---|---|
| 0 | 0.5000 (D_3) |
| 0.2 | 0.5232 |
| 0.4 | 0.05856 |
| 0.6 | 0.6679 |
| 0.8 | 0.7444 |
| 1 | 0.7907 |
| 1.2 | 0.7921 |
| 1.4 | 0.7466 |
| 1.6 | 0.6580 |
| 1.8 | 0.5208 |
| 2.0 | 0.5706 (D_3_ET) |

Fig. 130

| | first surface(S1) | second surface(S2) | third surface(S3) | fourth surface(S4) | fifth surface(S5) | sixth surface(S6) |
|---|---|---|---|---|---|---|
| K | | | -10.2858517046 | -5.1434930078 | -3.7461516311 | -0.6967922402 |
| A | | | -0.0945089250 | -0.1474346417 | -0.1756285190 | -0.1958008337 |
| B | | | 0.0918306298 | 0.0567586978 | 0.0921855422 | 0.0613582981 |
| C | | | -0.4563938416 | 0.0188667573 | -0.1197300725 | -0.0296780442 |
| D | | | 1.0916905670 | -0.1196407391 | 0.1368841770 | 0.0210730360 |
| E | | | -1.6589096542 | 0.1600169188 | -0.0934001461 | -0.0119910756 |
| F | | | 1.5998588978 | -0.1115770270 | 0.0390511384 | 0.0042727118 |
| G | | | -0.9318189532 | 0.0426024818 | -0.0099246191 | -0.0009054669 |
| H | | | 0.3025926322 | -0.0078036986 | 0.0014105231 | 0.0001049165 |
| J | | | -0.0427025706 | 0.0004573856 | -0.0000861142 | -0.0000051370 |

Fig. 131

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 0.98521 | 0 |
| 0.2 | 0.97631 | 0.2 |
| 0.4 | 0.94831 | 0.4 |
| 0.6 | 0.89641 | 0.6 |
| 0.8 | 0.81081 | 0.8 |
| 1 (L1) | 0.69861 | 1 (L1) |
| 1.2 | | 1.2 |
| 1.4 | | 1.4 |
| 1.6 | | 1.6 |
| 1.8 | | 1.8 |
| 2.0 | | 2.0 |

Fig. 132

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.52550 | 0 |
| 0.2 | 0.54380 | 0.2 |
| 0.4 | 0.59680 | 0.4 |
| 0.6 | 0.67910 | 0.6 |
| 0.8 | 0.78340 | 0.8 |
| 1 | 0.90410 | 1 |
| 1.2 | 1.04180 | 1.2 |
| 1.4 (L2) | 1.17820 | 1.4 (L2) |
| 1.6 | 1.11530 | 1.6 |
| 1.8 | 1.03910 | 1.8 |
| 2.0 | | 2.0 |

Fig. 144
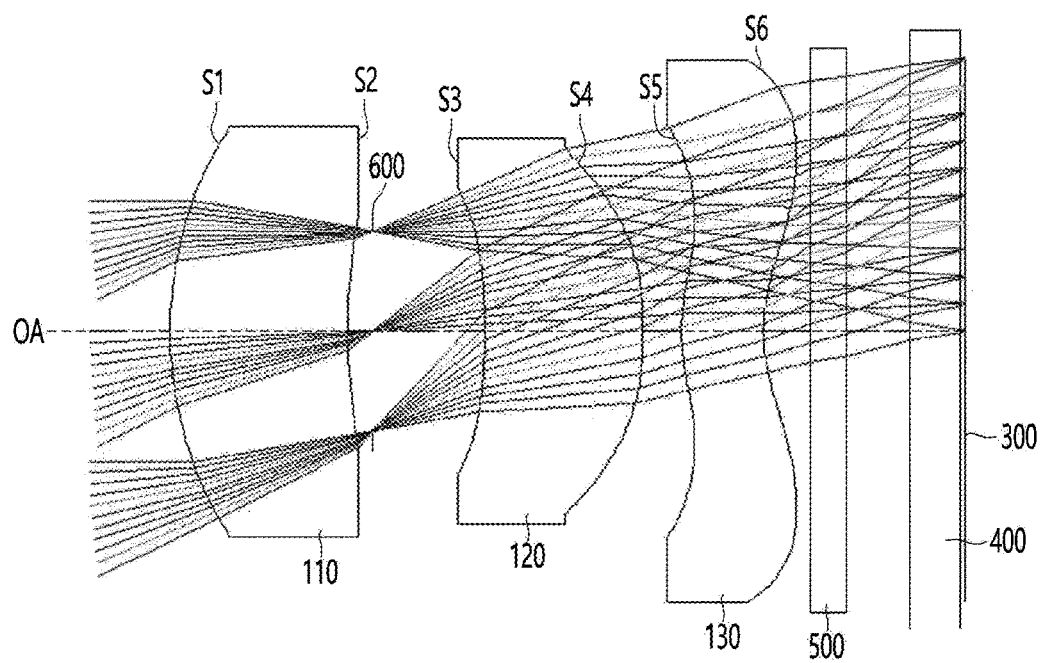
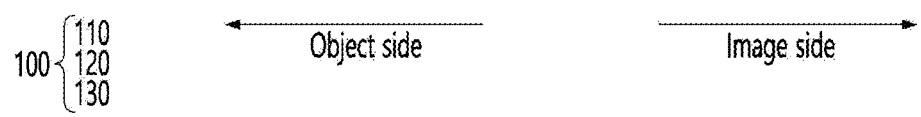

Fig. 145

| lens | surface | radius of curvature (mm) | thickness or interval (mm) | Refractive index | Abbe's number | the size of the effective diameter (mm) |
|---|---|---|---|---|---|---|
| first lens | first surface | 3.2482104 | 1.4188 | 2.0508 | 26.9000 | 3.2809 |
| | second surface | 5.5918743 | 1.0911 | | | 1.8573 |
| second lens | third surface | -5.9935087 | 1.2642 | 1.6605 | 20.4000 | 2.2120 |
| | fourth surface | -4.2991767 | 0.3048 | | | 2.9778 |
| third lens | fifth surface | 1.59149417 | 0.6552 | 1.6605 | 20.4000 | 3.5 |
| | sixth surface | 1.4493618 | 0.3648 | | | 4.2504 |
| filter | seventh surface | 1.E+18 | 0.300 | 1.513 | 54.500 | 4.205 |
| | eighth surface | 1.E+18 | 0.500 | | | 4.304 |
| cover glass | ninth surface | 1.E+18 | 0.400 | 1.513 | 54.500 | 4.558 |
| | tenth surface | 1.E+18 | 0.045 | | | 4.689 |
| image sensor | eleventh surface | 1.E+18 | 0.000 | | | 4.531 |

Fig. 146

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0.0000 | 0 | 0.0000 |
| 0.2 | 0.00620 | 0.2 | 0.0360 |
| 0.4 | 0.02470 | 0.4 | 0.01430 |
| 0.6 | 0.05590 | 0.6 | 0.03230 |
| 0.8 | 0.10010 | 0.8 | 0.05750 |
| 1 | 0.15780 | 1 | 0.09010 |
| 1.2 | 0.22980 | 1.2 | |
| 1.4 | 0.31720 | 1.4 | |
| 1.6 | 0.42140 | 1.6 | |

Fig. 147

| vertical height of the optical axis from the optical axis(mm) | thickness of the first lens in the optical axis direction(mm) |
|---|---|
| 0 | 1.4499 (D_1) |
| 0.2 | 1.4596 |
| 0.4 | 1.5375 |
| 0.6 | 1.5375 |
| 0.8 | 1.6064 |
| 1 | 1.6961 |
| 1.2 | 1.7873 |
| 1.4 | 1.0785 (D_1_ET) |
| 1.6 | 1.0785 |

Fig. 148

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0.0000 | 0 | 0.0000 |
| 0.2 | -0.00340 | 0.2 | -0.00500 |
| 0.4 | -0.01450 | 0.4 | -0.02380 |
| 0.6 | -0.03570 | 0.6 | -0.6350 |
| 0.8 | -0.07230 | 0.8 | -0.13010 |
| 1 | -0.13200 | 1 | -0.22730 |
| 1.2 | -0.22110 | 1.2 | -0.35750 |
| 1.4 | | 1.4 | -0.52000 |
| 1.6 | | 1.6 | -0.70090 |

Fig. 149

| vertical height of the optical axis from the optical axis(mm) | thickness of the second lens in the optical axis direction(mm) |
|---|---|
| 0 | 1.0175 (D_2) |
| 0.2 | 1.0086 |
| 0.4 | 0.9936 |
| 0.6 | 0.9076 |
| 0.8 | 0.7874 |
| 1 | 0.6008 |
| 1.2 | 0.6036 |
| 1.4 | 0.6390 (D_2_ET) |
| 1.6 | 0.6390 |

Fig. 150

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0.0000 | 0 | 0.0000 |
| 0.2 | 0.01200 | 0.2 | 0.01350 |
| 0.4 | 0.04250 | 0.4 | 0.05090 |
| 0.6 | 0.07860 | 0.6 | 0.10360 |
| 0.8 | 0.10480 | 0.8 | 0.15990 |
| 1 | 0.10870 | 1 | 0.20970 |
| 1.2 | 0.08430 | 1.2 | 0.24610 |
| 1.4 | 0.03130 | 1.4 | 0.26410 |
| 1.6 | -0.05230 | 1.6 | 0.25790 |
| 1.7 | -0.11240 | 1.7 | 0.24320 |
| 1.9 | | 1.9 | 0.18020 |
| 2.1 | | 2.1 | 0.04370 |

Fig. 151

| vertical height of the optical axis from the optical axis(mm) | thickness of the third lens in the optical axis direction(mm) |
|---|---|
| 0 | 0.7273 (D_3) |
| 0.2 | 0.7521 |
| 0.4 | 0.8188 |
| 0.6 | 0.9078 |
| 0.8 | 0.9930 |
| 1 | 1.0511 |
| 1.2 | 1.0600 |
| 1.4 | 1.0491 |
| 1.6 | 0.9911 |
| 1.8 | 0.8838 |
| 2.0 | 0.7602 (D_3_ET) |

Fig. 152

| | first surface(S1) | second surface(S2) | third surface(S3) | fourth surface(S4) | fifth surface(S5) | sixth surface(S6) |
|---|---|---|---|---|---|---|
| K | | | -98.7902577110 | 5.7144888821 | -12.3632077479 | -0.6121663902 |
| A | | | -0.1078616604 | -0.2311646429 | -0.0060540489 | -0.1862966213 |
| B | | | 0.1713597318 | 0.3048025675 | -0.2453602947 | 0.0210854841 |
| C | | | -0.5575725984 | -0.3566291064 | 0.3470183601 | 0.0323485829 |
| D | | | 1.2324931963 | 0.3286000818 | -0.2860397873 | -0.0302636566 |
| E | | | -1.8151910133 | -0.2188993420 | 0.1563241471 | 0.0132208670 |
| F | | | 1.7486024173 | 0.1002006335 | -0.0563954556 | -0.0033978224 |
| G | | | -1.0533230369 | -0.0294409842 | 0.0127922346 | 0.0005134975 |
| H | | | 0.3594045465 | 0.0049525300 | -0.0016428934 | -0.0000415632 |
| J | | | -0.0529167634 | -0.0003563266 | 0.0000903158 | 0.0000013338 |

Fig. 153

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 1.25040 | 0 |
| 0.2 | 1.24240 | 0.2 |
| 0.4 | 1.21730 | 0.4 |
| 0.6 | 1.17130 | 0.6 |
| 0.8 (L1) | 1.09740 | 0.8 (L1) |
| 1 | 0.98620 | 1 |
| 1.2 |  | 1.2 |
| 1.4 |  | 1.4 |
| 1.6 |  | 1.6 |

Fig. 154

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.28134 | 0 |
| 0.2 | 0.29834 | 0.2 |
| 0.4 | 0.34824 | 0.4 |
| 0.6 | 0.42774 | 0.6 |
| 0.8 | 0.52934 | 0.8 |
| 1 | 0.64614 | 1 |
| 1.2 | 0.77584 | 1.2 |
| 1.4 (L2) | 0.91144 | 1.4 (L2) |
| 1.6 | 0.94414 | 1.6 |
| 1.8 | 0.87434 | 1.8 |
| 2.0 |  | 2.0 |

Fig. 167

| lens | surface | radius of curvature (mm) | thickness or interval (mm) | Refractive index | Abbe's number | the size of the effective diameter (mm) |
|---|---|---|---|---|---|---|
| first lens | first surface | 3.2293 | 1.5265 | 2.0508 | 26.9000 | 3.1702 |
| | second surface | 5.3525 | 1.0679 | | | 1.8901 |
| second lens | third surface | -5.6250 | 1.2245 | 1.6605 | 20.4000 | 2.2400 |
| | fourth surface | -3.6516 | 0.3231 | | | 2.9940 |
| third lens | fifth surface | 1.5162 | 0.5764 | 1.6605 | 20.4000 | 3.4655 |
| | sixth surface | 1.3354 | 0.3666 | | | 4.0561 |
| filter | seventh surface | 1.E+18 | 0.300 | 1.513 | 54.500 | 4.205 |
| | eighth surface | 1.E+18 | 0.500 | | | 4.304 |
| cover glass | ninth surface | 1.E+18 | 0.400 | 1.513 | 54.500 | 4.558 |
| | tenth surface | 1.E+18 | 0.045 | | | 4.689 |
| image sensor | eleventh surface | 1.E+18 | 0.000 | | | 4.531 |

Fig. 168

| vertical height of the optical axis from the optical axis at object-side surface of the first lens | Sag of object-side surface of the first lens (mm) | vertical height of the optical axis from the optical axis at sensor-side surface of the first lens | Sag of sensor-side surface of the first lens (mm) |
|---|---|---|---|
| 0 | 0.0000 | 0 | 0.0000 |
| 0.2 | 0.00620 | 0.2 | 0.00370 |
| 0.4 | 0.02490 | 0.4 | 0.01500 |
| 0.6 | 0.05620 | 0.6 | 0.03370 |
| 0.8 | 0.10070 | 0.8 | 0.06010 |
| 1 | 0.15870 | 1 | 0.09420 |
| 1.2 | 0.23120 | 1.2 | |
| 1.4 | 0.31930 | 1.4 | |
| 1.6 | 0.42420 | 1.6 | |

Fig. 169

| vertical height of the optical axis from the optical axis(mm) | thickness of the first lens in the optical axis direction(mm) |
|---|---|
| 0 | 1.5418 (D_1) |
| 0.2 | 1.5526 |
| 0.4 | 1.5853 |
| 0.6 | 1.6400 |
| 0.8 | 1.7175 |
| 1 | 1.7948 |
| 1.2 | 1.7910 |
| 1.4 | 1.8867 |
| 1.6 | 1.1401 (D_1_ET) |

Fig. 170

| vertical height of the optical axis from the optical axis at object-side surface of the second lens | Sag of object-side surface of the second lens (mm) | vertical height of the optical axis from the optical axis at sensor-side surface of the second lens | Sag of sensor-side surface of the second lens (mm) |
|---|---|---|---|
| 0 | 0.0000 | 0 | 0.0000 |
| 0.2 | -0.00360 | 0.2 | -0.00580 |
| 0.4 | -0.01550 | 0.4 | -0.02690 |
| 0.6 | -0.03850 | 0.6 | -0.06990 |
| 0.8 | -0.07830 | 0.8 | -0.14050 |
| 1 | -0.14340 | 1 | -0.24240 |
| 1.2 | -0.24090 | 1.2 | -0.37810 |
| 1.4 | | 1.4 | -0.54490 |
| 1.5 | | 1.5 | -0.63320 |

Fig. 171

| vertical height of the optical axis from the optical axis(mm) | thickness of the second lens in the optical axis direction(mm) |
|---|---|
| 0 | 1.0594 (D_2) |
| 0.2 | 1.0499 |
| 0.4 | 1.0169 |
| 0.6 | 0.9498 |
| 0.8 | 0.8332 |
| 1 | 0.6516 |
| 1.2 | 0.6648 |
| 1.4 | 0.6729 (D_2_ET) |
| 1.6 | 0.6729 |

Fig. 172

| vertical height of the optical axis from the optical axis at object-side surface of the third lens | Sag of object-side surface of the third lens (mm) | vertical height of the optical axis from the optical axis at sensor-side surface of the third lens | Sag of sensor-side surface of the third lens (mm) |
|---|---|---|---|
| 0 | 0.0000 | 0 | 0.0000 |
| 0.2 | 0.01260 | 0.2 | 0.01460 |
| 0.4 | 0.04440 | 0.4 | 0.05440 |
| 0.6 | 0.08170 | 0.6 | 0.10930 |
| 0.8 | 0.10880 | 0.8 | 0.16670 |
| 1 | 0.11350 | 1 | 0.21610 |
| 1.2 | 0.09070 | 1.2 | 0.25090 |
| 1.4 | 0.04230 | 1.4 | 0.26630 |
| 1.6 | −0.02860 | 1.6 | 0.25750 |
| 1.8 | −0.13460 | 1.8 | 0.21570 |
| 2.0 |  | 2.0 | 0.12150 |
| 2.1 |  | 2.1 | 0.04210 |

Fig. 173

| vertical height of the optical axis from the optical axis(mm) | thickness of the third lens in the optical axis direction(mm) |
|---|---|
| 0 | 0.5525 (D_3) |
| 0.2 | 0.5772 |
| 0.4 | 0.6424 |
| 0.6 | 0.7237 |
| 0.8 | 0.7886 |
| 1 | 0.8110 |
| 1.2 | 0.7813 |
| 1.4 | 0.7052 |
| 1.6 | 0.5984 |
| 1.8 | 0.4689 |
| 2.0 | 0.6924 (D_3_ET) |

Fig. 174

| | first surface(S1) | second surface(S2) | third surface(S3) | fourth surface(S4) | fifth surface(S5) | sixth surface(S6) |
|---|---|---|---|---|---|---|
| K | | | -99.0000000000 | 3.8563096028 | -12.3024364384 | -5.1334267693 |
| A | | | -0.1336221263 | -0.2210886481 | 0.0091831334 | -0.0151926684 |
| B | | | 0.2923871644 | 0.2993630334 | -0.3061146604 | -0.1087915987 |
| C | | | -1.1141230579 | -0.3320458963 | 0.4586771987 | 0.1383517982 |
| D | | | 2.8375024522 | 0.2665059365 | -0.4060320638 | -0.0950914360 |
| E | | | -4.7224925963 | -0.1416266406 | 0.2381428532 | 0.0410199646 |
| F | | | 5.0477884158 | 0.0461628290 | -0.0920415417 | -0.0113541549 |
| G | | | -3.3250641177 | -0.0076077050 | 0.0224114799 | 0.0019550289 |
| H | | | 1.2266946025 | 0.0001935823 | -0.0031084530 | -0.0001906466 |
| J | | | -0.1936851359 | 0.0000783884 | 0.0001868853 | 0.0000080407 |

Fig. 175

| vertical height of the optical axis from optical at sensor-side surface of the first lens (mm) | distance of airgap (d12) in the optical axis direction (mm) (first distance) | vertical height of the optical axis from optical at object-side surface of the second lens (mm) |
|---|---|---|
| 0 | 1.11524 | 0 |
| 0.2 | 1.10754 | 0.2 |
| 0.4 | 1.08304 | 0.4 |
| 0.6 | 1.03794 | 0.6 |
| 0.8 (L1) | 0.96404 | 0.8 (L1) |
| 1 | 0.85094 | 1 |
| 1.2 | | 1.2 |
| 1.4 | | 1.4 |

Fig. 176

| vertical height of the optical axis from optical at sensor-side surface of the second lens (mm) | distance of airgap (d23) in the optical axis direction (mm) (second distance) | vertical height of the optical axis from optical at object-side surface of the third lens (mm) |
|---|---|---|
| 0 | 0.38055 | 0 |
| 0.2 | 0.39775 | 0.2 |
| 0.4 | 0.44695 | 0.4 |
| 0.6 | 0.52125 | 0.6 |
| 0.8 | 0.60935 | 0.8 |
| 1 | 0.70275 | 1 |
| 1.2 | 0.80125 | 1.2 |
| 1.4 (L2) | 0.89645 | 1.4 (L2) |
| 1.6 | 0.89805 | 1.6 |
| 1.8 | 0.83425 | 1.8 |
| 2.0 | | 2.0 |

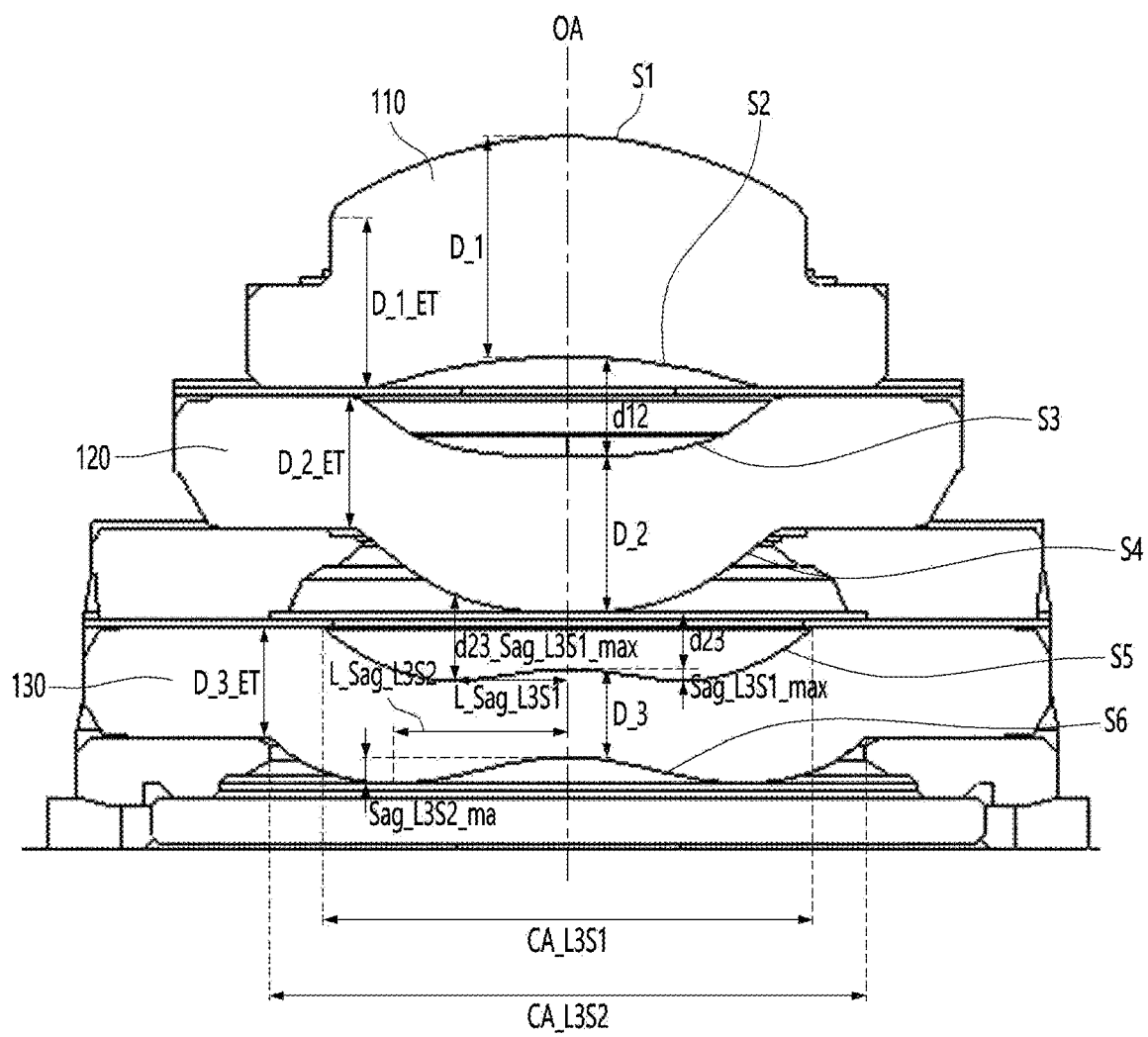

OPTICAL SYSTEM AND CAMERA MODULE COMPRISING SAME

CROSS-REFERENCE TO RELATED APPLICATIONS

This application is the U.S. national stage application of International Patent Application No. PCT/KR2022/001987, filed Feb. 9, 2022, which claims the benefit under 35 U.S.C. § 119 of Korean Application Nos. 10-2021-0018549, filed Feb. 9, 2021; 10-2021-0091809, filed Jul. 13, 2021; 10-2021-0177903, filed Dec. 13, 2021; and 10-2021-0183195, filed Dec. 20, 2021; the disclosures of each of which are incorporated herein by reference in their entirety.

TECHNICAL FIELD

An embodiment relates to an optical system having improved optical performance and a camera module comprising the same.

BACKGROUND ART

ADAS (Advanced Driving Assistance System) is an advanced driver assistance system to assist drivers in driving. ADAS is configured to sense the situation in front, determine the situation based on the sensed result, and control the behavior of the vehicle based on the situation determination. For example, the ADAS sensor device detects a vehicle ahead and recognizes a lane. Then, when the target lane or target speed and the target in front are determined, the vehicle's ESC (Electrical Stability Control), EMS (Engine Management System), MDPS (Motor Driven Power Steering), etc. are controlled. Typically, ADAS may be implemented as an automatic parking system, a low-speed city driving assistance system, a blind spot warning system, or the like.

Sensor devices for detecting the situation ahead in ADAS include a GPS sensor, a laser scanner, a front radar, and a lidar, and the most representative is a camera for photographing the front, rear and side of the vehicle.

Such a camera may be disposed outside or inside the vehicle to sense surrounding conditions of the vehicle. In addition, the camera may be disposed inside the vehicle to detect the situation of the driver and the passenger. For example, the camera may photograph the driver at a position adjacent to the driver, and may detect the driver's health state, whether he is drowsy, whether he is drinking, or the like. In addition, the camera may photograph the passenger at a position adjacent to the passenger, detect whether the passenger is sleeping, health status, etc., and may provide information about the passenger to the driver.

In particular, the most important element for obtaining an image in a camera is an imaging lens that forms an image. Recently, interest in high performance such as high image quality and high resolution is increasing, and research on an optical system including a plurality of lenses is being conducted in order to realize this. However, when the camera is exposed to a harsh environment, for example, high temperature, low temperature, moisture, high humidity, etc. outside or inside the vehicle, there is a problem in that the characteristics of the optical system change. In this case, the camera has a problem in that it is difficult to uniformly derive excellent optical characteristics and aberration characteristics.

Therefore, a new optical system and a camera capable of solving the above problems are required.

DISCLOSURE

Technical Problem

An embodiment is to provide an optical system and a camera module with improved optical properties.

In addition, the embodiment is to provide an optical system and a camera module that can provide excellent optical properties in a low or high temperature environment.

In addition, embodiment is to provide an optical system and a camera module capable of inhibiting or minimizing changes in optical properties in various temperature ranges.

Technical Solution

An optical system according to an embodiment includes first to third lenses disposed along an optical axis from an object side to a sensor side direction, wherein the first lens has a meniscus shape convex toward the object side, and satisfies $1.7 \leq nt\_1 \leq 2.3$ and $TTL \leq 6$ mm.

($nt\_1$ is the refractive index of the first lens with respect to the light of the t-line wavelength band, and TTL is the distance on the optical axis from the object-side surface of the first lens to the upper surface of the image sensor.)

In addition, the object-side surface and the sensor-side surface of the first lens may be spherical.

In addition, $1.4 \text{ mm} \leq D\_1$ may be satisfied.

($D\_1$ is the thickness on the optical axis of the first lens.)

Also, a difference between the Abbe numbers of the first to third lenses may be 10 or less.

In addition, the F-number of the optical system may be 1.8 to 2.2.

Also, $nt\_2 < nt\_1$, $nt\_3 < nt\_1$ may be satisfied, materials of the first lens and the second lens are different from each other, materials of the first lens and the third lens are different from each other, and materials of the second lens and the third lens may be the same.

($nt\_1$ is the refractive index of the first lens with respect to the light of the t-line wavelength band, $nt\_2$ is the refractive index of the second lens with respect to the light of the t-line wavelength band, and $nt\_3$ is the refractive index of the third lens with respect to the light of the t-line wavelength band.)

In addition, the optical system according to the embodiment includes first to third lenses disposed along an optical axis in a direction from the object side to the sensor side, the first lens has a positive refractive power, and the first lens has a meniscus shape convex toward the object, and each of the first to third lenses may satisfy the following equation.

$$dnt\_1/dt > 0$$

$$dnt\_2/dt < 0$$

$$dnt\_3/dt < 0$$

($dnt\_1/dt$ is a change in the refractive index of the first lens according to temperature change, $dnt\_2/dt$ is a change in refractive index of the second lens according to temperature change, and $dnt\_3/dt$ is a change in refractive index of the third lens according to temperature change.)

In addition, the object-side surface and the sensor-side surface of the first lens may be spherical.

Also, $1.7 \leq nt\_1 \leq 2.3$ may be satisfied.

(nt_1 is the refractive index of the first lens with respect to the light of the t-line wavelength band.)

Also, nt_2<nt_1, nt_3<nt_1 may be satisfied, materials of the first lens and the second lens are different from each other, materials of the first lens and the third lens are different from each other, and materials of the second lens and the third lens may be the same.

(nt_1 is the refractive index of the first lens with respect to the light of the t-line wavelength band, nt_2 is the refractive index of the second lens with respect to the light of the t-line wavelength band, and nt_3 is the refractive index of the third lens with respect to the light of the t-line wavelength band.)

In addition, TTL≤6 mm may be satisfied.

(TTL is the distance on the optical axis from the object-side surface of the first lens to the upper surface of the image sensor.)

Advantageous Effects

The optical system and camera module according to the embodiment may have improved optical properties. In detail, in the optical system according to the embodiment, the plurality of lenses may have a set shape, refractive power, focal length, thickness, etc., and thus may have improved distortion characteristics and aberration characteristics. Accordingly, the optical system and the camera module according to the embodiment may provide high resolution and high-quality images within a set field of view range.

In addition, the optical system and the camera module according to the embodiment may operate in various temperature ranges. In detail, the optical system may include a first lens made of a glass material, and second and third lenses made of a plastic material. In this case, each of the first to third lenses may have a set refractive power. Accordingly, even when the focal length of each lens is changed due to a change in refractive index according to a change in temperature, the first to third lenses may be mutually compensated. That is, the optical system can effectively distribute the refractive power in the temperature range of low (about −40° C.) to high (about 99° C.). And, it is possible to inhibit or minimize changes in optical properties in the temperature range of low (−40° C.) to high (99° C.). Accordingly, the optical system and the camera module according to the embodiment may maintain improved optical properties in various temperature ranges.

In addition, the optical system and the camera module according to the embodiment satisfy the field of view set with the minimum lens and can implement excellent optical characteristics. Accordingly, the optical system may be provided in a slimmer and more compact structure. Accordingly, the optical system and the camera module may be provided for various applications and devices, and may have excellent optical properties even in a harsh temperature environment, for example, in a high temperature vehicle interior in summer.

DESCRIPTION OF DRAWINGS

FIG. 6 is a data on refraction of a second lens and a third lens with respect to light of various wavelengths in a temperature range of low temperature to high temperature.

FIG. 9 is a data of first lens to third lens according to the first embodiment.

FIG. 10 is a sag data according to the vertical height of the optical axis of each of the object-side surface and the sensor-side surface of the first lens at room temperature.

FIG. 11 is a data on the lens thickness according to the height in the vertical direction of the optical axis at room temperature.

FIG. 12 is a sag data according to the vertical height of the optical axis of each of the object-side surface and the sensor-side surface of the second lens at room temperature.

FIG. 13 is a data on the lens thickness according to the height in the vertical direction of the optical axis at room temperature.

FIG. 14 is a sag data according to the vertical height of the optical axis of each of the object-side surface and the sensor-side surface of the third lens at room temperature.

FIG. 15 is a data on a lens thickness according to a height in a vertical direction of an optical axis at room temperature.

FIG. 16 is an aspheric coefficient data of the optical system according to the first embodiment.

FIG. 17 is a data of an interval between a first lens and a second lens of the optical system according to the first embodiment.

FIG. 18 is a data of an interval between a second lens and a third lens of the optical system according to the first embodiment.

FIG. 19 is a data of the optical system according to the first embodiment applied to the equation.

FIG. 20 is a result data of the optical system according to the first embodiment introduced in Equation.

FIG. 33 is a data of first lens to third lens according to the second

FIG. 34 is a sag data according to the vertical height of the optical axis of each of the object-side surface and the sensor-side surface of the first lens at room temperature.

FIG. 35 is a data on the lens thickness according to the height in the vertical direction of the optical axis at room temperature.

FIG. 36 is a sag data according to the vertical height of the optical axis of each of the object-side surface and the sensor-side surface of the second lens at room temperature.

FIG. 37 is a data on the lens thickness according to the height in the vertical direction of the optical axis at room temperature.

FIG. 38 is a sag data according to the vertical height of the optical axis of each of the object-side surface and the sensor-side surface of the third lens at room temperature.

FIG. 39 is a data on the lens thickness according to the height in the vertical direction of the optical axis at room temperature.

FIG. 40 is an aspheric coefficient data of the optical system according to the second embodiment.

FIG. 41 is an interval data between a first lens and a second lens of the optical system according to the second embodiment.

FIG. 42 is an interval data between a second lens and a third lens of the optical system according to the second embodiment.

FIG. 43 is a data of the optical system according to the second embodiment applied to Equation.

FIG. 44 is a result data of the optical system according to the second embodiment introduced in Equation.

FIG. 57 is a table of first lens to third lens of the optical system according to the third embodiment.

FIG. 58 is a table of sag values of the first lens of the optical system according to the third embodiment.

FIG. 59 is a table showing the thickness of the first lens of the optical system according to the third embodiment.

FIG. 60 is a table of sag values of the second lens of the optical system according to the third embodiment.

FIG. 61 is a table of the thickness of the second lens of the optical system according to the third embodiment.

FIG. 62 is a table of sag values of the third lens of the optical system according to the third embodiment.

FIG. 63 is a table of the thickness of the third lens of the optical system according to the third embodiment.

FIG. 64 is a table of the aspheric coefficient of the lens of the optical system according to the third embodiment.

FIGS. 65 and 66 are tables of intervals between lenses of the optical system according to the third embodiment.

FIG. 79 is a table of first lens to third lens of the optical system according to the fourth embodiment.

FIG. 80 is a table of sag values of the first lens of the optical system according to the fourth embodiment.

FIG. 81 is a table of the thickness of the first lens of the optical system according to the fourth embodiment.

FIG. 82 is a table of sag values of the second lens of the optical system according to the fourth embodiment.

FIG. 83 is a table showing the thickness of the second lens of the optical system according to the fourth embodiment.

FIG. 84 is a table of sag values of the third lens of the optical system according to the fourth embodiment.

FIG. 85 is a table of the thickness of the third lens of the optical system according to the fourth embodiment.

FIG. 86 is a table of the aspheric coefficient of the lens of the optical system according to the fourth embodiment.

FIGS. 87 and 88 are tables of intervals between lenses of the optical system according to the fourth embodiment.

FIG. 101 is a table of first to third lenses of the optical system according to the fifth embodiment.

FIG. 102 is a table of sag values of the first lens of the optical system according to the fifth embodiment.

FIG. 103 is a table of the thickness of the first lens of the optical system according to the fifth embodiment.

FIG. 104 is a table of sag values of the second lens of the optical system according to the fifth embodiment.

FIG. 105 is a table of the thickness of the second lens of the optical system according to the fifth embodiment.

FIG. 106 is a table of sag values of the third lens of the optical system according to the fifth embodiment.

FIG. 107 is a table of the thickness of the third lens of the optical system according to the fifth embodiment.

FIG. 108 is a table of the aspheric coefficient of the lens of the optical system according to the fifth embodiment.

FIGS. 109 and 110 are tables of intervals between lenses of the optical system according to the fifth embodiment.

FIG. 123 is a table of first lens to third lens of the optical system according to the sixth embodiment.

FIG. 124 is a table of sag values of the first lens of the optical system according to the sixth embodiment.

FIG. 125 is a table showing the thickness of the first lens of the optical system according to the sixth embodiment.

FIG. 126 is a table of sag values of the second lens of the optical system according to the sixth embodiment.

FIG. 127 is a table showing the thickness of the second lens of the optical system according to the sixth embodiment.

FIG. 128 is a table of sag values of the third lens of the optical system according to the sixth embodiment.

FIG. 129 is a table showing the thickness of the third lens of the optical system according to the sixth embodiment.

FIG. 130 is a table of the aspheric coefficient of the lens of the optical system according to the sixth embodiment.

FIGS. 131 and 132 are tables of intervals between lenses of the optical system according to the sixth embodiment.

FIG. 144 is a block diagram of an optical system according to the seventh embodiment.

FIG. 145 is a table of first lens to third lens of the optical system according to the seventh embodiment.

FIG. 146 is a table of sag values of the first lens of the optical system according to the seventh embodiment.

FIG. 147 is a table of the thickness of the first lens of the optical system according to the seventh embodiment.

FIG. 148 is a table of sag values of the second lens of the optical system according to the seventh embodiment.

FIG. 149 is a table of the thickness of the second lens of the optical system according to the seventh embodiment.

FIG. 150 is a table of sag values of the third lens of the optical system according to the seventh embodiment.

FIG. 151 is a table of the thickness of the third lens of the optical system according to the seventh embodiment.

FIG. 152 is a table of the aspheric coefficient of the lens of the optical system according to the seventh embodiment.

FIGS. 153 and 154 are tables of intervals between lenses of the optical system according to the seventh embodiment.

FIG. 167 is a table of first lens to third lens of the optical system according to the eighth embodiment.

FIG. 168 is a table of sag values of the first lens of the optical system according to the eighth embodiment.

FIG. 169 is a table of the thickness of the first lens of the optical system according to the eighth embodiment.

FIG. 170 is a table of sag values of the second lens of the optical system according to the eighth embodiment.

FIG. 171 is a table showing the thickness of the second lens of the optical system according to the eighth embodiment.

FIG. 172 is a table of sag values of the third lens of the optical system according to the eighth embodiment.

FIG. 173 is a table showing the thickness of the third lens of the optical system according to the eighth embodiment.

FIG. 174 is a table of the aspheric coefficient of the lens of the optical system according to the eighth embodiment.

FIGS. 175 and 176 are tables of intervals between lenses of the optical system according to the eighth embodiment.

FIG. 188 is a configuration diagram for explaining some terms in the optical system according to the embodiment.

MODES OF THE INVENTION

Figure 1:
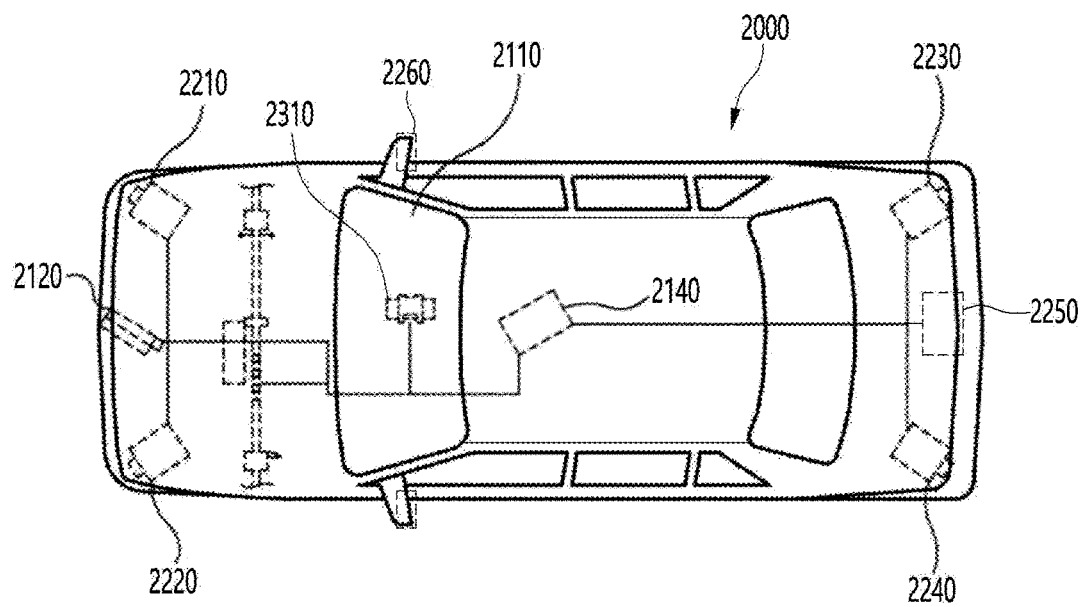
FIG. 1 is a view showing a plan view of a vehicle to which a camera module or an optical system according to an embodiment is applied.

Hereinafter, preferred embodiments of the invention will be described in detail with reference to the accompanying drawings.

A technical spirit of the invention is not limited to some embodiments to be described, and may be implemented in various other forms, and one or more of the components may be selectively combined and substituted for use within the scope of the technical spirit of the invention.

In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C.

In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component.

In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In addition, the convex surface of the lens may mean that the lens surface of the region corresponding to the optical axis has a convex shape, and the concave surface of the lens means that the lens surface of the region corresponding to the optical axis has a concave shape.

In addition, "object-side surface" may mean the surface of the lens facing the object side with respect to the optical axis, and "image-side surface" may mean the surface of the lens toward the imaging surface with respect to the optical axis.

In addition, the vertical direction may mean a direction perpendicular to the optical axis, and the end of the lens or the lens surface may mean the end of the effective region of the lens through which the incident light passes.

In addition, the size of the effective diameter of the lens surface may mean an area between the ends of the lens through which incident light passes. That is, the size of the effective area of the lens may be the size of the effective diameter.

In addition, the center thickness of the lens may mean a length in the optical axis direction between the object side and the sensor side on the optical axis of the lens.

In addition, the size of the effective diameter of the lens surface may have a measurement error of up to 0.4 mm depending on a measurement method or the like. For example, the effective diameter may be 2 mm or less, or 1 mm or less, or 0.3 mm or less with respect to the inner diameter of the flange portion.

In addition, in an embodiment, low temperature may mean a specific temperature (−40° C.) or may mean a temperature range of about −40° C. to about 30° C., room temperature may mean a specific temperature (22° C.) or a temperature range of about 20° C. to about 30° C. Also, high temperature may mean a specific temperature (99° C.) or a temperature range of about 85° C. to about 105° C.

Figure 2:
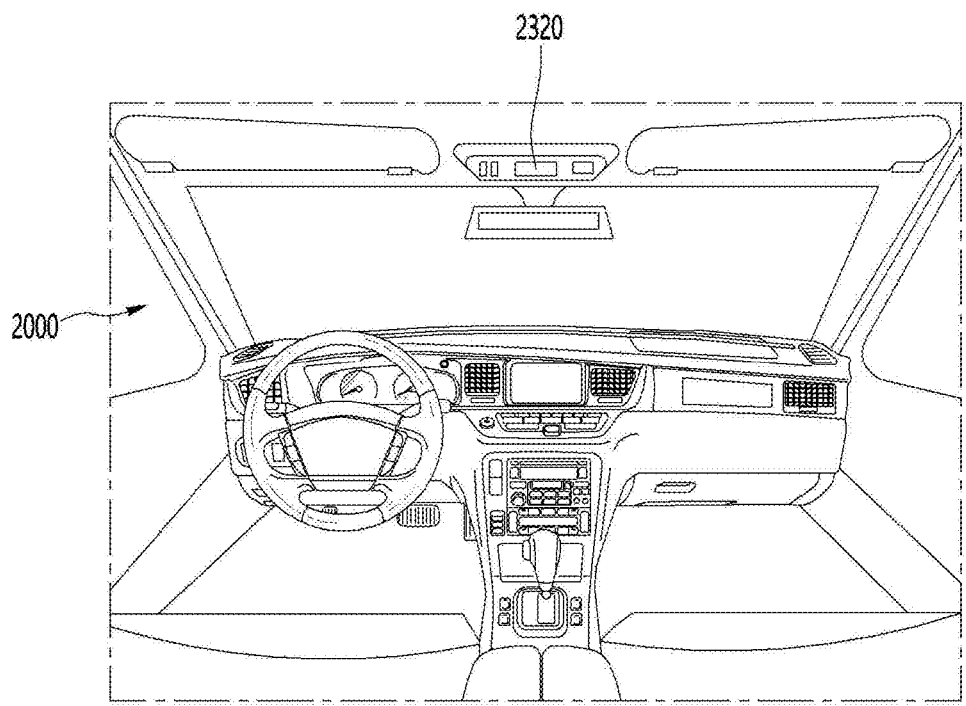
FIGS. 2 and 3 are views showing an interior view of a vehicle to which a camera module or an optical system according to an embodiment is applied.
Figures 3, 4:
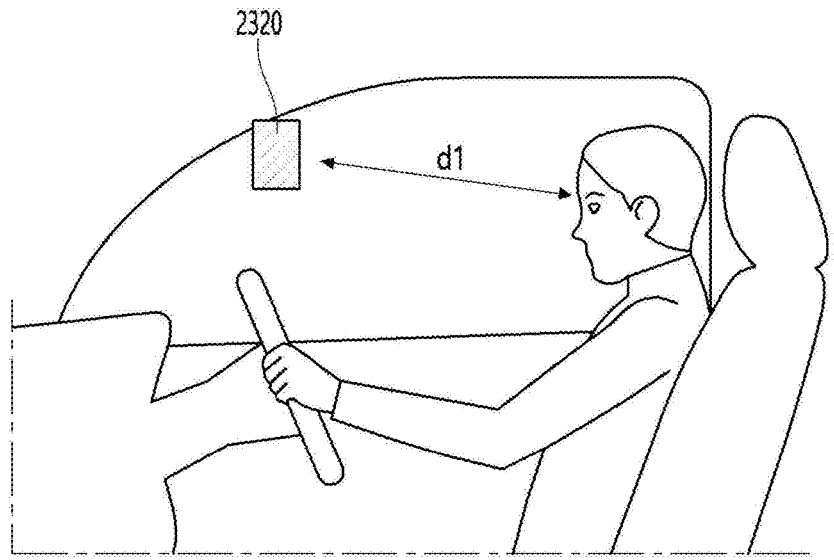
FIG. 4 is a data on the refractive index of the first lens for light of various wavelengths in a temperature range of low temperature to high temperature.

FIG. 1 is a view showing a plan view of a vehicle to which a camera module or an optical system according to an embodiment is applied, and FIGS. 2 and 3 are views showing the interior of a vehicle to which a camera module or an optical system according to an embodiment is applied.

First, referring to FIG. 1, the vehicle camera system according to the embodiment includes an image generation unit 2110, a first information generation unit 2120, and a second information generation unit 2210, 2220, 2230, 2240, 2250, 2260, and a control unit 2140.

The image generation unit 2110 may include at least one first camera module 2310 disposed outside or inside the vehicle 2000, and may generate a front image of the vehicle 2000. In addition, the image generating unit 2110 uses the first camera module 2310 to photograph not only the front of the vehicle 2000 but also the surroundings of the vehicle 2000 in one or more directions, whereby the image generating unit 2110 may generate an image around the vehicle 2000. Here, the front image and the surrounding image may be a digital image, and may include a color image, a black-and-white image, and an infrared image. Also, the front image and the surrounding image may include a still image and a moving image. The image generation unit 2110 may provide the front image and the surrounding image to the controller 2140.

Next, the first information generating unit 2120 may include at least one radar and/or a camera disposed on the vehicle 2000, and detects the front of the vehicle 2000 to generate first detection information. Specifically, the first information generating unit 2120 is disposed in the vehicle 2000, the first sensing information may be generated by detecting the position and speed of the vehicles 2000 located in front of the vehicle 2000, the presence and location of pedestrians, and the like.

Using the first sensing information generated by the first information generating unit 2120, it is possible to control to maintain a constant distance between the vehicle 2000 and the vehicle in front. In addition, the driving stability of the vehicle 2000 may be improved in a preset specific case, such as when the driver wants to change the driving lane of the vehicle 2000 or when parking in reverse. The first information generating unit 2120 may provide the first detection information to the controller 2140.

Next, the second information generating units 2210, 2220, 2230, 2240, 2250, 2260 detects each side of the vehicle 2000 based on the front image generated by the image generating unit 2110 and the first sensing information generated by the first information generating unit 2120, and thereby, the second sensing information is generated. Specifically, the second information generating unit 2210, 2220, 2230, 2240, 2250, 2260 may include at least one radar and/or camera disposed on the vehicle 2000, and may detect the position and speed of vehicles located on the side of the vehicle 2000 or capture an image. Here, the second information generating unit 2210, 2220, 2230, 2240, 2250, 2260 may be disposed at both front corners, side mirrors, and rear center and rear corners of the vehicle 2000, respectively.

Also, referring to FIGS. 2 and 3, the image generating unit 2110 may include at least one second camera module 2320 disposed inside the vehicle 2000. The second camera module 2320 may be disposed adjacent to a driver and a passenger. For example, the second camera module 2320 may be disposed at a location spaced apart from a driver and a passenger by a first distance d1 to generate an internal image of the vehicle 2000. In this case, the first distance d1 may be about 500 mm or more. In detail, the first distance d1 may be about 600 mm or more. In addition, the second camera module 2320 may have a field of view FOV of about 55 degrees or more.

The image generating unit 2110 may generate an internal image of the vehicle 2000 by photographing a driver and/or a passenger inside the vehicle 2000 using the second camera module 2320. Here, the image inside the vehicle may be a digital image, and may include a color image, a black-and-white image, and an infrared image. Also, the internal image may include a still image and a moving image. The image generating unit 2110 provides the internal image of the vehicle 2000 to the controller 2140.

The controller 2140 may provide information to the occupant of the vehicle 2000 based on the information provided from the image generating unit 2110. For example, based on the information provided from the image generating unit 2110, the driver's health state, drowsiness, drinking, etc. may be detected, and information such as guidance and warning corresponding thereto may be provided to the driver. there is. In addition, based on the information provided from the image generating unit 2110, whether the passenger is sleeping, health status, etc. may be detected and information may be provided to the driver and/or the passenger.

Such a vehicle camera system may include a camera module having an optical system 1000 according to the following embodiment, and is provided to a user using information obtained through the front, rear, side, or corner areas of the vehicle 2000 or to protect the vehicle 2000 and objects from autonomous driving or surrounding safety. In addition, it may be disposed inside the vehicle 2000 to provide various information to the driver and passengers. That is, at least one of the first camera module 2310 and the second camera module 2320 may include an optical system 1000 to be described later.

A plurality of optical systems of the camera module according to the embodiment may be mounted in a vehicle for safety regulation, reinforcement of autonomous driving functions, and increased convenience. In addition, the optical system of the camera module is a part for control such as a lane keeping assistance system (LKAS), a lane departure warning system (LDWS), and a driver monitoring system (DMS), and is applied in a vehicle. Such a vehicle camera module can implement stable optical performance even when ambient temperature changes and provide a module with competitive price, thereby securing reliability of vehicle components.

Hereinafter, an optical system according to an embodiment will be described in detail.

The optical system 1000 according to the embodiment may include a plurality of lenses 100 and an image sensor 300. In detail, the optical system 1000 according to the embodiment may include two or more lenses. For example, the optical system 1000 may include three lenses. the optical system 1000 may include a first lens 110, a second lens 120, a third lens 130 and an image sensor 300 sequentially disposed from an object side to the sensor side. and an image sensor 300. The first to third lenses 110, 120, 130 may be sequentially disposed along the optical axis OA of the optical system 1000.

In this case, the light corresponding to the object information may pass through the first lens 110, the second lens 120, and the third lens 130 to be incident on the image sensor 300.

Each of the plurality of lenses 100 may include an effective area and an ineffective area. The effective area may be an area through which light incident on each of the first to third lenses 110, 120, 130 passes. That is, the effective region may be a region in which incident light is refracted to realize optical properties.

The ineffective area may be disposed around the effective area. The ineffective area may be an area to which the light is not incident. That is, the ineffective region may be a region independent of the optical characteristic. Also, the ineffective region may be a region fixed to a barrel (not shown) for receiving the lens.

The image sensor 300 may detect light. In detail, the image sensor 300 may detect light sequentially passing through the plurality of lenses 100, in detail, the first to third lenses 110, 120, 130. The image sensor 300 may include a device capable of detecting incident light, such as a charge coupled device (CCD) or a complementary metal oxide semiconductor (CMOS).

The image sensor 300 may include a plurality of pixels having a set size. For example, the pixel size of the image sensor 300 may be about 3 m.

The image sensor 300 may detect light of a set wavelength. For example, the image sensor 300 may detect infrared ray light. In detail, the image sensor 300 may detect near infrared ray light of about 1500 nm or less. For example, the image sensor may detect light in a wavelength band of about 880 nm to about 1000 nm.

The optical system 1000 according to the embodiment may further include a cover glass 400 and a filter 500.

The cover glass 400 may be disposed between the plurality of lenses 100 and the image sensor 300. The cover glass 400 may be disposed adjacent to the image sensor 300. The cover glass 400 may have a shape corresponding to the image sensor 300. The cover glass 400 may be provided to have a size greater than or equal to that of the image sensor 300 to protect an upper portion of the image sensor 300.

Also, the filter 500 may be disposed between the plurality of lenses 100 and the image sensor 300. The filter 500 may be disposed between the last lens (third lens 130) closest to the image sensor 300 and the image sensor 300. In detail, the filter 500 may be disposed between the last lens (the third lens 130) and the cover glass 400.

The filter 500 may pass light of a set wavelength band and filter light of a different wavelength band. The filter 500 may pass light of a wavelength band corresponding to the light received by the image sensor 300 and may block light of a wavelength band that does not correspond to the received light. In detail, the filter 500 may pass light in an infrared wavelength band and block light in an ultraviolet or visible ray band. For example, the filter 500 may include at least one of an infrared pass filter and an infrared cut-off filter.

Also, the optical system 1000 according to the embodiment may include an aperture (not shown). The aperture may control the amount of light incident on the optical system 1000.

The aperture may be disposed at a set position. For example, the aperture may be positioned in front of the first lens 110. In addition, the aperture may be disposed between two lenses selected from among the first to third lenses 110, 120, and 130. For example, the aperture may be located at the rear of the first lens 110.

In addition, at least one of the first to third lenses 110, 120, 130 may function as an aperture. In detail, the object-side surface or the sensor-side surface of one of the first to third lenses 110, 120, 130 may serve as an aperture for controlling the amount of light. For example, the sensor-side surface (the second surface S2) of the first lens 110 may serve as an aperture.

Hereinafter, the plurality of lenses 100 according to the embodiment will be described in more detail.

The first lens 110 may have a positive (+) refractive power in the optical axis OA. The first lens 110 may include a glass material.

The first lens 110 may include a first surface S1 defined as an object-side surface and a second surface S2 defined as a sensor-side surface. The first surface S1 may have a convex shape in the optical axis OA, and the second surface S2 may be concave in the optical axis OA. That is, the first lens 110 may have a meniscus shape convex from the optical axis OA toward the object.

At least one of the first surface S1 and the second surface S2 may be a sphere. For example, both the first surface S1 and the second surface S2 may be spheres.

The second lens 120 may have positive (+) or negative (−) refractive power in the optical axis OA. The second lens 120 may be made of a material different from that of the first lens 110. For example, the second lens 120 may be made of a plastic material.

The second lens 120 may include a third surface S3 defined as an object-side surface and a fourth surface S4 defined as a sensor-side surface. The third surface S3 may have a convex shape in the optical axis OA, and the fourth surface S4 may be concave in the optical axis OA. That is, the second lens 120 may have a meniscus shape convex from the optical axis OA toward the object. Alternatively, the third surface S3 may have a convex shape in the optical axis OA, and the fourth surface S4 may be convex in the optical axis OA. That is, the second lens 120 may have a shape in which both sides are convex in the optical axis OA. Alternatively, the third surface S3 may have a concave shape in the optical axis OA, and the fourth surface S4 may be convex in the optical axis OA. That is, the second lens 120 may have a meniscus shape convex from the optical axis OA toward the sensor. Alternatively, the third surface S3 may have a concave shape in the optical axis OA, and the fourth surface S4 may be concave in the optical axis OA. That is, the second lens 120 may have a concave shape on both sides of the optical axis OA.

At least one of the third surface S3 and the fourth surface S4 may be an aspherical surface. For example, both the third surface S3 and the fourth surface S4 may be an aspherical surface.

The third lens 130 may have positive (+) or negative (−) refractive power in the optical axis OA. The third lens 130 may be made of a material different from that of the first lens 110. Also, the third lens 130 may be made of the same material as the second lens 120. For example, the third lens 130 may be made of a plastic material.

The third lens 130 may include a fifth surface S5 defined as an object-side surface and a sixth surface S6 defined as a sensor-side surface. The fifth surface S5 may have a convex shape in the optical axis OA, and the sixth surface S6 may be concave in the optical axis OA. That is, the third lens 130 may have a meniscus shape convex toward the object from the optical axis OA.

Alternatively, the fifth surface S5 may have a convex shape in the optical axis OA, and the sixth surface S6 may be convex in the optical axis OA. That is, the third lens 130 may have a shape in which both sides are convex in the optical axis OA. Alternatively, the fifth surface S5 may have a concave shape in the optical axis OA, and the sixth surface S6 may be convex in the optical axis OA. That is, the third lens 130 may have a meniscus shape convex from the optical axis OA toward the sensor. Alternatively, the fifth surface S5 may have a concave shape in the optical axis OA, and the sixth surface S6 may be concave in the optical axis OA. That is, the third lens 130 may have a concave shape on both sides of the optical axis OA.

At least one of the fifth surface S5 and the sixth surface S6 may be an aspherical surface. For example, both the fifth surface S5 and the sixth surface S6 may be an aspherical surface.

The optical system 1000 according to the embodiment may satisfy at least one of the following equations. Accordingly, in the optical system 1000 according to the embodiment, it is possible to inhibit or minimize the change in optical properties according to the temperature in the low temperature to high temperature range, and thus to implement improved optical properties at various temperatures. In addition, the optical system 1000 according to the embodiment may have improved distortion and aberration characteristics at various temperatures as it satisfies at least one of Equations to be described later.

Equations below will be described. Also, terms indicated in some equations will be described with reference to FIG. 188.

$$1.7 \leq nt\_1 \leq 2.3 \text{ or } 1.9 \leq nt\_1 \leq 2.1 \text{ or } 2.0 \leq nt\_1 \leq 2.1 \quad \text{[Equation 1]}$$

In Equation 1, $nt\_1$ is the refractive index of the first lens 110 with respect to light in a t-line (1013.98 nm) or d-line (587.6 nm) wavelength band.

$$nt\_2 < nt\_1$$

$$nt\_3 < nt\_1 \quad \text{[Equation 2]}$$

In Equation 2, $nt\_1$ is the refractive index of the light of the t-line or d-line wavelength band of the first lens 110, and $nt\_2$ is the refractive index of the light of the t-line or d-line wavelength band of the second lens 120, and $nt\_3$ is the refractive index of the light of the t-line or d-line wavelength band of the third lens 130.

$$dnt\_1/dt \geq 0$$

$$dnt\_2/dt < 0$$

$$dnt\_3/dt < 0$$

$$|dnt\_2/dt|/|dnt\_1/dt| > 20 \quad \text{[Equation 3]}$$

In Equation 3, dt means a temperature change amount (° C.), and $dnt\_1$ is a change in the refractive index of the first lens 110 in the entire wavelength band, particularly in the d-line wavelength band. That is, $dnt\_1/dt$ means a change in the refractive index of the first lens 110 according to a temperature change in the entire wavelength band, particularly in the d-line wavelength band. In addition, $dnt\_2$ is a change in the refractive index of the second lens 120 in the entire wavelength band, particularly in the d-line wavelength band, and $dnt\_2/dt$ is the second lens according to the temperature change in the entire wavelength band, particularly in the d-line wavelength band. (120) means a change in the refractive index. In addition, $dnt\_3$ is a change in the refractive index of the third lens 130 in the entire wavelength band, particularly in the d-line wavelength band, and $dnt\_3/dt$ is the third lens according to the temperature change in the entire wavelength band, particularly in the d-line wavelength band. (130) means a change in the refractive index. In Equation 3, dt may be a temperature change from −40° C. to 99° C.

When the optical system 1000 according to the embodiment satisfies at least one of Equations 1 to 3, the optical system 1000 may have good optical performance in a temperature range of a low temperature to a high temperature.

In addition, as the range of $nt\_1$ in Equation 1 is narrowed, optical performance may be further improved in response to a temperature change from low temperature to high temperature.

$$1 \leq |v1 - v2| \leq 10$$

$$1 \leq |v1 - v3| \leq 10$$

$$50 \leq v1 + v2 + v3 \leq 200 \text{ or } 50 \leq v1 + v2 + v3 \leq 70 \text{ or } 60 \leq v1 + v2 + v3 \leq 70 \quad \text{[Equation 4]}$$

In Equation 4, v1 is the Abbe's number of the first lens 110, v2 is the Abbe's number of the second lens 120, and v3 is the Abbe's number of the third lens 130.

When the optical system 1000 according to the embodiment satisfies Equation 4, the optical system 1000 may have improved incident light control characteristics and aberration control characteristics in a specific wavelength band.

In addition, as the range of v1+v2+v3 in Equation 4 becomes narrower, the optimum incident light control characteristic and aberration control characteristic may be obtained in a specific wavelength band.

$$0 \text{ mm} < TTL \leq 8 \text{ mm or } 0 \text{ mm} < TTL \leq 7 \text{ mm or } 0 \text{ mm} < TTL \leq 6 \text{ mm} \quad \text{[Equation 5]}$$

In Equation 5, TTL is the distance (mm) in the optical axis OA from the object-side surface (first surface S1) of the first lens 110 to the upper surface of the image sensor 300 in an environment of room temperature (about 22° C.).

When the optical system 1000 according to the embodiment satisfies Equation 5, the overall size of the optical system 1000 may be reduced. Accordingly, the optical system 1000 according to the embodiment may be implemented with a compact size.

$$D\_1 + D\_2 + D\_3 \leq TTL \leq 8 \text{ mm}$$

$$D\_1 + D\_2 + D\_3 \leq TTL \leq 7 \text{ mm}$$

$$D\_1 + D\_2 + D\_3 \leq TTL \leq 6 \text{ mm}$$

$$D1*3.4 \leq TTL \leq 7 \text{ mm} \quad \text{[Equation 6]}$$

In Equation 6, TTL is the distance (mm) in the optical axis OA from the object-side surface (first surface S1) of the first lens 110 to the upper surface of the image sensor 300 in an environment of room temperature (about 22° C.), $D\_1$ is the thickness (mm) at the optical axis OA of the first lens 110 as the central thickness (see FIG. 188) of the first lens 110 at room temperature (about 22° C.), $D\_2$ is the thickness (mm) at the optical axis OA of the second lens 120 as the central thickness (see FIG. 188) of the second lens 120 at room temperature (about 22° C.), and $D\_3$ is the thickness (mm) at the optical axis OA of the third lens 130 as the central thickness (see FIG. 188) of the third lens 130 at room temperature (about 22° C.)

When the optical system 1000 according to the embodiment satisfies Equation 6, the overall size of the optical system may be reduced. Accordingly, the optical system 1000 according to the embodiment has a compact size even when the temperature changes from a low temperature to a high temperature, and the optical performance can be constantly maintained.

$$Diop\_L1 > Diop\_L2 > Diop\_L3 \quad \text{[Equation 7]}$$

In Equation 7, Diop_L1 is a diopter value of the first lens 110 at room temperature (about 22° C.), and Diop_L2 is a diopter value of the second lens 120 at room temperature (about 22° C.), and Diop_L3 is a diopter value of the third lens 130 at room temperature (about 22° C.).

$$1 < Diop\_L1/Diop\_L2 < 2 \quad \text{[Equation 8]}$$

In Equation 8, Diop_L1 is a diopter value of the first lens 110 at room temperature (about 22° C.), and Diop_L2 is a diopter value of the second lens 120 at room temperature (about 22° C.).

$$10 < Diop\_L1/Diop\_L3 < 600 \quad \text{[Equation 9]}$$

In Equation 9, Diop_L1 is a diopter value of the first lens 110 at room temperature (about 22° C.), and Diop_L3 is a diopter value of the third lens 130 at room temperature (about 22° C.).

When the optical system 1000 according to the embodiment satisfies at least one of Equations 7 to 9, the plurality of lenses 100 of the optical system 1000 may have good optical performance in the central and peripheral portions of the field of view FOV, and in a temperature range of low to high temperature.

$$1.8 \leq XF\# \leq 2.2 \text{ or } 1.9 \leq F\# \leq 2.1 \quad \text{[Equation 10]}$$

In Equation 10, F # is a F-number of the optical system 1000 in environments of room temperature (about 22° C.), low temperature (about −40° C.), and high temperature (about 99° C.).

When the optical system 1000 according to the embodiment satisfies Equation 10, the overall brightness of the optical system 1000 may be controlled. Accordingly, the optical system 1000 according to the embodiment may implement the desired brightness.

$$1.2 \text{ mm} \leq D\_1 \leq 1.7 \text{ mm or } 1.4 \text{ mm} \leq D\_1 \leq 1.7 \text{ mm or } 1.45 \text{ mm} \leq D\_1 \leq 1.65 \text{ mm} \quad \text{[Equation 11]}$$

In Equation 11, D_1 is the central thickness (refer to FIG. 188) of the first lens 110 at room temperature (about 22° C.) and is the thickness (mm) on the optical axis OA of the first lens 110.

When the optical system 1000 according to the embodiment satisfies Equation 11, the optical system 1000 may have improved optical performance and may be easily manufactured. For example, when the central thickness of the first lens 110 is less than about 1.2 mm, the focal length of the first lens 110 becomes long, and manufacturing a glass lens may be difficult. In addition, when the central thickness of the first lens 110 exceeds about 1.7 mm, the focal length of the first lens 110 may decrease, and thus the overall optical performance of the optical system 1000 may be reduced.

In addition, as the range of Equation 11 is narrowed, the optical system 1000 may realize optimal optical performance even when the temperature is changed from a low temperature to a high temperature. That is, it is possible to inhibit or minimize the change in optical performance according to the temperature change.

$$0.2 \leq D\_1/TTL \leq 0.3 \text{ or } 0.25 \leq D\_1/TTL \leq 0.3 \quad \text{[Equation 12]}$$

In Equation 12, D_1 is the central thickness (refer to FIG. 188) of the first lens 110 at room temperature (about 22° C.), and is the thickness (mm) at the optical axis OA of the first lens 110. In addition, TTL is the distance (mm) in the optical axis OA from the object-side surface (first surface S1) of the first lens 110 to the upper surface of the image sensor 300 in an environment of room temperature (about 22° C.).

When the optical system 1000 according to the embodiment satisfies Equation 12 at room temperature (about 22° C.), the optical system 1000 changes optical performance according to temperature change at room temperature (about 22° C.) and high temperature (about 99° C.) can be inhibited or minimized. In addition, as the range of Equation 12 is narrowed, the optical system 1000 may realize optimal optical performance while minimizing the change in optical performance according to temperature change.

$$1 < D\_1/D\_2 < 1.6 \text{ or } 1 < D\_1/D\_2 \leq 1.5 \text{ or } 1.5 < D\_1/D\_2 \leq 2.5 \quad \text{[Equation 13]}$$

In Equation 13, D_1 is the central thickness of the first lens 110 at room temperature (about 22° C.) and is the thickness (mm) on the optical axis OA of the first lens 110. In addition, D_2 is the central thickness of the second lens 120 at room temperature (about 22° C.) and is the thickness (mm) on the optical axis OA of the second lens 120. (See FIG. 188)

When the optical system 1000 according to the embodiment satisfies Equation 13, the optical system 1000 may improve aberration characteristics. In addition, as the range of Equation 13 is narrowed, the optical system 1000 may realize optimal optical performance while improving aberration characteristics.

$$2 < D\_1/D\_3 < 2.8 \text{ or } 2.5 \leq D\_1/D\_3 \leq 2.8 \text{ or } 3.0 < D\_1/D\_3 < 4.0 \quad \text{[Equation 14]}$$

In Equation 14, D_1 is the central thickness of the first lens 110 at room temperature (about 22° C.) and is the thickness (mm) on the optical axis OA of the first lens 110. In addition, D_3 is the central thickness of the third lens 130 at room temperature (about 22° C.) and is the thickness (mm) on the optical axis OA of the third lens 130. (See FIG. 188)

When the optical system 1000 according to the embodiment satisfies Equation 14, the optical system 1000 may improve aberration characteristics. In addition, as the range of Equation 14 is narrowed, the optical system 1000 may realize optimal optical performance while improving aberration characteristics.

$$f1 < f2 < f3 \quad \text{[Equation 15]}$$

$$|f1| < |f2| < |f3| \quad \text{[Equation 15-1]}$$

$$f1 < |f2| < |f3| \quad \text{[Equation 15-2]}$$

In Equations 15, 15-1, and 15-2, f1 is the focal length (mm) of the first lens 110 at room temperature (about 22° C.), and f2 is the focal length (mm) of the second lens 120 at room temperature (about 22° C.), f3 is the focal length (mm) of the third lens 130 at room temperature (about 22° C.).

Also, in Equation 15-2, the focal length of the first lens is a positive value. Also, the focal length of the second lens or the third lens may have a positive or negative value.

In this case, the focal length f1 of the first lens 110 at room temperature (about 22° C.) may be greater than 4 mm and less than 7 mm. Also, the focal length f2 of the second lens 120 at room temperature (about 22° C.) may be greater than 7 mm and less than 13 mm. Also, the focal length f3 of the third lens 130 at room temperature (about 22° C.) may be greater than 80 mm and less than 120 mm.

$$P1 > P2 > P3 \quad \text{[Equation 15-3]}$$

In Equation 15-3, P1 is the power value of the first lens 110 at room temperature (about 22° C.), P2 is the power value of the second lens 120 at room temperature (about 22° C.), and P3 is the power value of the third lens 130 at room temperature (about 22° C.). The power value is the reciprocal of the focal length. If Equation 15 is satisfied, Equation 15-3 is satisfied.

$$|P1|>|P2|>|P3| \quad \text{[Equation 15-4]}$$

$$P1>|P2|>|P3| \quad \text{[Equation 15-5]}$$

In Equation 15-5, the power of the first lens is a positive value. In addition, the power of the second lens or the third lens may have a positive or negative value.

When the optical system 1000 according to the embodiment satisfies Equations 15 to 15-5, the first lens power is a positive value and the power value of the first lens among the first lens to the third lens is the largest, it is possible to appropriately control the light incident on the optical system 1000 through the first lens. Accordingly, it is possible to inhibit or minimize the change in the optical system performance according to the temperature change. Also, it may have good optical performance at the center and the periphery of the field of view.

$$0.4<f1/f2<0.8 \quad \text{[Equation 16]}$$

$$0.4<|f1|/|f2|<<0.8 \text{ or } 0.5\leq|f1|/|f2|\leq0.6 \quad \text{[Equation 16-1]}$$

$$0.4<f1/|f2|<0.8 \text{ or } 0.5\leq f1/|f2|\leq0.6 \quad \text{[Equation 16-2]}$$

In Equations 16, 16-1, and 16-2, f1 is the focal length (mm) of the first lens 110 at room temperature (about 22° C.), and f2 is the focal length (mm) of the second lens 120 at room temperature (about 22° C.).

In Equation 16-2, the focal length of the first lens is a positive value. Also, the focal length of the second lens may have a positive or negative value.

$$1.25<P1/P2<2.5 \quad \text{[Equation 16-3]}$$

In Equation 16-3, P1 is a power value of the first lens 110 at room temperature (about 22° C.), and P2 is a power value of the second lens 120 at room temperature (about 22° C.). Power is the inverse of the focal length. If Equation 16 is satisfied, Equation 16-3 is satisfied.

$$1.25<|P1|/|P2|<2.5 \text{ or } 1.67<|P1|/|P2|<2.0 \quad \text{[Equation 16-4]}$$

$$1.25<P1/|P2|<2.5 \text{ or } 1.67<P1/|P2|<2.0 \quad \text{[Equation 16-5]}$$

In Equation 16-5, the power of the first lens may have a positive value, and the power of the second lens may have a positive or negative value.

When the optical system 1000 according to the embodiment satisfies Equations 16 to 16-5, the optical system 1000 may have an appropriate refractive power for controlling a path of light incident on the first lens 110 and the second lens 120, and the optical system 1000 may have improved resolution. In addition, as the ranges of Equations 16-1 to 16-5 narrow, the first lens 110 and the second lens 120 have more appropriate refractive power for controlling an incident light path. Accordingly, the optical system 1000 may have an optimal resolution according to a temperature change from a low temperature to a high temperature. In addition, it is possible to inhibit or minimize the change in the optical system performance according to the temperature change.

$$1.25\leq|f2|/|f1|\leq2.5 \text{ or } 1.67\leq|f2|/|f1|\leq2 \quad \text{[Equation 17]}$$

When the optical system 1000 according to the embodiment satisfies Equation 17, the optical system 1000 may have an appropriate refractive power for controlling the path of light incident to the first lens 110 and the second lens 120, and the optical system 1000 may have improved resolution. In addition, as the range of Equation 17 is narrowed, the optical system 1000 may have an optimal resolution.

$$10<f3/f1<550 \quad \text{[Equation 18]}$$

$$10<|f3|/|f1|<550 \text{ or } 10<|f3|/|f1|\leq50 \text{ or } 1<|f3|/|f1|\leq10 \quad \text{[Equation 18-1]}$$

$$10<f3/|f1|<550 \text{ or } 10<f3/|f1|\leq50 \text{ or } 1<f3/|f1|\leq10 \quad \text{[Equation 18-2]}$$

In Equations 18, 18-1, and 18-2, f1 is the focal length (mm) of the first lens 110 at room temperature (about 22° C.), and f3 is the focal length (mm) of the third lens 130 at room temperature (about 22° C.).

In Equation 18-2, the focal length of the third lens is a positive value. Also, the focal length of the first lens may have a positive or negative value.

$$10<P1/P3<550 \quad \text{[Equation 18-3]}$$

In Equation 18-3, P is the reciprocal of the focal length. If Equation 18 is satisfied, Equation 18-3 is satisfied.

P1 is a power value of the first lens 110 at room temperature (about 22° C.), and P3 is a power value of the third lens 130 at room temperature (about 22° C.).

$$10<|P1|/|P3|<550 \text{ or } 10<|P1|/|P3|\leq50 \text{ or } 1<|P1|/|P3|\leq10 \quad \text{[Equation 18-4]}$$

$$10<P1/|P3|<550 \text{ or } 10<P1/|P3|\leq50 \text{ or } 1<P1/|P3|\leq10 \quad \text{[Equation 18-5]}$$

In Equation 18-5, the power of the first lens may have a positive value, and the power of the third lens may have a positive or negative value.

When the optical system 1000 according to the embodiment satisfies Equations 18 to 18-5, the optical system 1000 may appropriately control the refractive power of the first lens 110 and the third lens 130, and thus may have improved resolution. In addition, as the range of Equations 18-1 to 18-5 narrows, the first lens has more appropriate refractive power to control the light incident on the optical system 1000, and the third lens has more appropriate refractive power to control the light incident to the image sensor. Accordingly, the optical system 1000 may have an optimal resolution even when the temperature change from a low temperature to a high temperature is changed. In addition, it is possible to inhibit or minimize the change in the optical system performance according to the temperature change.

$$0.5<L1R1/L1R2<0.8 \text{ or } 0.6\leq L1R1/L1R2\leq0.7 \quad \text{[Equation 19]}$$

In Equation 19, L1R1 is the radius of curvature of the object-side surface (first surface S1) of the first lens 110 at room temperature (about 22° C.), and L1R2 is the radius of curvature of the sensor-side surface (second surface S2) of the first lens 110 at room temperature (about 22° C.).

When the optical system 1000 according to the embodiment satisfies Equation 19, the optical system 1000 may control incident light and may have improved aberration control characteristics. In addition, as the range of Equation 19 is narrowed, incident light may be more efficiently controlled, and the optical system 1000 may have optimal resolution.

$$2<L2R1/L2R2<2.3 \text{ or } 2.1\leq L2R1/L2R2\leq2.2 \text{ or } 1\leq L2R1/L2R2\leq2 \text{ or } 1.5\leq L2R1/L2R2\leq1.8 \quad \text{[Equation 20]}$$

In Equation 20, L2R1 is the radius of curvature of the object-side surface (third surface S3) of the second lens 120 at room temperature (about 22° C.), and L2R2 is the radius of curvature of the sensor-side surface (fourth surface S4) of the second lens 120 at room temperature (about 22° C.).

When the optical system 1000 according to the embodiment satisfies Equation 20, the optical system 1000 may have improved aberration control characteristics. In addition, as the range of Equation 20 is narrowed, the optical system 1000 may realize optimal optical performance while improving aberration characteristics.

$$1 < L3R1/L3R2 < 1.3 \text{ or } 1.1 \le L3R1/L3R2 \le 1.2 \quad \text{[Equation 21]}$$

In Equation 21, L3R1 is the radius of curvature of the object-side surface (the fifth surface S5) of the third lens 130 at room temperature (about 22° C.), and L3R2 is the radius of curvature of the sensor-side surface (the sixth surface S6) of the third lens 130 at room temperature (about 22° C.).

When the optical system 1000 according to the embodiment satisfies Equation 21, the optical system 1000 may have good optical performance in the periphery of the field of view. In addition, as the range of Equation 21 is narrowed, it is possible to more appropriately control the light incident on the image sensor, and to improve optical performance in the periphery.

Accordingly, the optical system 1000 may realize optimal optical performance.

$$0.5 < CA\_L1S1/CA\_L3S2 < 0.8 \text{ or } 0.65 \le CA\_L1S1/CA\_L3S2 \le 0.75 \text{ or } 0.5 \le CA\_L1S1/CA\_L3S2 \le 1 \text{ or } 0.75 \le CA\_L1S1/CA\_L3S2 \le 0.85 \quad \text{[Equation 22]}$$

In Equation 22, CA_L1S1 is the size of the effective diameter (CA, Clear Aperture) of the object-side surface (first surface S1) of the first lens 110 at room temperature (about 22° C.), and CA_L3S2 is the size of the effective diameter (CA, Clear Aperture) of the sensor-side surface (sixth surface S6) of the third lens 130 at room temperature (about 22° C.)

When the optical system 1000 according to the embodiment satisfies Equation 22, the optical system 1000 may control incident light and may be provided in a slim and compact structure while maintaining optical performance. In addition, as the range of Equation 22 is narrowed, the optical system 1000 may have optimal optical performance and size.

$$CA\_L1S2 \le CA\_L2S2 \le CA\_L3S2$$

$$CA\_L1S2 \le CA\_L2S1 \le CA\_L3S1$$

$$CA\_L1S2 \le CA\_L2S1 \le CA\_L2S2 \le CA\_L3S1 \le CA\_L3S2 \quad \text{[Equation 23]}$$

In Equation 23, CA_L1S2 is the effective diameter size of the surface on which the aperture is disposed at room temperature (about 22° C.). That is, CA_L1S2 is the size of the effective diameter (CA, Clear Aperture) of the sensor-side surface (the second surface S2) of the first lens 110, and CA_L2S1 is the size of the effective diameter (CA, Clear Aperture) of the object-side surface (the third surface S3) of the second lens 120, and CA_L2S2 is the size of the effective diameter (CA, Clear Aperture) of the object-side surface (the fourth surface S4) of the second lens 120, and L3S1 is the size of the effective diameter (CA, Clear Aperture) of the object-side surface (the fifth surface S5) of the third lens 130, and CA_L3S2 is the size of the effective diameter (CA, Clear Aperture) of the sensor-side surface (the sixth surface S6) of the third lens 130.

When the optical system 1000 according to the embodiment satisfies Equation 23, that is, the effective diameter of the lens surface on which the aperture is disposed, or the lens surface closest to the aperture is smaller than the effective diameter of the lens disposed close to the sensor, or when the effective diameter of each side of the lens increases from the aperture to the sensor side, the optical system 1000 may control incident light and may have an appropriate size to be provided in a slim and compact structure while maintaining optical performance.

$$0.35 < d12/D\_1 < 0.5 \text{ or } 0.4 < d12/D\_1 < 0.9 \text{ or } 0.5 < d12/D\_1 < 0.65 \quad \text{[Equation 24]}$$

In Equation 24, d12 is the distance (mm) at the optical axis OA of the first lens 110 and the second lens 120 at room temperature (about 22° C.), and D_1 is the central thickness of the first lens 110 at room temperature (about 22° C.) and is the thickness (mm) on the optical axis OA of the first lens 110. (See FIG. 18B)

When the optical system 1000 according to the embodiment satisfies Equation 24, the optical system 1000 may control the incident light and may have improved aberration control characteristics.

$$0.7 \le CA\_Smax/ImgH \le 1 \text{ or } 0.8 \le CA\_Smax/ImgH \le 0.95 \text{ or } 0.85 \le CA\_Smax/ImgH \le 0.9 \quad \text{[Equation 25]}$$

In Equation 25, CA_Smax is the size of the effective diameter of the lens surface having the largest effective diameter CA at room temperature (about 22° C.) among the lens surfaces of the plurality of lenses 100 included in the optical system 1000.

In addition, ImgH is twice the distance from the 0 field area, which is the center of the upper surface of the image sensor 300 overlapping the optical axis OA, to the 1.0 field area of the image sensor 300 at room temperature (about 22° C.). In addition, the distance is a distance in a vertical direction of the optical axis OA. That is, the ImgH means an overall diagonal length (mm) of the image sensor 300 at room temperature (about 22° C.).

When the optical system 1000 according to the embodiment satisfies Equation 25, the optical system 1000 can more appropriately control the light incident on the image sensor, and has good optical performance at the center and the periphery of the field of view (FOV), and may be provided in a slim and compact structure. Also, as the range of Equation 25 becomes narrower, the optical system 1000 may have optimal optical performance and size. Also, as the range of Equation 25 becomes narrower, the optical system 1000 may have optimal optical performance and size.

$$3 \le EFL \le 5 \text{ or } 4 \le EFL \le 5 \text{ or } 4.5 \le EFL \le 5 \quad \text{[Equation 26]}$$

In Equation 26, EFL (Effective Focal Length) means an effective focal length (mm) of the optical system 1000 at room temperature (about 22° C.).

When the optical system 1000 according to the embodiment satisfies Equation 26, the optical system 1000 may control overall brightness and improve aberration characteristics. In addition, as the range of Equation 26 is narrowed, the optical system 1000 may implement optimal optical performance while improving aberration characteristics and brightness.

$$50 \text{ degrees} \le FOV \le 70 \text{ degrees or } 40 \text{ degrees} \le FOV \le 60 \text{ degrees or } 40 \text{ degrees} \le FOV \le 50 \text{ degrees} \quad \text{[Equation 27]}$$

In Equation 27, FOV refers to a field of view of the optical system (1000) in an environment of room temperature (about 22° C.), low temperature (about −40° C.) and high temperature (about 99° C.).

$$1 < TTL/ImgH < 1.4 \text{ or } 1.3 \le TTL/ImgH < 1.4 \quad \text{[Equation 28]}$$

In Equation (28), the TTL is the distance (mm) in the optical axis OA from the object-side surface (first surface S1) of the first lens 110 to the upper surface of the image sensor 300 in an environment of room temperature (about 22° C.).

In addition, ImgH is twice the distance from the 0 field area, which is the center of the upper surface of the image sensor 300 overlapping the optical axis OA, to the 1.0 field area of the image sensor 300 at room temperature (about 22° C.). In addition, the distance is a distance in a vertical direction of the optical axis OA. That is, the ImgH means an overall diagonal length (mm) of the image sensor 300 at room temperature (about 22° C.).

When the optical system 1000 according to the embodiment satisfies Equation 28, the optical system 1000 can satisfy a BFL (Back focal length) for applying a relatively large image sensor 300, for example, a large image sensor 300 of about 1 inch or less, and may have a smaller TTL. Thereby, it is possible to implement high quality and to have a slim structure. In addition, as the range of Equation 28 is narrowed, the optical system 1000 may realize an optimal image quality and may have a slim structure.

$$0.2 < BFL/ImgH < 0.5 \text{ or } 0.3 \leq BFL/ImgH \leq 0.4 \text{ or } 0.3 \leq BFL/ImgH \leq 0.35 \qquad \text{[Equation 29]}$$

In Equation (29), BFL (Back Focal Length) is the distance (mm) from the vertex of the sensor side of the lens closest to the image sensor 300 to the top surface of the image sensor 300 at room temperature (about 22° C.). In addition, the distance is in the direction of the optical axis.

In addition, ImgH is twice the distance from the 0 field area, which is the center of the upper surface of the image sensor 300 overlapping the optical axis OA, to the 1.0 field area of the image sensor 300 at room temperature (about 22° C.). In addition, the distance is a distance in a vertical direction of the optical axis OA. That is, the ImgH means an overall diagonal length (mm) of the image sensor 300 at room temperature (about 22° C.).

When the optical system 1000 according to the embodiment satisfies Equation 29, the optical system 1000 can satisfy a BFL (Back focal length) for applying a relatively large image sensor 300, for example, a large image sensor 300 of about 1 inch or less, and since the distance between the last lens and the image sensor 300 can be minimized, good optical properties can be obtained at the center and the periphery of the field of view. In addition, as the range of Equation 29 becomes narrower, the optical system 1000 may have optimal optical characteristics.

$$3 < TTL/BFL < 5 \text{ or } 3.5 \leq TTL/BFL \leq 4.5 \qquad \text{[Equation 30]}$$

In Equation 30, TTL is the distance (mm) in the optical axis OA from the object-side surface (first surface S1) of the first lens 110 to the upper surface of the image sensor 300 in an environment of room temperature (about 22° C.).

In addition, BFL (Back focal length) is the distance (mm) in the optical axis OA from the vertex of the sensor-side of the lens closest to the image sensor 300 to the upper surface of the image sensor 300 in an environment of room temperature (about 22° C.).

When the optical system 1000 according to the embodiment satisfies Equation 30, the optical system 1000 may be provided in a slim and compact manner while satisfying the BFL. In addition, as the range of Equation 30 is narrowed, the optical system 1000 may have a slim structure having optimal optical performance.

$$0.6 < EFL/TTL < 0.8 \text{ or } 0.65 \leq EFL/TTL \leq 0.75 \text{ or } 0.65 \leq EFL/TTL \leq 0.7 \qquad \text{[Equation 31]}$$

In Equation 31, EFL (Effective Focal Length) means an effective focal length (mm) of the optical system 1000 at room temperature (about 22° C.).

In addition, TTL is the distance (mm) in the optical axis OA from the object-side surface (first surface S1) of the first lens 110 to the upper surface of the image sensor 300 in an environment of room temperature (about 22° C.).

When the optical system 1000 according to the embodiment satisfies Equation 31, the optical system 1000 may be provided in a slim and compact manner. In addition, as the range of Equation 31 is narrowed, the optical system 1000 may have a size having optimal optical performance.

$$2 < EFL/BFL < 3 \text{ or } 2.5 \leq EFL/BFL < 3 \qquad \text{[Equation 32]}$$

In Equation 32, EFL (Effective Focal Length) means an effective focal length (mm) of the optical system 1000 at room temperature (about 22° C.).

In addition, BFL (Back focal length) is the distance (mm) in the optical axis OA from the vertex of the sensor-side of the lens closest to the image sensor 300 to the upper surface of the image sensor 300 in an environment of room temperature (about 22° C.).

When the optical system 1000 according to the embodiment satisfies Equation 32, the optical system 1000 may have a set angle of view, an appropriate focal length, and may be provided in a slim and compact manner. In addition, the optical system 1000 may minimize the distance between the last lens and the image sensor 300, and thus may have good optical characteristics in the periphery of the field of view. Also, as the range of Equation 32 is narrowed, the optical system 1000 may have optimal optical performance and a slim structure.

$$0.7 < EFL/ImgH < 1 \text{ or } 0.8 \leq EFL/ImgH < 1 \qquad \text{[Equation 33]}$$

In Equation 33, EFL (Effective Focal Length) means an effective focal length (mm) of the optical system 1000 at room temperature (about 22° C.).

In addition, ImgH is twice the distance from the 0 field area, which is the center of the upper surface of the image sensor 300 overlapping the optical axis OA, to the 1.0 field area of the image sensor 300 at room temperature (about 22° C.). In addition, the distance is a distance in a vertical direction of the optical axis OA. That is, the ImgH means an overall diagonal length (mm) of the image sensor 300 at room temperature (about 22° C.).

When the optical system 1000 according to the embodiment satisfies Equation 33, the optical system 1000 may have improved aberration characteristics while applying the image sensor 300 having a relatively large size. (For example, a large image sensor 300 around 1 inch) In addition, as the range of Equation 33 is narrowed, the optical system 1000 may realize optimal optical performance while improving aberration characteristics.

$$0.2 < D\_1\_ET/D\_1 < 1.7 \text{ or } 0.4 \leq D\_1\_ET/D\_1 \leq 1.5 \text{ or } 0.7 \leq D\_1\_ET/D\_1 \leq 1.3 \text{ or } 0.7 \leq D\_1\_ET/D\_1 \leq 0.9 \text{ or } 0.7 \leq D\_1\_ET/D1 \leq 0.8 \qquad \text{[Equation 34]}$$

In Equation 34, D_1 is the central thickness of the first lens 110 at room temperature (about 22° C.) and is the thickness (mm) on the optical axis OA of the first lens 110. In addition, D_1_ET means a thickness (mm) in the optical axis (OA) direction at the end of the effective area of the first lens 110 at room temperature (about 22° C.). In detail, referring to FIG. 188, D_1_ET is distance in the optical axis (OA) between the effective area end of the object-side surface (first surface S1) of the first lens 110 and the effective area end of the sensor-side surface (second surface S2) of the first lens 110. D_1_ET may be the thickness of the flange outside the effective diameter of the first lens 110.

When the optical system 1000 according to the embodiment satisfies Equation 34, the optical system 1000 may more appropriately control the incident light, and may have improved aberration control characteristics in a temperature range of a low temperature to a high temperature. In addition, as the range of Equation 34 narrows, the optical system 1000 may realize optimal optical performance while improving aberration characteristics.

$$0.3 < D\_2\_ET/D\_2 < 1.7 \text{ or } 0.4 \leq D\_2\_ET/D\_2 \leq 1.5 \text{ or } 0.5 \leq D\_2\_ET/D\_2 \leq 1.3 \text{ or } 0.55 \leq D\_2\_ET/D\_2 \leq 0.7 \text{ or } 0.6 \leq D\_2\_ET/D\_2 \leq 0.65 \quad \text{[Equation 35]}$$

In Equation 35, D_2 is the central thickness of the second lens 120 at room temperature (about 22° C.) and is the thickness (mm) on the optical axis OA of the second lens 120. In addition, D_2_ET means a thickness (mm) in the optical axis (OA) direction at the end of the effective area of the second lens 120 at room temperature (about 22° C.). In detail, referring to FIG. 188, D_2_ET is distance in the optical axis (OA) between the effective area end of the object-side surface (third surface S3) of the second lens 120 and the effective area end of the sensor-side surface (fourth surface S4) of the second lens 120. D_2_ET may be the thickness of the flange outside the effective diameter of the second lens 120.

When the optical system 1000 according to the embodiment satisfies Equation 35, the optical system 1000 may have improved chromatic aberration control characteristics in a temperature range of a low temperature to a high temperature. In addition, as the range of Equation 35 narrows, the optical system 1000 may realize optimal optical performance while improving aberration characteristics.

$$0.3 < D\_3\_ET/D\_3 < 1.7 \text{ or } 0.5 \leq D\_3\_ET/D\_3 \leq 1.5 \text{ or } 0.7 \leq D\_3\_ET/D\_3 \leq 1.3 \text{ or } 1.1 \leq D\_3\_ET/D\_3 \leq 1.3 \text{ or } 1.2 \leq D\_3\_ET/D\_3 \leq 1.3 \quad \text{[Equation 36]}$$

In Equation 36, D_3 is the central thickness of the third lens 130 at room temperature (about 22° C.) and is the thickness (mm) on the optical axis OA of the third lens 130. In addition, D_3_ET means a thickness (mm) in the optical axis (OA) direction at the end of the effective area of the third lens 130 at room temperature (about 22° C.). In detail, referring to FIG. 188, D_3_ET is distance in the optical axis (OA) between the effective area end of the object-side surface (fifth surface S5) of the third lens 130 and the effective area end of the sensor-side surface (sixth surface S6) of the third lens 130. D_3_ET may be the thickness of the flange outside the effective diameter of the third lens 130.

When the optical system 1000 according to the embodiment satisfies Equation 36, the optical system 1000 may have improved distortion control characteristics in a temperature range of low to high temperature, and more appropriately control light incident to the image sensor possible, and may have good optical performance at the periphery of the field of view. In addition, as the range of Equation 36 is narrowed, the optical system 1000 may implement optimal optical performance while improving aberration characteristics.

$$0.1 < d23/d23\_max < 1 \text{ or } 0.2 \leq d23/d23\_max \leq 0.9 \text{ or } 0.25 \leq d23/d23\_max \leq 0.8 \text{ or } 0.3 \leq d23/d23\_max \leq 0.5 \text{ or } 0.3 \leq d23/d23\_max \leq 0.35 \quad \text{[Equation 37]}$$

In Equation 37, d23 is the distance (mm) at the optical axis OA of the second lens 120 and the third lens 130 at room temperature (about 22° C.), and d23_max is at room temperature (about 22° C.) The largest distance among the distances in the optical axis OA direction between the sensor-side surface (the fourth surface S4) of the second lens 120 and the object-side surface (the fifth surface S5) of the third lens 130 (mm) means.

When the optical system 1000 according to the embodiment satisfies Equation 37, the optical system 1000 may improve characteristics of chromatic aberration and distortion aberration at the periphery of the angle of view (FOV) in a temperature range of low to high temperature. In addition, as the range of Equation 37 is narrowed, the optical system 1000 may realize optimal optical performance while improving aberration characteristics in a temperature range of low to high temperature.

$$1 < d23\_Sag\_L3S1\_max/d23 < 5 \text{ or } 1.3 \leq d23\_Sag\_L3S1\_max/d23 \leq 4 \text{ or } 1.5 \leq d23\_Sag\_L3S1\_max/d23 \leq 3 \text{ or } 1.5 \leq d23\_Sag\_L3S1\_max/3S1 \leq 1.923\_Sag \leq 3S1 \leq 1.923\_1.8 \quad \text{[Equation 38]}$$

In Equation 38, d23 is the distance (mm) in the optical axis OA of the second lens 120 and the third lens 130 at room temperature (about 22° C.), and d23_Sag_L3S1_max is distance (mm) in the optical axis OA direction between a maximum Sag of the object-side surface (the fifth surface S5) of the third lens 130 and the sensor side (fourth surface S4) of the second lens 120 facing the maximum Sag value. (See FIG. 188)

When the optical system 1000 according to the embodiment satisfies Equation 38, the optical system 1000 may improve the optical performance of the periphery of the field of view in a temperature range of a low temperature to a high temperature. In addition, as the range of Equation 38 narrows, the optical system 1000 may implement optimal optical performance in a temperature range of low to high temperature.

$$0.2 < L\_Sag\_L3S1/CA\_L3S1 < 1 \quad \text{[Equation 39]}$$

In Equation 39, L_Sag_L3S1 is distance in perpendicular to the optical axis OA from the optical axis OA to the maximum Sag value of the object-side surface (the fifth surface S5) of the third lens 130 at room temperature (about 22° C.), and CA_L3S1 means the size of the effective diameter of the object-side surface (the fifth surface S5) of the third lens 130 at room temperature (about 22° C.). (See FIG. 188)

In detail, Equation 39 may satisfy $0.3 < L\_Sag\_L3S1/CA\_L3S1 < 0.9$ in order to further improve the optical performance of the periphery of the field of view in various temperature ranges. In more detail, Equation 39 may satisfy $0.4 < L\_Sag\_L3S1/CA\_L3S1 < 0.8$ in order to further improve the optical performance of the peripheral part in various temperature ranges.

When the optical system 1000 according to the embodiment satisfies Equation 39, the optical system 1000 may improve the optical performance of the periphery of the field of view in a temperature range of a low temperature to a high temperature. In addition, as the range of Equation 39 is narrowed, the optical system 1000 may implement optimal optical performance in a temperature range of low to high temperature.

$$0.2 < L\_Sag\_L3S1/(CA\_L3S1/2) < 1 \text{ or } 0.3 \leq L\_Sag\_L3S1/(CA\_L3S1/2) \leq 0.9 \text{ or } 0.4 \leq L\_Sag\_L3S1/(CA\_L3S1/2) \leq 0.8 \text{ or } 0.45 \leq L\_Sag\_L3S1/2) \leq 0.55 \text{ or } L\_Sag\_L3S1/(CA\_L3S1/2) \leq 0.55 \quad \text{[Equation 39-1]}$$

When the optical system 1000 according to the embodiment satisfies Equation 39-1, the third lens 130 may more appropriately control the light incident to the image sensor. In addition, the optical system 1000 may improve the optical performance of the periphery of the field of view in a temperature range of a low temperature to a high temperature. In addition, as the range of Equation 39 is narrowed, the optical system 1000 may realize optimal optical performance in a temperature range of low to high temperature.

$$0.02 < |Sag\_L3S1\_max| < 0.5 \text{ or}$$
$$0.04 \leq |Sag\_L3S1\_max| \leq 0.3 \text{ or}$$
$$0.05 \leq |Sag\_L3S1\_max| \leq 0.1 \text{ or}$$
$$0.08 \leq |Sag\_L3S1\_max| \leq 0.1 \quad \text{[Equation 40]}$$

In Equation 40, Sag_L3S1_max means a difference between the Sag value of the object-side surface (the fifth surface S5) of the third lens on the optical axis OA and the maximum Sag value of the object-side surface (the fifth surface S5) of the third lens at room temperature (about 22° C.).

When the optical system 1000 according to the embodiment satisfies Equation 40, the optical system 1000 may improve the optical performance of the periphery of the field of view in a temperature range of a low temperature to a high temperature. In addition, as the range of Equation 40 is narrowed, the third lens 130 may more appropriately control the light incident to the image sensor. In addition, the optical system 1000 may implement optimal optical performance in a temperature range of low to high temperature.

$$0.2 < L\_Sag\_L3S2/(CA\_L3S2) < 1 \quad \text{[Equation 41]}$$

In Equation 41, L_Sag_L3S2 is distance in perpendicular to the optical axis OA from the optical axis OA to the maximum Sag value of the sensor-side surface (the sixth surface S6) of the third lens 130 at room temperature (about 22° C.), and CA_L3S2 means the size of the effective diameter of the sensor-side surface (the sixth surface S6) of the third lens 130 at room temperature (about 22° C.). (See FIG. 188)

In detail, Equation 41 may satisfy 0.3<L_Sag_L3S2/CA_L3S2<0.9 in order to further improve the optical performance of the periphery of the field of view in various temperature ranges. In more detail, Equation 41 may satisfy 0.4<L_Sag_L3S2/CA_L3S2<0.7 in order to further improve the optical performance of the peripheral part in various temperature ranges.

When the optical system 1000 according to the embodiment satisfies Equation 41, the optical system 1000 may improve chromatic aberration and aberration characteristics in a temperature range of a low temperature to a high temperature. In addition, the third lens 130 may more appropriately control the light incident on the image sensor, and may have good optical performance not only in the center of the field of view but also in the periphery. In addition, as the range of Equation 41 is narrowed, the optical system 1000 may implement optimal optical performance in a temperature range of low to high temperature.

$$0.2 < L\_Sag\_L3S2/(CA\_L3S2/2) < 1 \text{ or}$$
$$0.3 \leq L\_Sag\_L3S2/(CA\_L3S2/2) \leq 0.9 \text{ or}$$
$$0.4 \leq L\_Sag\_L3S2/(CA\_L3S2/2) \leq 0.7 \text{ or}$$
$$0.6 \leq L\_Sag\_L3S2/(CA\_L3S2/2) \leq 0.7 \quad \text{[Equation 41-1]}$$

In Equation 41-1, L_Sag_L3S2 is distance in perpendicular to the optical axis OA from the optical axis OA to the maximum Sag value of the sensor-side surface (the sixth surface S6) of the third lens 130 at room temperature (about 22° C.), and CA_L3S2 means the size of the effective diameter of the sensor-side surface (the sixth surface S6) of the third lens 130 at room temperature (about 22° C.). (See FIG. 188)

When the optical system 1000 according to the embodiment satisfies Equation 41-1, the optical system 1000 may improve chromatic aberration and aberration characteristics in a temperature range of a low temperature to a high temperature. In addition, the third lens 130 may more appropriately control the light incident on the image sensor, and may have good optical performance not only in the center of the field of view but also in the periphery. In addition, as the range of Equation 41 is narrowed, the optical system 1000 may implement optimal optical performance in a temperature range of low to high temperature.

$$0.05 < |Sag\_L3S2\_max| < 0.5 \text{ or}$$
$$0.1 \leq |Sag\_L3S2\_max| \leq 0.3 \text{ or}$$
$$0.15 \leq |Sag\_L3S2\_max| \leq 0.25 \text{ or}$$
$$0.15 \leq |Sag\_L3S2\_max| \leq 0.2 \text{ or}$$
$$0.2 \leq |Sag\_L3S2\_max| \leq 0.25 \quad \text{[Equation 42]}$$

In Equation 42, |Sag_L3S2_max| means a difference between the Sag value of the sensor-side surface (the sixth surface S6) of the third lens on the optical axis OA and the maximum Sag value of the sensor-side surface (the sixth surface S6) of the third lens at room temperature (about 22° C.).

When the optical system 1000 according to the embodiment satisfies Equation 42, the optical system 1000 may improve the optical performance of the periphery of the field of view in a temperature range of a low temperature to a high temperature. In addition, as the range of Equation 40 is narrowed, the third lens 130 may more appropriately control the light incident to the image sensor. In addition, the optical system 1000 may implement optimal optical performance in a temperature range of low to high temperature.

$$0.2 < L3S2\_max\_sag \text{ to Sensor}/BFL < 1 \text{ or}$$
$$0.3 \leq L3S2\_max\_sag \text{ to Sensor}/BFL \leq 0.95 \text{ or}$$
$$0.4 \leq L3S2\_max\_sag \text{ to Sensor}/BFL \leq 0.9 \text{ or}$$
$$0.8 \leq L3S2\_max\_sag \text{ to Sensor}/BFL \leq 0.9 \quad \text{[Equation 43]}$$

In Equation 43, BFL (Back Focal Length) is the distance (mm) from the vertex of the sensor side of the lens closest to the image sensor 300 to the top surface of the image sensor 300. In addition, the distance is in the direction of the optical axis.

In addition, L3S2_max_sag to Sensor means the distance (mm) in the optical axis (OA) direction from the maximum Sag value of the sensor-side surface (the sixth surface S6) of the third lens 130 to the image sensor at room temperature (about 22° C.).

When the optical system 1000 according to the embodiment satisfies Equation 43, the optical system 1000 may improve distortion aberration characteristics, have good optical performance in the periphery of the field of view, and facilitate assembly. In addition, as the range of Equation 43 is narrowed, the optical system 1000 may implement optimal optical performance while improving aberration characteristics.

$$3 < \Sigma\text{Index} < 10 \text{ or } 5 \leq \Sigma\text{Index} \leq 6 \text{ or } 5 \leq \Sigma\text{Index} \leq 5.5 \quad \text{[Equation 44]}$$

In Equation 44, ΣIndex means the sum of refractive indices on the d-line of each of the first to third lenses 110, 120, 130 at room temperature (about 22° C.).

When the optical system 1000 according to the embodiment satisfies Equation 44, it is possible to control the TTL of the optical system 1000 in a temperature range of low to high temperature, and to have improved chromatic aberration and resolution characteristics. Also, as the range of Equation 44 is narrowed, the optical system 1000 may have optimal chromatic aberration and resolution.

$$10 < \Sigma Abb/\Sigma\text{Index} < 50 \text{ or } 10 < \Sigma Abb/\Sigma\text{Index} \leq 15 \text{ or}$$
$$12 \leq \Sigma Abb/\Sigma\text{Index} \leq 13 \quad \text{[Equation 45]}$$

In Equation 45, ΣIndex means the sum of refractive indices on the d-line of each of the first to third lenses 110, 120, 130 at room temperature (about 22° C.). In addition, ΣAbb denotes the sum of Abbe's numbers of each of the first to third lenses 110, 120, 130 at room temperature (about 22° C.).

When the optical system 1000 according to the embodiment satisfies Equation 45, the optical system 1000 may have improved aberration characteristics and resolving power in a temperature range of a low temperature to a high temperature. Also, as the range of Equation 45 is narrowed, the optical system 1000 may have optimal aberration characteristics and resolution.

$$1 < CA\_Smax/CA\_Smin < 5 \text{ or } 2 \leq CA\_Smax/CA\_Smin \leq 3 \text{ or } 2 \leq CA\_Smax/CA\_Smin \leq 2.5 \quad \text{[Equation 46]}$$

In Equation 46, CA_Smax is the size of the effective diameter of the lens surface having the largest effective diameter CA at room temperature (about 22° C.) among the lens surfaces of the plurality of lenses 100 included in the optical system 1000. In addition, CA_Smin is the size of the effective diameter of the lens surface having the smallest effective diameter CA at room temperature (about 22° C.) among the lens surfaces of the plurality of lenses 100 included in the optical system 1000.

When the optical system 1000 according to the embodiment satisfies Equation 46, the optical system 1000 may be provided in a slim and compact structure, and may have an appropriate size for realizing optical performance in a low to high temperature range. In addition, as the range of Equation 46 narrows, the optical system 1000 may implement a size having optimal optical characteristics in a temperature range of low to high temperature.

$$1 < CA\_Smax/CA\_Aver < 3 \text{ or } 1 < CA\_Smax/CA\_Aver \leq 5 \quad \text{[Equation 47]}$$

In Equation 47, CA_Smax is the size of the effective diameter of the lens surface having the largest effective diameter CA at room temperature (about 22° C.) among the lens surfaces of the plurality of lenses 100 included in the optical system 1000. In addition, CA_Aver means the average (mm) of the size of the effective diameter CA at room temperature (about 22° C.) of the lens surfaces (object side, sensor side) of the plurality of lenses 100 included in the optical system 1000.

When the optical system 1000 according to the embodiment satisfies Equation 47, the optical system 1000 may be provided in a slim and compact structure, and may have an appropriate size for realizing optical performance in a low to high temperature range. In addition, as the range of Equation 47 narrows, the optical system 1000 may implement a size having optimal optical characteristics in a temperature range of low to high temperature.

$$0.1 < CA\_Smin/CA\_Aver < 1 \text{ or } 0.5 \leq CA\_Smin/CA\_Aver \leq 0.65 \quad \text{[Equation 48]}$$

In Equation 48, CA_Smin is the size of the effective diameter of the lens surface having the smallest effective diameter CA at room temperature (about 22° C.) among the lens surfaces of the plurality of lenses 100 included in the optical system 1000. In addition, CA_Aver means the average (mm) of the size of the effective diameter CA at room temperature (about 22° C.) of the lens surfaces (object side, sensor side) of the plurality of lenses 100 included in the optical system 1000.

When the optical system 1000 according to the embodiment satisfies Equation 48, the optical system 1000 may be provided in a slim and compact structure, and may have an appropriate size for realizing optical performance in a temperature range of low to high temperature. In addition, as the range of Equation 48 is narrowed, the optical system 1000 may realize a size having optimal optical characteristics in a temperature range of low to high temperature.

$$0.1 < CA\_Smax/ImgH < 1 \text{ or } 0.8 \leq CA\_Smax/ImgH \leq 0.95 \quad \text{[Equation 49]}$$

In Equation 49, CA_Smax is the size of the effective diameter of the lens surface having the largest effective diameter CA at room temperature (about 22° C.) among the lens surfaces of the plurality of lenses 100 included in the optical system 1000.

In addition, ImgH is twice the distance from the 0 field area, which is the center of the upper surface of the image sensor 300 overlapping the optical axis OA, to the 1.0 field area of the image sensor 300 at room temperature (about 22° C.). In addition, the distance is a distance in a vertical direction of the optical axis OA. That is, the ImgH means an overall diagonal length (mm) of the image sensor 300 at room temperature (about 22° C.).

When the optical system 1000 according to the embodiment satisfies Equation 49, the optical system 1000 has good optical performance in the center and the periphery of the field of view in the temperature range of low to high temperature, and has a slim and compact structure. In addition, as the range of Equation 49 narrows, the optical system 1000 may implement a size having optimal optical characteristics in a temperature range of low to high temperature.

$$0.5 < CA\_L1S2/CA\_L2S1 < 1 \text{ or } 0.7 \leq CA\_L1S2/CA\_L2S1 \leq 0.9 \quad \text{[Equation 50]}$$

In Equation 50, CA_L1S2 is the size of the effective diameter of the sensor-side surface (second surface S2) of the first lens 110 at room temperature (about 22° C.), and CA_L2S1 is the size of the effective diameter of the object-side surface (third surface S3) of the second lens 120 at room temperature (about 22° C.)

When the optical system 1000 according to the embodiment satisfies Equation 50, the optical system 1000 may have improved chromatic aberration control characteristics in a temperature range of a low temperature to a high temperature. In addition, as the range of Equation 50 is narrowed, the optical system 1000 may have optimal optical characteristics while controlling chromatic aberration characteristics.

[Equation 51]

In Equation 51, Z is Sag, which may mean a distance in the optical axis direction from an arbitrary position on the aspherical surface to the vertex of the aspherical surface.

In addition, Y may mean a distance in a direction perpendicular to the optical axis from an arbitrary position on the aspherical surface to the optical axis.

Also, c may mean a curvature of the lens, and K may mean a conic constant.

Also, A, B, C, D, . . . may mean an aspheric constant.

Also, a chief ray angle (CRA) of the optical system 1000 according to the embodiment may be about 20 degrees to about 35 degrees. In detail, the chief ray incidence angle CRA of the optical system 1000 may be about 25 degrees to about 30 degrees in a 1.0 field. In addition, the optical distortion of the optical system 1000 may be ±4% or less in a 1.0 field.

$$0 < d1Ap < 0.2 \quad \text{[Equation 52]}$$

In Equation 52, d1Ap means the distance (mm) in the optical axis direction of the aperture stop 600 from the end of the effective diameter of the sensor side surface (the second surface S2) of the first lens 110 at room temperature (about 22° C.)

$$0.8 < CA\_L1S2/CA\_Ap < 1.8 \quad \text{[Equation 53]}$$

In Equation 53, CA_L1S2 means the size (mm) of the effective diameter of the sensor side (second surface S2) of the first lens 110 at room temperature (about 22° C.), CA_Ap means the size (mm) of the effective diameter of the aperture stop 600 at room temperature (about 22° C.).

When the optical system 1000 according to the embodiment satisfies Equations 51 and 52, the optical system 1000 may control the incident light and may have improved aberration control characteristics.

$$0.95 \le EFL\_R/EFL\_H \le 1.05 \quad \text{[Equation 54]}$$

In Equation 54, EFL_R means an effective focal length (mm) of the optical system 1000 at room temperature (about 22° C.), EFL_H means an effective focal length (mm) of the optical system 1000 at high temperature (about 90° C.).

$$0.95 \le EFL\_R/EFL\_L \le 1.05 \quad \text{[Equation 55]}$$

In Equation 55, EFL_R means an effective focal length (mm) of the optical system 1000 at room temperature (about 22° C.), EFL_L means an effective focal length (mm) of the optical system 1000 at low temperature (about −40° C.).

$$0.95 \le FOV\_R/FOV\_H \le 1.05 \quad \text{[Equation 56]}$$

In Equation 56, FOV_R means the angle of view (°) of the optical system 1000 at room temperature (about 22° C.), FOV_H means the angle of view (°) of the optical system 1000 at high temperature (about 90° C.).

$$0.95 \le FOV\_R/FOV\_L \le 1.05 \quad \text{[Equation 57]}$$

In Equation 57, FOV_R means the angle of view (°) of the optical system 1000 at room temperature (about 22° C.), FOV_L means the angle of view (°) of the optical system 1000 at low temperature (about −40° C.).

In particular, in the optical system 1000 according to the embodiment, the first lens 110 may include a material different from that of the second lens 120 and the third lens 130. For example, the first lens 110 may be made of a glass material, and the second lens 120 and the third lens 130 may be made of the same plastic material.

Figure 5:
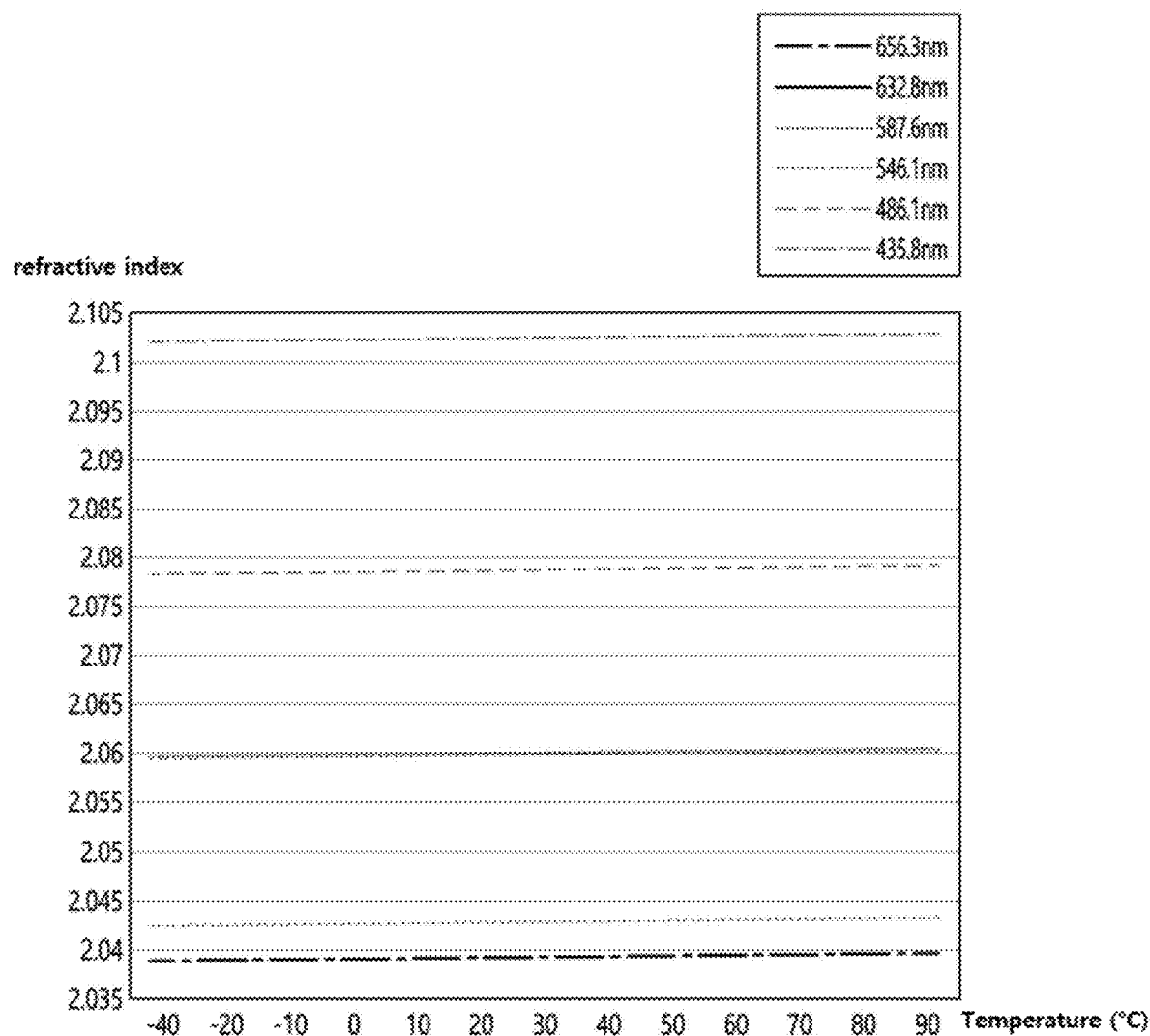
FIG. 5 is a graph showing a change in the refractive index of the first lens according to a change in temperature.

In detail, FIG. 4 is data on the refractive index of the first lens 110 for light of various wavelengths in a temperature range of low temperature (−40° C.) to high temperature (90° C.), and FIG. 5 is a graph showing a change in the refractive index of the first lens 110 according to a change in temperature.

Figure 7:
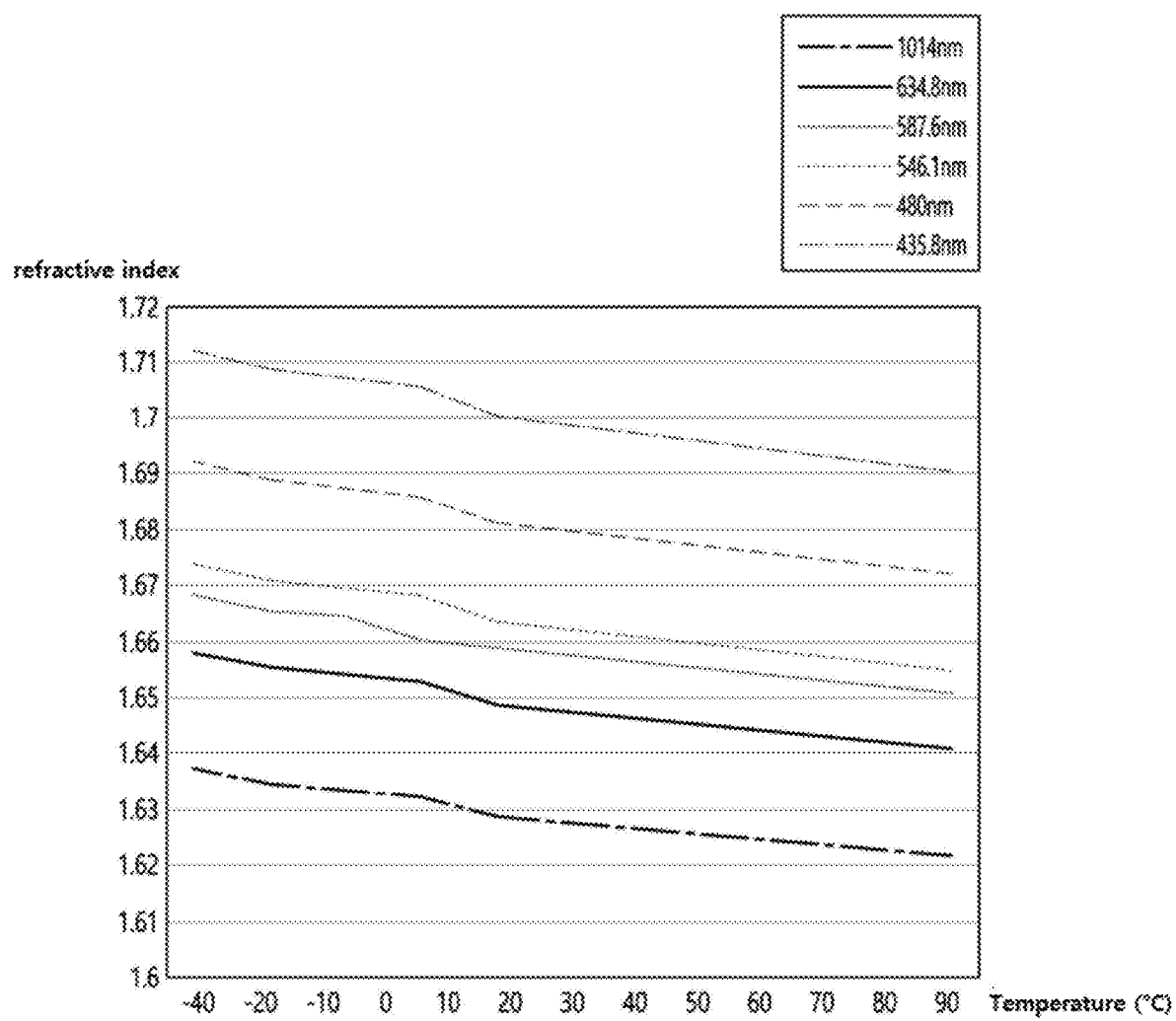
FIG. 7 is a graph showing changes in refractive indices of a second lens and a third lens according to a change in temperature.

In addition, FIG. 6 is data on the refraction of the second lens 120 and the third lens 130 for light of various wavelengths in a temperature range of low temperature (−40° C.) to high temperature (90° C.), and FIG. 7 a graph showing a change in refractive index of the second lens 120 and the third lens 130 according to a change in temperature.

Referring to FIGS. 4 to 7, the first lens 110, the second lens 120, and the third lens 130 may have different refractive index change characteristics according to a change in temperature.

First, referring to FIGS. 4 and 5, it can be seen that the first lens 110 has a very small refractive index that changes depending on the temperature in a temperature range of a low temperature (about −40° C.) to a high temperature (about 99° C.). In particular, it can be seen that the change (dnt_1/dt) of the refractive index according to the temperature change of the first lens 110 has a positive number as in Equation 3 and a positive slope as shown in FIG. 5.

On the other hand, referring to FIGS. 6 and 7, a change in refractive index of the second lens 120 and the third lens 130 according to temperature in a temperature range of a low temperature (about −40° C.) to a high temperature (about 99° C.) is relatively large compared to the first lens 110. In particular, it can be seen that the change (dnt_2/dt, dnt_3/dt) of the refractive index according to the temperature change of the first lens 110 and the second lens 120 has a negative number as in Equation 3 and a negative slope as shown in FIG. 7.

In this case, the first lens 110 may have a refractive index greater than that of the second lens 120 and the third lens 130. In detail, the first lens 110 has a refractive index greater than that of the two lenses 120 and 130 to compensate for the second lens 120 and the third lens 130 having relatively large refractive index changes according to temperature change.

In addition, the first lens 110 has a diopter value greater than that of the two lenses 120 and 130 to compensate for the second lens 120 and the third lens 130 having relatively large refractive index changes according to temperature change. Accordingly, the first lens 110 can effectively distribute the power of the optical system 1000 in a temperature range of a low temperature (about −40° C.) to a high temperature (about 99° C.). Accordingly, the optical system 1000 according to the embodiment may minimize or inhibit deterioration of optical properties in an environment of various temperatures, and may have improved optical performance.

That is, in the optical system 1000 according to the embodiment, the first lens 110 may be provided with a material different from that of the second lens 120 and the third lens 130, and at least one of Equations 1 to 57 may be satisfied. Accordingly, the optical system 1000 may inhibit or minimize changes in optical properties according to temperature, and may have improved optical properties at various temperatures.

In addition, since the optical system 1000 according to the embodiment satisfies at least one of Equation 1 to Equation 57, it is possible to inhibit or minimize changes in distortion and aberration characteristics at various temperatures, so that it has improved optical characteristics.

In addition, in the optical system 1000 according to the embodiment, a distance between the plurality of lenses 100 may have a value set according to an area.

The first lens 110 and the second lens 120 may be spaced apart from each other by a first interval. The first interval may be an optical axis OA direction interval between the first lens 110 and the second lens 120.

The first interval may vary according to a position between the first lens 110 and the second lens 120. In detail, when the first interval has the optical axis OA as the starting point and the effective area end of the sensor-side surface (the second surface S2) of the first lens 110 as the endpoint, it may change from the optical axis OA to a direction perpendicular to the optical axis OA. That is, the first interval may change from the optical axis OA toward the end of the effective diameter of the second surface S2.

The first interval may decrease from the optical axis OA toward the first point L1 located on the second surface S2. Here, the first point L1 may be the end of the effective area of the second surface S2.

The first interval may have a maximum value in the optical axis OA. Also, the first interval may have a minimum value at the first point L1. In this case, the maximum value of the first interval may be about 1.1 times or more of the minimum value. In detail, the maximum value of the first interval may satisfy about 1.1 times to about 3 times the minimum value.

The second lens 120 and the third lens 130 may be spaced apart from each other by a second interval. The second interval may be a distance in the optical axis OA direction between the second lens 120 and the third lens 130.

The second interval may vary according to a position between the second lens 120 and the third lens 130. In detail, when the second interval has the optical axis OA as the starting point and the effective area end of the sensor-side surface (the fourth surface S4) of the second lens 120 as the endpoint, it may change from the optical axis OA to a direction perpendicular to the optical axis OA. That is, the second interval may change from the optical axis OA toward the end of the effective diameter of the fourth surface S4.

The second interval may decrease from the optical axis OA toward the second point L2 located on the fourth surface S4. Here, the second point L2 may be the end of the effective area of the fourth surface S4.

The second interval may have a maximum value in the optical axis OA. Also, the second interval may have a minimum value at the second point L2. In this case, the maximum value of the second interval may be about 2 times or more of the minimum value. In detail, the maximum value of the second interval may satisfy about 2 times to about 4 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

The optical system 1000 according to the first embodiment will be described in more detail with reference to FIGS. 8 to 31.

Figure 8:
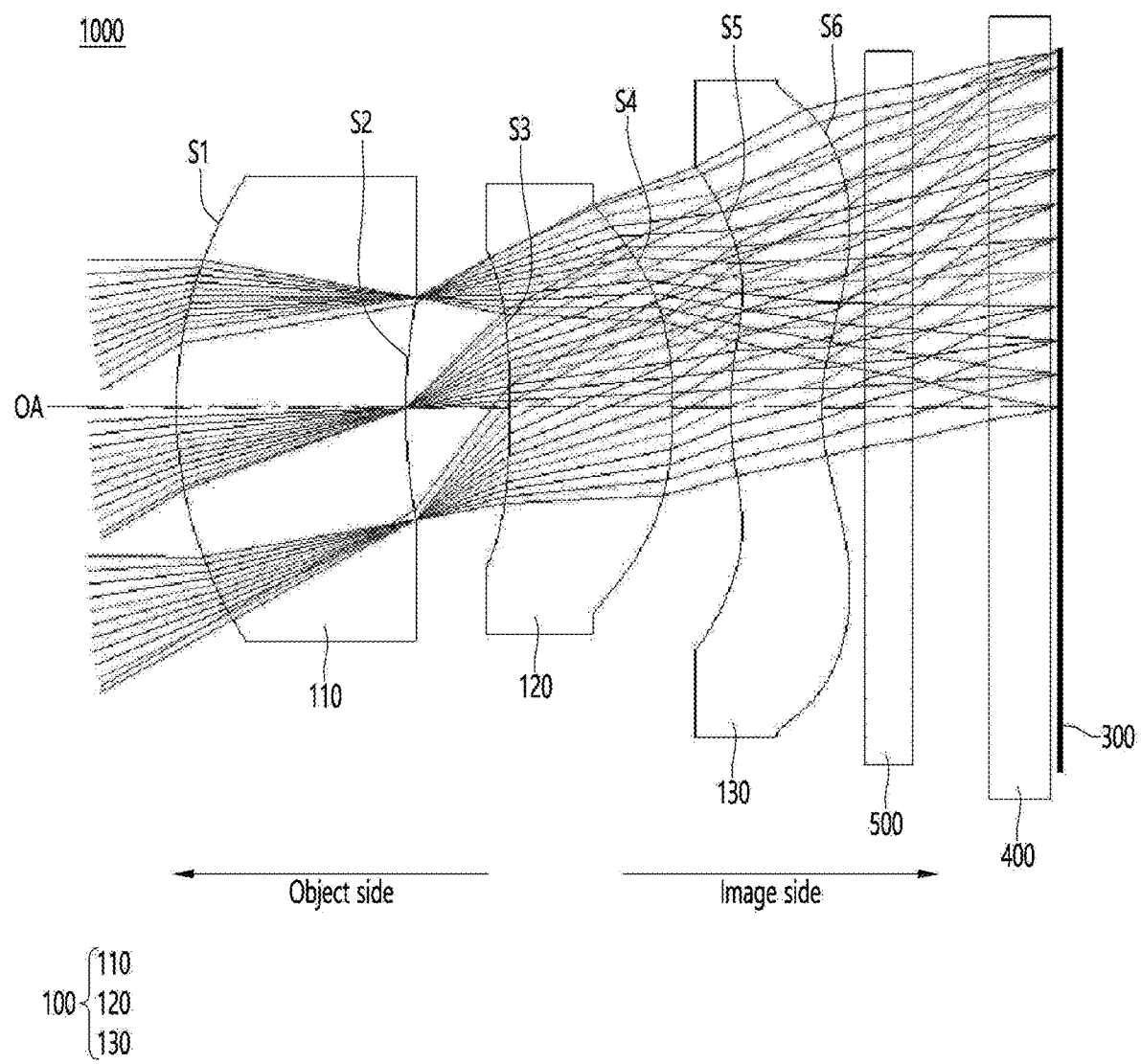
FIG. 8 is a block diagram of an optical system according to the first embodiment.
Figure 21:
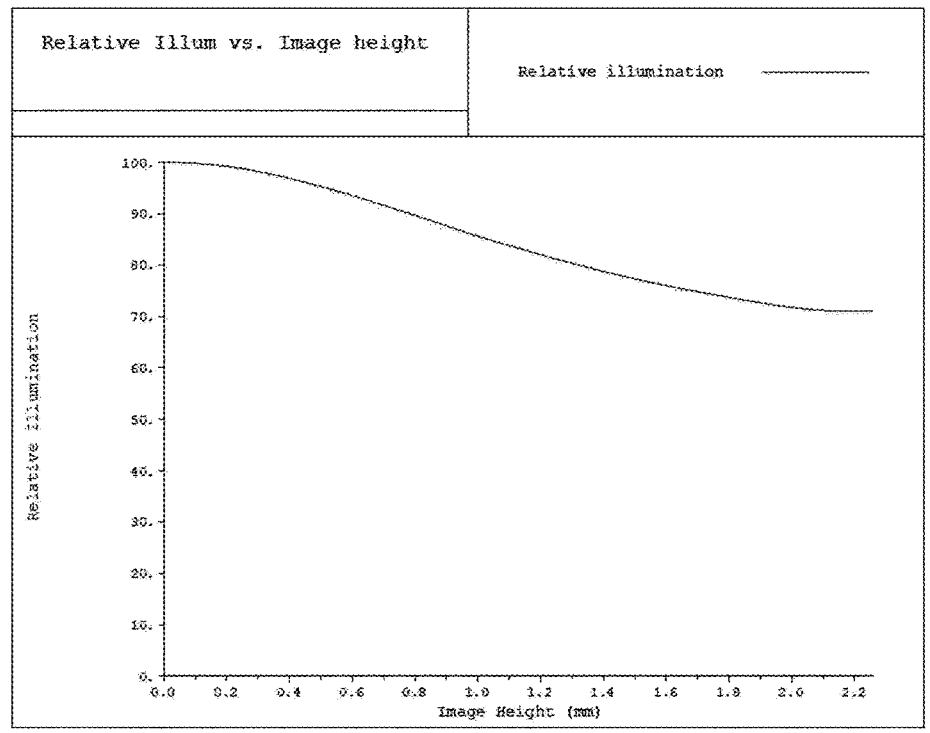
FIG. 21 is a graph of relative illumination for each field of the optical system according to the first embodiment.
Figure 22:
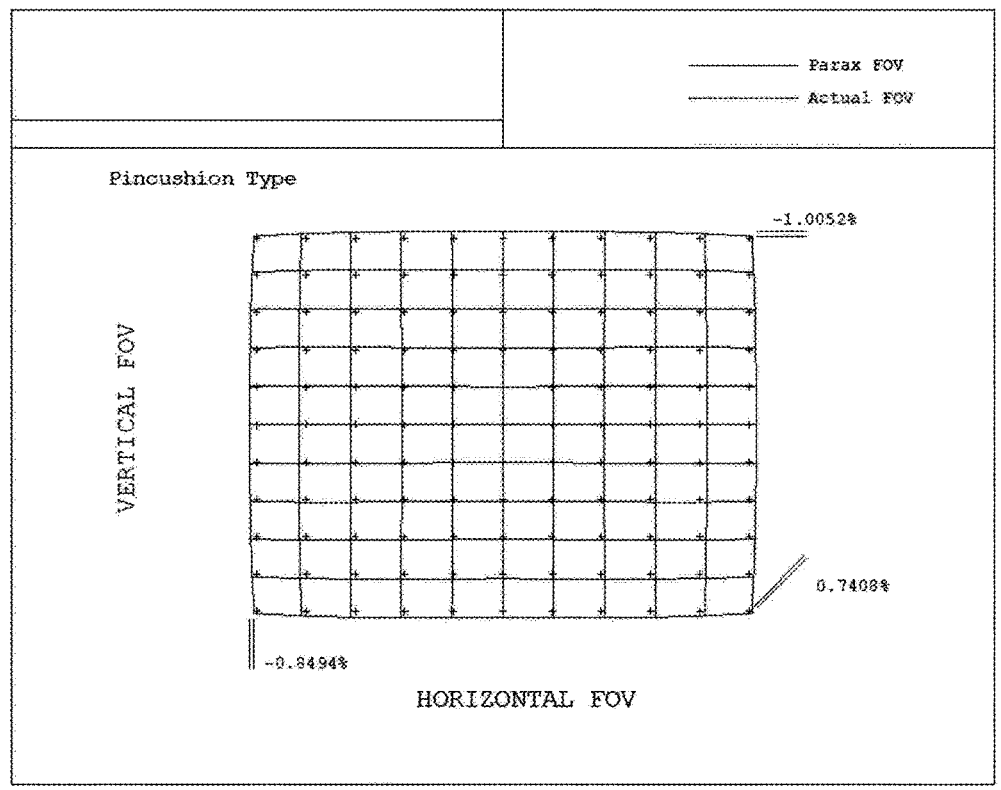
FIG. 22 is a distortion characteristic data of the optical system according to the first embodiment.

FIG. 8 is a block diagram of an optical system according to the first embodiment. Also, FIG. 9 is a view showing a radius of curvature of the first to third lenses 110, 120, 130 according to the first embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 9 is data at room temperature (about 22° C.). Also, FIG. 21 is a graph of relative illumination for each field of the optical system according to the first embodiment, and FIG. 22 is data on distortion characteristics of the optical system according to the first embodiment. Also, FIGS. 23 to 31 are graphs of diffraction MTFs and aberrations for each temperature of the optical system according to the first embodiment.

Referring to FIGS. 8 to 31, the optical system 1000 according to the first embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the first embodiment, the sensor-side surface (the second surface S2) of the first lens 110 may serve as an aperture stop.

In addition, a filter 500 may be disposed between the plurality of lenses 100 and the image sensor 300, and a cover glass 400 may be disposed between the filter 500 and the image sensor 300.

Referring to FIGS. 8 and 9, the first lens 110 of the optical system 1000 according to the first embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 10 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 11 is data of the lens thickness according to the vertical height (0.2 mm interval) of the optical axis OA at room temperature (about 22° C.). In detail, D_1 of FIG. 11 is the central thickness of the first lens 110 and is the thickness (mm) of the first lens 110 on the optical axis OA. In addition, D_1_ET of FIG. 11 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 9 to 11, the thickness of the first lens 110 in the optical axis OA direction may decrease from the optical axis OA toward the end of the effective diameter of the first lens 110. In detail, in the range from the optical axis OA to the effective diameter end of the second surface S2, the thickness in the optical axis OA direction of the first lens 110 may have a maximum value at the optical axis OA, and have a minimum value at the end of the effective diameter of the second surfaces S2.

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 12 is sag data according to the vertical height (0.2 mm interval) of the optical axis of each of the object-side surface (third surface, S3) and the sensor-side surface (fourth surface, S4) of the second lens 120 at room temperature (about 22° C.).

In addition, FIG. 13 is data of the lens thickness according to the vertical height (0.2 mm interval) of the optical axis OA at room temperature (about 22° C.). In detail, D_2 of FIG. 13 is the central thickness of the second lens 120 and is the thickness (mm) of the second lens 120 on the optical axis OA. In addition, D_2_ET of FIG. 13 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120.

Referring to FIGS. 9, 12 and 13, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA, and have a minimum value at the end of the effective diameter of the third surfaces S3.

Accordingly, the second lens 120 may inhibit or minimize the change in optical properties depending on the temperature in the low to high temperature range.

The third lens 130 may be made of a plastic material and have positive (+) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 14 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 15 is data of the lens thickness according to the vertical height (0.2 mm interval) of the optical axis OA at room temperature (about 22° C.). In detail, D_3 of FIG. 15 is the central thickness of the third lens 130 and is the thickness (mm) of the third lens 130 on the optical axis OA. In addition, D_3_ET of FIG. 15 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 9, 14 and 15, the thickness of the third lens 130 in the optical axis OA direction may increase from the optical axis OA toward the end of the effective diameter of the third lens 130. In detail, in the range from the optical axis OA to the effective diameter end of the fifth surface S5, the thickness in the optical axis OA direction of the third lens 130 may have a maximum value at the end of the effective diameter of the fifth surfaces S5, and have a minimum value at the optical axis OA.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 1.1 times or more of the refractive power of the second lens 120 and the third lens 130. In detail, the refractive power of the first lens 110 may be greater than or equal to about 1.15 times the refractive power of the second lens 120 and the third lens 130. In more detail, the refractive power of the first lens 110 may be about 1.2 times or more of the refractive power of the second lens 120 and the third lens 130. The refractive powers of the second lens 120 and the third lens 130 may be equal to each other.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the first embodiment, the values of the aspheric coefficients of each lens surface are as shown in FIG. 16.

In addition, in the optical system 1000 according to the first embodiment, the interval (first interval) between the first lens 110 and the second lens 120 may be the same as that of FIG. 17 below at room temperature (about 22° C.)

Referring to FIG. 17, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 9.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

In addition, in the optical system 1000 according to the first embodiment, the interval (second interval) between the second lens 120 and the third lens 130 may be the same as that of FIG. 18 below at room temperature (about 22° C.)

Referring to FIG. 18, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 9.

The second interval may have a maximum value at the second point L2 and a minimum value at the optical axis OA. The maximum value of the second interval may be about 2 times to about 4 times the minimum value. For example, in the first embodiment, the maximum value of the second interval may be about 2.1 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

FIG. 19 is items of the above-described equations in the optical system 1000 according to the first embodiment. FIG. 19 shows diopter values of the first to third lenses 110, 120, 130 at room temperature (about 22° C.), focal lengths, total track length (TTL), BFL (Back focal length), F number, ImgH, and effective focal length (EFL) values.

FIG. 20 shows the result values of the above-described equations in the optical system 1000 according to the first embodiment.

Referring to FIG. 20, the optical system 1000 according to the first embodiment satisfies at least one of Equations 1 to 57. In detail, the optical system 1000 according to the first embodiment satisfies all of Equations 1 to 57 above.

Accordingly, the optical system 1000 according to the first embodiment has an angle of view of about 60 degrees (60±2 degrees) in a temperature range of a low temperature (−40° C.) to a high temperature (99° C.), and have optical characteristics as shown in FIGS. 21 to 31.

FIG. 21 is a graph of relative illumination for each field of the optical system according to the first embodiment, and FIG. 22 is data on distortion characteristics of the optical system according to the first embodiment. In this case, FIGS. 21 and 22 are data obtained by measuring the optical system 1000 at room temperature (about 22° C.).

Referring to FIG. 21, the optical system 1000 according to the first embodiment may have excellent relative illumination characteristics in the 0 field region (center region) to 1.0 field region (edge region) of the image sensor 300. For example, the optical system 1000 may have the relative illumination of about 65% or more. In detail, in the optical system 1000, when the 0 field area is 100%, the relative illumination of the 0.5 field area may be about 80% or more, and the relative illumination of the 1.0 field area may be about 65% or more. In more detail, the relative illumination of the 1.0 field region may be about 70% or more.

Also, referring to FIG. 22, the optical system 1000 according to the first embodiment may have a barrel distortion shape in which an edge portion of an image is curved outward, and has a distortion of about 0.7408% and a TV-distortion of about −1.0052%.

FIGS. 23 to 31 are graphs of diffraction MTF characteristics and aberration diagrams of the optical system 1000 according to temperature.

Figure 23:
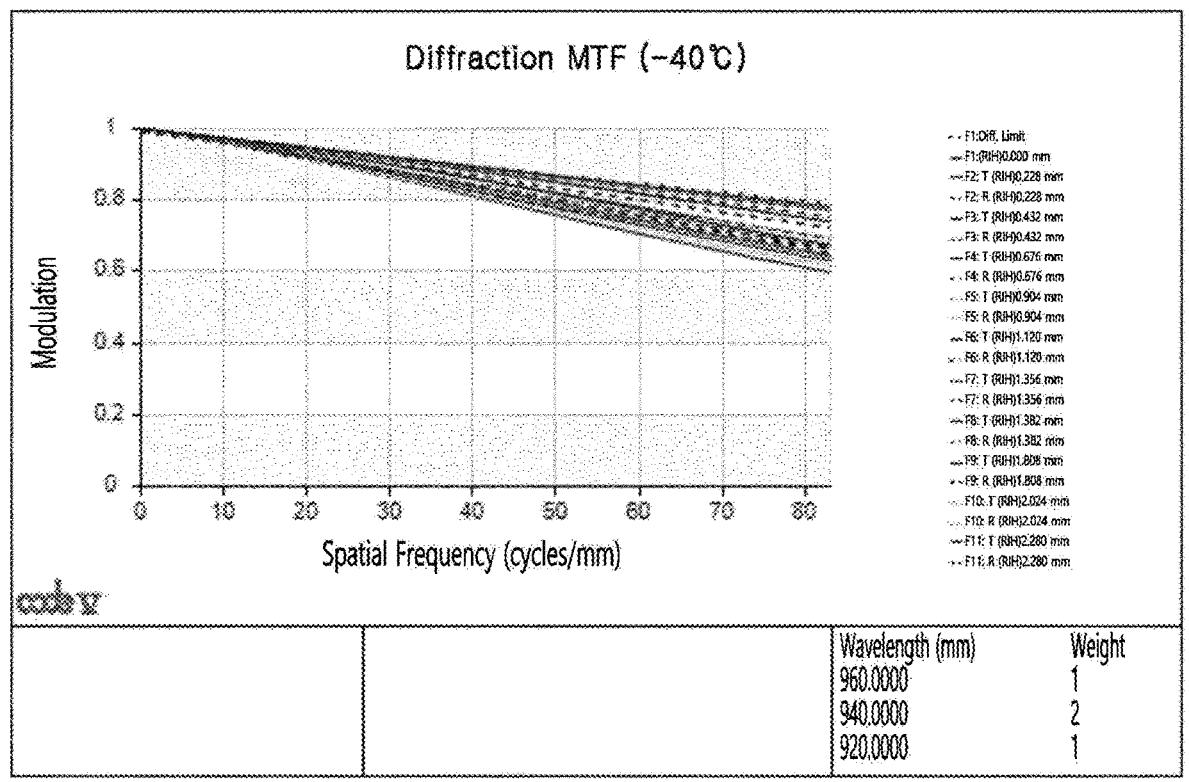
FIGS. 23 to 31 are graphs of diffraction MTF characteristics and aberration diagrams according to temperature of the optical system according to the first embodiment.
Figure 24:
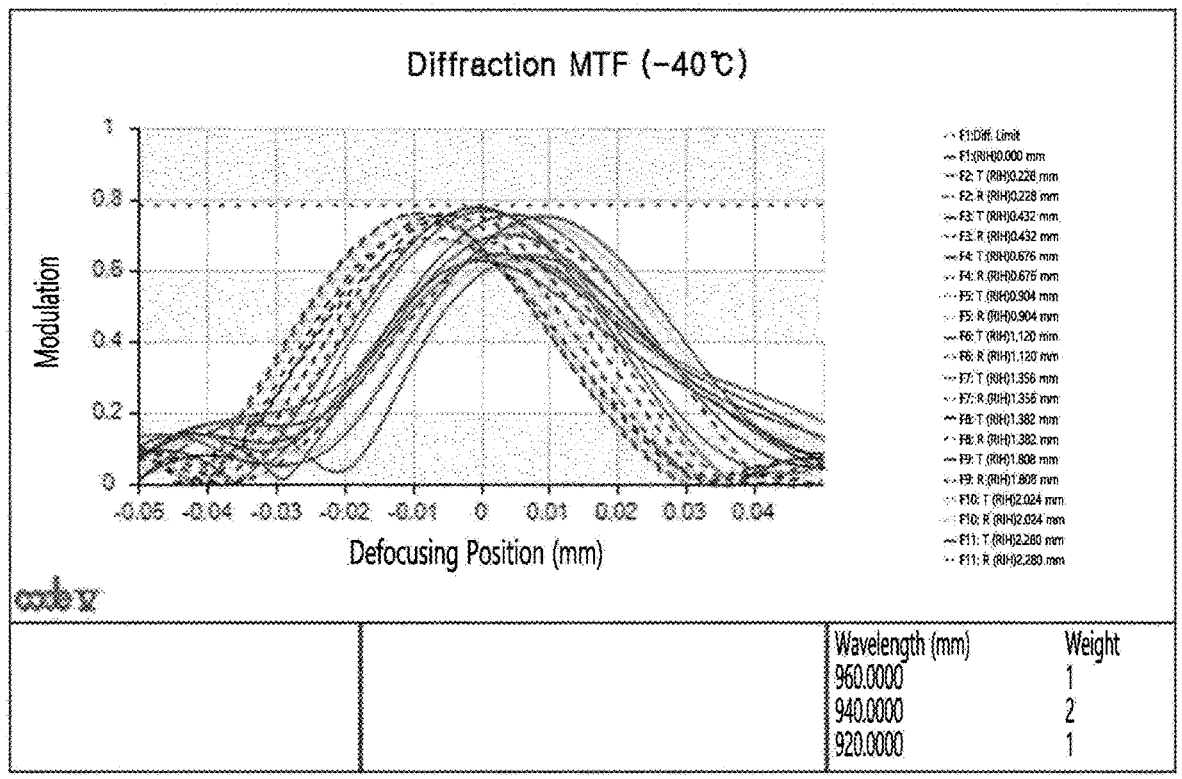
Figure 26:
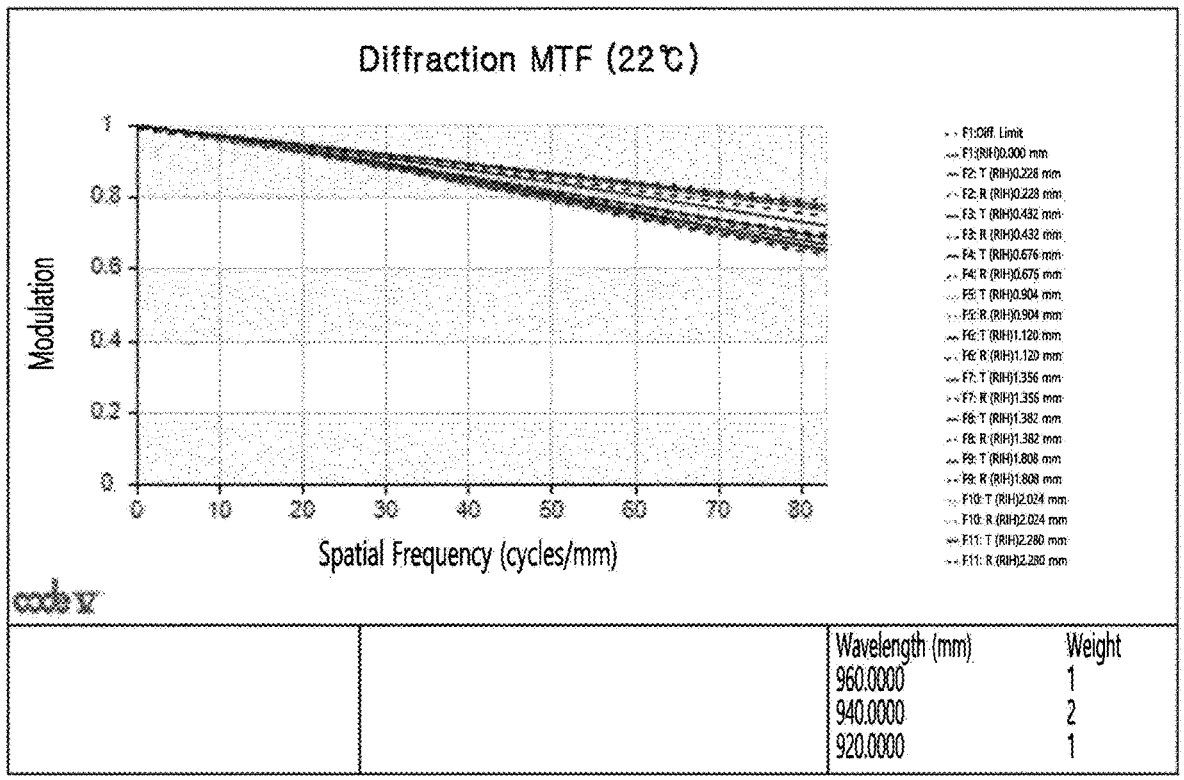
Figure 27:
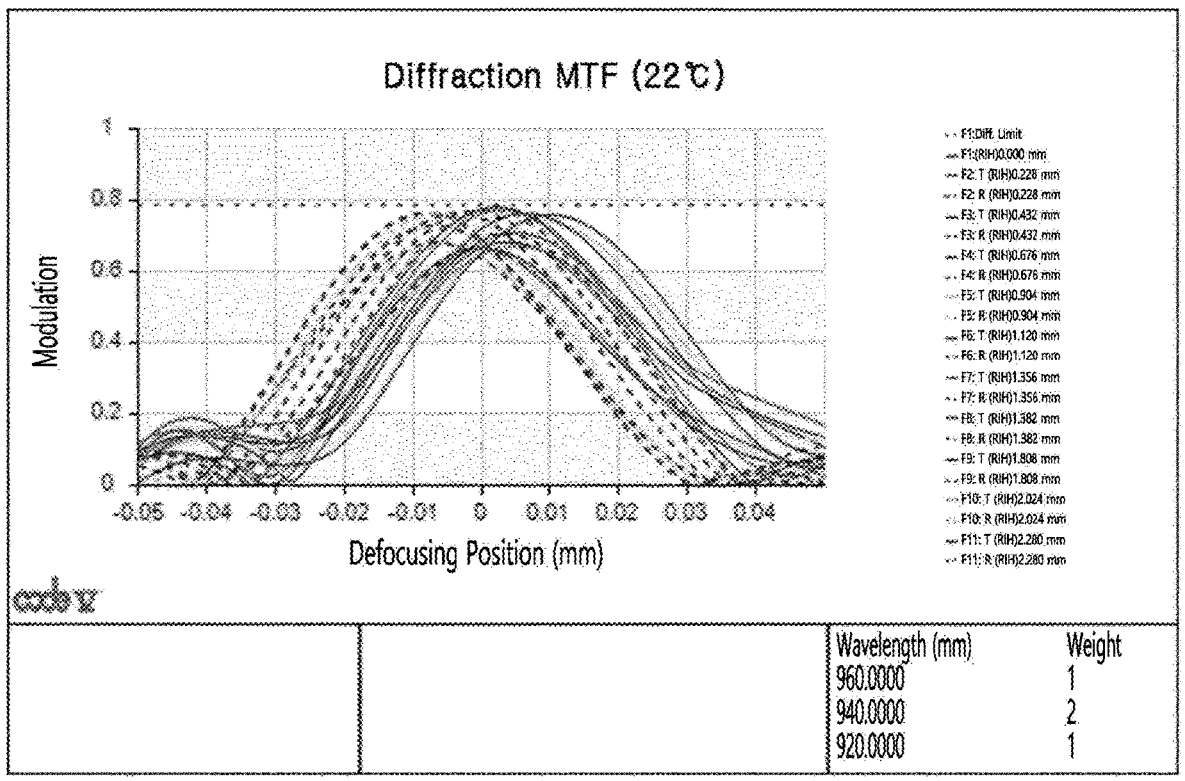
Figure 29:
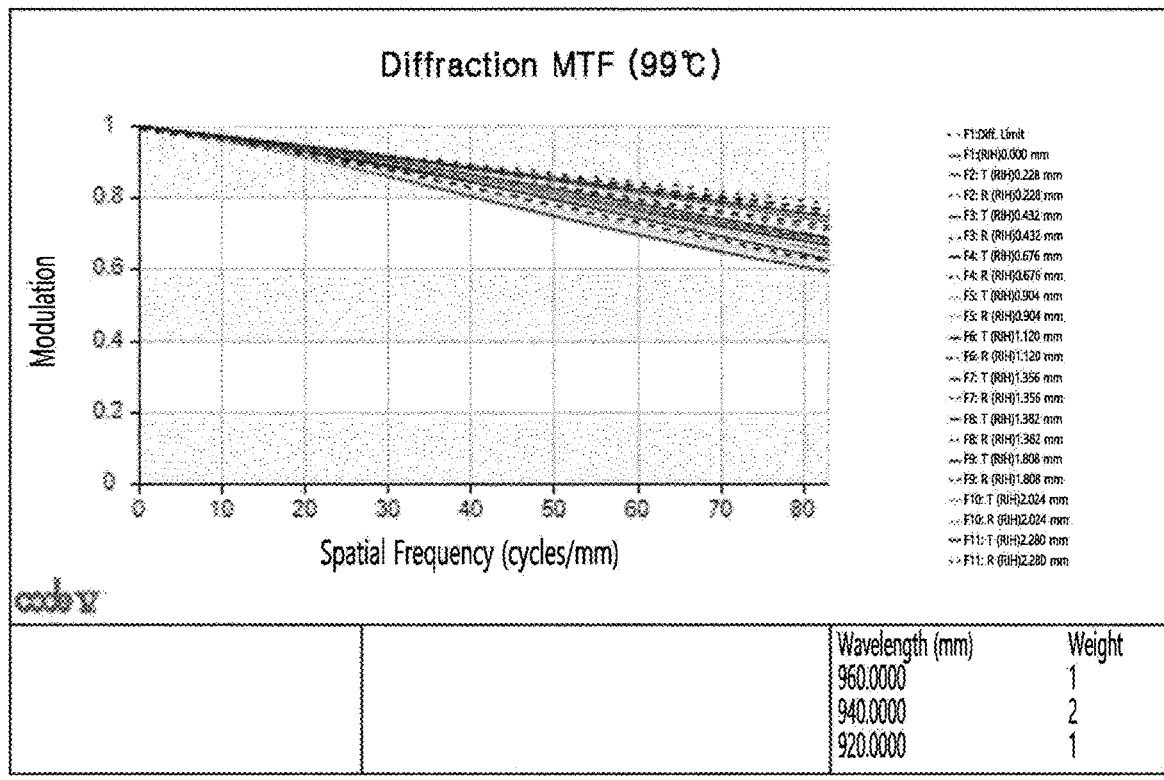
Figure 30:
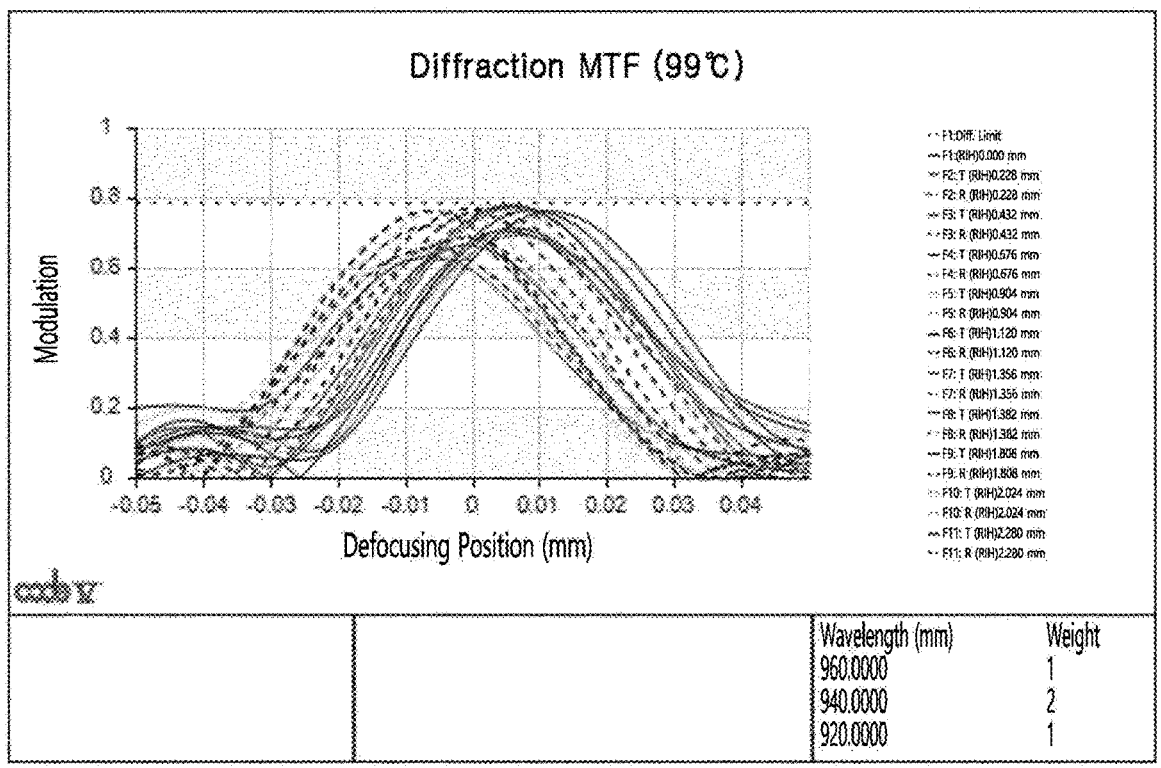

In detail, FIGS. 23 and 24 are graphs of the diffraction MTF characteristics of the optical system 1000 in a low-temperature (−40° C.) environment, and FIGS. 26 and 27 are graphs of the diffraction MTF characteristics of the optical system 1000 in a room temperature (22° C.) environment, and FIGS. 29 and 30 are graphs of diffraction MTF characteristics of the optical system 1000 in a high temperature (99° C.) environment.

Figure 25:
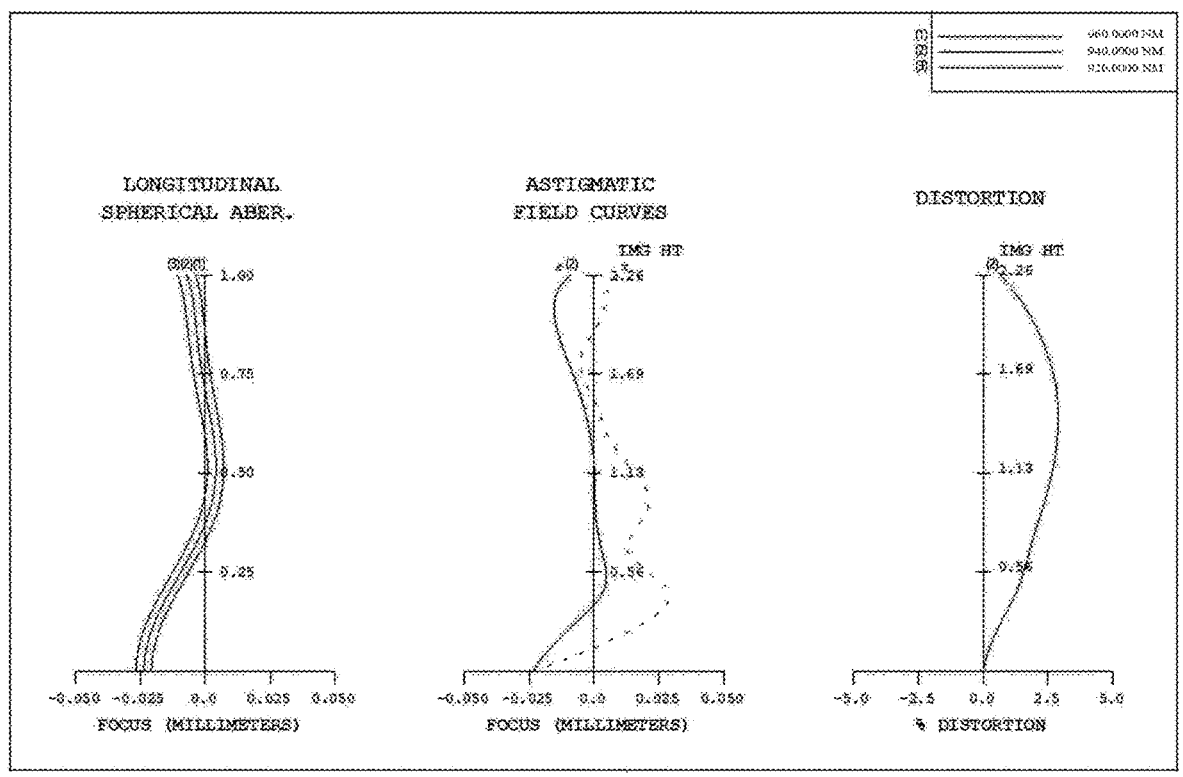
Figure 28:
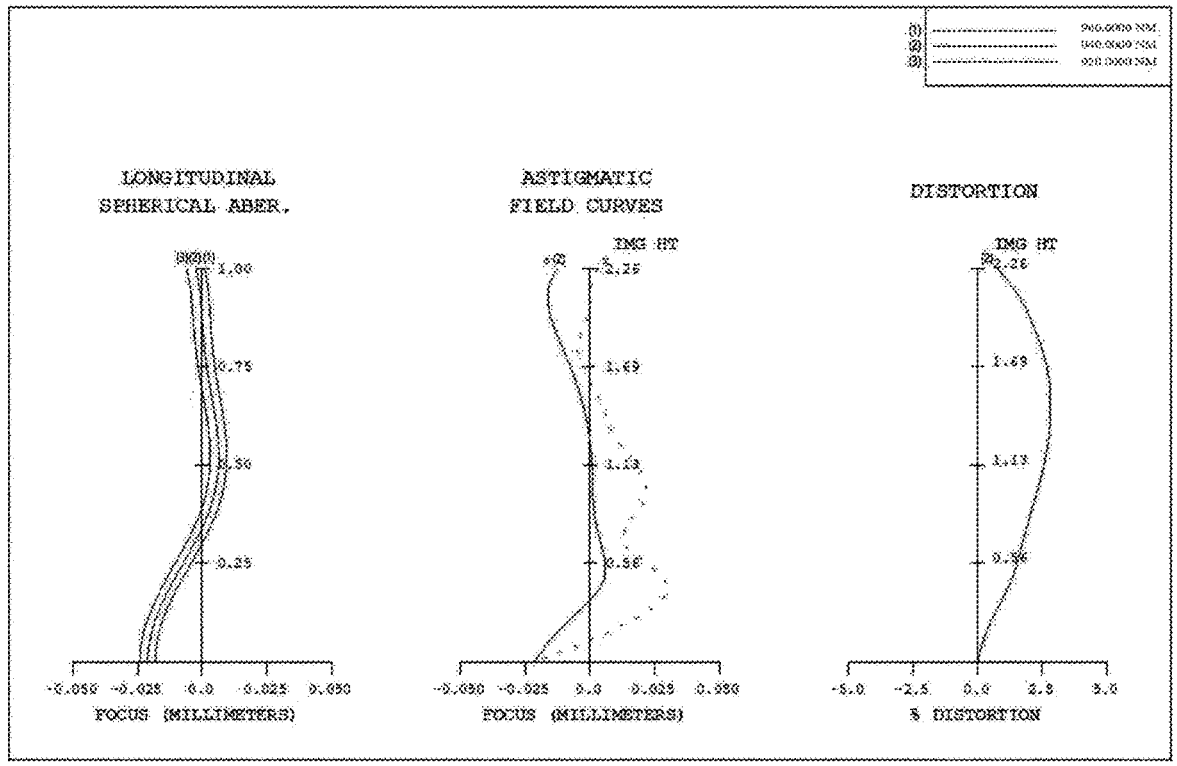
Figure 31:
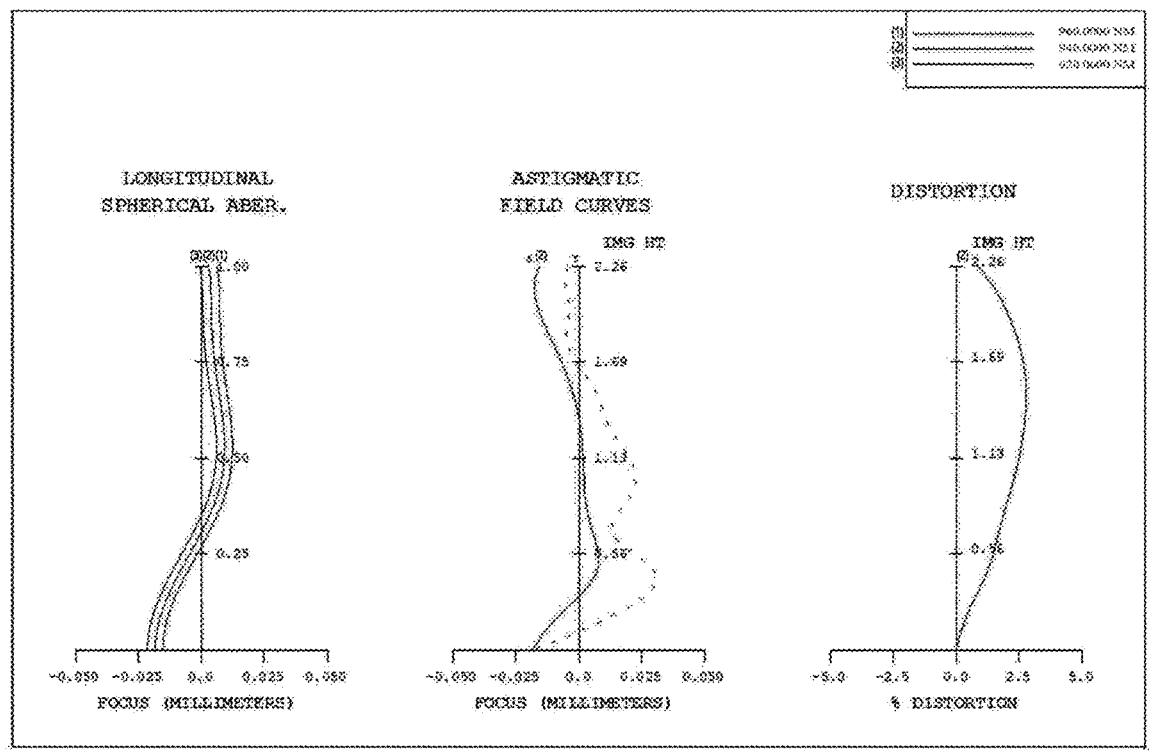

In addition, each of FIGS. 25, 28 and 31 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 25, 28 and 31, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 25, 28 and 31, the closer the curves are to the Y-axis, the better the aberration correction function can be interpreted. Referring to FIGS. 25, 28 and 31, in the optical system 1000 according to the first embodiment, measured values are adjacent to the Y-axis in almost all areas.

Referring to FIGS. 23 to 31, in the optical system 1000 according to the first embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the first embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the first embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

Hereinafter, the optical system 1000 according to the second embodiment will be described in more detail with reference to FIGS. 32 to 55.

Figure 32:
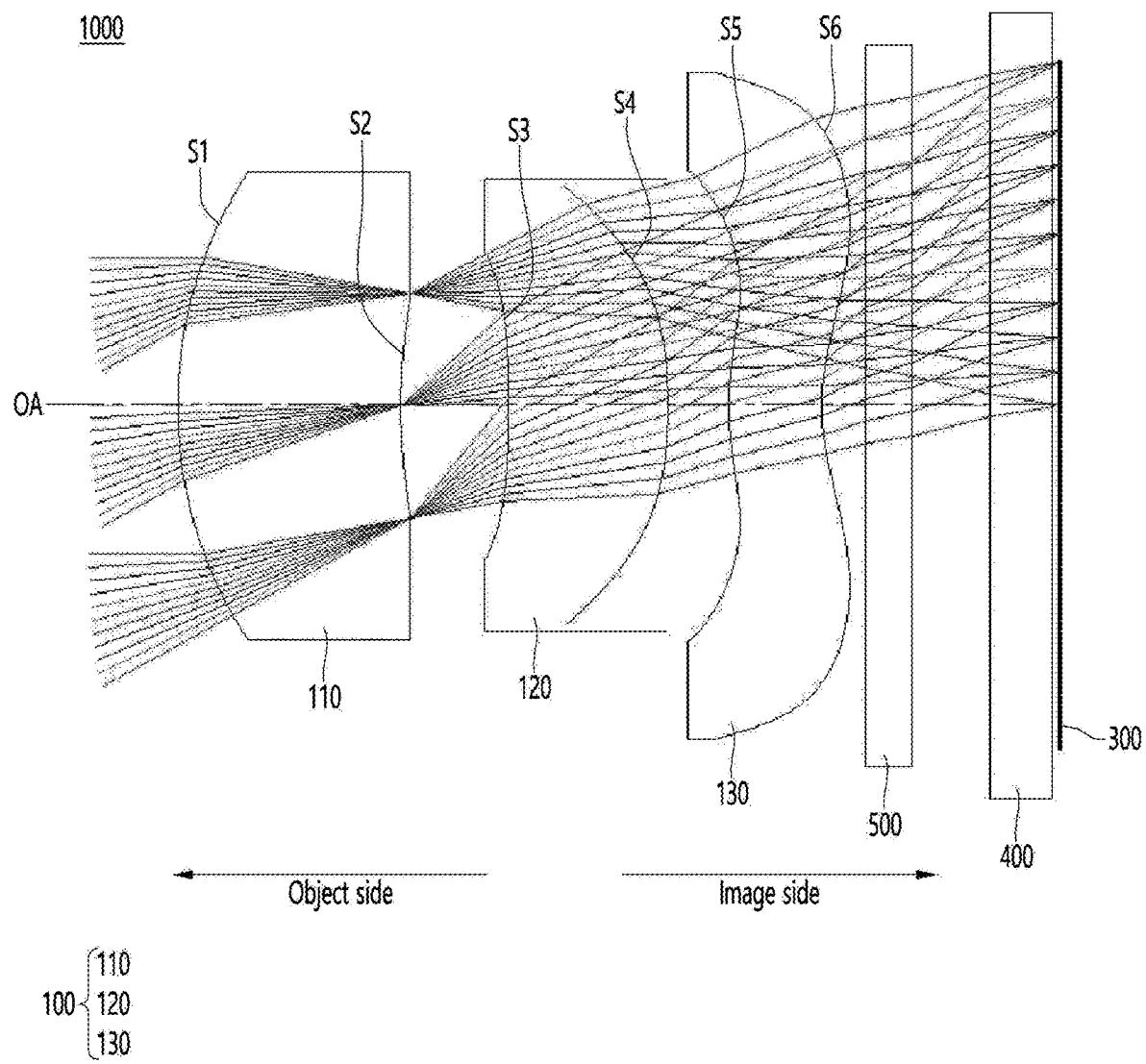
FIG. 32 is a block diagram of an optical system according to the second embodiment.
Figure 45:
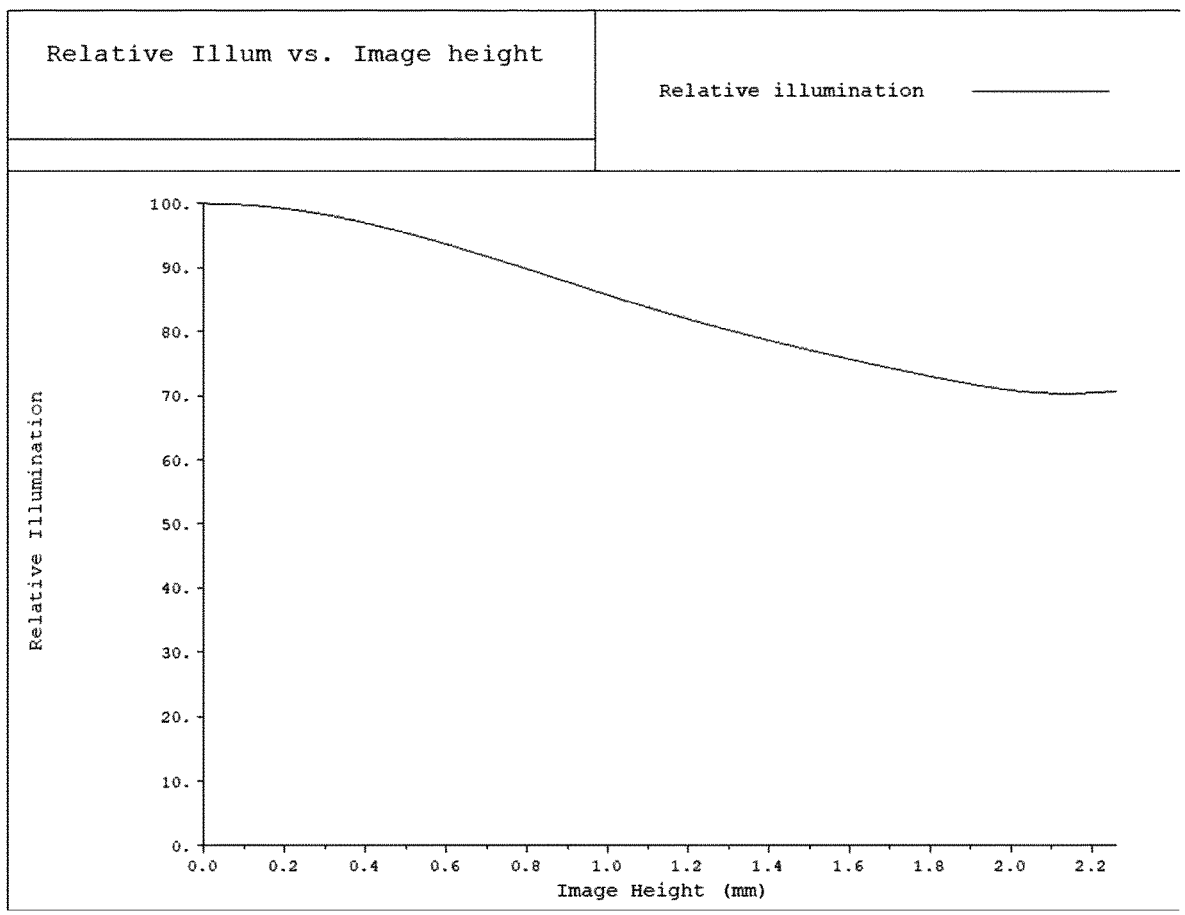
FIG. 45 is a graph of relative illumination for each field of the optical system according to the second embodiment.
Figure 46:
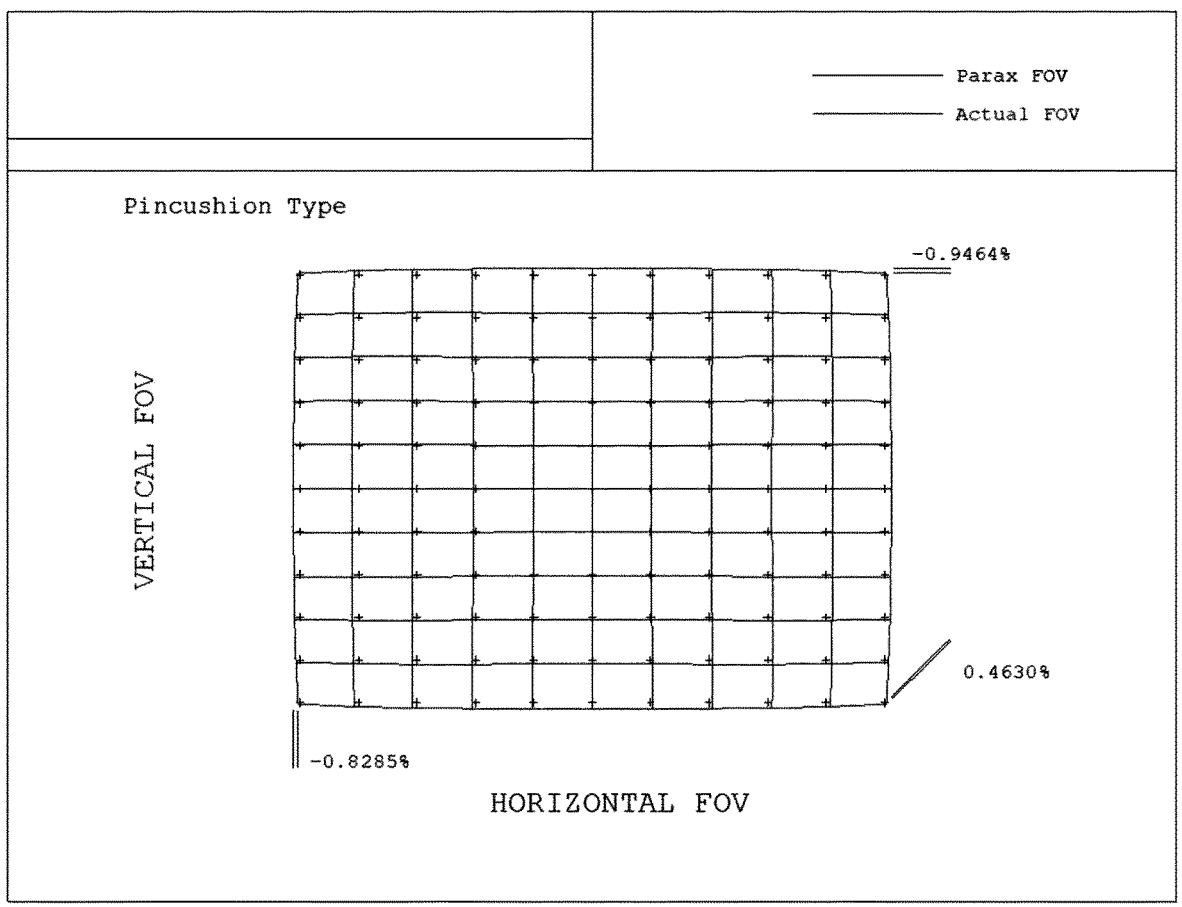
FIG. 46 is a distortion characteristic data of the optical system according to the second embodiment.

FIG. 32 is a block diagram of an optical system according to the second embodiment. Also, FIG. 33 is a view showing a radius of curvature of the first to third lenses 110, 120, 130 according to the second embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 33 is data at room temperature (about 22° C.). Also, FIG. 45 is a graph of relative illumination for each field of the optical system according to the second embodiment, and FIG. 46 is data on distortion characteristics of the optical system according to the second embodiment. Also, FIGS. 47 to 55 are graphs of diffraction MTFs and aberrations for each temperature of the optical system according to the second embodiment.

Referring to FIGS. 32 to 33, the optical system 1000 according to the second embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the second embodiment, the sensor-side surface (the second surface S2) of the first lens 110 may serve as an aperture stop.

In addition, a filter 500 may be disposed between the plurality of lenses 100 and the image sensor 300, and a cover glass 400 may be disposed between the filter 500 and the image sensor 300.

Referring to FIGS. 32 and 33, the first lens 110 of the optical system 1000 according to the second embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 34 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 35 is data of the lens thickness according to the vertical height (0.2 mm interval) of the optical axis OA at room temperature (about 22° C.). In detail, D_1 of FIG. 35 is the central thickness of the first lens 110 and is the thickness (mm) of the first lens 110 on the optical axis OA. In addition, D_1_ET of FIG. 35 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 33 to 35, the thickness of the first lens 110 in the optical axis OA direction may decrease from the optical axis OA toward the end of the effective diameter of the first lens 110. In detail, in the range from the optical axis OA to the effective diameter end of the second surface S2, the thickness in the optical axis OA direction of the first lens 110 may have a maximum value at the optical axis OA, and have a minimum value at the end of the effective diameter of the second surfaces S2.

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 36 is sag data according to the vertical height (0.2 mm interval) of the optical axis of each of the object-side surface (third surface, S3) and the sensor-side surface (fourth surface, S4) of the second lens 120 at room temperature (about 22° C.). In addition, FIG. 37 is data of the lens thickness according to the vertical height (0.2 mm interval) of the optical axis OA at room temperature (about 22° C.). In detail, D_2 of FIG. 37 is the central thickness of the second lens 120 and is the thickness (mm) of the second lens 120 on the optical axis OA. In addition, D_2_ET of FIG. 37 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120. Referring to FIGS. 33, 36 and 37, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA, and have a minimum value at the end of the effective diameter of the third surfaces S3.

Accordingly, the second lens 120 may inhibit or minimize the change in optical properties depending on the temperature in the low to high temperature range.

The third lens 130 may be made of a plastic material and have positive (+) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 38 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 39 is data of the lens thickness according to the vertical height (0.2 mm interval) of the optical axis OA at room temperature (about 22° C.). In detail, D_3 of FIG. 39 is the central thickness of the third lens 130 and is the thickness (mm) of the third lens 130 on the optical axis OA. In addition, D_3_ET of FIG. 39 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 33, 38 and 39, the thickness of the third lens 130 in the optical axis OA direction may increase from the optical axis OA toward the end of the effective diameter of the third lens 130. In detail, in the range from the optical axis OA to the effective diameter end of the fifth surface S5, the thickness in the optical axis OA direction of the third lens 130 may have a maximum value at the end of the effective diameter of the fifth surfaces S5, and have a minimum value at the optical axis OA.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 1.1 times or more of the refractive power of the second lens 120 and the third lens 130. In detail, the refractive power of the first lens 110 may be greater than or equal to about 1.15 times the refractive power of the second lens 120 and the third lens 130. In more detail, the refractive power of the first lens 110 may be about 1.2 times or more of the refractive power of the second lens 120 and the third lens 130. The refractive powers of the second lens 120 and the third lens 130 may be equal to each other.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the second embodiment, the values of the aspheric coefficients of each lens surface are as shown in FIG. 40.

In addition, in the optical system 1000 according to the second embodiment, the interval (first interval) between the first lens 110 and the second lens 120 may be the same as that of FIG. 41 below at room temperature (about 22° C.)

Referring to FIG. 41, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 33.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

In addition, in the optical system 1000 according to the second embodiment, the interval (second interval) between the second lens 120 and the third lens 130 may be the same as that of FIG. 42 below at room temperature (about 22° C.)

Referring to FIG. 42, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 33.

The second interval may have a maximum value at the second point L2 and a minimum value at the optical axis OA. The maximum value of the second interval may be about 2 times to about 4 times the minimum value. For example, in the second embodiment, the maximum value of the second interval may be about 2.1 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

FIG. 43 is items of the above-described equations in the optical system 1000 according to the second embodiment. FIG. 19 shows diopter values of the first to third lenses 110, 120, 130 at room temperature (about 22° C.), focal lengths, total track length (TTL), BFL (Back focal length), F number, ImgH, and effective focal length (EFL) values.

FIG. 44 shows the result values of the above-described equations in the optical system 1000 according to the second embodiment.

Referring to FIG. 44, the optical system 1000 according to the second embodiment satisfies at least one of Equations 1 to 57. In detail, the optical system 1000 according to the second embodiment satisfies all of Equations 1 to 57 above.

Accordingly, the optical system 1000 according to the second embodiment has an angle of view of about 60 degrees (60±2 degrees) in a temperature range of a low temperature (−40° C.) to a high temperature (99° C.), and have optical characteristics as shown in FIGS. 45 to 55.

FIG. 45 is a graph of relative illumination for each field of the optical system according to the second embodiment, and FIG. 46 is data on distortion characteristics of the optical system according to the second embodiment. In this case, FIGS. 45 and 46 are data obtained by measuring the optical system 1000 at room temperature (about 22° C.).

Referring to FIG. 45, the optical system 1000 according to the second embodiment may have excellent relative illumination characteristics in the 0 field region (center region) to 1.0 field region (edge region) of the image sensor 300. For example, the optical system 1000 may have the relative illumination of about 65% or more. In detail, in the optical system 1000, when the 0 field area is 100%, the relative illumination of the 0.5 field area may be about 80% or more, and the relative illumination of the 1.0 field area may be about 65% or more. In more detail, the relative illumination of the 1.0 field region may be about 70% or more.

Also, referring to FIG. 46, the optical system 1000 according to the second embodiment may have a barrel distortion shape in which an edge portion of an image is curved outward, and has a distortion of about 0.4630% and a TV-distortion of about −0.9464%.

FIGS. 47 to 55 are graphs of diffraction MTF characteristics and aberration diagrams of the optical system 1000 according to temperature.

Figure 47:
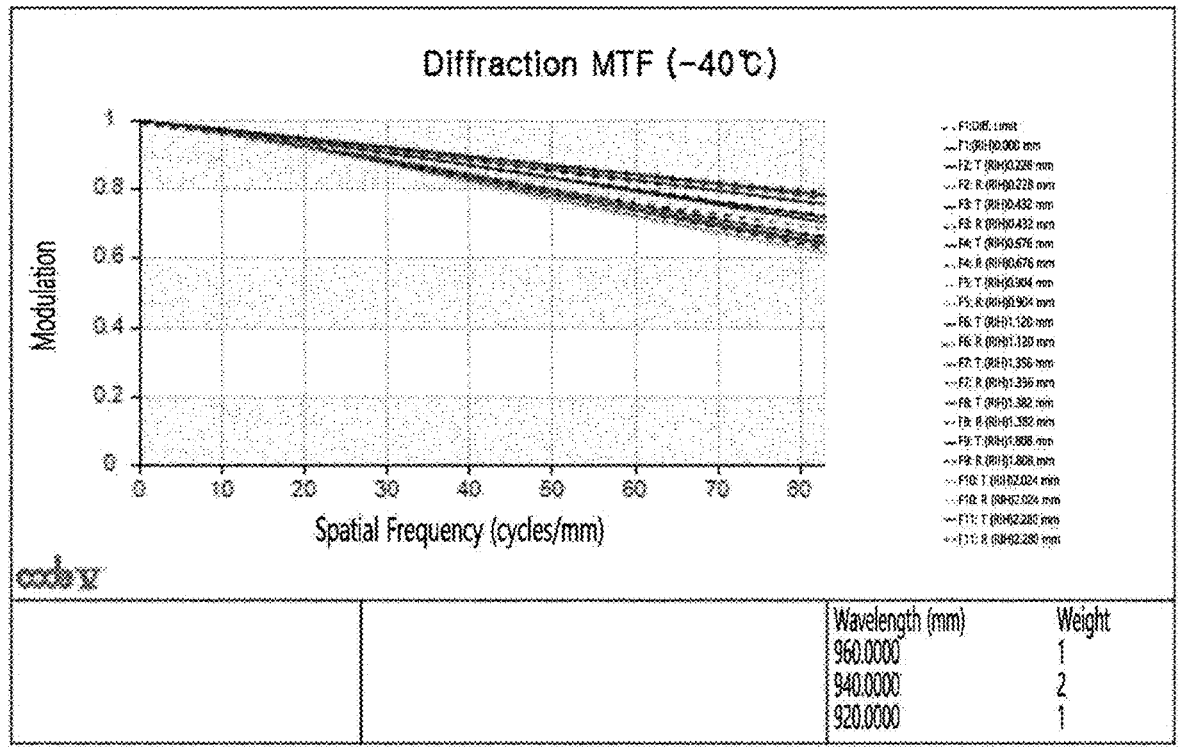
FIGS. 47 to 55 are graphs of diffraction MTF characteristics and aberrations according to the temperature of the optical system according to the second embodiment.
Figure 48:
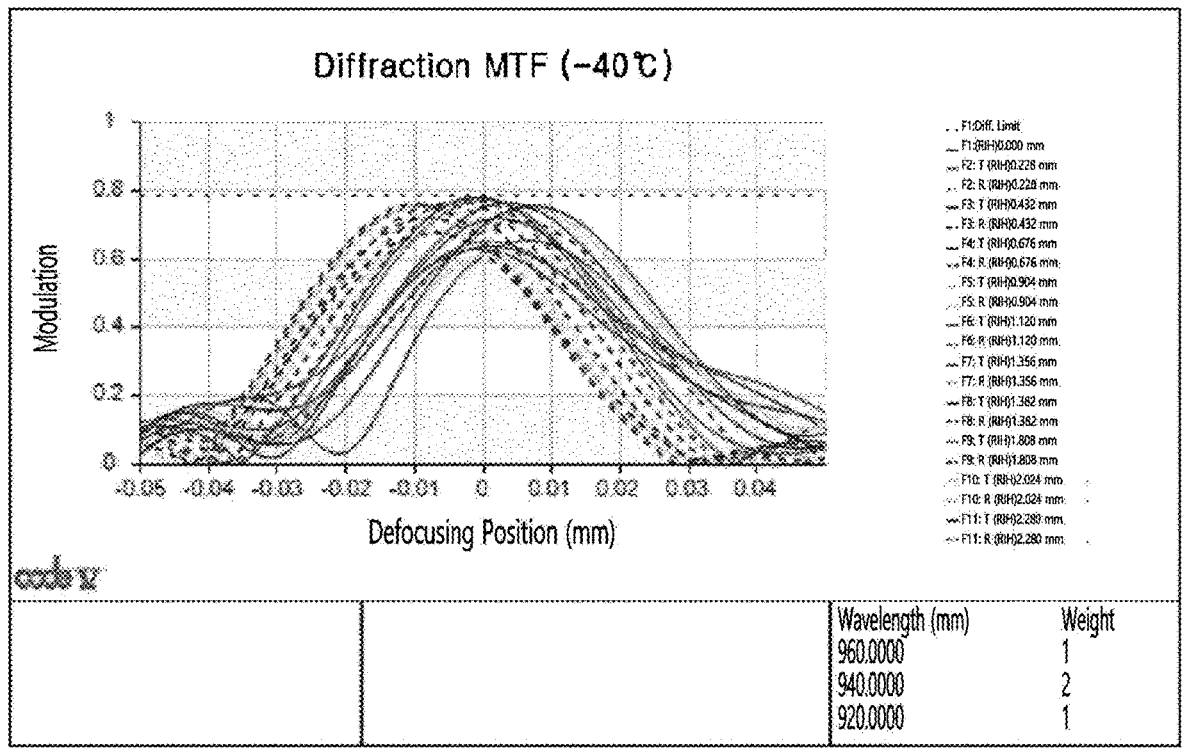
Figure 50:
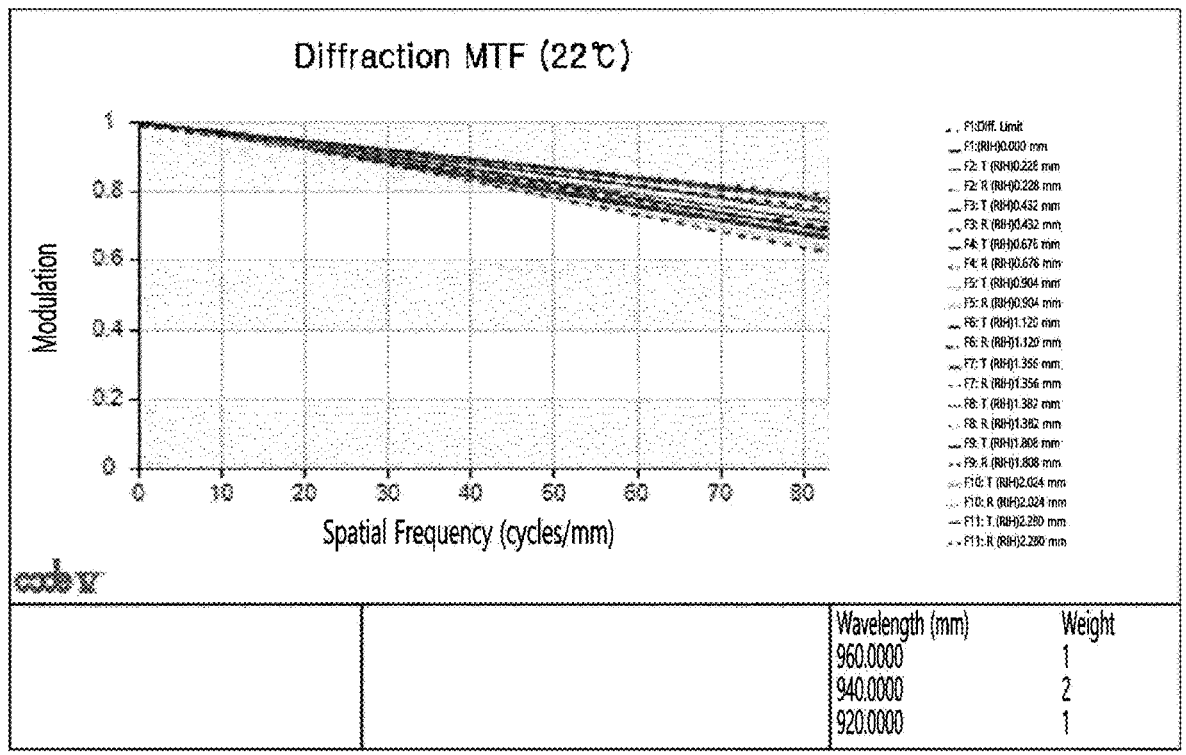
Figure 51:
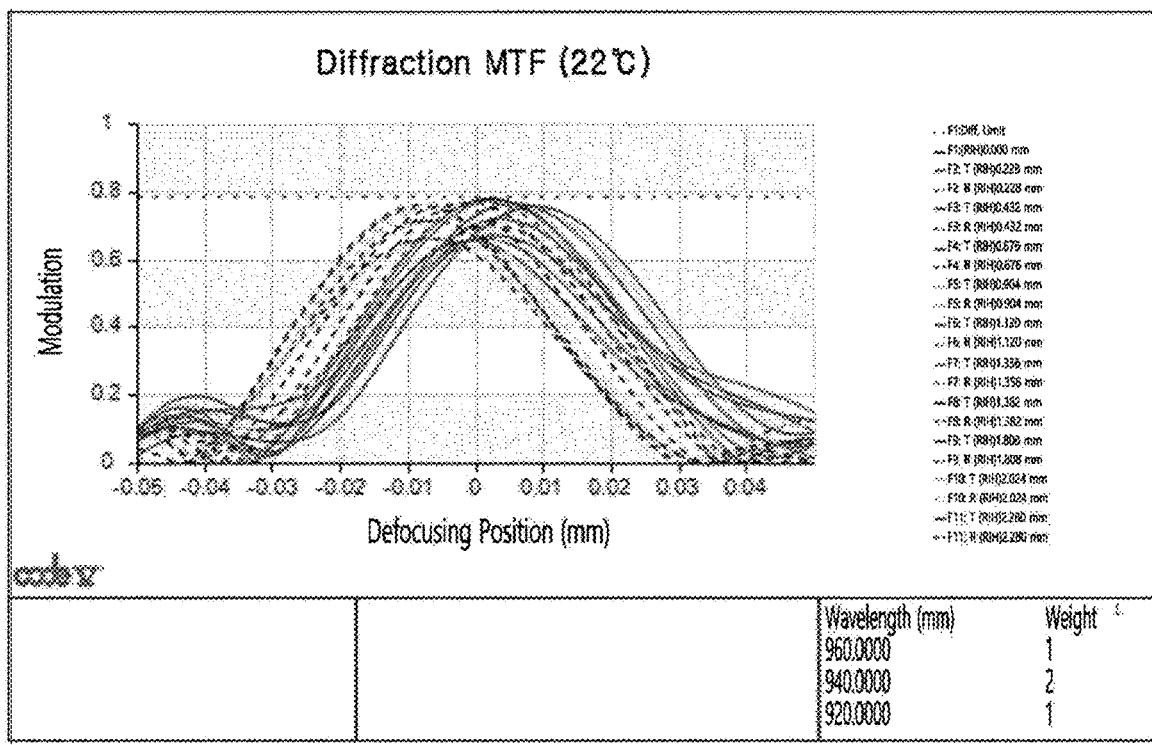
Figure 53:
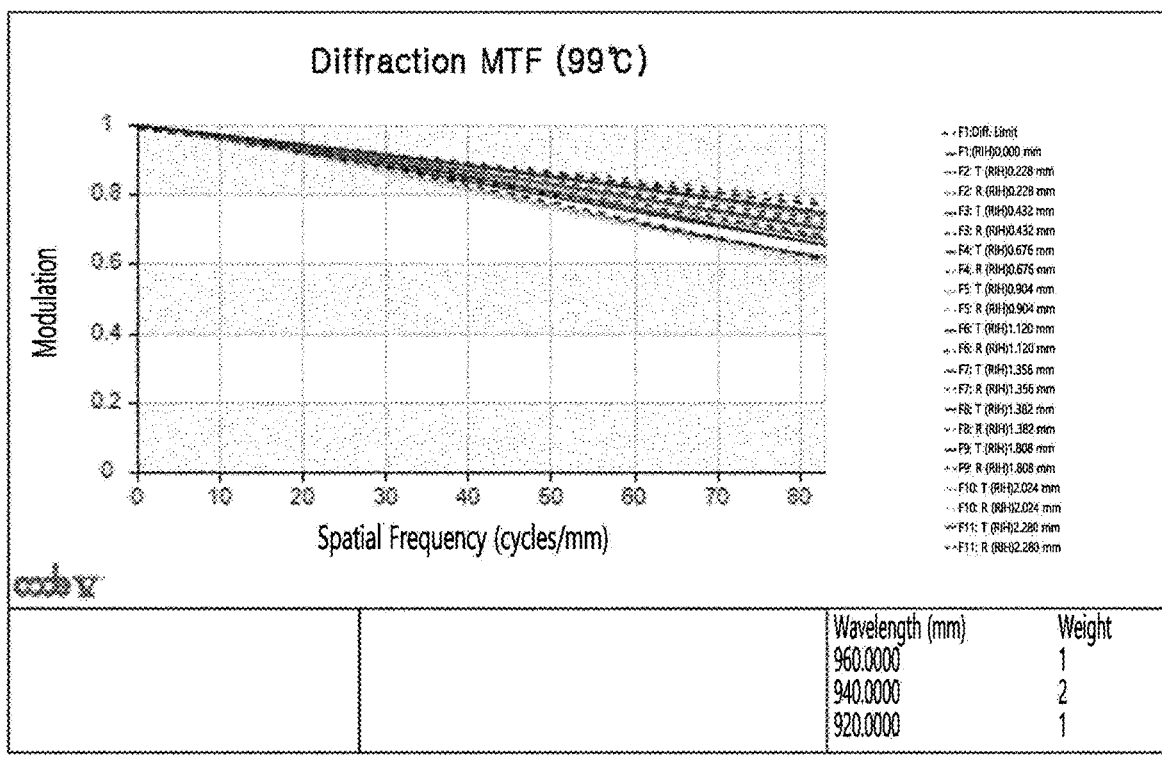
Figure 54:
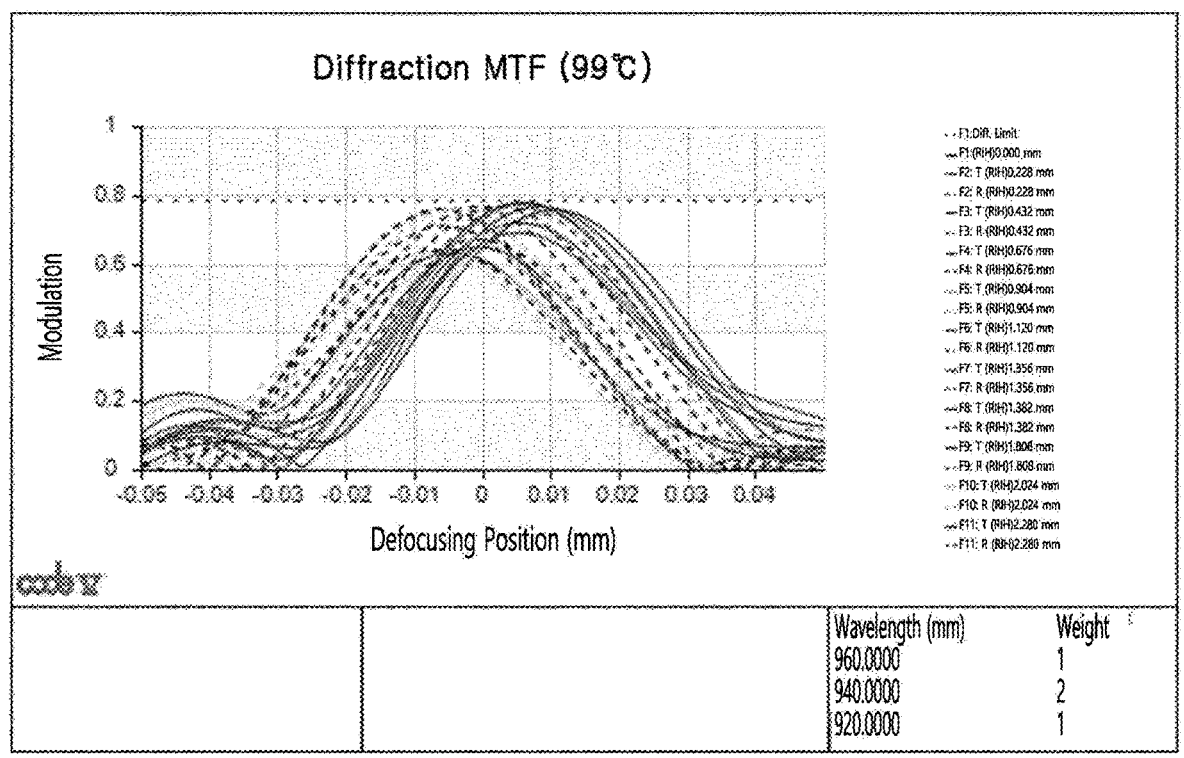

In detail, FIGS. 47 and 48 are graphs of the diffraction MTF characteristics of the optical system 1000 in a low-temperature (−40° C.) environment, and FIGS. 50 and 51 are graphs of the diffraction MTF characteristics of the optical system 1000 in a room temperature (22° C.) environment, and FIGS. 53 and 54 are graphs of diffraction MTF characteristics of the optical system 1000 in a high temperature (99° C.) environment.

Figure 49:
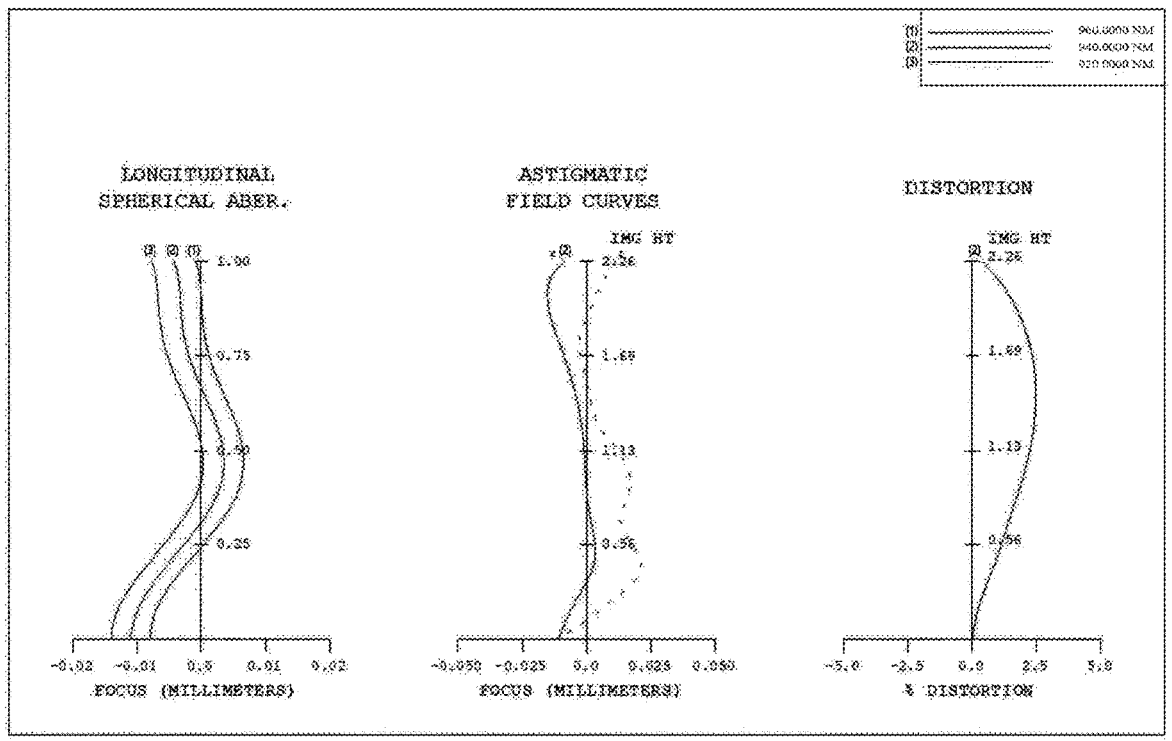
Figure 52:
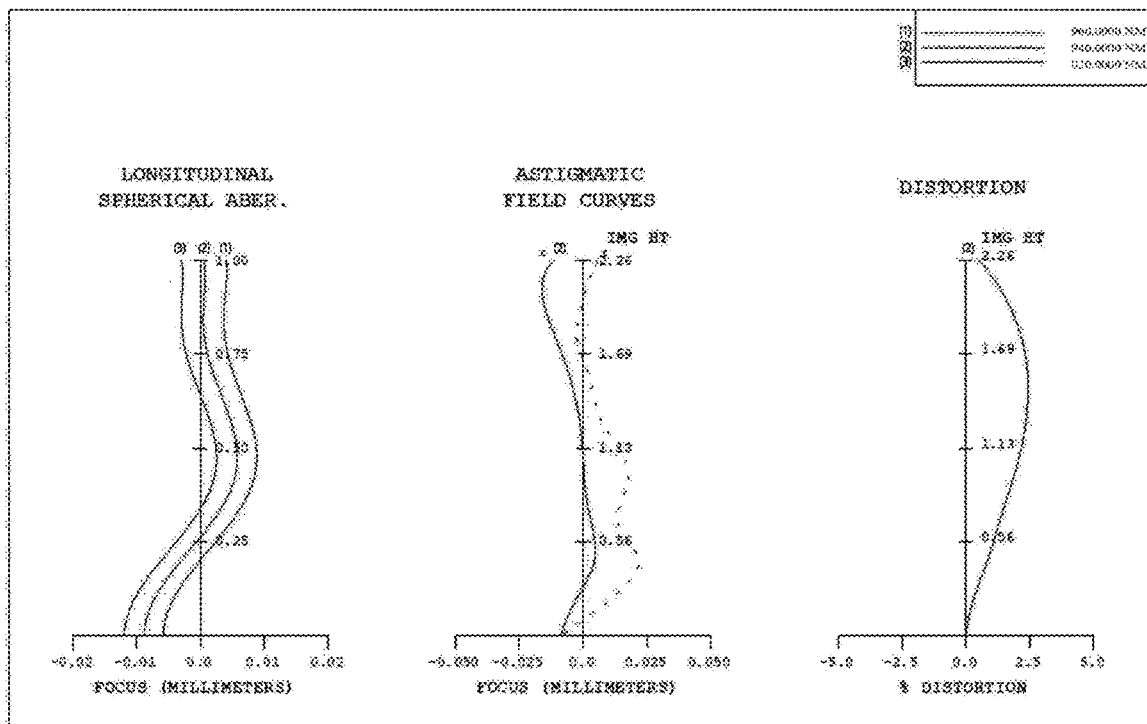
Figure 55:
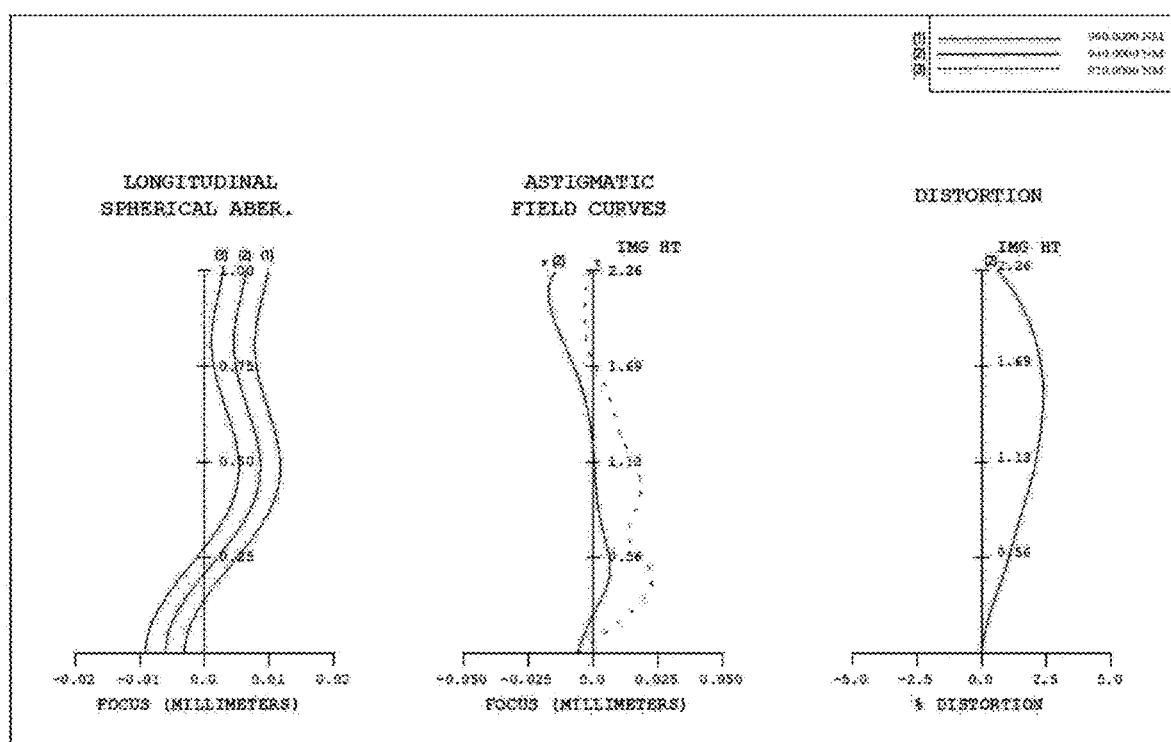

In addition, each of FIGS. 49, 52 and 55 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 49, 52 and 55, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 49, 52 and 55, the closer the curves are to the Y-axis, the better the aberration correction function can be interpreted. Referring to FIGS. 49, 52 and 55, in the optical system 1000 according to the second embodiment, measured values are adjacent to the Y-axis in almost all areas.

Referring to FIGS. 47 to 55, in the optical system 1000 according to the second embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the second embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the second embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

Hereinafter, the optical system 1000 according to the third embodiment will be described in more detail with reference to FIGS. 56 to 77.

Referring to FIGS. 56 to 77, the optical system 1000 according to the third embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the third embodiment, the aperture 600 may be disposed between the sensor-side surface (second surface S2) of the first lens 110 and the object-side surface (third surface S3) of the second lens 120.

In detail, the aperture 600 may be disposed to be spaced apart from the sensor side surface (the second surface S2) of the first lens 110 at between the sensor-side surface (second surface S2) of the first lens 110 and the object-side surface (third surface S3) of the second lens 120.

For example, the aperture 600 may be disposed to be spaced apart from the sensor-side surface (the second surface S2) of the first lens 110 as shown in Equations 52 and 53 above.

In addition, in the optical system 1000 according to the first embodiment, the sensor-side surface (the second surface S2) of the first lens 110 may serve as an aperture stop.

In addition, a filter 500 may be disposed between the plurality of lenses 100 and the image sensor 300, and a cover glass 400 may be disposed between the filter 500 and the image sensor 300.

FIG. 57 is a view showing a radius of curvature of the first to third lenses 110, 120, 130 according to the third embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 57 is data at room temperature (about 22° C.)

Figure 56:
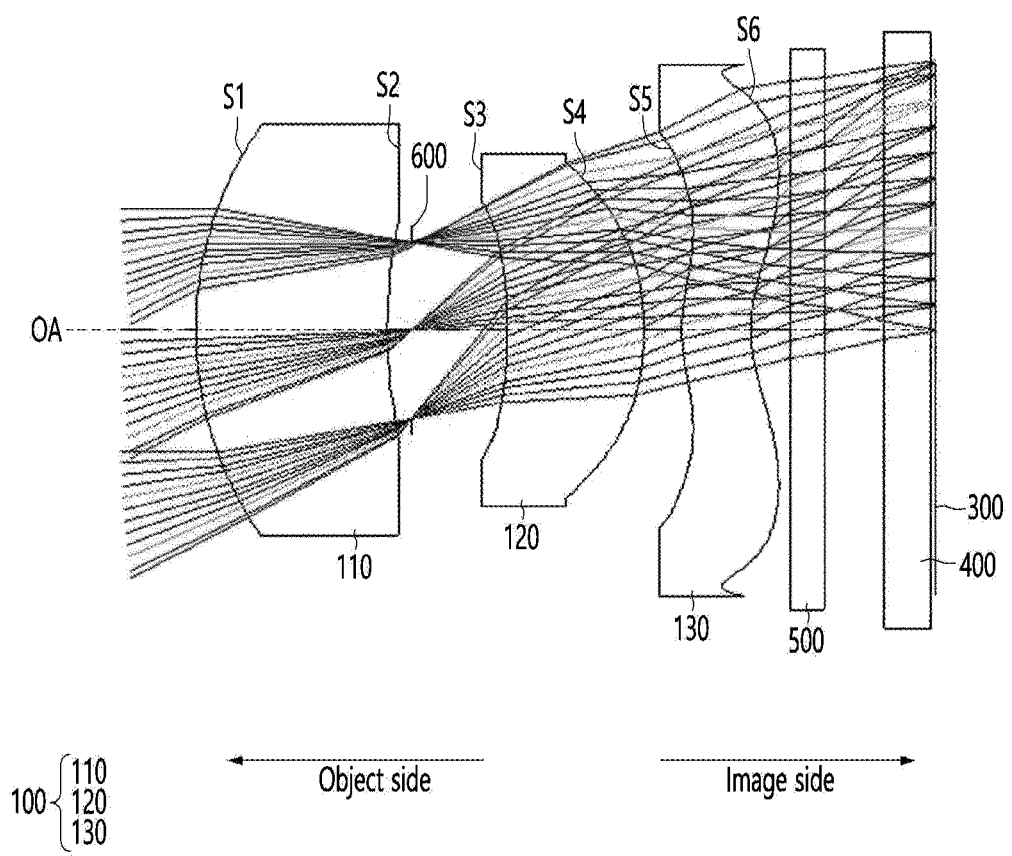
FIG. 56 is a block diagram of an optical system according to the third embodiment.

Referring to FIGS. 56 and 57, the first lens 110 of the optical system 1000 according to the third embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 58 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 59 is data of the lens thickness according to the vertical height (0.2 mm interval) of the optical axis OA at room temperature (about 22° C.). In detail, D_1 of FIG. 59 is the central thickness of the first lens 110 and is the thickness (mm) of the first lens 110 on the optical axis OA. In addition, D_1_ET of FIG. 59 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 57 to 59, the thickness of the first lens 110 in the optical axis OA direction may increase from the optical axis OA toward the end of the effective diameter of the first lens 110.

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 60 is sag data according to the vertical height (0.2 mm interval) of the optical axis of each of the object-side surface (third surface, S3) and the sensor-side surface (fourth surface, S4) of the second lens 120 at room temperature (about 22° C.).

In addition, FIG. 61 is data of the lens thickness according to the vertical height (0.2 mm interval) of the optical axis OA at room temperature (about 22° C.). In detail, D_2 of FIG. 61 is the central thickness of the second lens 120 and is the thickness (mm) of the second lens 120 on the optical axis OA. In addition, D_2_ET of FIG. 61 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120.

Referring to FIGS. 57, 60 and 61, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA, and have a minimum value at the end of the effective diameter of the third surfaces S3.

Accordingly, the second lens 120 may inhibit or minimize the change in optical properties depending on the temperature in the low to high temperature range.

The third lens 130 may be made of a plastic material and have positive (+) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 62 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 63 is data of the lens thickness according to the vertical height (0.2 mm interval) of the optical axis OA at room temperature (about 22° C.). In detail, D_3 of FIG. 63 is the central thickness of the third lens 130 and is the thickness (mm) of the third lens 130 on the optical axis OA. In addition, D_3_ET of FIG. 63 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 57, 62 and 63, the thickness of the third lens 130 in the optical axis OA direction may increase from the optical axis OA toward the end of the effective diameter of the third lens 130. In detail, in the range from the optical axis OA to the effective diameter end of the fifth surface S5, the thickness in the optical axis OA direction of the third lens 130 may have a maximum value at the end of the effective diameter of the fifth surfaces S5, and have a minimum value at the optical axis OA.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 1.2 times or more of the refractive power of the second lens 120 and the third lens 130. In detail, the refractive power of the first lens 110 may be greater than or equal to about 1.5 times the refractive power of the second lens 120 and the third lens 130. In more detail, the refractive power of the first lens 110 may be about 1.8 times or more of the refractive power of the second lens 120 and the third lens 130.

Also, the refractive index of the second lens 120 may be different from the refractive power of the third lens 130. For example, the refractive power of the second lens 120 may be about 10 times or more of the refractive power of the third lens 130. In detail, the refractive power of the second lens 120 may be about 15 times or more of the refractive power of the third lens 130. In more detail, the refractive power of the second lens 120 may be about 30 times or more of the refractive power of the third lens 130.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the third embodiment, the values of the aspheric coefficients of each lens surface are as shown in FIG. 64.

In addition, in the optical system 1000 according to the third embodiment, the interval (first interval) between the first lens 110 and the second lens 120 may be the same as that of FIG. 65 below at room temperature (about 22° C.). And, the interval (second interval) between the second lens 120 and the third lens 130 may be the same as that of FIG. 66 below at room temperature (about 22° C.).

Referring to FIG. 65, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 57.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

Referring to FIG. 66, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 57.

The second interval may have a maximum value at the second point L2 and a minimum value at the optical axis OA. The maximum value of the second interval may be about 2 times to about 4 times the minimum value. For example, in the third embodiment, the maximum value of the second interval may be about 2.6 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

Figure 67:
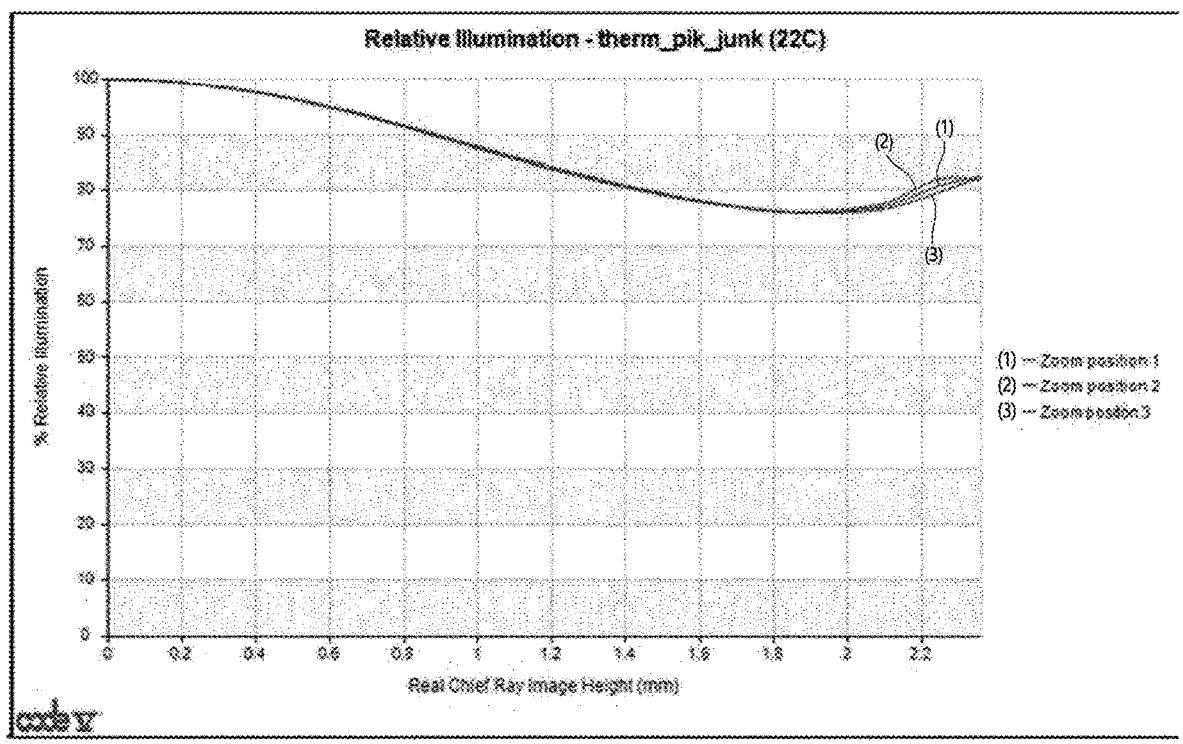
FIG. 67 is a graph of relative illumination for each field of the optical system according to the third embodiment.
Figure 68:
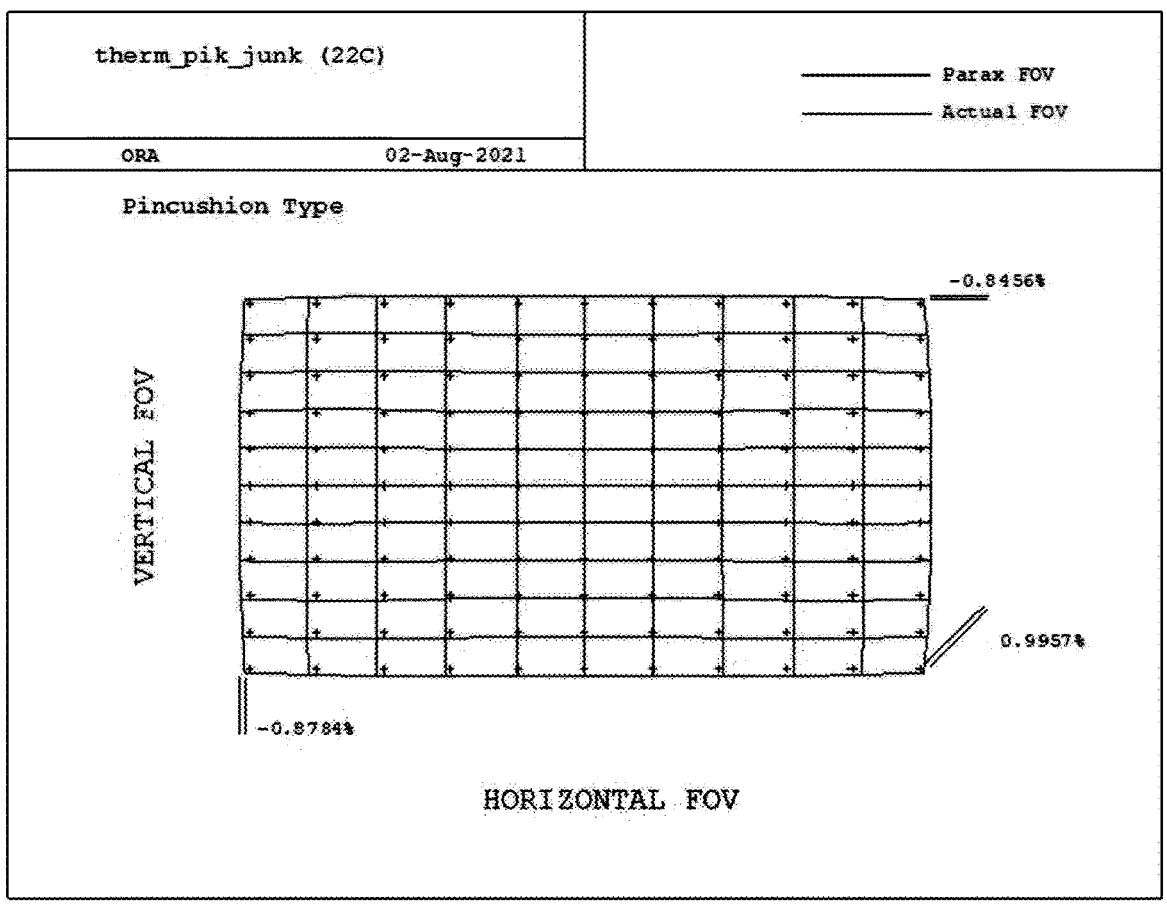
FIG. 68 is a data of distortion characteristics of the optical system according to the third embodiment.

FIG. 67 is a graph of relative illumination for each field of the optical system according to the third embodiment, and FIG. 68 is data on distortion characteristics of the optical system according to the third embodiment. In this case, FIGS. 67 and 68 are data obtained by measuring the optical system 1000 at room temperature (about 22° C.).

Referring to FIG. 67, the optical system 1000 according to the third embodiment may have excellent relative illumination characteristics in the 0 field region (center region) to 1.0 field region (edge region) of the image sensor 300. For example, the optical system 1000 may have the relative illumination of about 70% or more. In detail, in the optical system 1000, when the 0 field area is 100%, the relative illumination of the 0.5 field area may be about 80% or more, and the relative illumination of the 1.0 field area may be about 70% or more.

Also, referring to FIG. 68, the optical system 1000 according to the third embodiment may have a barrel distortion shape in which an edge portion of an image is curved outward, and has a distortion of about 1.1179% and a TV-distortion of about −0.7453%.

FIGS. 69 to 77 are graphs of diffraction MTF characteristics and aberration diagrams of the optical system 1000 according to temperature.

Figure 69:
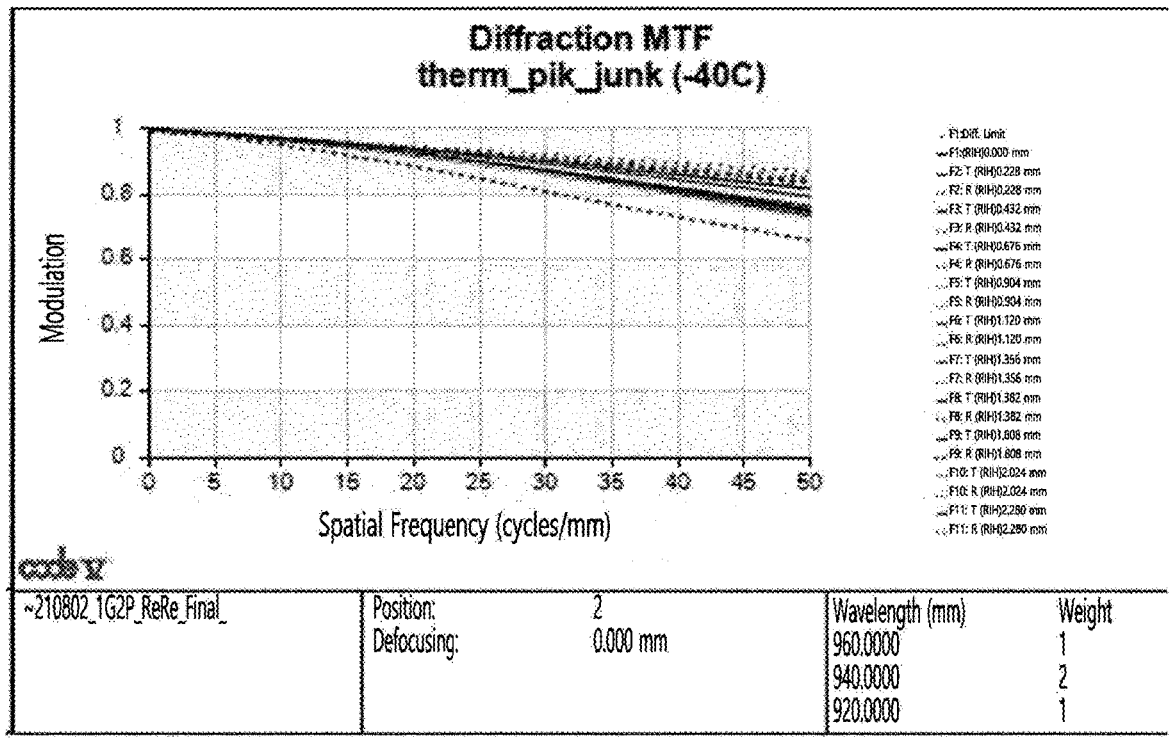
FIGS. 69 to 77 are graphs of diffraction MTF and aberration diagrams according to temperature of the optical system according to the third embodiment.
Figure 70:
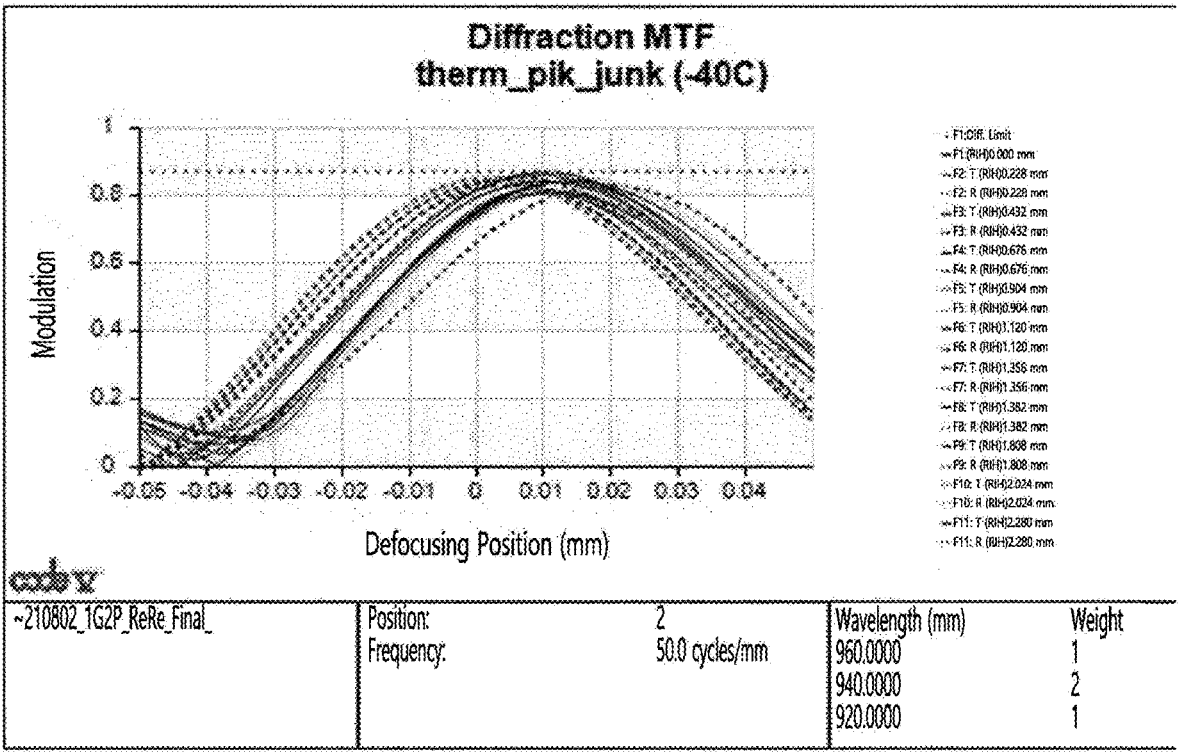
Figure 72:
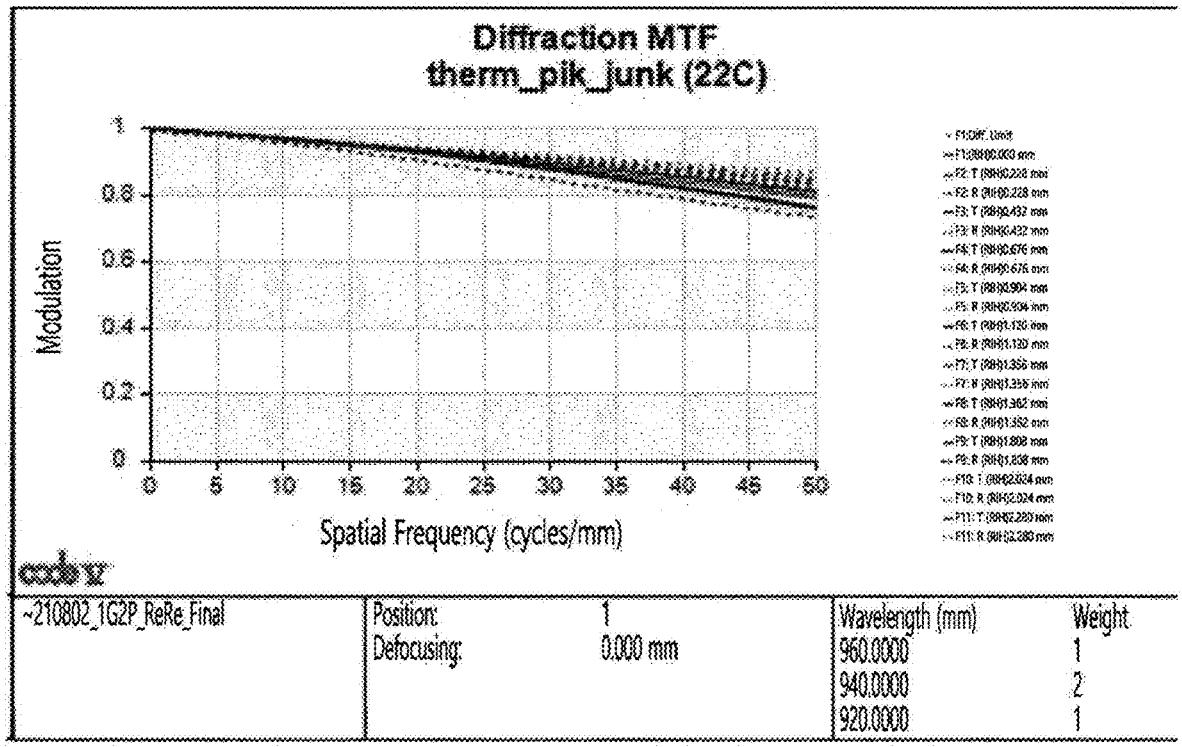
Figure 73:
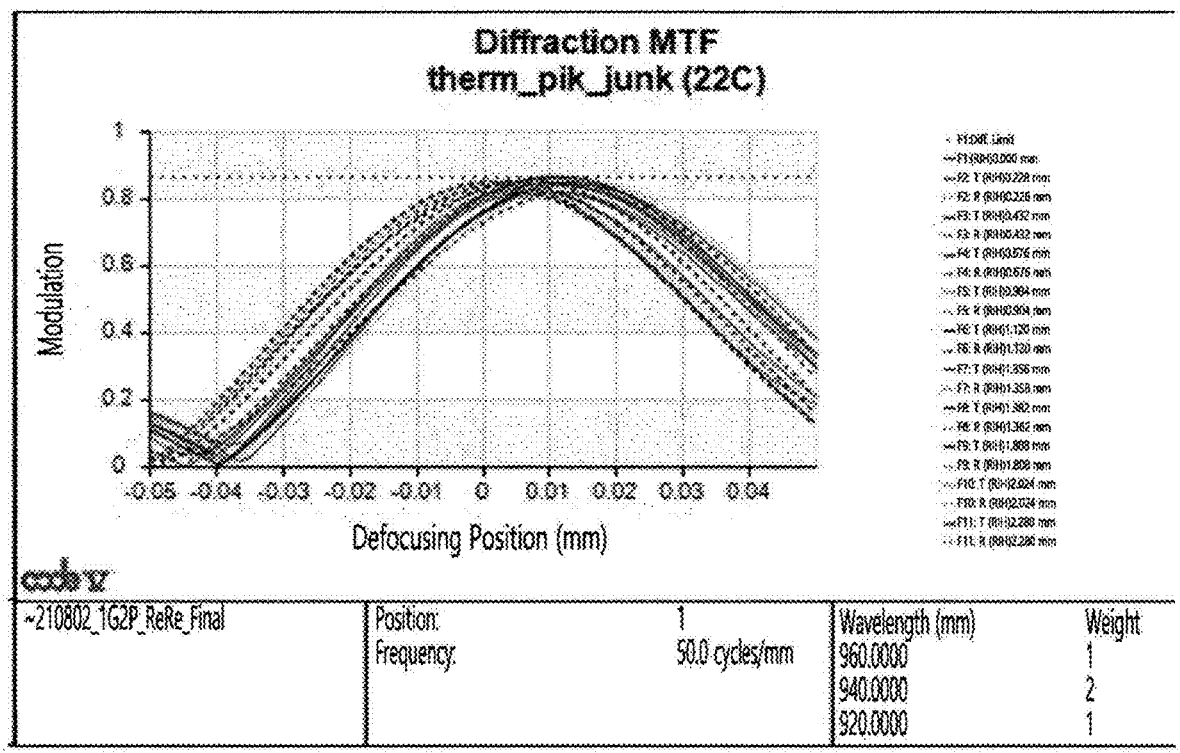
Figure 75:
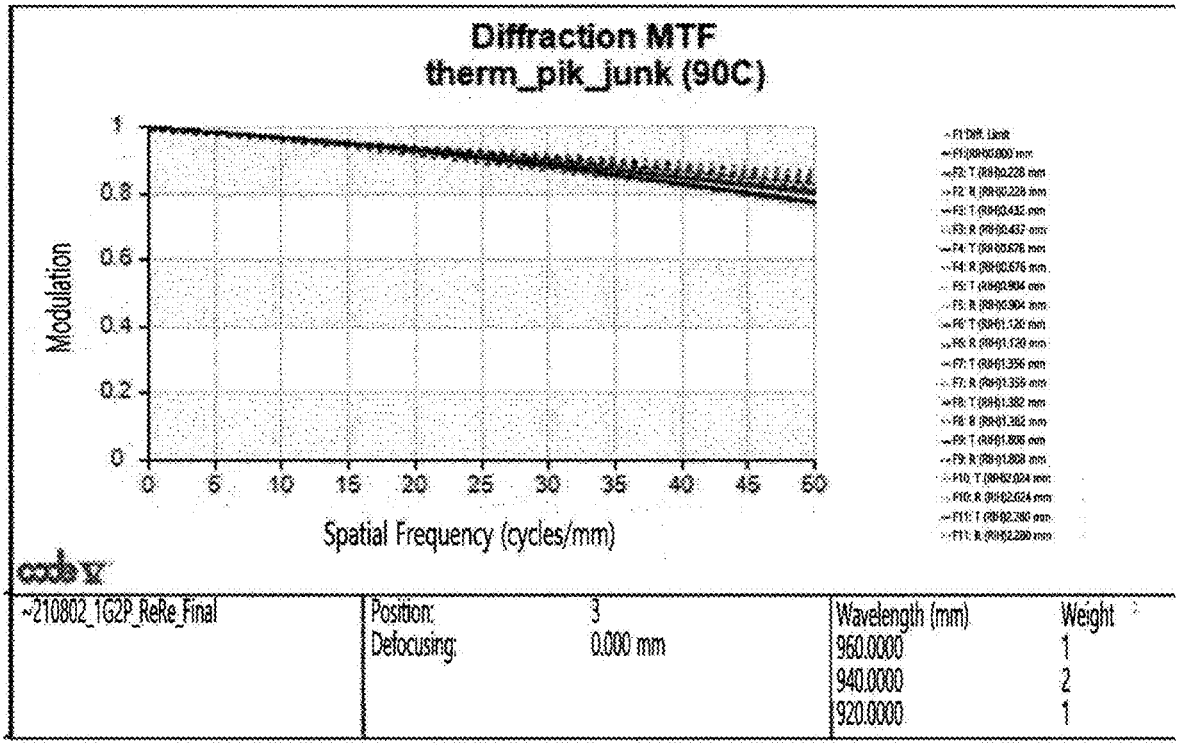
Figure 76:
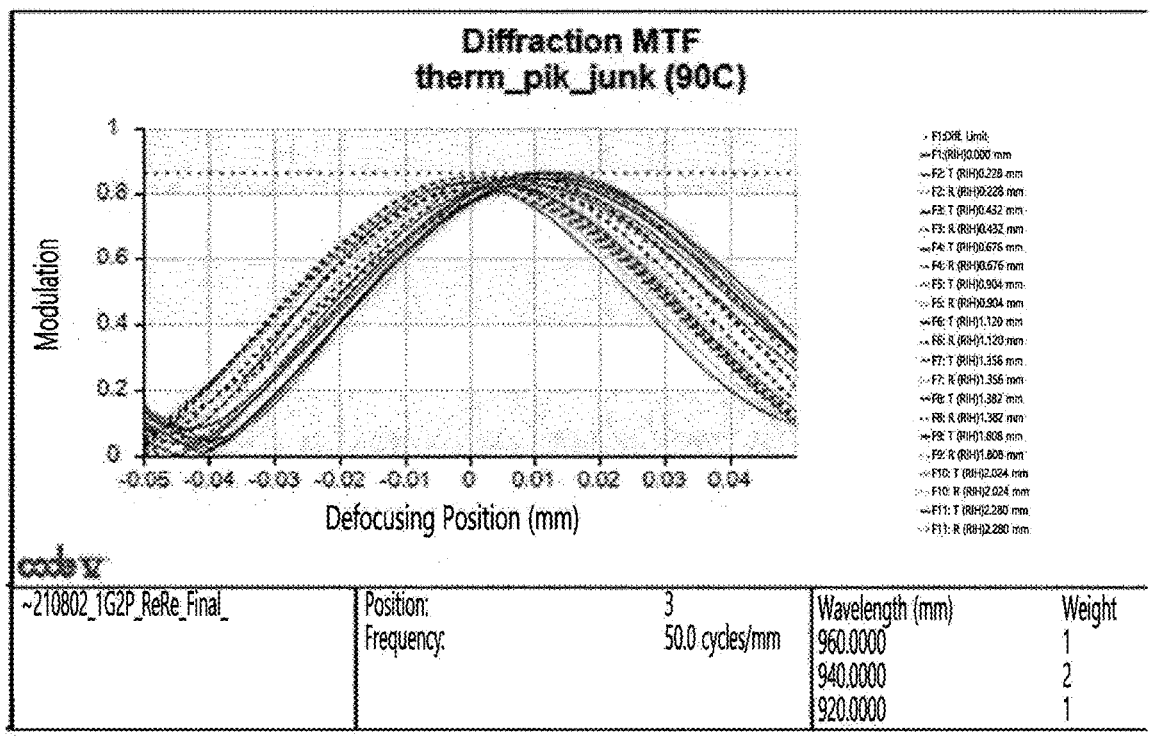

In detail, FIGS. 69 and 70 are graphs of the diffraction MTF characteristics of the optical system 1000 in a low-temperature (−40° C.) environment, and FIGS. 72 and 73 are graphs of the diffraction MTF characteristics of the optical system 1000 in a room temperature (22° C.) environment, and FIGS. 75 and 76 are graphs of diffraction MTF characteristics of the optical system 1000 in a high temperature (99° C.) environment.

Figure 71:
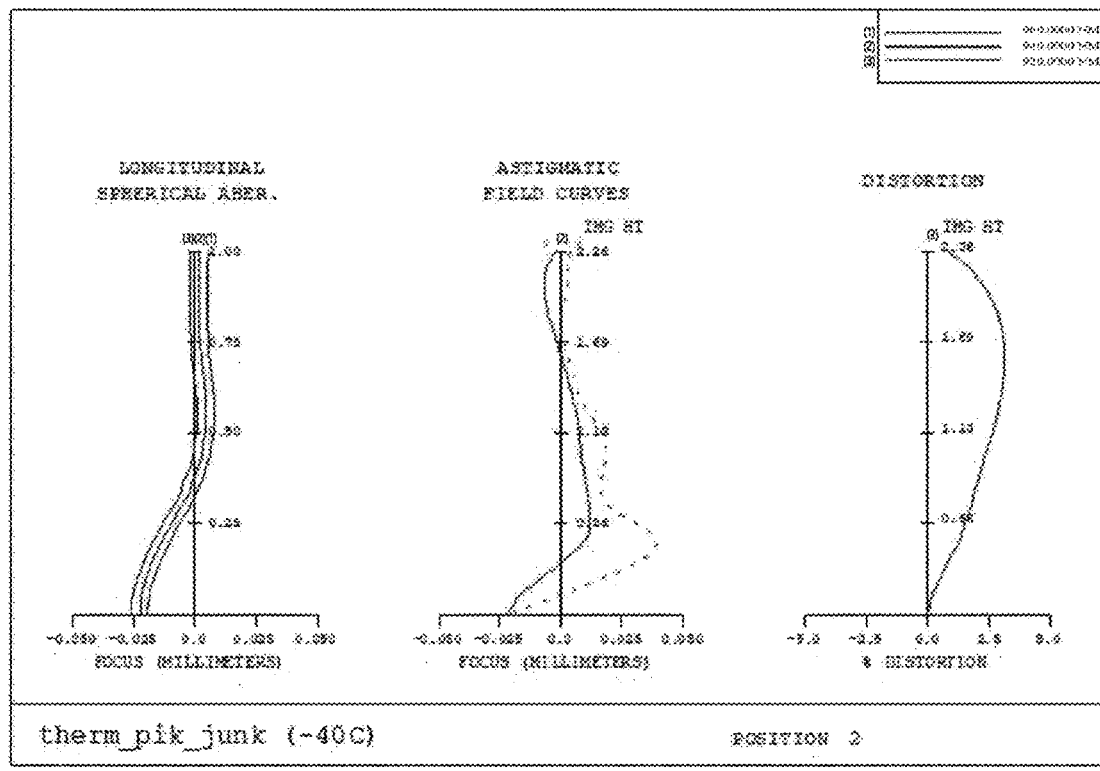
Figure 74:
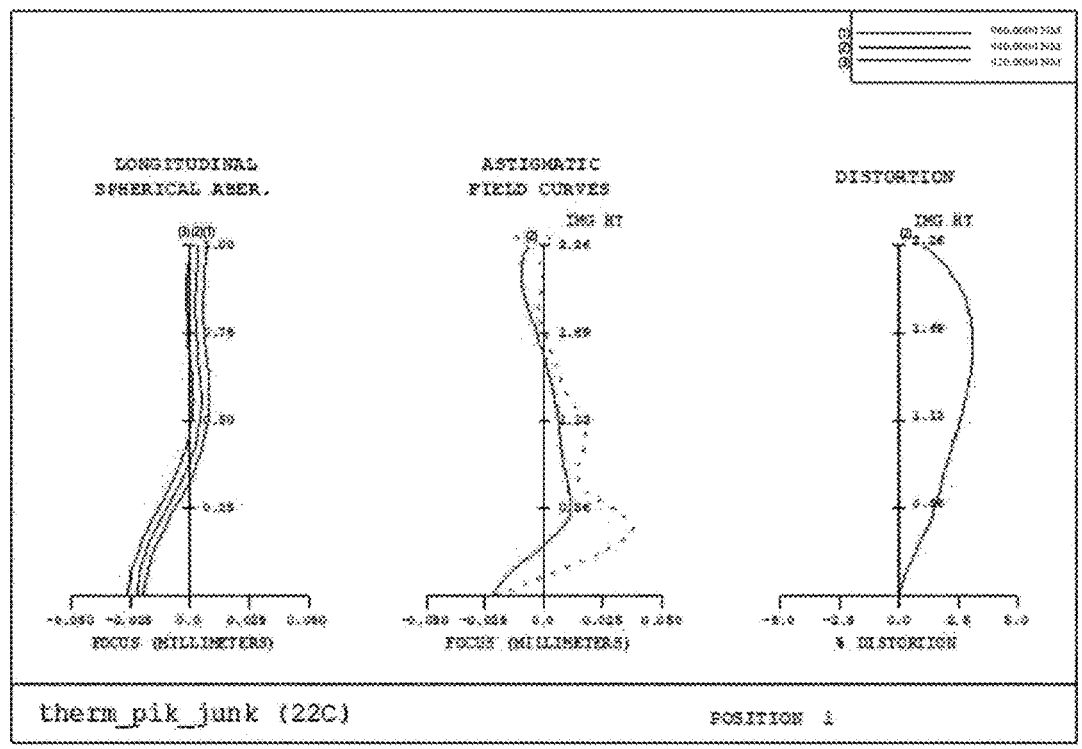
Figure 77:
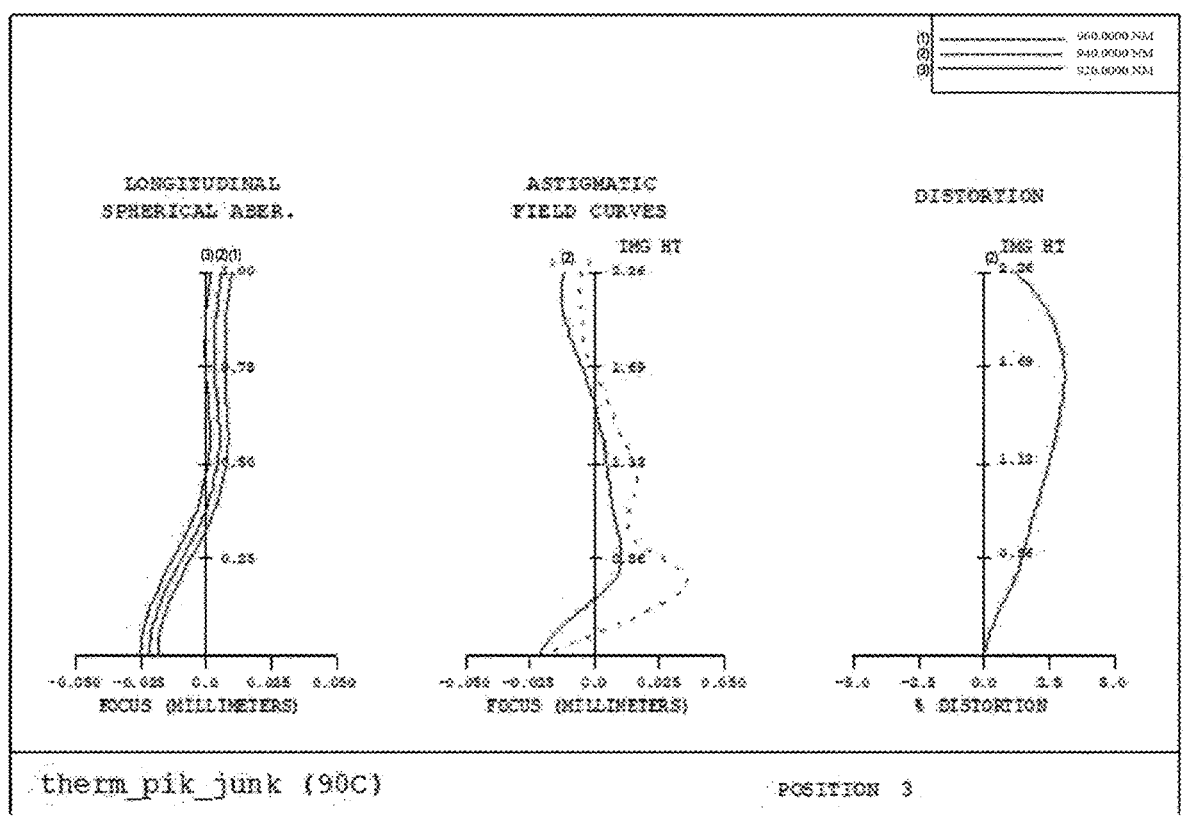

In addition, each of FIGS. 71, 74 and 77 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 71, 74 and 77, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 71, 74 and 77, the closer the curves are to the Y-axis, the better the aberration correction function can be interpreted. Referring to FIGS. 71, 74 and 77, in the optical system 1000 according to the first embodiment, measured values are adjacent to the Y-axis in almost all areas.

Referring to FIGS. 69 to 77, in the optical system 1000 according to the third embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the third embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the third embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

Hereinafter, the optical system 1000 according to the fourth embodiment will be described in more detail with reference to FIGS. 78 to 99.

Figure 78:
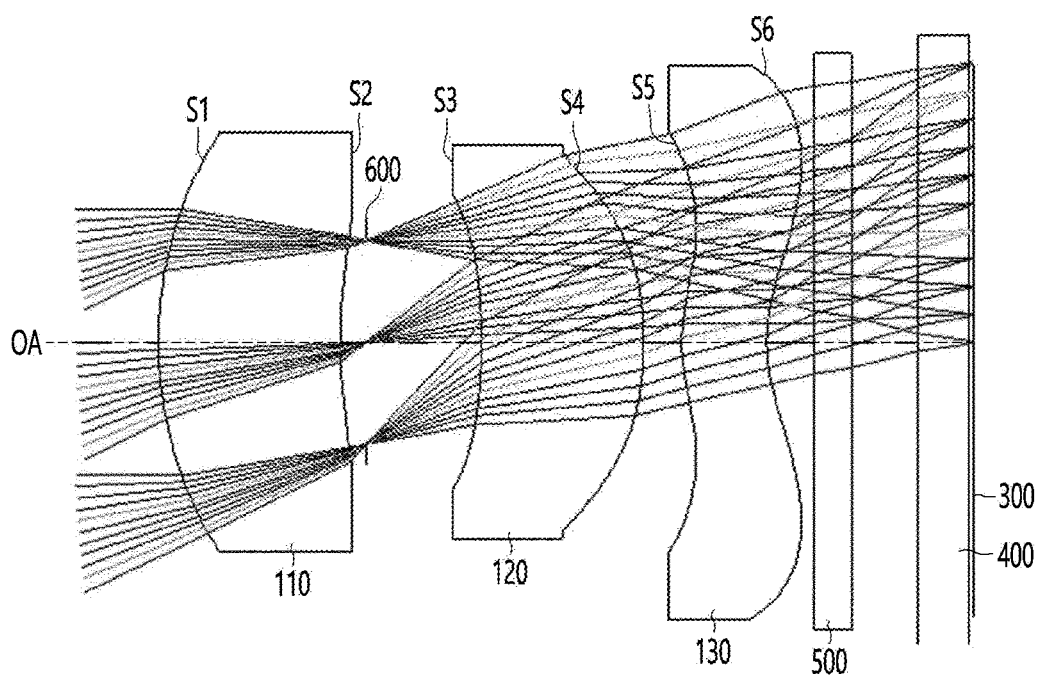
FIG. 78 is a block diagram of an optical system according to the fourth embodiment.

Referring to FIG. 78, the optical system 1000 according to the fourth embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the fourth embodiment, the aperture 600 may be disposed between the sensor-side surface (second surface S2) of the first lens 110 and the object-side surface (third surface S3) of the second lens 120.

In detail, the aperture 600 may be disposed to be spaced apart from the sensor side surface (the second surface S2) of the first lens 110 at between the sensor-side surface (second surface S2) of the first lens 110 and the object-side surface (third surface S3) of the second lens 120.

For example, the aperture 600 may be disposed to be spaced apart from the sensor-side surface (the second surface S2) of the first lens 110 as shown in Equations 52 and 53 above.

In addition, a filter 500 may be disposed between the plurality of lenses 100 and the image sensor 300, and a cover glass 400 may be disposed between the filter 500 and the image sensor 300.

FIG. 79 is a view showing a radius of curvature of the first to third lenses 110, 120, 130 according to the third embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 79 is data at room temperature (about 22° C.)

Referring to FIGS. 78 and 79, the first lens 110 of the optical system 1000 according to the fourth embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 80 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 81 is data of the lens thickness according to the vertical height (0.2 mm interval) of the optical axis OA at room temperature (about 22° C.). In detail, D_1 of FIG. 81 is the central thickness of the first lens 110 and is the thickness (mm) of the first lens 110 on the optical axis OA. In addition, D_1_ET of FIG. 81 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 79 to 81, the thickness of the first lens 110 in the optical axis OA direction may increase from the optical axis OA toward the end of the effective diameter of the first lens 110.

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 82 is sag data according to the vertical height (0.2 mm interval) of the optical axis of each of the object-side surface (third surface, S3) and the sensor-side surface (fourth surface, S4) of the second lens 120 at room temperature (about 22° C.).

In addition, FIG. 83 is data of the lens thickness according to the vertical height (0.2 mm interval) of the optical axis OA at room temperature (about 22° C.). In detail, D_2 of FIG. 83 is the central thickness of the second lens 120 and is the thickness (mm) of the second lens 120 on the optical axis OA. In addition, D_2_ET of FIG. 83 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120.

Referring to FIGS. 79, 82 and 83, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA.

Accordingly, the second lens 120 may inhibit or minimize the change in optical properties depending on the temperature in the low to high temperature range.

The third lens 130 may be made of a plastic material and have positive (+) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 84 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 85 is data of the lens thickness according to the vertical height (0.2 mm interval) of the optical axis OA at room temperature (about 22° C.). In detail, D_3 of FIG. 85 is the central thickness of the third lens 130 and is the thickness (mm) of the third lens 130 on the optical axis OA. In addition, D_3_ET of FIG. 85 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 79, 84 and 85, the thickness of the third lens 130 in the optical axis OA direction may increase from the optical axis OA toward the end of the effective diameter of the third lens 130.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 2 times or more of the refractive power of the second lens 120 and the third lens 130. In detail, the refractive power of the first lens 110 may be greater than or equal to about 2.5 times the refractive power of the second lens 120 and the third lens 130. In more detail, the refractive power of the first lens 110 may be about 3 times or more of the refractive power of the second lens 120 and the third lens 130.

Also, the refractive index of the second lens 120 may be different from the refractive power of the third lens 130. For example, the refractive power of the second lens 120 may be about 1.2 times or more of the refractive power of the third lens 130. In detail, the refractive power of the second lens 120 may be about 1.5 times or more of the refractive power of the third lens 130. In more detail, the refractive power of the second lens 120 may be about 1.7 times or more of the refractive power of the third lens 130.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the fourth embodiment, the values of the aspheric coefficients of each lens surface are as shown in FIG. 86.

In addition, in the optical system 1000 according to the fourth embodiment, the interval (first interval) between the first lens 110 and the second lens 120 may be the same as that of FIG. 87 below at room temperature (about 22° C.). And, the interval (second interval) between the second lens 120 and the third lens 130 may be the same as that of FIG. 88 below at room temperature (about 22° C.).

Referring to FIG. 87, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 57.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

Referring to FIG. 88, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 57.

The second interval may have a maximum value at the second point L2 and a minimum value at the optical axis OA. The maximum value of the second interval may be about 2 times to about 4 times the minimum value. For example, in the third embodiment, the maximum value of the second interval may be about 2.6 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

Figure 89:
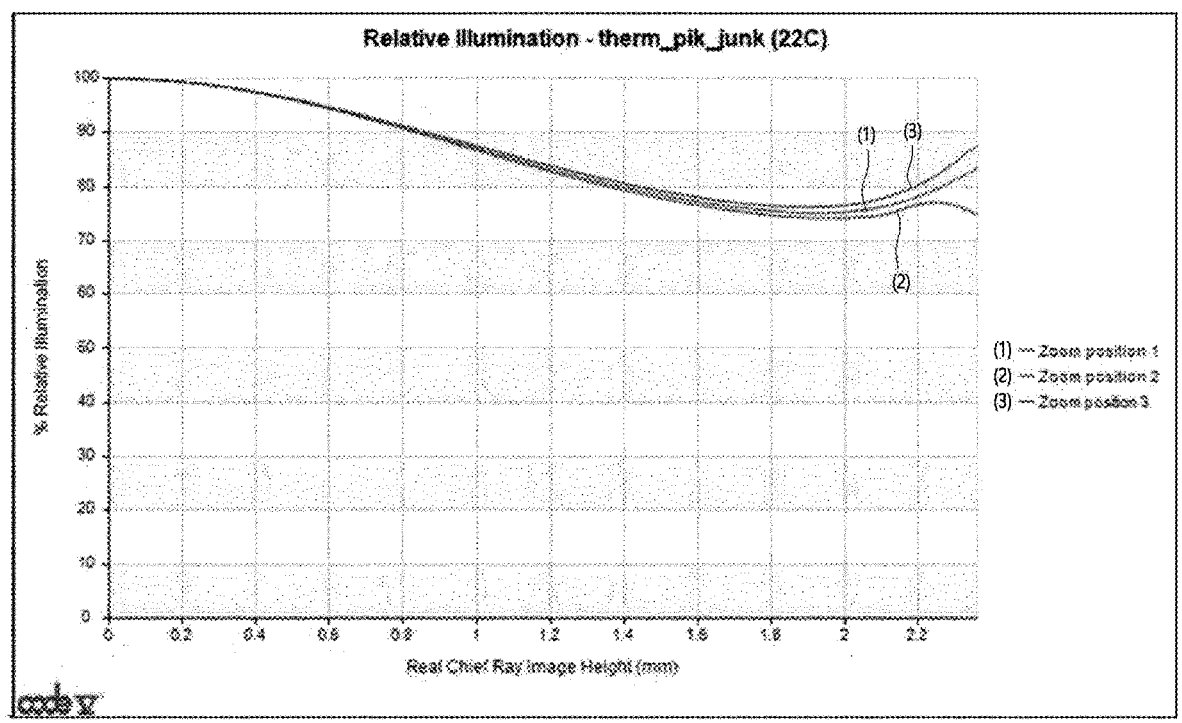
FIG. 89 is a graph of relative illumination for each field of the optical system according to the fourth embodiment.

FIG. 89 is a graph of relative illumination for each field of the optical system according to the fourth embodiment, and FIG. 68 is data on distortion characteristics of the optical system according to the fourth embodiment. In this case, FIGS. 67 and 68 are data obtained by measuring the optical system 1000 at room temperature (about 22° C.).

Referring to FIG. 89, the optical system 1000 according to the third embodiment may have excellent relative illumination characteristics in the 0 field region (center region) to 1.0 field region (edge region) of the image sensor 300. For example, the optical system 1000 may have the relative illumination of about 70% or more. In detail, in the optical system 1000, when the 0 field area is 100%, the relative illumination of the 0.5 field area may be about 80% or more, and the relative illumination of the 1.0 field area may be about 70% or more.

Figure 90:
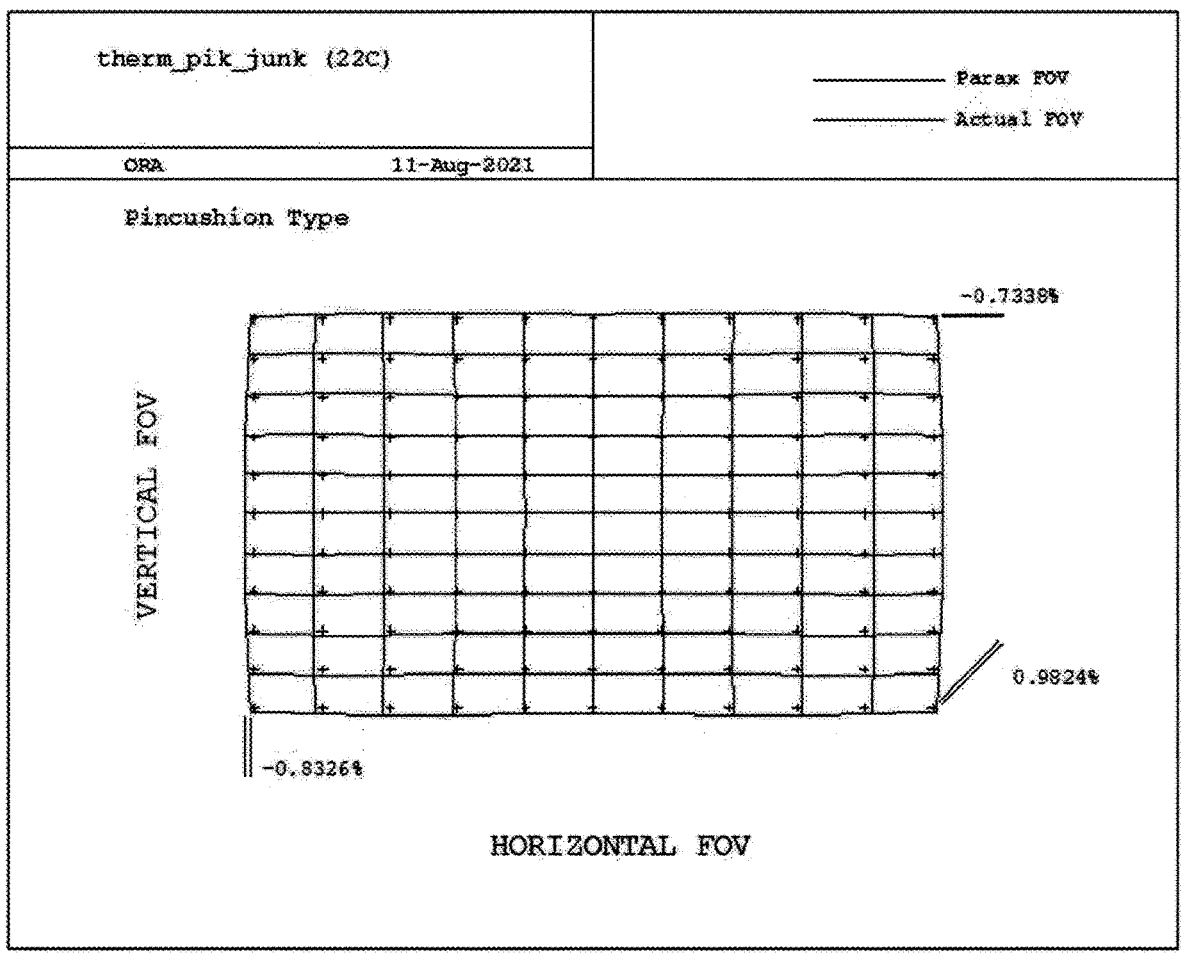
FIG. 90 is a data of the distortion characteristics of the optical system according to the fourth embodiment.

Also, referring to FIG. 90, the optical system 1000 according to the first embodiment may have a barrel distortion shape in which an edge portion of an image is curved outward, and has a distortion of about 0.9824% and a TV-distortion of about −0.7338%.

FIGS. 91 to 99 are graphs of diffraction MTF characteristics and aberration diagrams of the optical system 1000 according to temperature.

Figure 91:
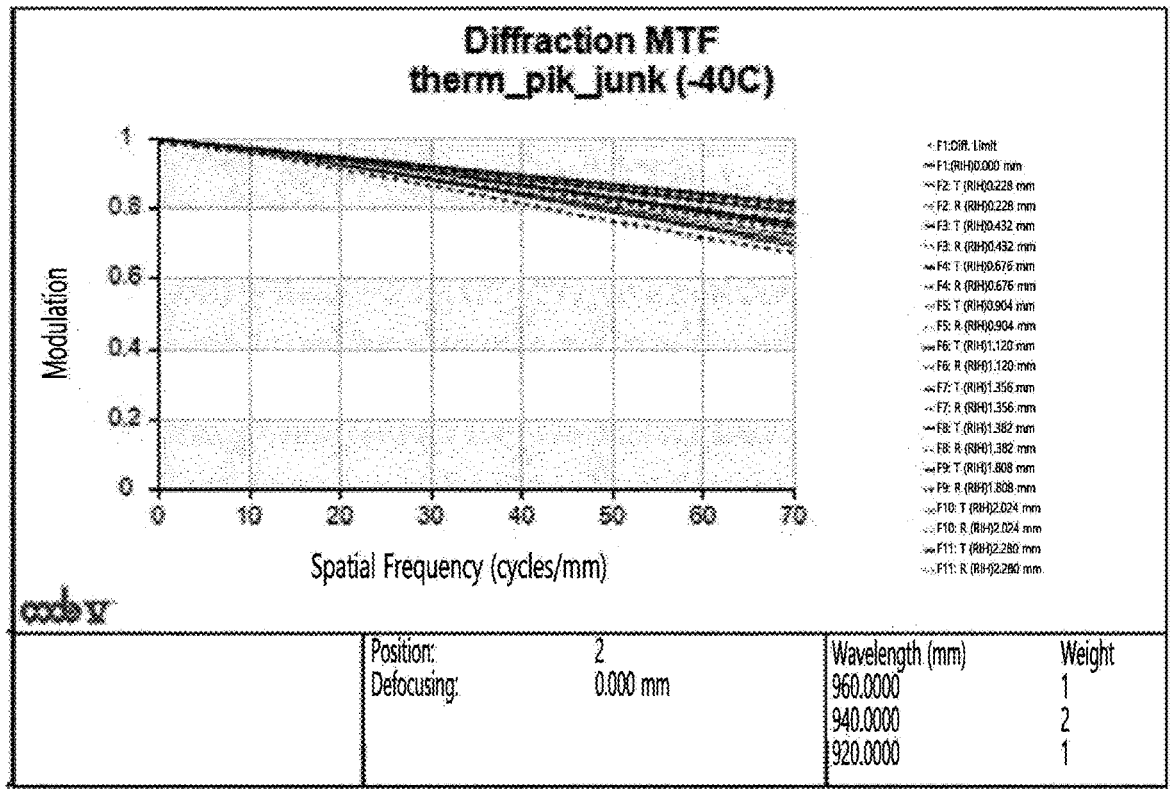
FIGS. 91 to 99 are graphs of diffraction MTF and aberration diagrams according to temperature of the optical system according to the fourth embodiment.
Figure 92:
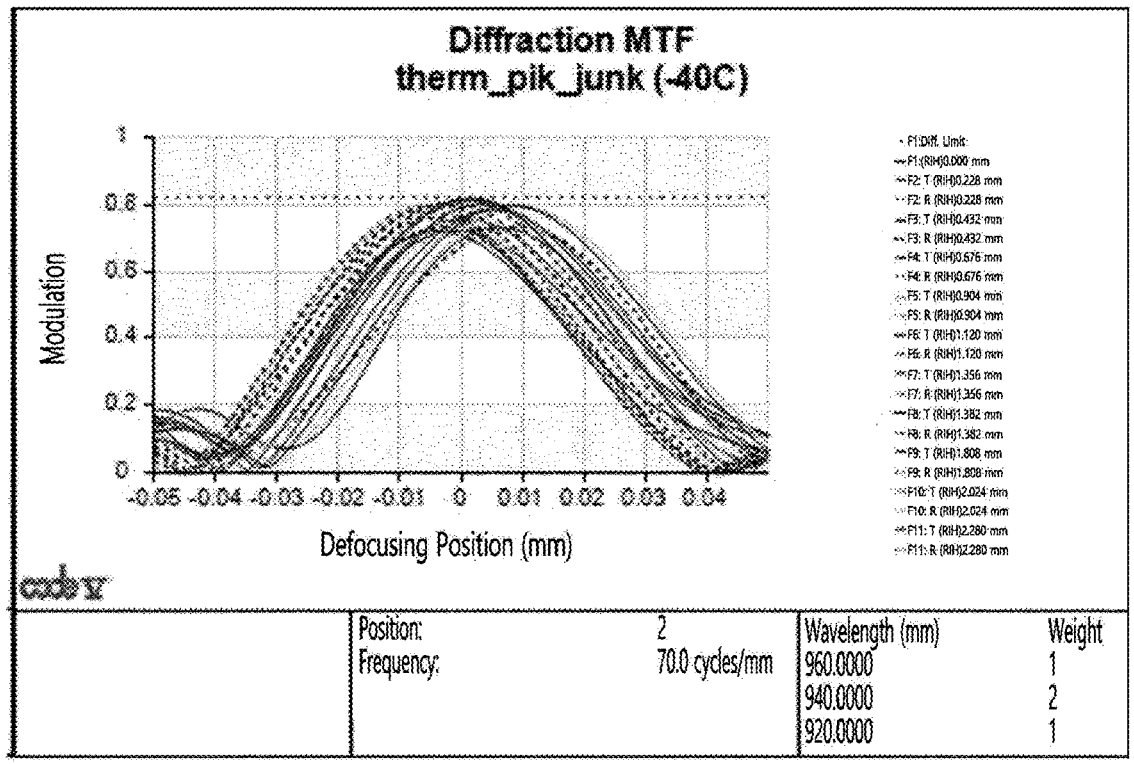
Figure 94:
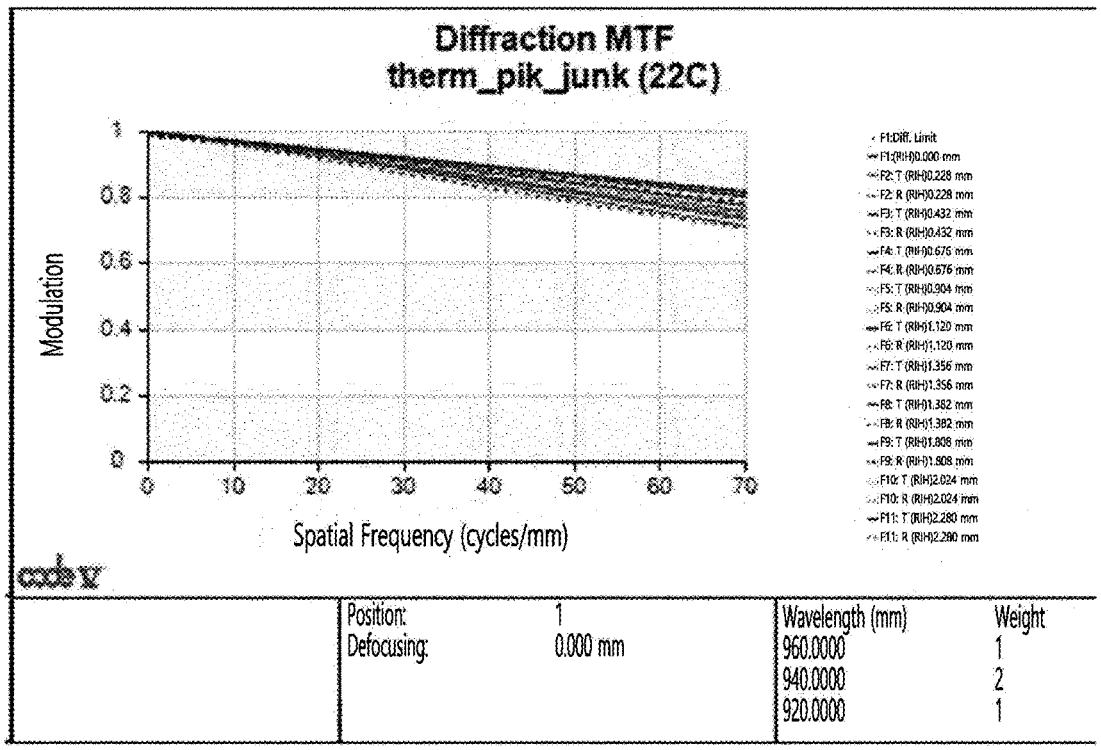
Figure 95:
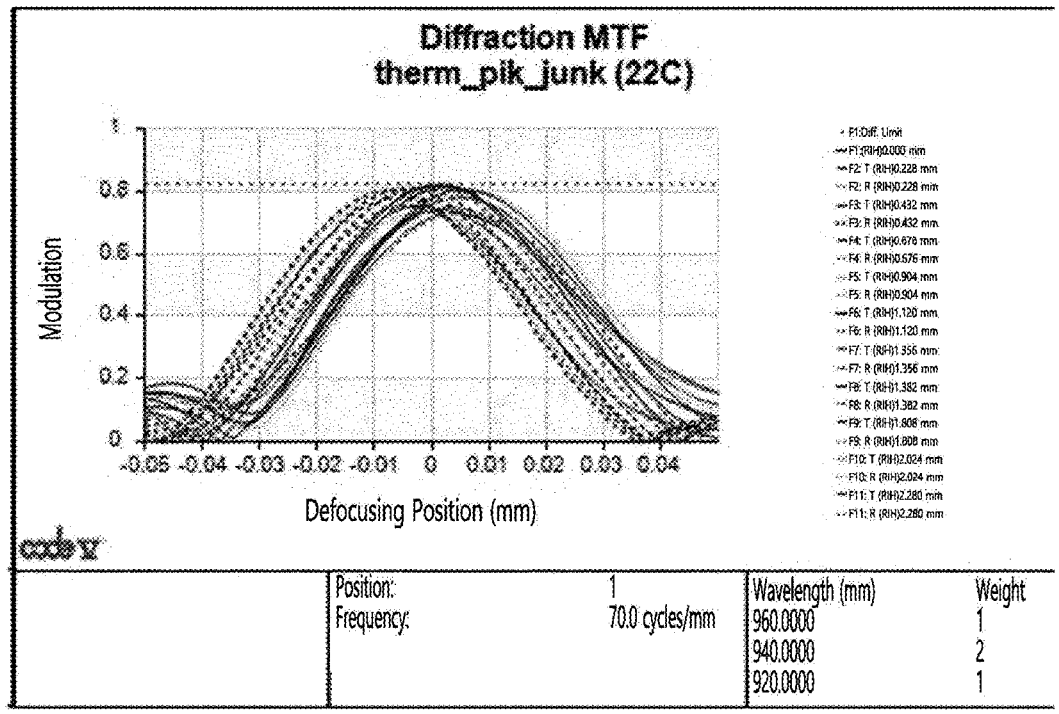
Figure 97:
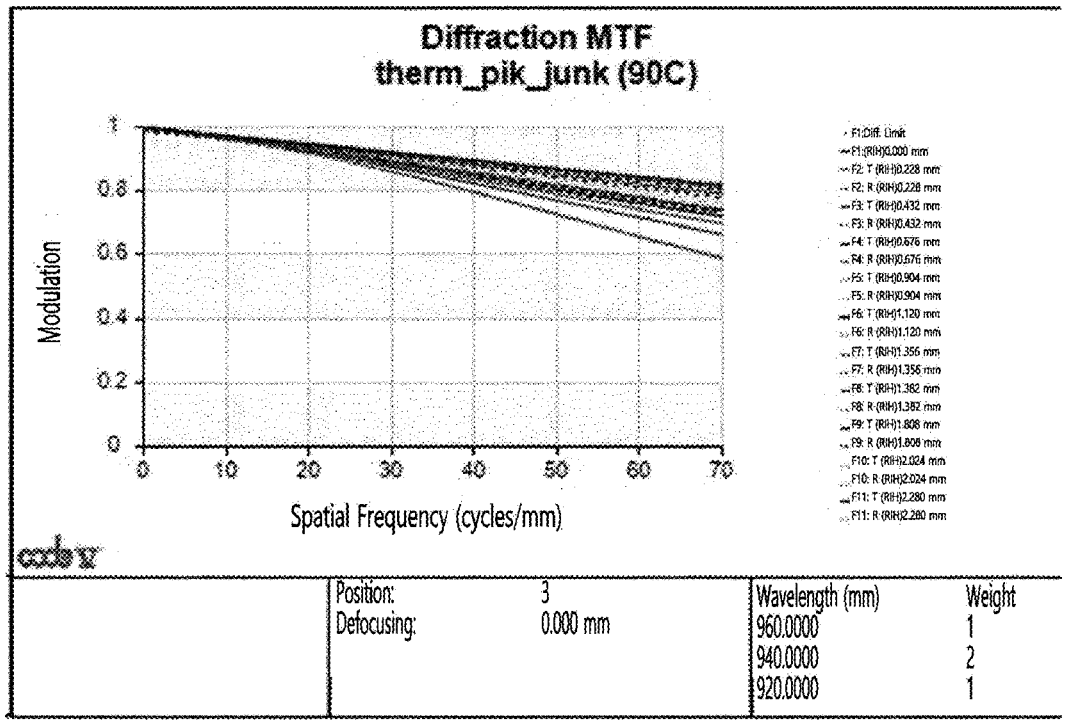
Figure 98:
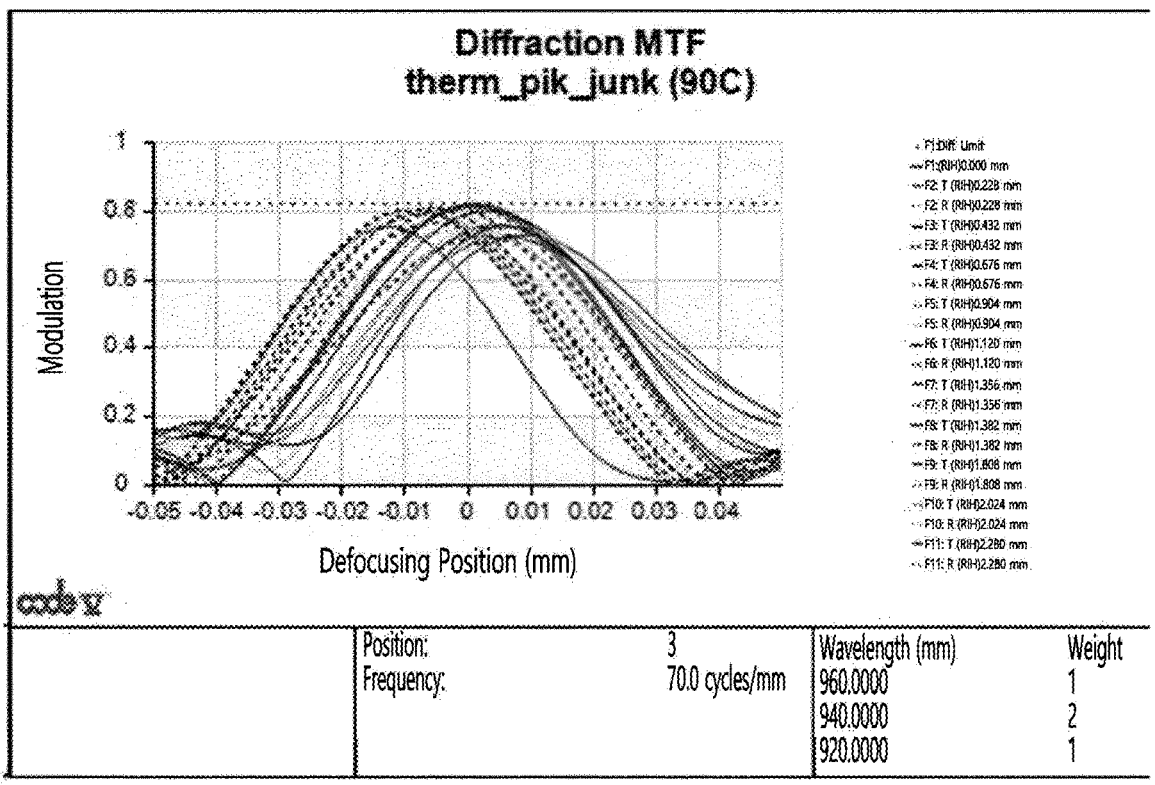

In detail, FIGS. 91 and 92 are graphs of the diffraction MTF characteristics of the optical system 1000 in a low-temperature (−40° C.) environment, and FIGS. 94 and 95 are graphs of the diffraction MTF characteristics of the optical system 1000 in a room temperature (22° C.) environment, and FIGS. 97 and 98 are graphs of diffraction MTF characteristics of the optical system 1000 in a high temperature (99° C.) environment.

Figure 93:
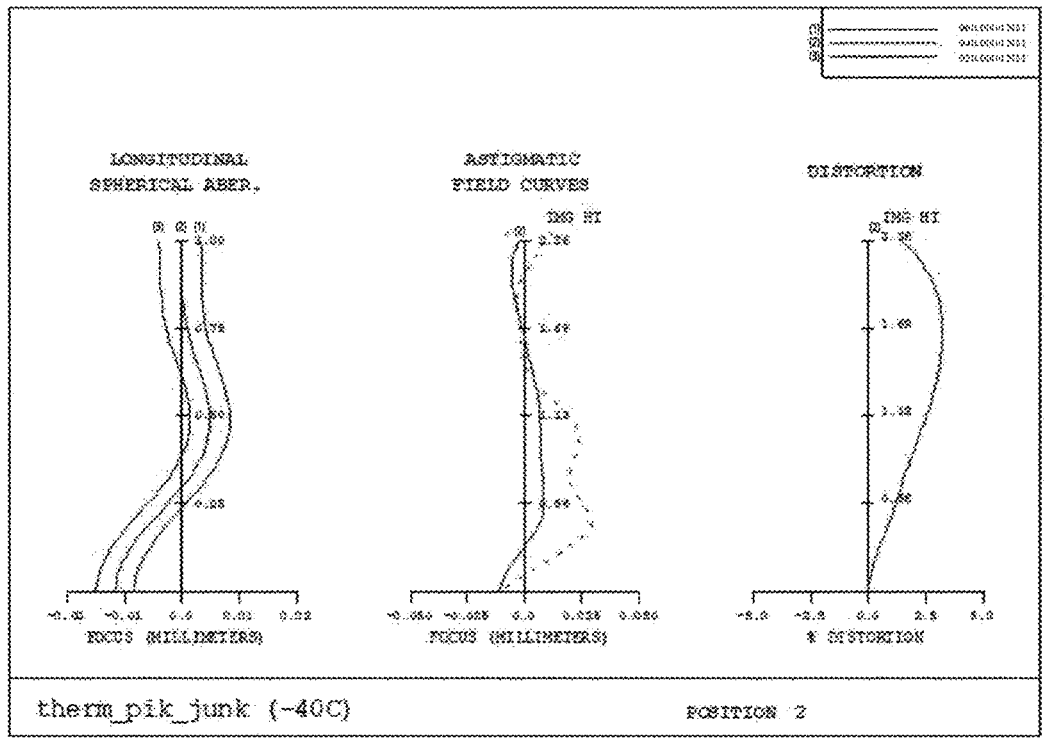
Figure 96:
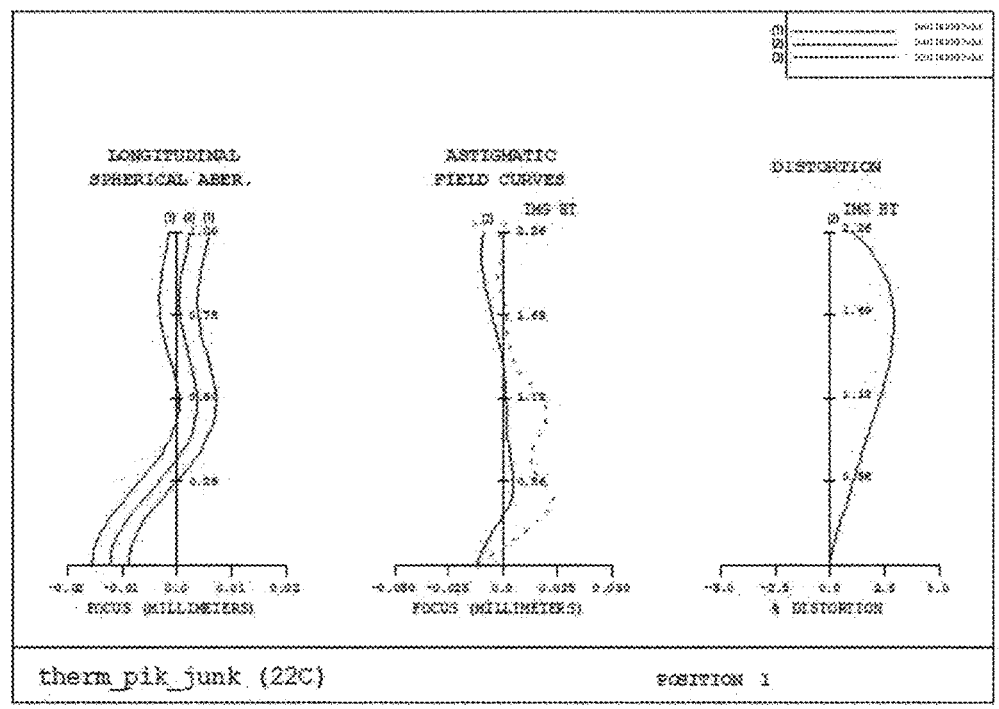
Figure 99:
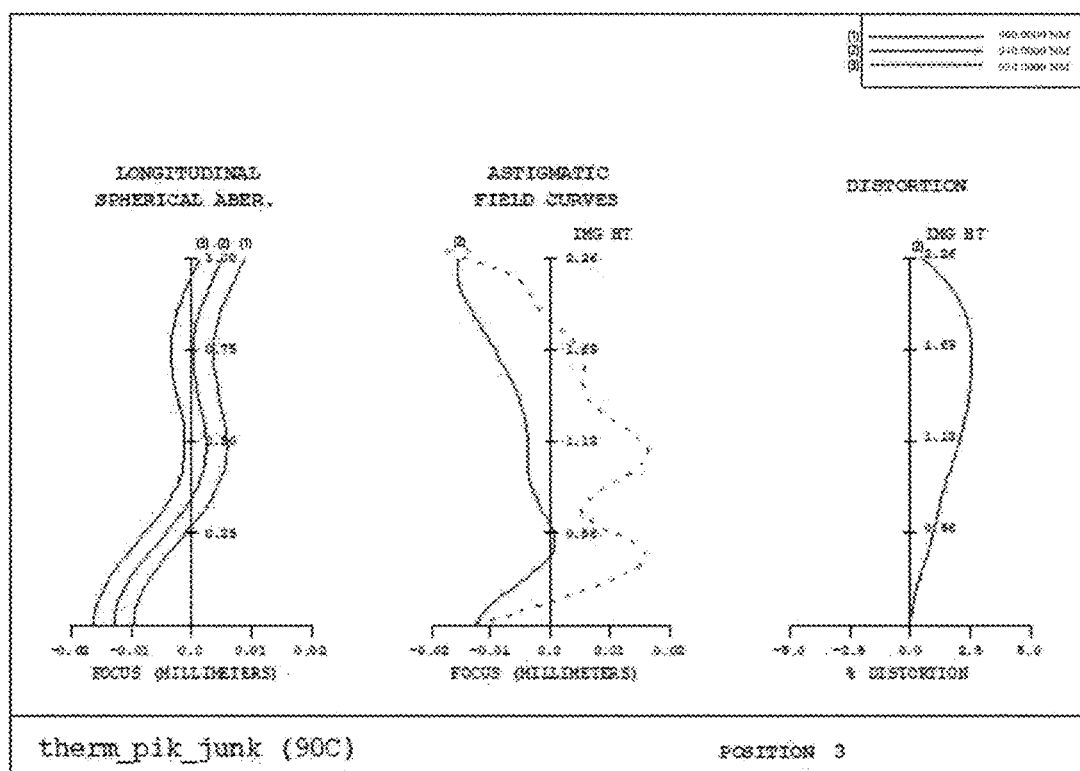

In addition, each of FIGS. 93, 96 and 99 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 93, 96 and 99, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 93, 96 and 99, the closer the curves are to the Y-axis, the better the aberration correction function can be interpreted. Referring to FIGS. 93, 96 and 99, in the optical system 1000 according to the first embodiment, measured values are adjacent to the Y-axis in almost all areas.

Referring to FIGS. 91 to 99, in the optical system 1000 according to the fourth embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the fourth embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the fourth embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

Hereinafter, the optical system 1000 according to the fifth embodiment will be described in more detail with reference to FIGS. 100 to 121.

Figure 100:
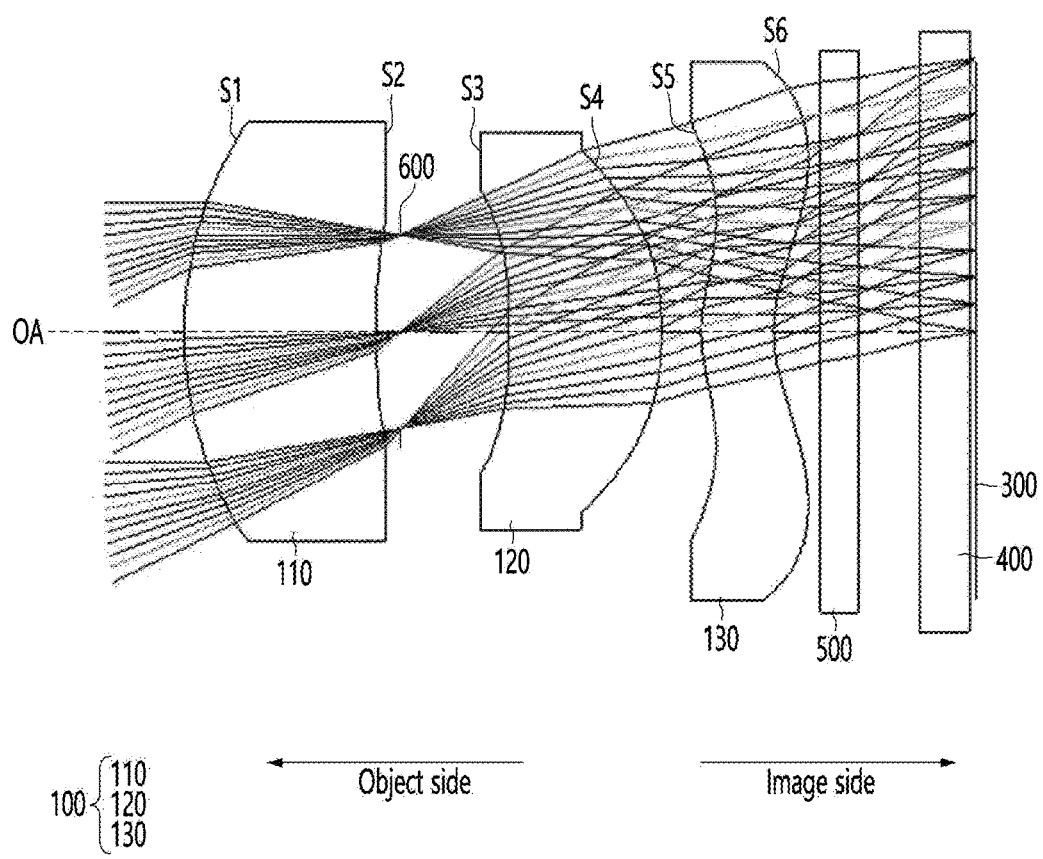
FIG. 100 is a block diagram of an optical system according to the fifth embodiment.

Referring to FIGS. 100, the optical system 1000 according to the fifth embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the fifth embodiment, the aperture 600 may be disposed between the sensor-side surface (second surface S2) of the first lens 110 and the object-side surface (third surface S3) of the second lens 120.

In detail, the aperture 600 may be disposed to be spaced apart from the sensor side surface (the second surface S2) of the first lens 110 at between the sensor-side surface (second surface S2) of the first lens 110 and the object-side surface (third surface S3) of the second lens 120.

For example, the aperture 600 may be disposed to be spaced apart from the sensor-side surface (the second surface S2) of the first lens 110 as shown in Equations 52 and 53 above.

In addition, a filter 500 may be disposed between the plurality of lenses 100 and the image sensor 300, and a cover glass 400 may be disposed between the filter 500 and the image sensor 300.

FIG. 101 is a view showing a radius of curvature of the first to third lenses 110, 120, 130 according to the third embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 101 is data at room temperature (about 22° C.)

Referring to FIGS. 100 and 101, the first lens 110 of the optical system 1000 according to the fifth embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 102 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 103 is data of the lens thickness according to the vertical height (0.2 mm interval) of the optical axis OA at room temperature (about 22° C.). In detail, D_1 of FIG. 103 is the central thickness of the first lens 110 and is the thickness (mm) of the first lens 110 on the optical axis OA. In addition, D_1_ET of FIG. 103 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 101 to 103, the thickness of the first lens 110 in the optical axis OA direction may increase from the optical axis OA toward the end of the effective diameter of the first lens 110.

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 104 is sag data according to the vertical height (0.2 mm interval) of the optical axis of each of the object-side surface (third surface, S3) and the sensor-side surface (fourth surface, S4) of the second lens 120 at room temperature (about 22° C.).

In addition, FIG. 105 is data of the lens thickness according to the vertical height (0.2 mm interval) of the optical axis OA at room temperature (about 22° C.). In detail, D_2 of FIG. 105 is the central thickness of the second lens 120 and is the thickness (mm) of the second lens 120 on the optical axis OA. In addition, D_2_ET of FIG. 105 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120.

Referring to FIGS. 100, 104 and 105, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA.

Accordingly, the second lens 120 may inhibit or minimize the change in optical properties depending on the temperature in the low to high temperature range.

The third lens 130 may be made of a plastic material and have positive (+) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 106 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 107 is data of the lens thickness according to the vertical height (0.2 mm interval) of the optical axis OA at room temperature (about 22° C.). In detail, D_3 of FIG. 107 is the central thickness of the third lens 130 and is the thickness (mm) of the third lens 130 on the optical axis OA. In addition, D_3_ET of FIG. 107 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 100, 106 and 107, the thickness of the third lens 130 in the optical axis OA direction may increase from the optical axis OA toward the end of the effective diameter of the third lens 130. In detail, the thickness in the optical axis OA direction of the third lens 130 may have a minimum value at the optical axis OA.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 1.3 times or more of the refractive power of the second lens 120 and the third lens 130. In detail, the refractive power of the first lens 110 may be greater than or equal to about 1.6 times the refractive power of the second lens 120 and the third lens 130. In more detail, the refractive power of the first lens 110 may be about 1.9 times or more of the refractive power of the second lens 120 and the third lens 130.

Also, the refractive index of the second lens 120 may be different from the refractive power of the third lens 130. For example, the refractive power of the second lens 120 may be about 1.5 times or more of the refractive power of the third lens 130. In detail, the refractive power of the second lens 120 may be about 2.5 times or more of the refractive power of the third lens 130. In more detail, the refractive power of the second lens 120 may be about 3.5 times or more of the refractive power of the third lens 130.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the fifth embodiment, the values of the aspheric coefficients of each lens surface are as shown in FIG. 108.

In addition, in the optical system 1000 according to the fifth embodiment, the interval (first interval) between the first lens 110 and the second lens 120 may be the same as that of FIG. 109 below at room temperature (about 22° C.). And, the interval (second interval) between the second lens 120 and the third lens 130 may be the same as that of FIG. 110 below at room temperature (about 22° C.).

Referring to FIG. 109, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 101.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

Referring to FIG. 110, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 101.

The second interval may have a maximum value at the second point L2 and a minimum value at the optical axis OA. The maximum value of the second interval may be about 2 times to about 4 times the minimum value. For example, in the fifth embodiment, the maximum value of the second interval may be about 2.6 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

Figure 111:
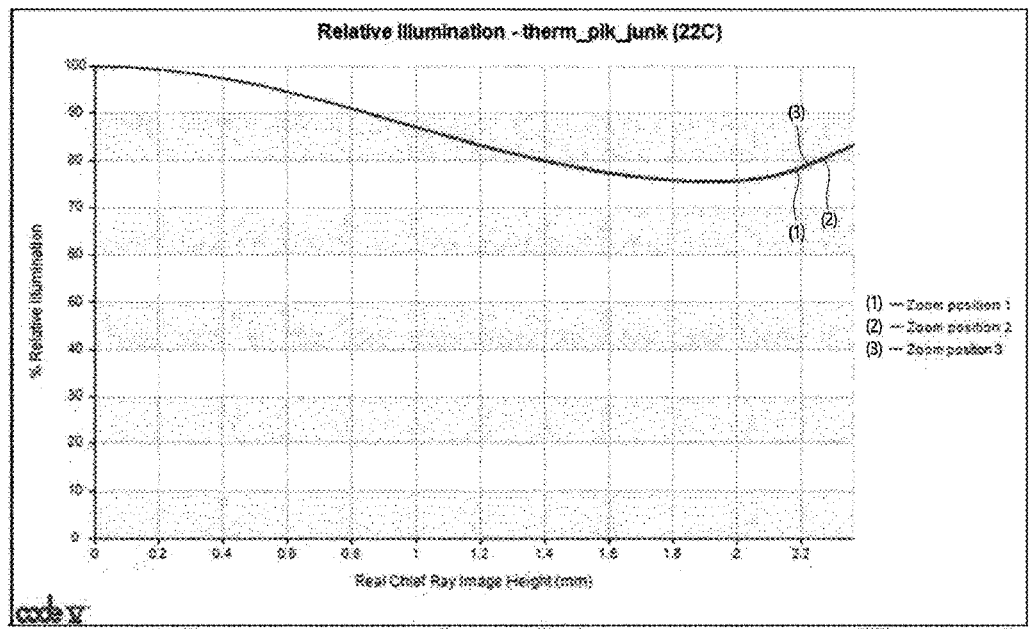
FIG. 111 is a graph of relative illumination for each field of the optical system according to the fifth embodiment.
Figure 112:
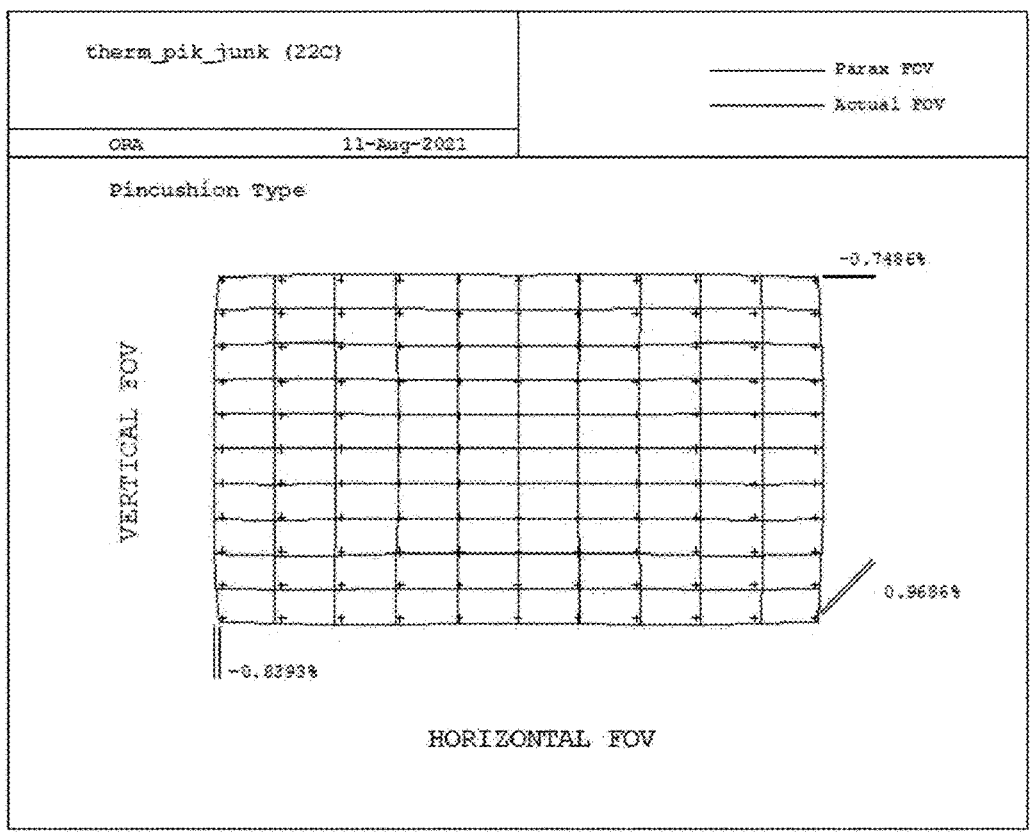
FIG. 112 is data on the distortion characteristics of the optical system according to the fifth embodiment.

FIG. 111 is a graph of relative illumination for each field of the optical system according to the fifth embodiment, and FIG. 112 is data on distortion characteristics of the optical system according to the fifth embodiment. In this case, FIGS. 111 and 112 are data obtained by measuring the optical system 1000 at room temperature (about 22° C.).

Referring to FIG. 111, the optical system 1000 according to the fifth embodiment may have excellent relative illumination characteristics in the 0 field region (center region) to 1.0 field region (edge region) of the image sensor 300. For example, the optical system 1000 may have the relative illumination of about 70% or more. In detail, in the optical system 1000, when the 0 field area is 100%, the relative illumination of the 0.5 field area may be about 80% or more, and the relative illumination of the 1.0 field area may be about 70% or more.

Also, referring to FIG. 112, the optical system 1000 according to the fifth embodiment may have a barrel distortion shape in which an edge portion of an image is curved outward, and has a distortion of about 0.9686% and a TV-distortion of about −0.7486%.

FIGS. 113 to 121 are graphs of diffraction MTF characteristics and aberration diagrams of the optical system 1000 according to temperature.

Figure 113:
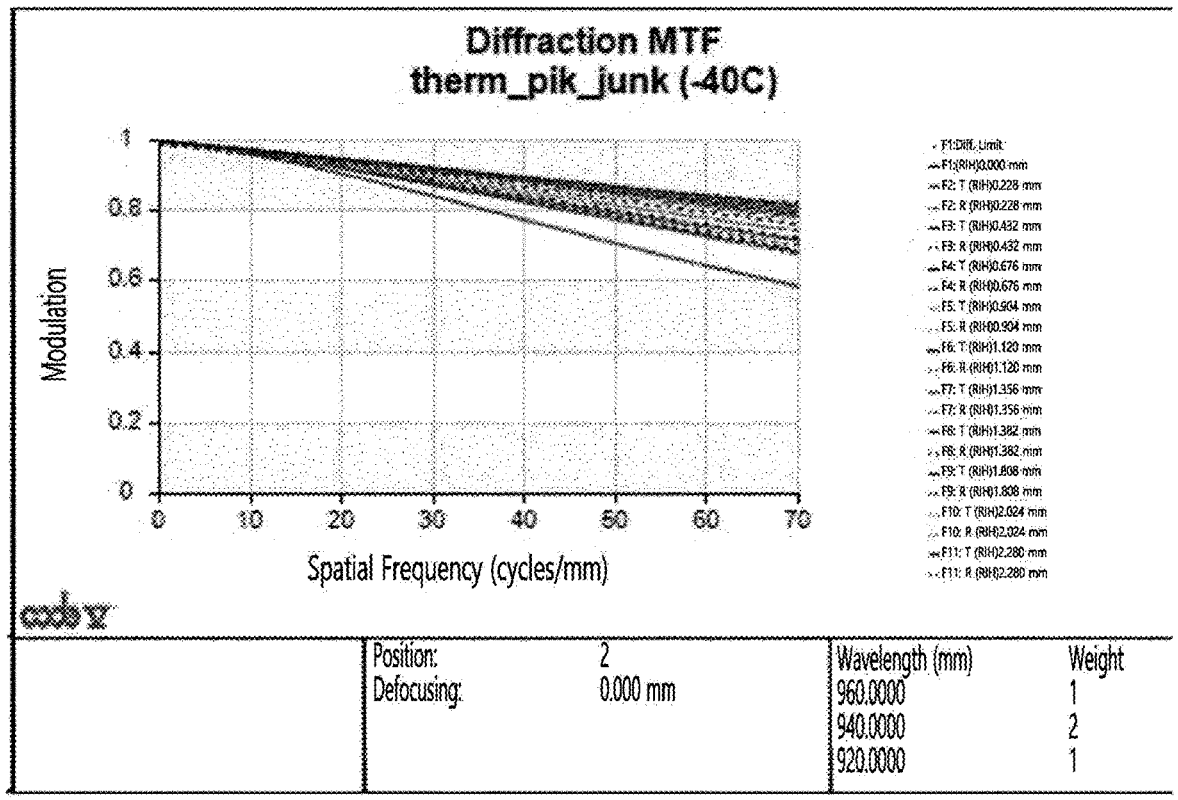
FIGS. 113 to 121 are graphs of diffraction MTF and aberration diagrams according to the temperature of the optical system according to the fifth embodiment.
Figure 114:
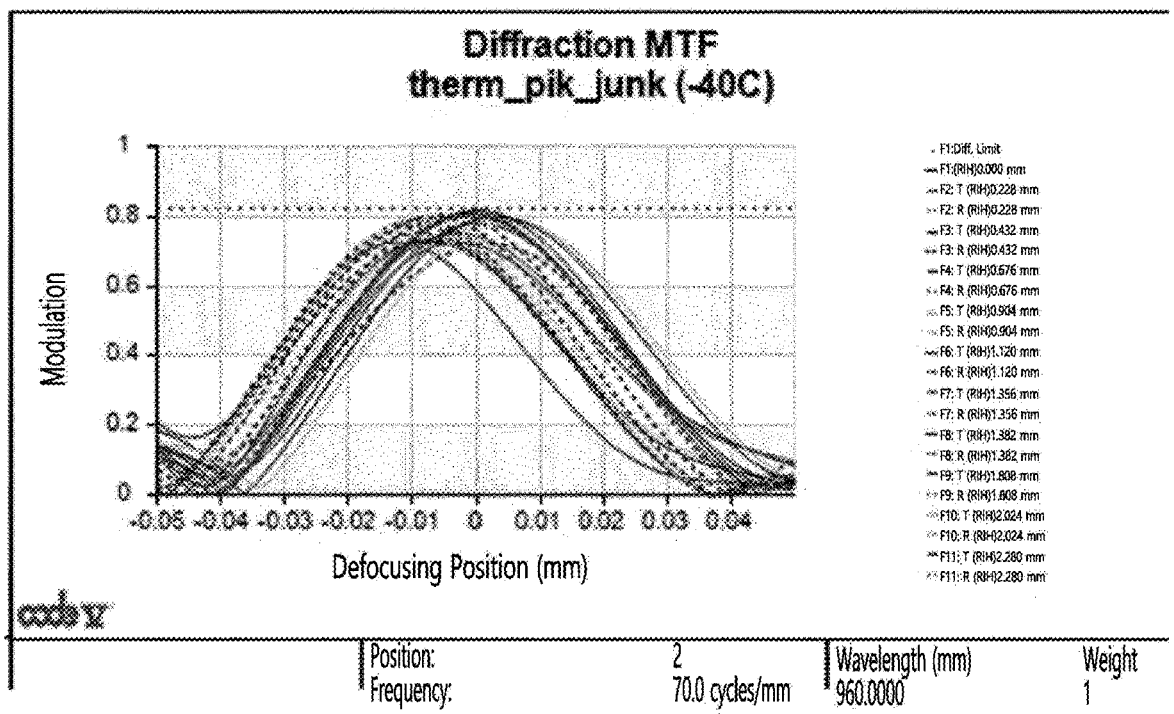

In detail, FIGS. 113 and 114 are graphs of the diffraction MTF characteristics of the optical system 1000 in a low-temperature (−40° C.) environment, and FIGS. 72 and 73 are graphs of the diffraction MTF characteristics of the optical system 1000 in a room temperature (22° C.) environment, and FIGS. 75 and 76 are graphs of diffraction MTF characteristics of the optical system 1000 in a high temperature (99° C.) environment.

Figure 115:
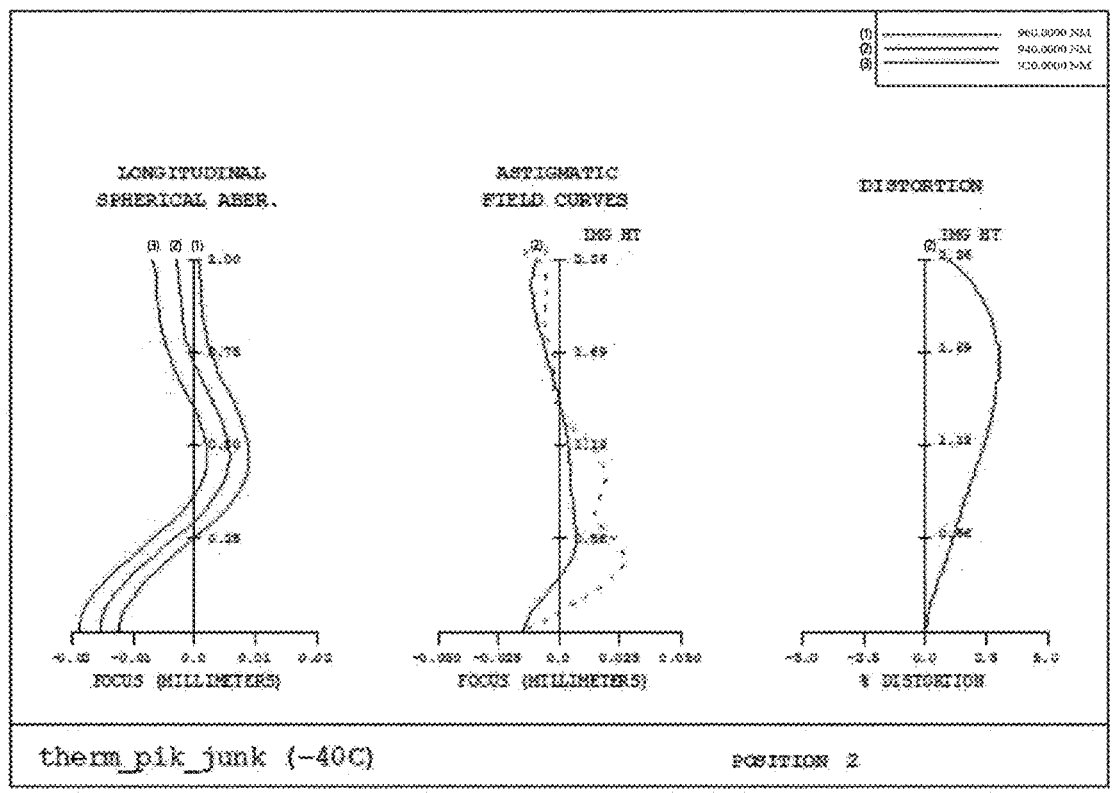
Figure 116:
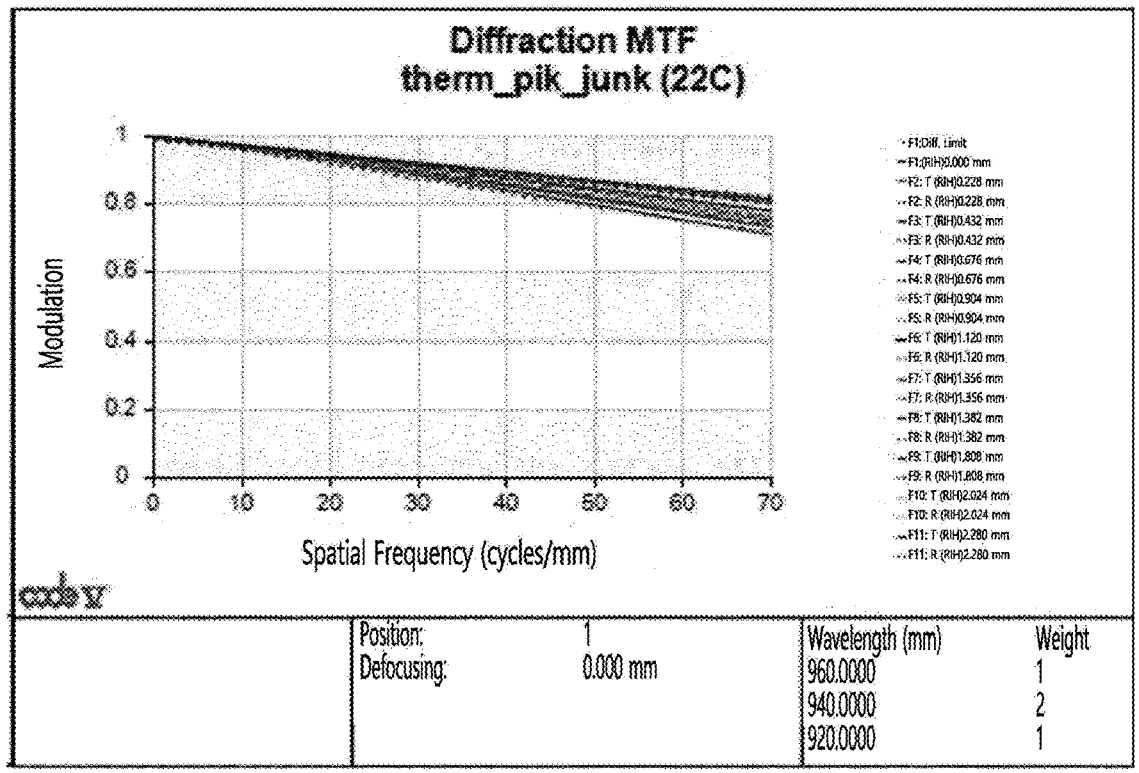
Figure 117:
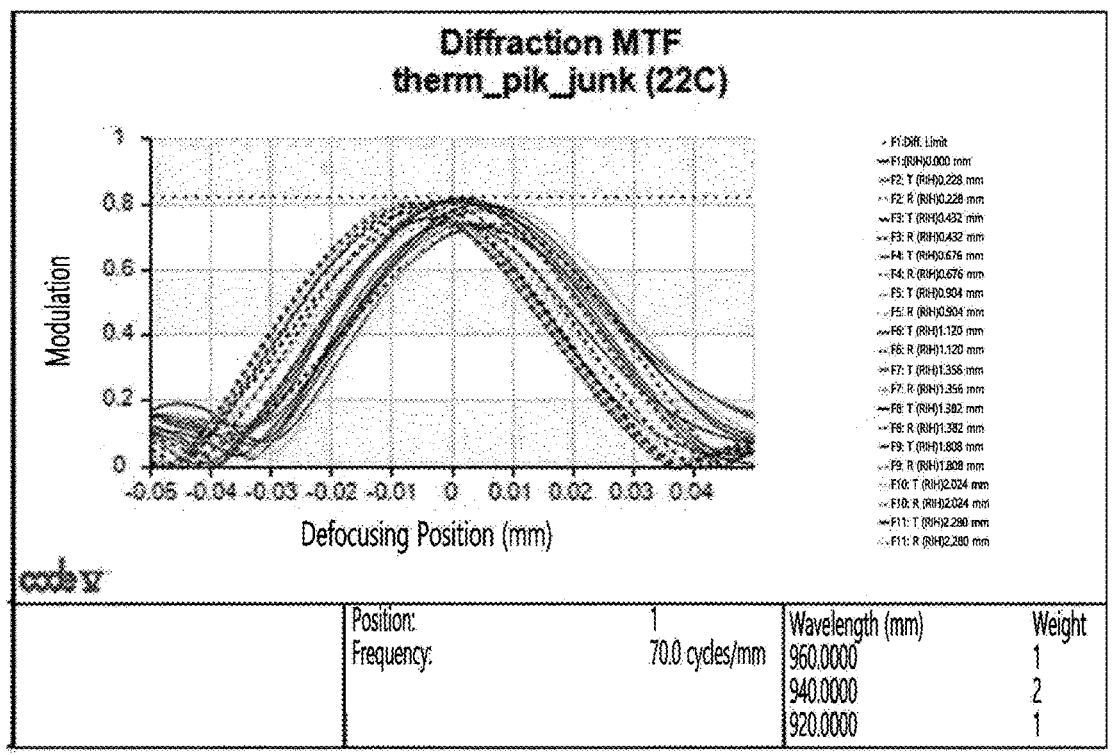
Figure 118:
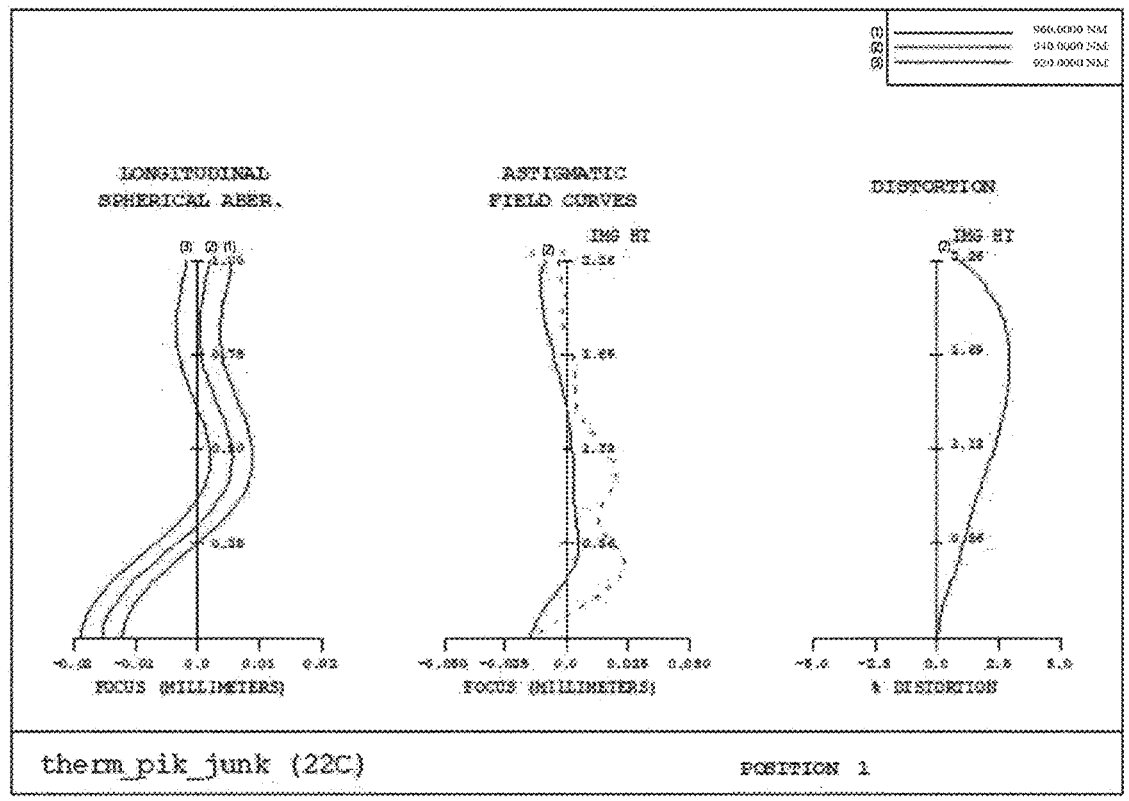
Figure 119:
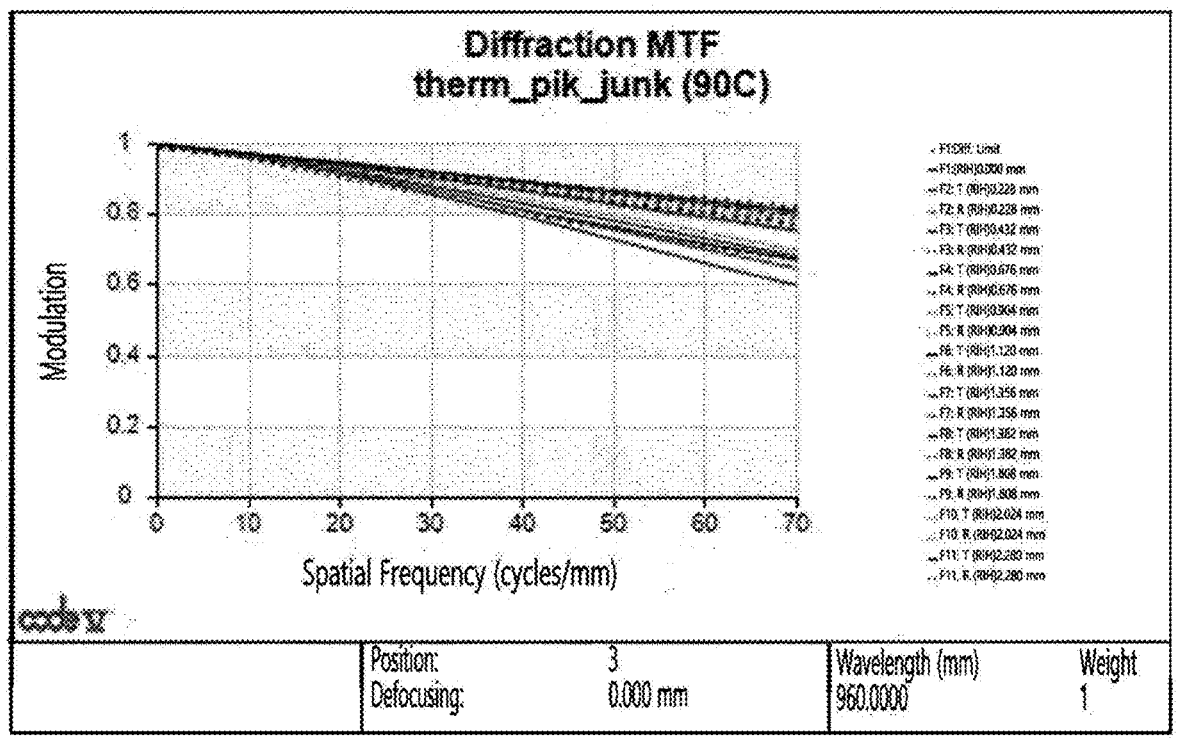
Figure 120:
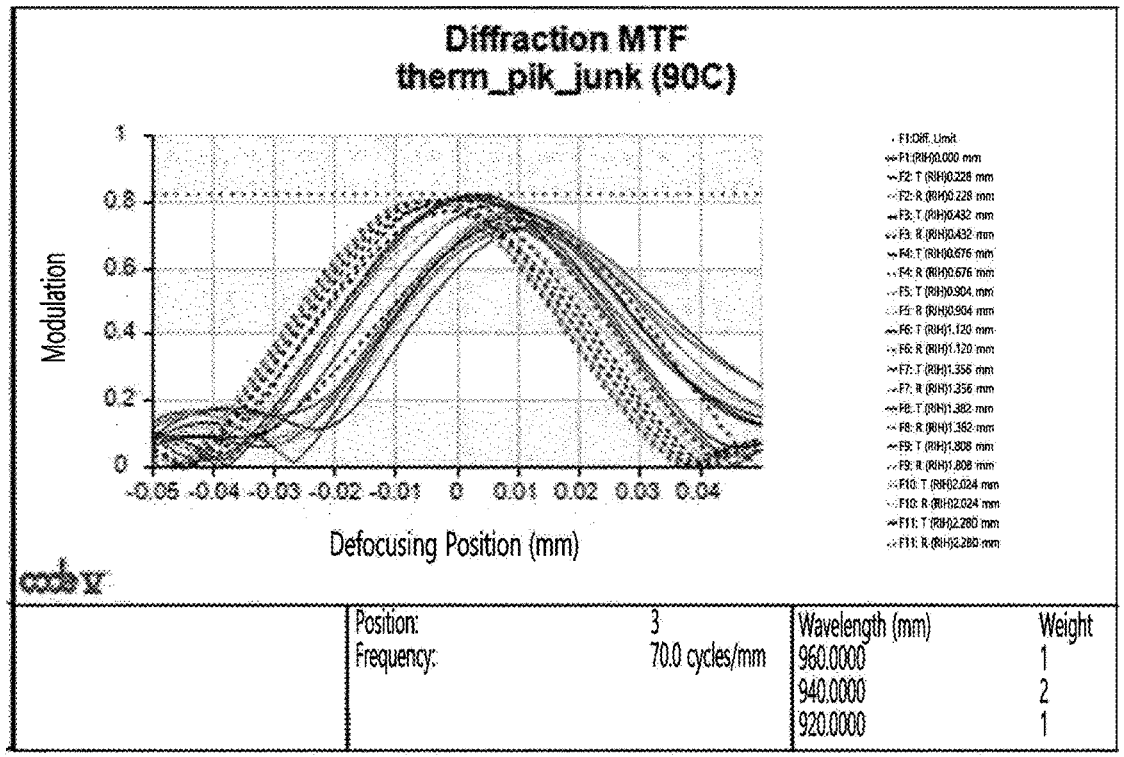
Figure 121:
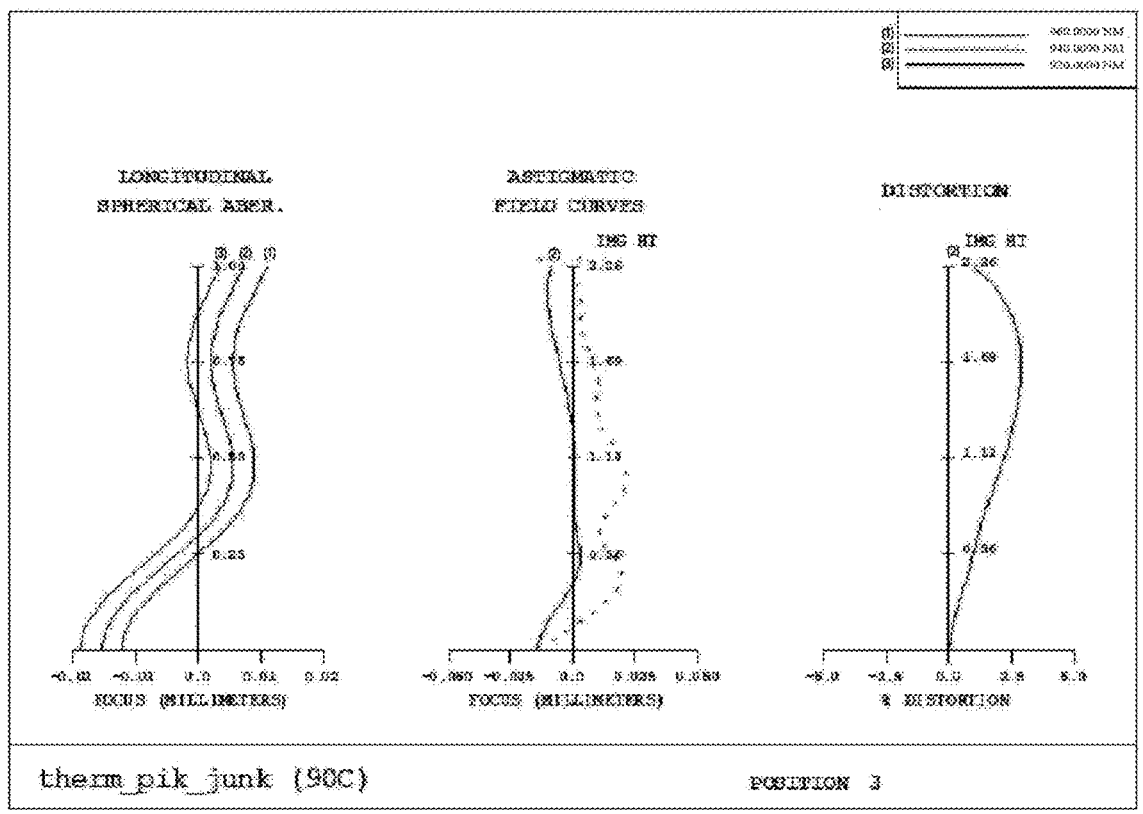

In addition, each of FIGS. 115, 118 and 121 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 115, 118 and 121, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 115, 118 and 121, the closer the curves are to the Y-axis, the better the aberration correction function can be interpreted. Referring to FIGS. 115, 118 and 121, in the optical system 1000 according to the first embodiment, measured values are adjacent to the Y-axis in almost all areas.

Referring to FIGS. 113 to 121, in the optical system 1000 according to the fifth embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the fifth embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the fifth embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

Hereinafter, the optical system 1000 according to the sixth embodiment will be described in more detail with reference to FIGS. 122 to 143.

Referring to FIGS. 122 to 146, the optical system 1000 according to the sixth embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the sixth embodiment, the aperture 600 may be disposed between the sensor-side surface (second surface S2) of the first lens 110 and the object-side surface (third surface S3) of the second lens 120.

In detail, the aperture 600 may be disposed to be spaced apart from the sensor side surface (the second surface S2) of the first lens 110 at between the sensor-side surface (second surface S2) of the first lens 110 and the object-side surface (third surface S3) of the second lens 120.

For example, the aperture 600 may be disposed to be spaced apart from the sensor-side surface (the second surface S2) of the first lens 110 as shown in Equations 52 and 53 above.

In addition, a filter 500 may be disposed between the plurality of lenses 100 and the image sensor 300, and a cover glass 400 may be disposed between the filter 500 and the image sensor 300.

FIG. 123 is a view showing a radius of curvature of the first to third lenses 110, 120, 130 according to the sixth embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 57 is data at room temperature (about 22° C.)

Figure 122:
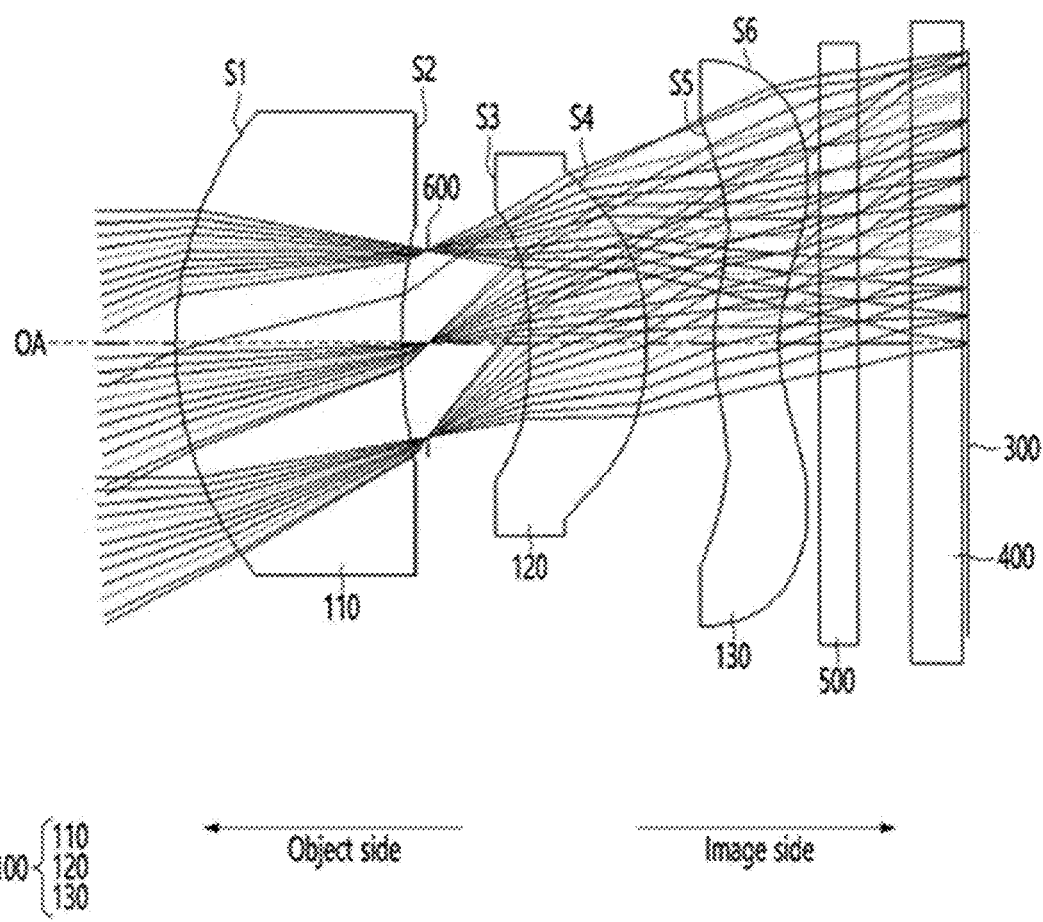
FIG. 122 is a block diagram of an optical system according to the sixth embodiment.

Referring to FIGS. 122 and 123, the first lens 110 of the optical system 1000 according to the sixth embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 124 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 125 is data of the lens thickness according to the vertical height (0.2 mm interval) of the optical axis OA at room temperature (about 22° C.). In detail, D_1 of FIG. 59 is the central thickness of the first lens 110 and is the thickness (mm) of the first lens 110 on the optical axis OA. In addition, D_1_ET of FIG. 59 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 123 to 125, the thickness of the first lens 110 in the optical axis OA direction may decrease from the optical axis OA toward the end of the effective diameter of the first lens 110. In detail, in the range from the optical axis OA to the effective diameter end of the second surface S2, the thickness in the optical axis OA direction of the first lens 110 may have a maximum value at the optical axis OA, and have a minimum value at the end of the effective diameter of the second surfaces S2.

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 126 is sag data according to the vertical height (0.2 mm interval) of the optical axis of each of the object-side surface (third surface, S3) and the sensor-side surface (fourth surface, S4) of the second lens 120 at room temperature (about 22° C.).

In addition, FIG. 127 is data of the lens thickness according to the vertical height (0.2 mm interval) of the optical axis OA at room temperature (about 22° C.). In detail, D_2 of FIG. 127 is the central thickness of the second lens 120 and is the thickness (mm) of the second lens 120 on the optical axis OA. In addition, D_2_ET of FIG. 127 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120.

Referring to FIGS. 123, 126 and 127, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA, and have a minimum value at the end of the effective diameter of the third surfaces S3.

Accordingly, the second lens 120 may inhibit or minimize the change in optical properties depending on the temperature in the low to high temperature range.

The third lens 130 may be made of a plastic material and have negative (−) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 128 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 129 is data of the lens thickness according to the vertical height (0.2 mm interval) of the optical axis OA at room temperature (about 22° C.). In detail, D_3 of FIG. 129 is the central thickness of the third lens 130 and is the thickness (mm) of the third lens 130 on the optical axis OA. In addition, D_3_ET of FIG. 129 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 123, 128 and 129, the thickness of the third lens 130 in the optical axis OA direction may increase from the optical axis OA toward the end of the effective diameter of the third lens 130. In detail, in the range from the optical axis OA to the effective diameter end of the fifth surface S5, the thickness in the optical axis OA direction of the third lens 130 may have a maximum value at the end of the effective diameter of the fifth surfaces S5, and have a minimum value at the optical axis OA.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 1.1 times or more of the refractive power of the second lens 120 and the third lens 130. In detail, the refractive power of the first lens 110 may be greater than or equal to about 1.2 times the refractive power of the second lens 120 and the third lens 130. In more detail, the refractive power of the first lens 110 may be about 1.3 times or more of the refractive power of the second lens 120 and the third lens 130.

Also, the refractive index of the second lens 120 may be different from the refractive power of the third lens 130. For example, the refractive power of the second lens 120 may be about 1.5 times or more of the refractive power of the third lens 130. In detail, the refractive power of the second lens 120 may be about 2 times or more of the refractive power of the third lens 130. In more detail, the refractive power of the second lens 120 may be about 3 times or more of the refractive power of the third lens 130.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the sixth embodiment, the values of the aspheric coefficients of each lens surface are as shown in FIG. 130.

In addition, in the optical system 1000 according to the sixth embodiment, the interval (first interval) between the first lens 110 and the second lens 120 may be the same as that of FIG. 131 below at room temperature (about 22° C.). And, the interval (second interval) between the second lens 120 and the third lens 130 may be the same as that of FIG. 132 below at room temperature (about 22° C.).

Figure 181:
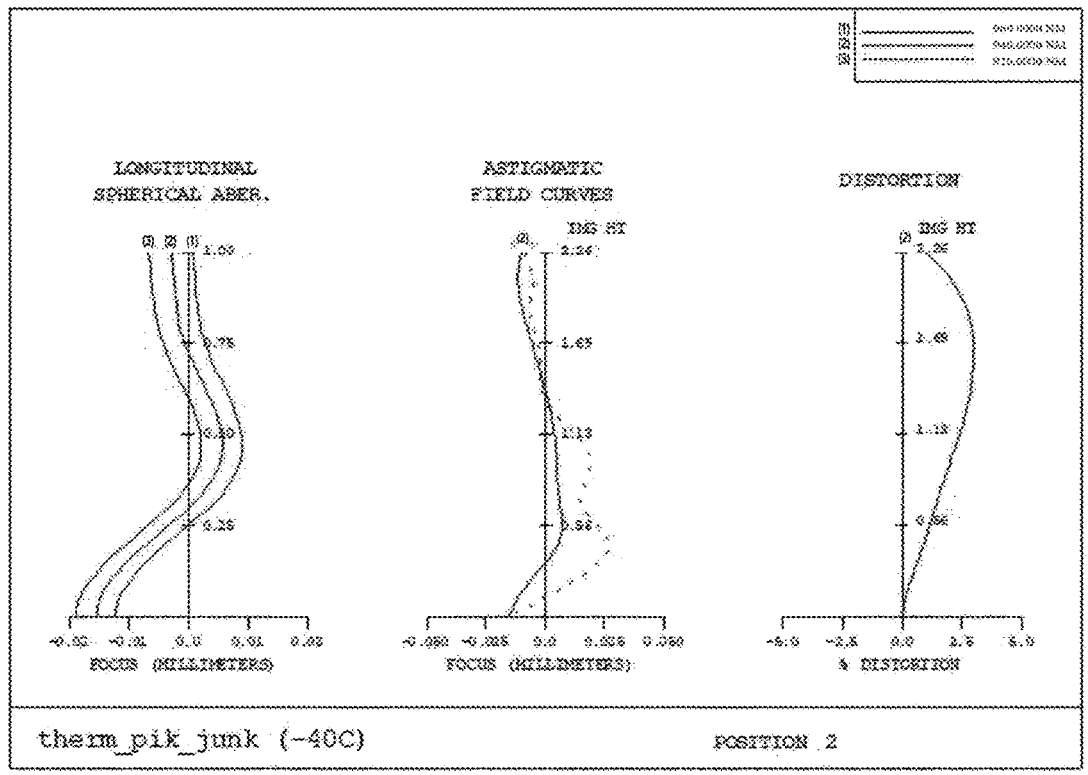

Referring to FIG. 181, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 123.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

Referring to FIG. 132, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 123.

The second interval may have a maximum value at the second point L2 and a minimum value at the optical axis OA. The maximum value of the second interval may be about 2 times to about 4 times the minimum value. For example, in the sixth embodiment, the maximum value of the second interval may be about 2.1 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

Figure 133:
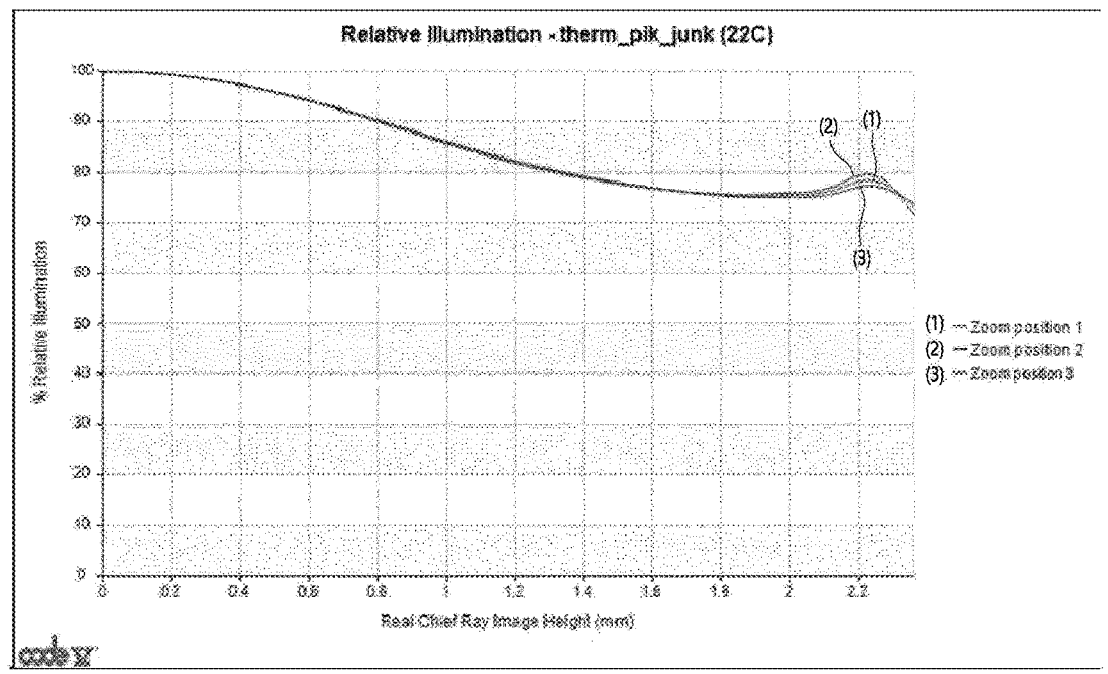
FIG. 133 is a graph of relative illumination for each field of the optical system according to the sixth embodiment.
Figure 134:
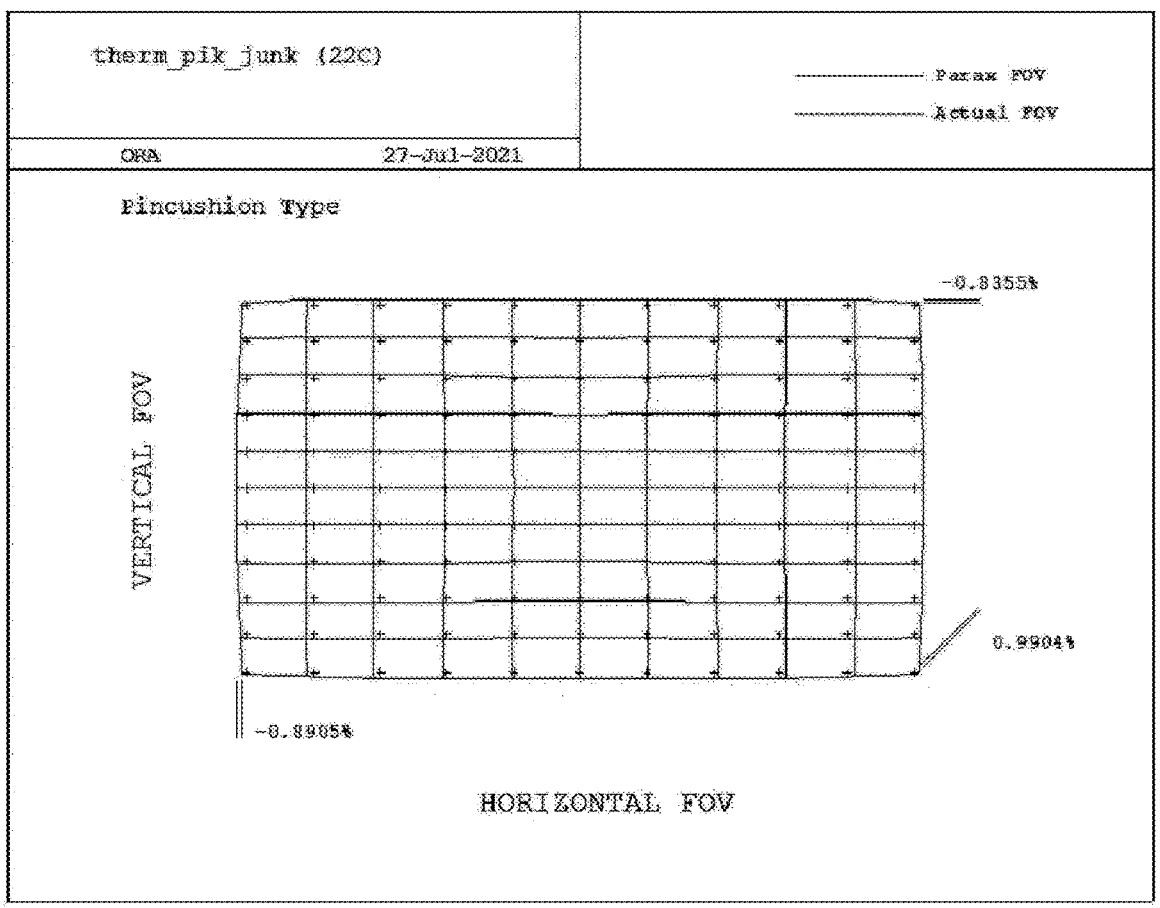
FIG. 134 is data of distortion characteristics of the optical system according to the sixth embodiment.

FIG. 133 is a graph of relative illumination for each field of the optical system according to the third embodiment, and FIG. 134 is data on distortion characteristics of the optical system according to the third embodiment. In this case, FIGS. 133 and 134 are data obtained by measuring the optical system 1000 at room temperature (about 22° C.).

Referring to FIG. 133, the optical system 1000 according to the sixth embodiment may have excellent relative illumination characteristics in the 0 field region (center region) to 1.0 field region (edge region) of the image sensor 300. For example, the optical system 1000 may have the relative illumination of about 70% or more. In detail, in the optical system 1000, when the 0 field area is 100%, the relative illumination of the 0.5 field area may be about 80% or more, and the relative illumination of the 1.0 field area may be about 70% or more.

Also, referring to FIG. 134, the optical system 1000 according to the sixth embodiment may have a barrel distortion shape in which an edge portion of an image is curved outward, and has a distortion of about 0.9904% and a TV-distortion of about −0.8355%.

FIGS. 135 to 143 are graphs of diffraction MTF characteristics and aberration diagrams of the optical system 1000 according to temperature.

Figure 135:
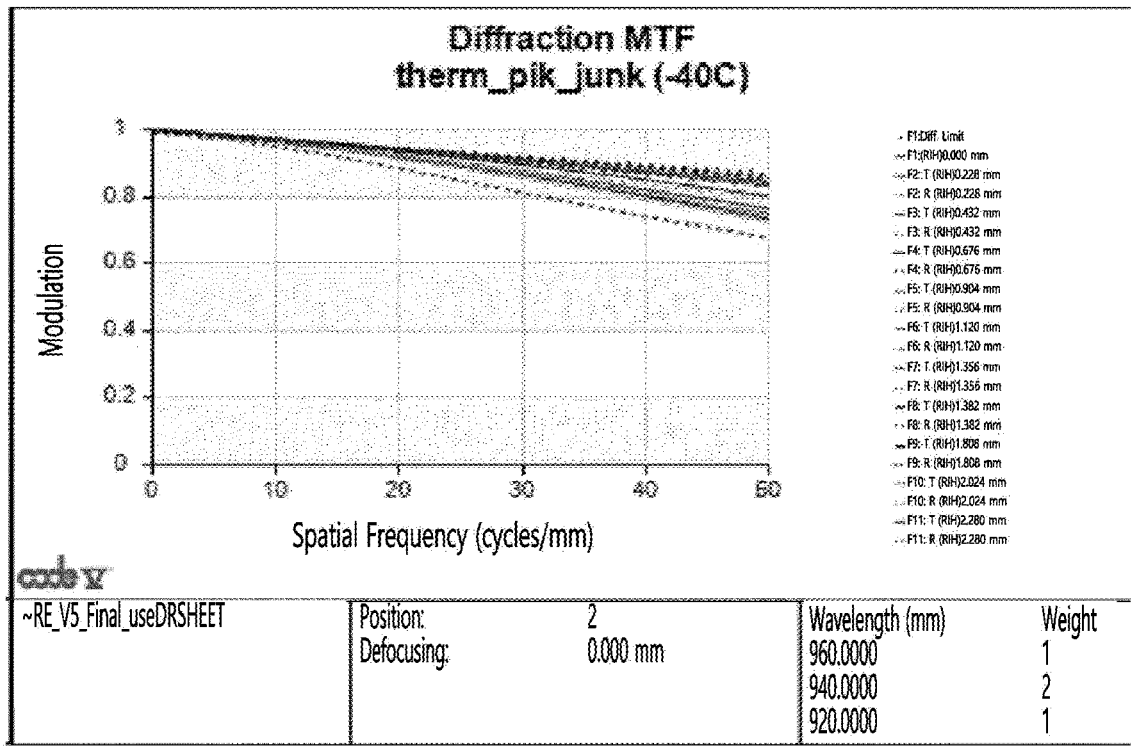
FIGS. 135 to 143 are graphs of diffraction MTF and aberration diagrams according to temperature of the optical system according to the sixth embodiment.
Figure 136:
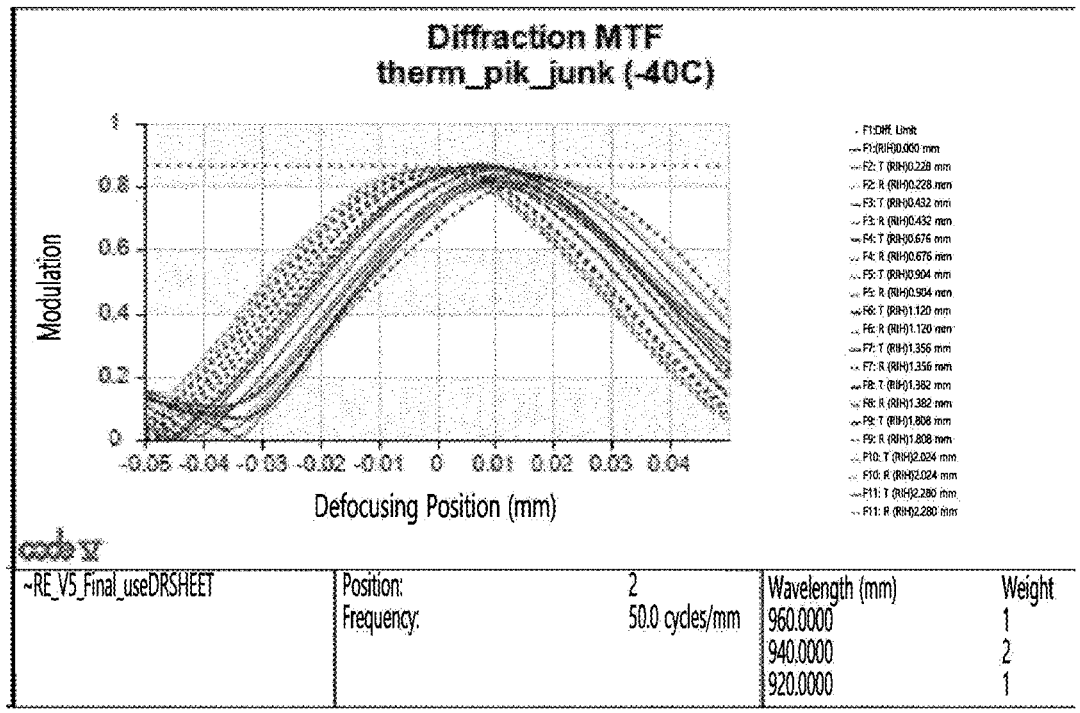
Figure 138:
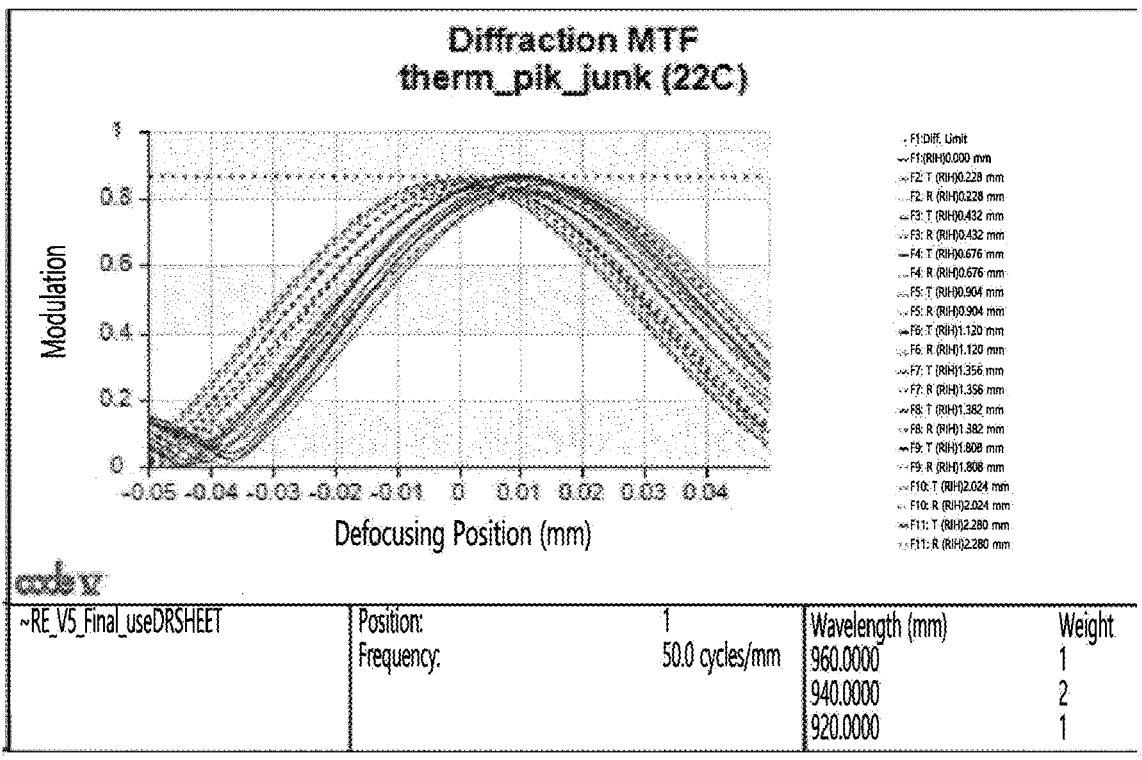
Figure 139:
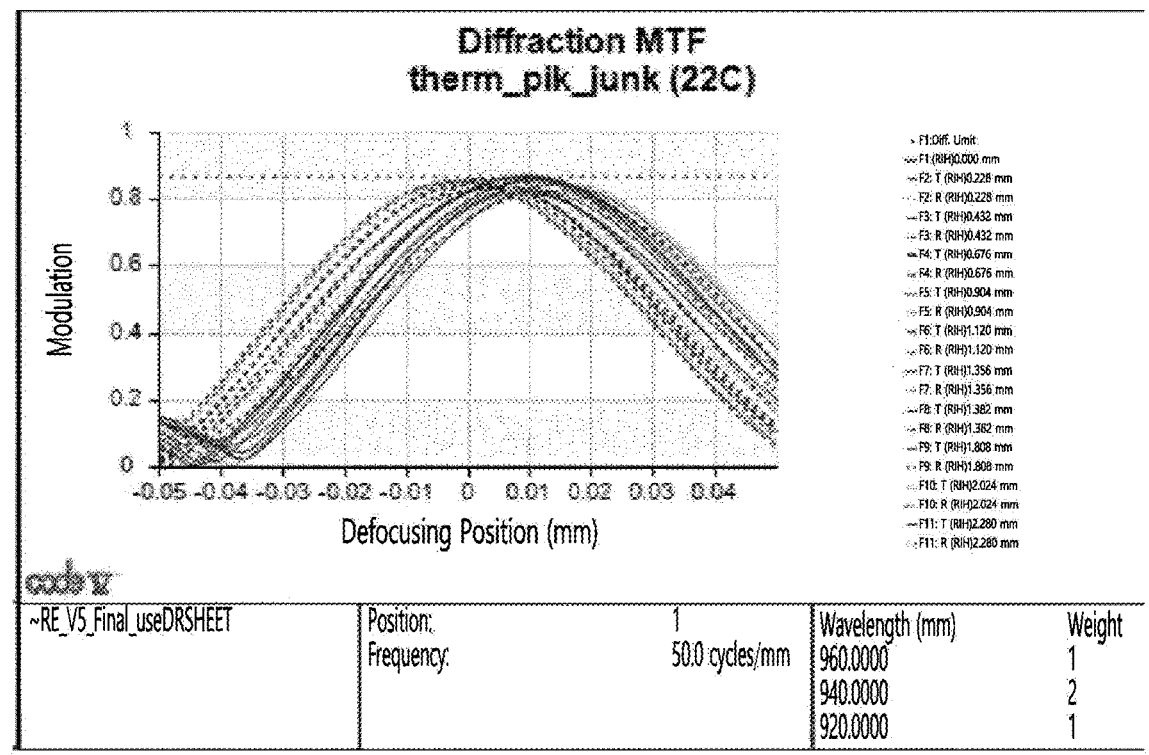
Figure 141:
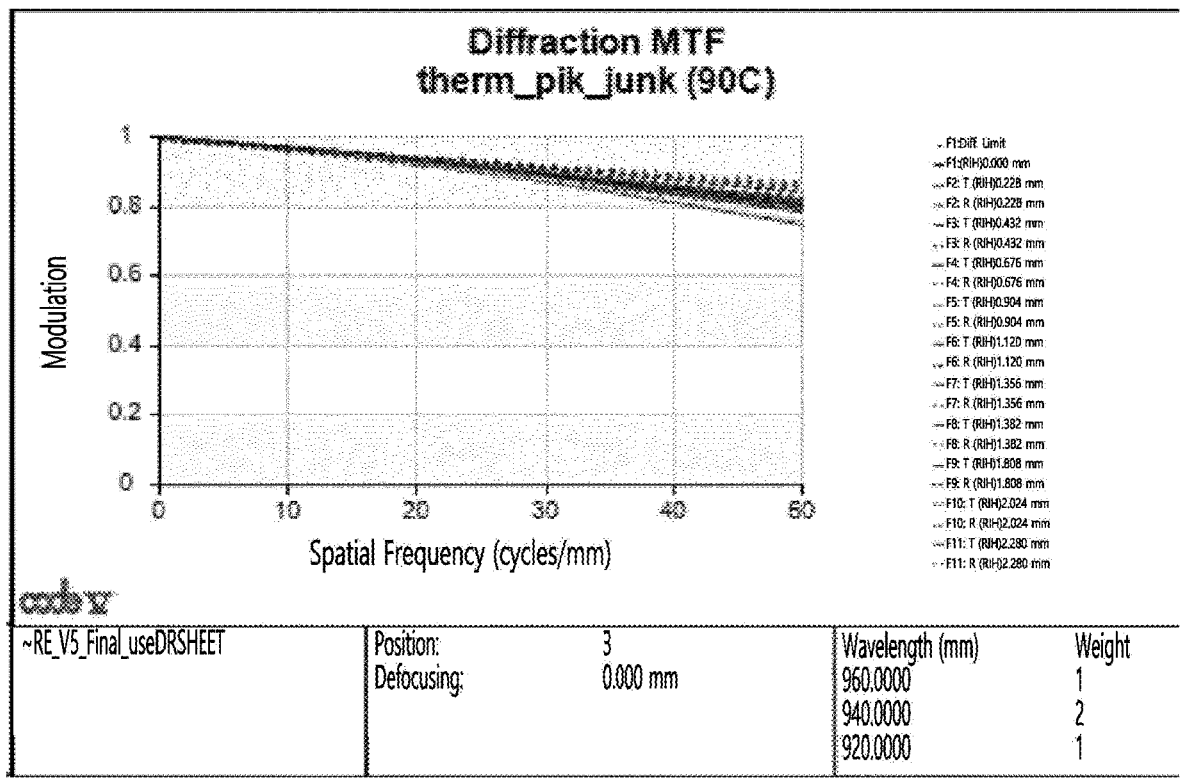
Figure 142:
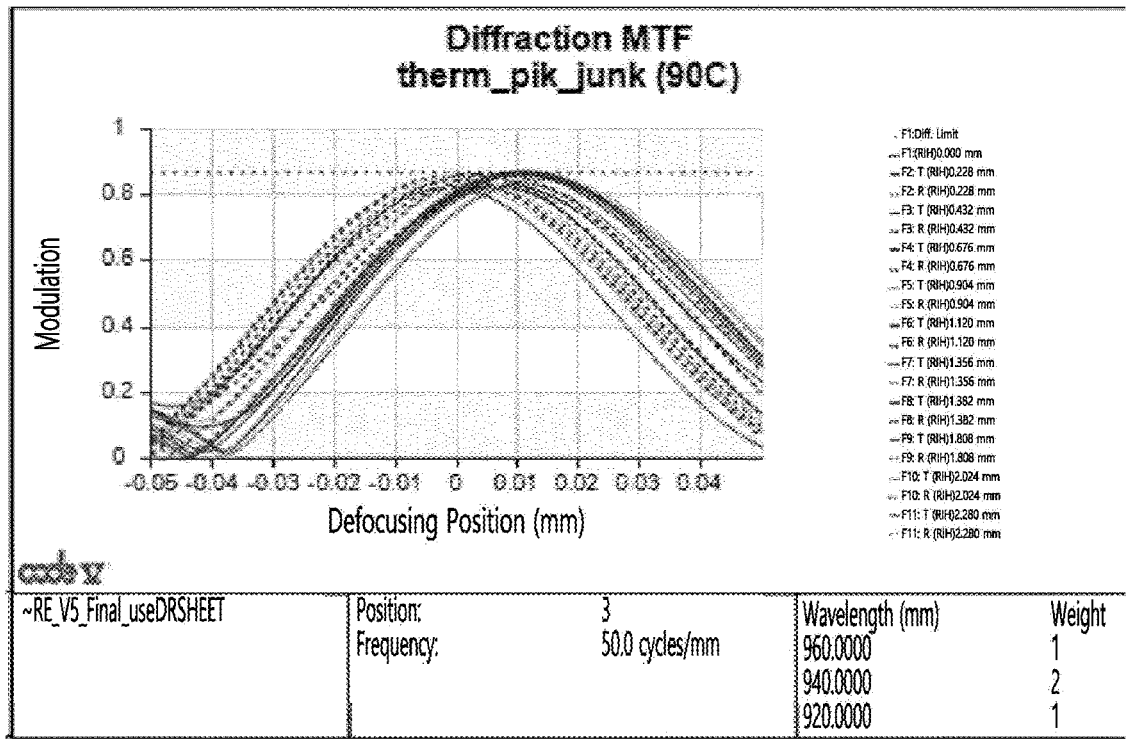

In detail, FIGS. 135 and 136 are graphs of the diffraction MTF characteristics of the optical system 1000 in a low-temperature (−40° C.) environment, and FIGS. 138 and 139 are graphs of the diffraction MTF characteristics of the optical system 1000 in a room temperature (22° C.) environment, and FIGS. 141 and 142 are graphs of diffraction MTF characteristics of the optical system 1000 in a high temperature (99° C.) environment.

Figure 137:
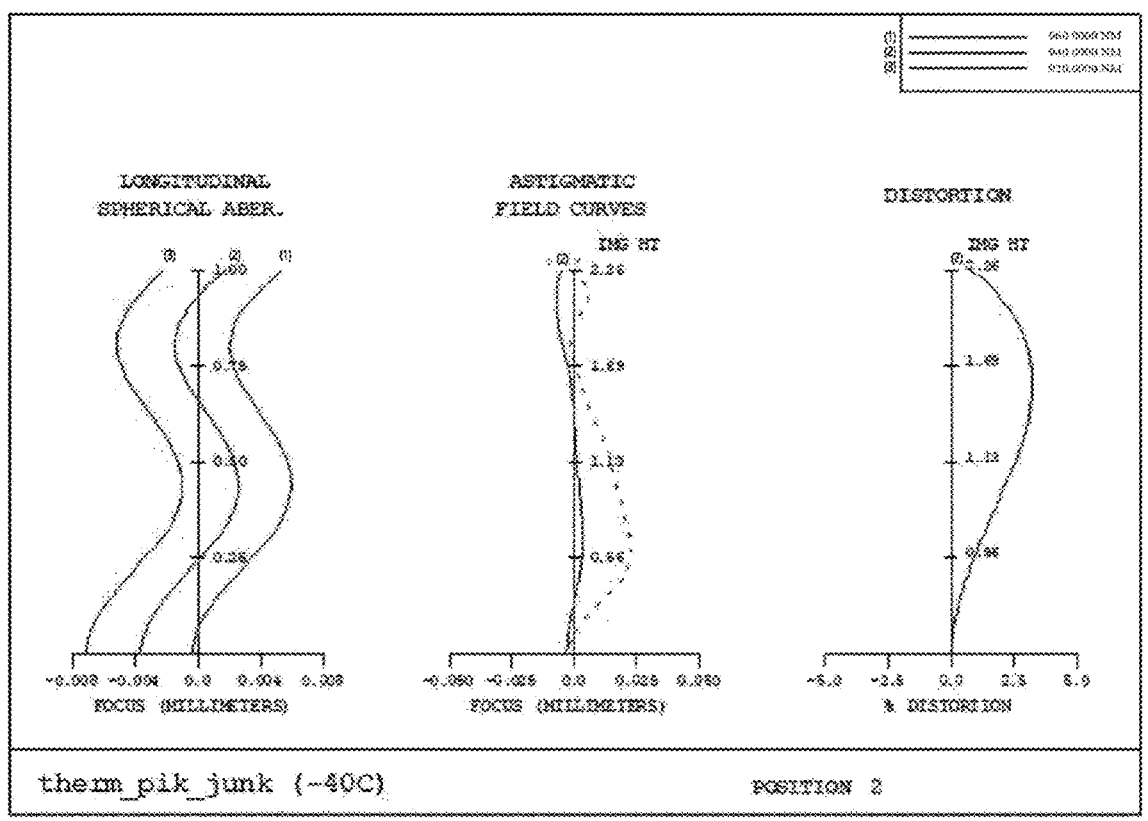
Figure 140:
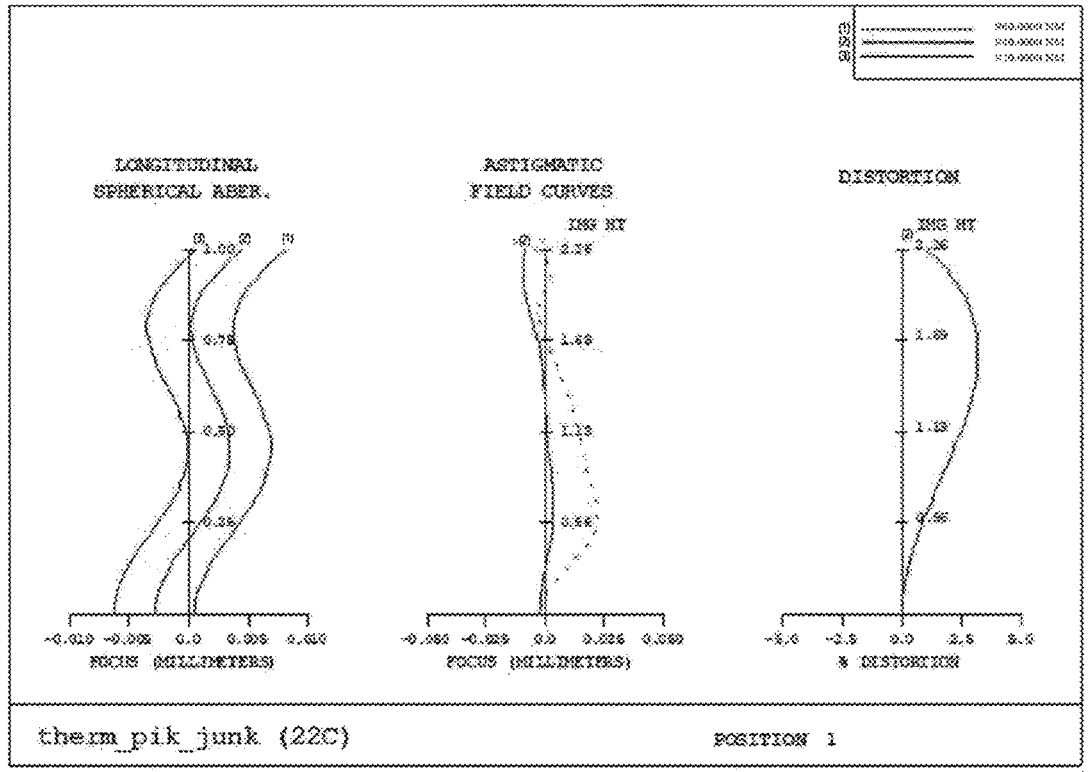
Figure 143:
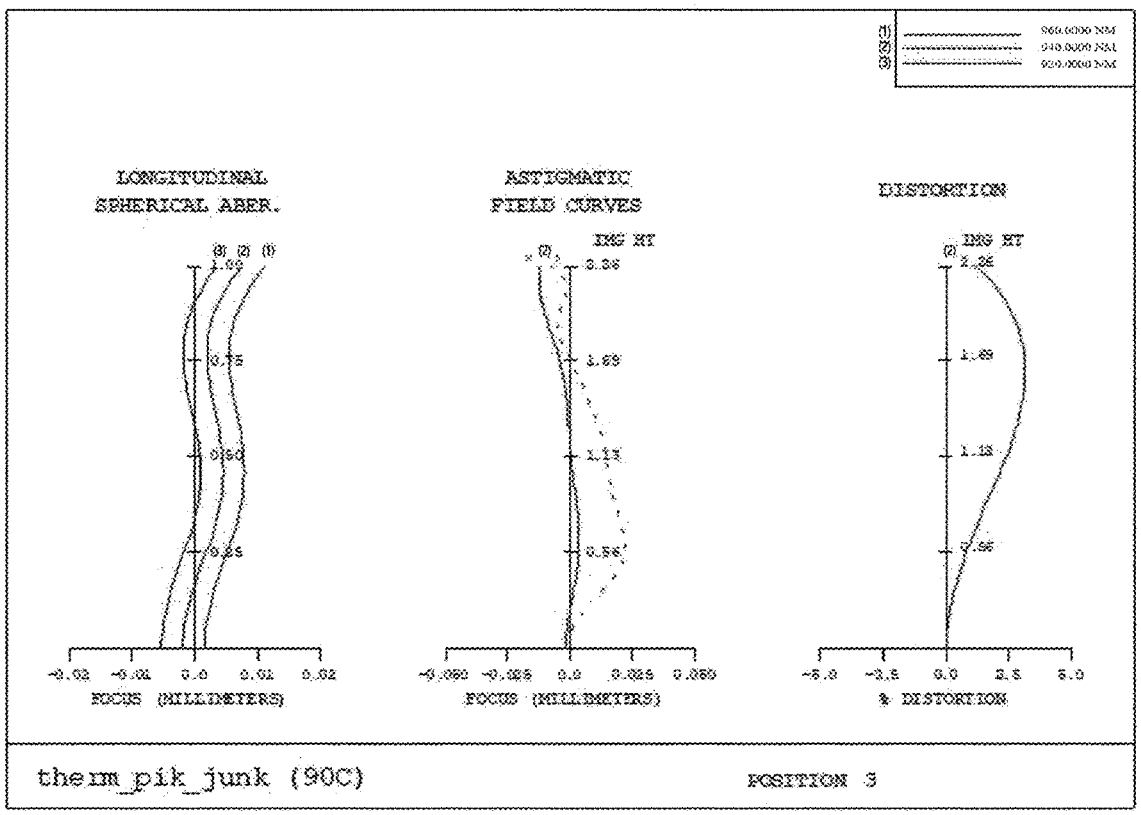

In addition, each of FIGS. 137, 140 and 141 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 137, 140 and 143, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 137, 140 and 143, the closer the curves are to the Y-axis, the better the aberration correction function can be interpreted. Referring to FIGS. 137, 140 and 143, in the optical system 1000 according to the sixth embodiment, measured values are adjacent to the Y-axis in almost all areas.

Referring to FIGS. 135 to 143, in the optical system 1000 according to the sixth embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the sixth embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the sixth embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

Hereinafter, the optical system 1000 according to the seventh embodiment will be described in more detail with reference to FIGS. 144 to 165.

Referring to FIG. 144, the optical system 1000 according to the seventh embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the seventh embodiment, the aperture 600 may be disposed between the sensor-side surface (second surface S2) of the first lens 110 and the object-side surface (third surface S3) of the second lens 120.

In detail, the aperture 600 may be disposed to be spaced apart from the sensor side surface (the second surface S2) of the first lens 110 at between the sensor-side surface (second surface S2) of the first lens 110 and the object-side surface (third surface S3) of the second lens 120.

For example, the aperture 600 may be disposed to be spaced apart from the sensor-side surface (the second surface S2) of the first lens 110 as shown in Equations 52 and 53 above.

In addition, a filter 500 may be disposed between the plurality of lenses 100 and the image sensor 300, and a cover glass 400 may be disposed between the filter 500 and the image sensor 300.

FIG. 145 is a view showing a radius of curvature of the first to third lenses 110, 120, 130 according to the third embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 145 is data at room temperature (about 22° C.)

Referring to FIGS. 144 and 145, the first lens 110 of the optical system 1000 according to the seventh embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 146 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 147 is data of the lens thickness according to the vertical height (0.2 mm interval) of the optical axis OA at room temperature (about 22° C.). In detail, D_1 of FIG. 147 is the central thickness of the first lens 110 and is the thickness (mm) of the first lens 110 on the optical axis OA. In addition, D_1_ET of FIG. 147 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 145 to 147, the thickness of the first lens 110 in the optical axis OA direction may decrease from the optical axis OA toward the end of the effective diameter of the first lens 110. In detail, in the range from the optical axis OA to the effective diameter end of the second surface S2, the thickness in the optical axis OA direction of the first lens 110 may have a maximum value at the optical axis OA, and have a minimum value at the end of the effective diameter of the second surfaces S2

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 148 is sag data according to the vertical height (0.2 mm interval) of the optical axis of each of the object-side surface (third surface, S3) and the sensor-side surface (fourth surface, S4) of the second lens 120 at room temperature (about 22° C.).

In addition, FIG. 149 is data of the lens thickness according to the vertical height (0.2 mm interval) of the optical axis OA at room temperature (about 22° C.). In detail, D_2 of FIG. 149 is the central thickness of the second lens 120 and is the thickness (mm) of the second lens 120 on the optical axis OA. In addition, D_2_ET of FIG. 149 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120.

Referring to FIGS. 145, 148 and 149, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA, and have a minimum value at the end of the effective diameter of the third surfaces S3.

Accordingly, the second lens 120 may inhibit or minimize the change in optical properties depending on the temperature in the low to high temperature range.

The third lens 130 may be made of a plastic material and have negative (−) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 150 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 151 is data of the lens thickness according to the vertical height (0.2 mm interval) of the optical axis OA at room temperature (about 22° C.). In detail, D_3 of FIG. 151 is the central thickness of the third lens 130 and is the thickness (mm) of the third lens 130 on the optical axis OA. In addition, D_3_ET of FIG. 151 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 145, 150 and 151, the thickness of the third lens 130 in the optical axis OA direction may increase from the optical axis OA toward the end of the effective diameter of the third lens 130. In detail, in the range from the optical axis OA to the effective diameter end of the fifth surface S5, the thickness in the optical axis OA direction of the third lens 130 may have a maximum value at the end of the effective diameter of the fifth surfaces S5, and have a minimum value at the optical axis OA.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 1.1 times or more of the refractive power of the second lens 120 and the third lens 130. In detail, the refractive power of the first lens 110 may be greater than or equal to about 1.3 times the refractive power of the second lens 120 and the third lens 130. In more detail, the refractive power of the first lens 110 may be about 1.5 times or more of the refractive power of the second lens 120 and the third lens 130.

Also, the refractive index of the second lens 120 may be different from the refractive power of the third lens 130. For example, the refractive power of the second lens 120 may be about 5 times or more of the refractive power of the third lens 130. In detail, the refractive power of the second lens 120 may be about 10 times or more of the refractive power of the third lens 130. In more detail, the refractive power of the second lens 120 may be about 15 times or more of the refractive power of the third lens 130.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the seventh embodiment, the values of the aspheric coefficients of each lens surface are as shown in FIG. 152.

In addition, in the optical system 1000 according to the seventh embodiment, the interval (first interval) between the first lens 110 and the second lens 120 may be the same as that of FIG. 153 below at room temperature (about 22° C.). And, the interval (second interval) between the second lens 120 and the third lens 130 may be the same as that of FIG. 154 below at room temperature (about 22° C.).

Referring to FIG. 153, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 57.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

Referring to FIG. 154, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 145.

The second interval may have a maximum value at the second point L2 and a minimum value at the optical axis OA. The maximum value of the second interval may be about 2 times to about 4 times the minimum value. For example, in the third embodiment, the maximum value of the second interval may be about 2.1 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

Figure 155:
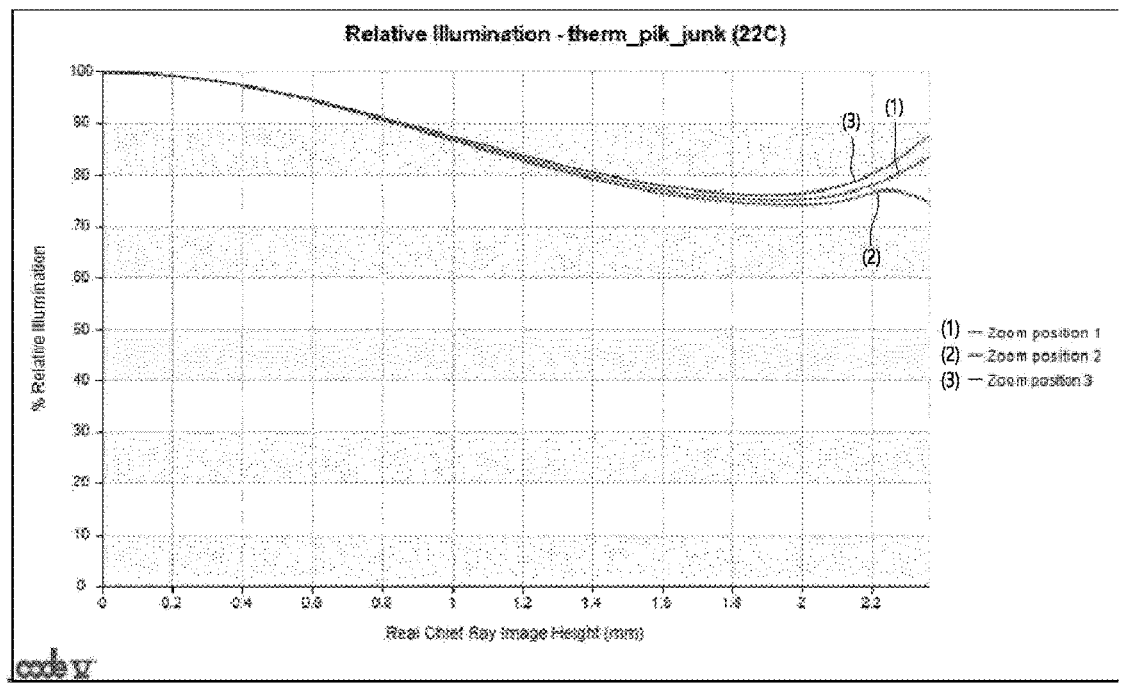
FIG. 155 is a graph of the relative illumination ratio for each field of the optical system according to the seventh embodiment.
Figure 156:
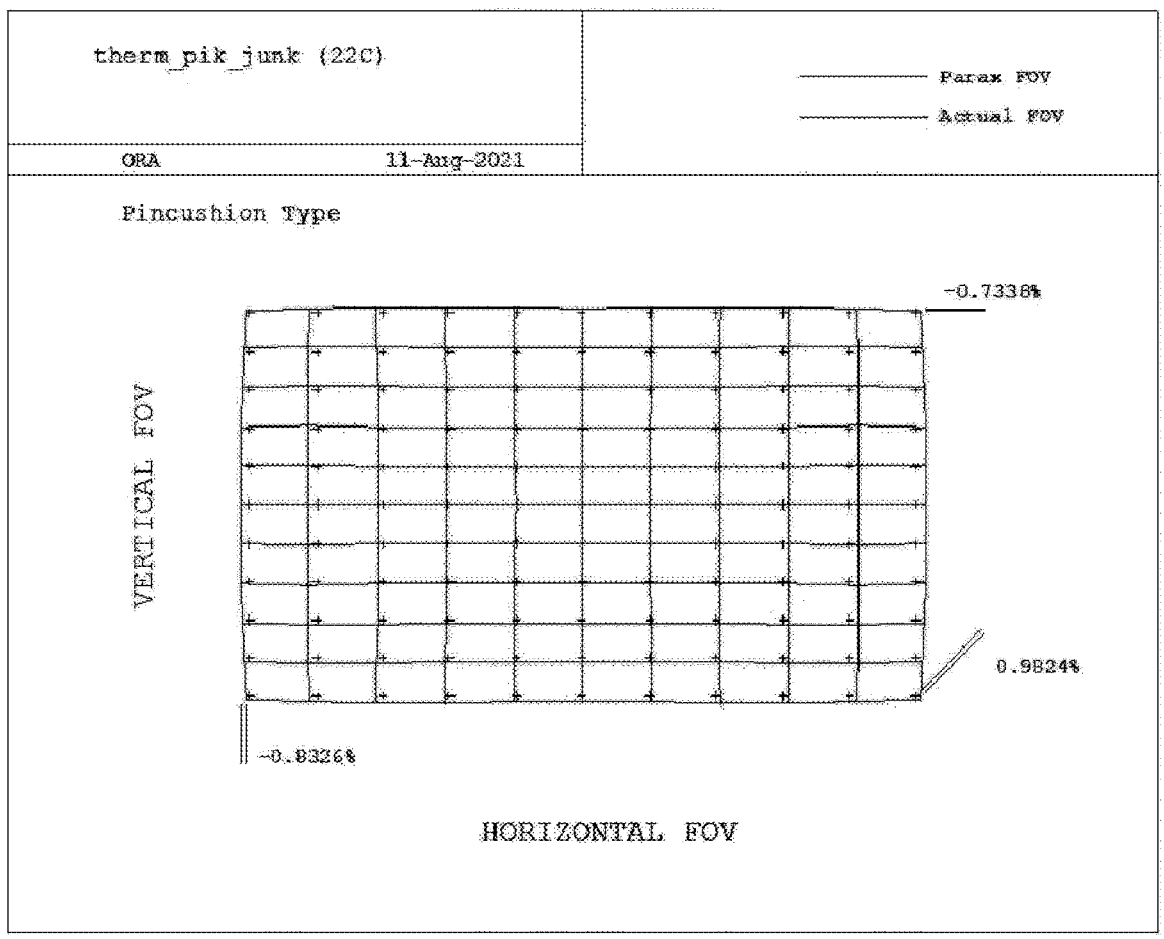
FIG. 156 is data on the distortion characteristics of the optical system according to the seventh embodiment.

FIG. 155 is a graph of relative illumination for each field of the optical system according to the seventh embodiment, and FIG. 156 is data on distortion characteristics of the optical system according to the seventh embodiment. In this case, FIGS. 155 and 156 are data obtained by measuring the optical system 1000 at room temperature (about 22° C.).

Referring to FIG. 155, the optical system 1000 according to the third embodiment may have excellent relative illumination characteristics in the 0 field region (center region) to 1.0 field region (edge region) of the image sensor 300. For example, the optical system 1000 may have the relative illumination of about 70% or more. In detail, in the optical system 1000, when the 0 field area is 100%, the relative illumination of the 0.5 field area may be about 80% or more, and the relative illumination of the 1.0 field area may be about 70% or more.

Also, referring to FIG. 156, the optical system 1000 according to the seventh embodiment may have a barrel distortion shape in which an edge portion of an image is curved outward, and has a distortion of about 2.2631% and a TV-distortion of about −0.2325%.

FIGS. 157 to 165 are graphs of diffraction MTF characteristics and aberration diagrams of the optical system 1000 according to temperature.

Figure 157:
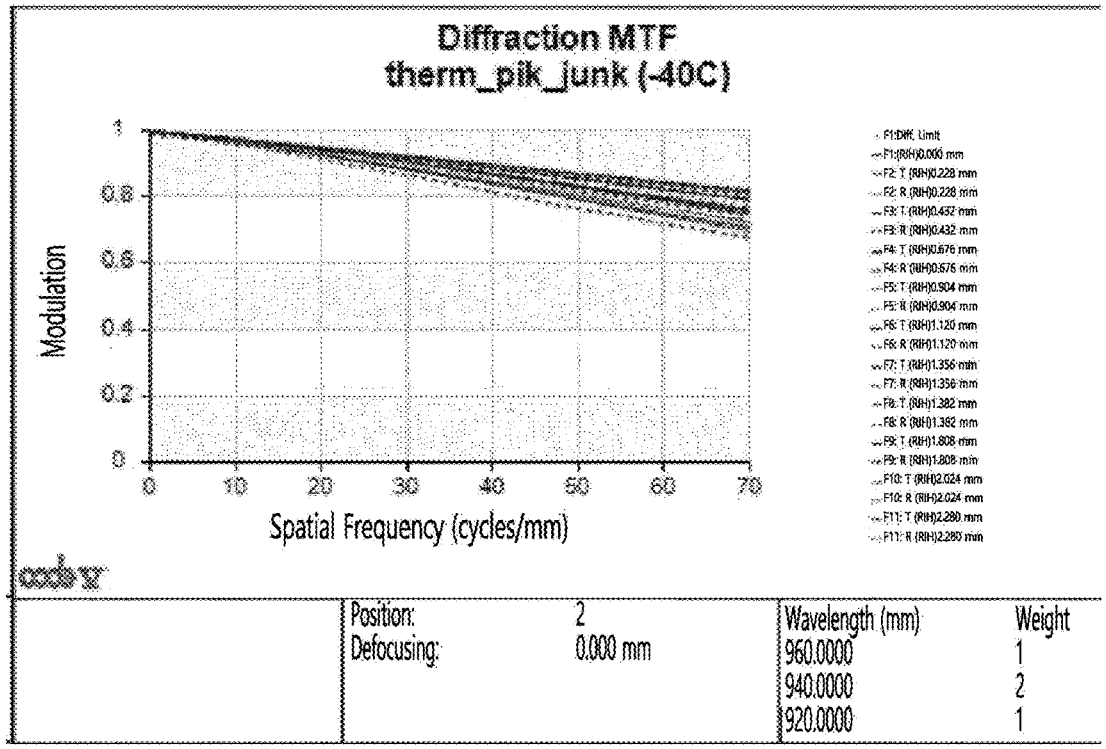
FIGS. 157 to 165 are graphs of diffraction MTF and aberration diagrams for each temperature of the optical system according to the seventh embodiment.
Figure 158:
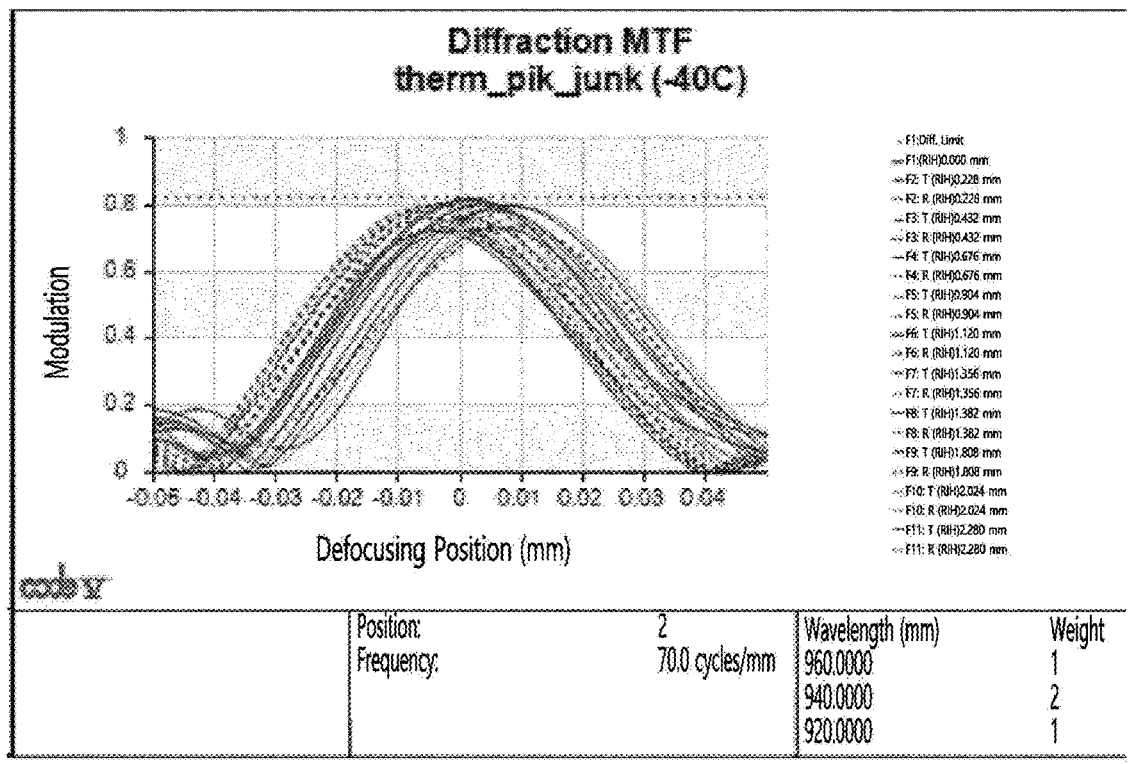

In detail, FIGS. 157 and 158 are graphs of the diffraction MTF characteristics of the optical system 1000 in a low-temperature (−40° C.) environment, and FIGS. 72 and 73 are graphs of the diffraction MTF characteristics of the optical system 1000 in a room temperature (22° C.) environment, and FIGS. 75 and 76 are graphs of diffraction MTF characteristics of the optical system 1000 in a high temperature (99° C.) environment.

Figure 159:
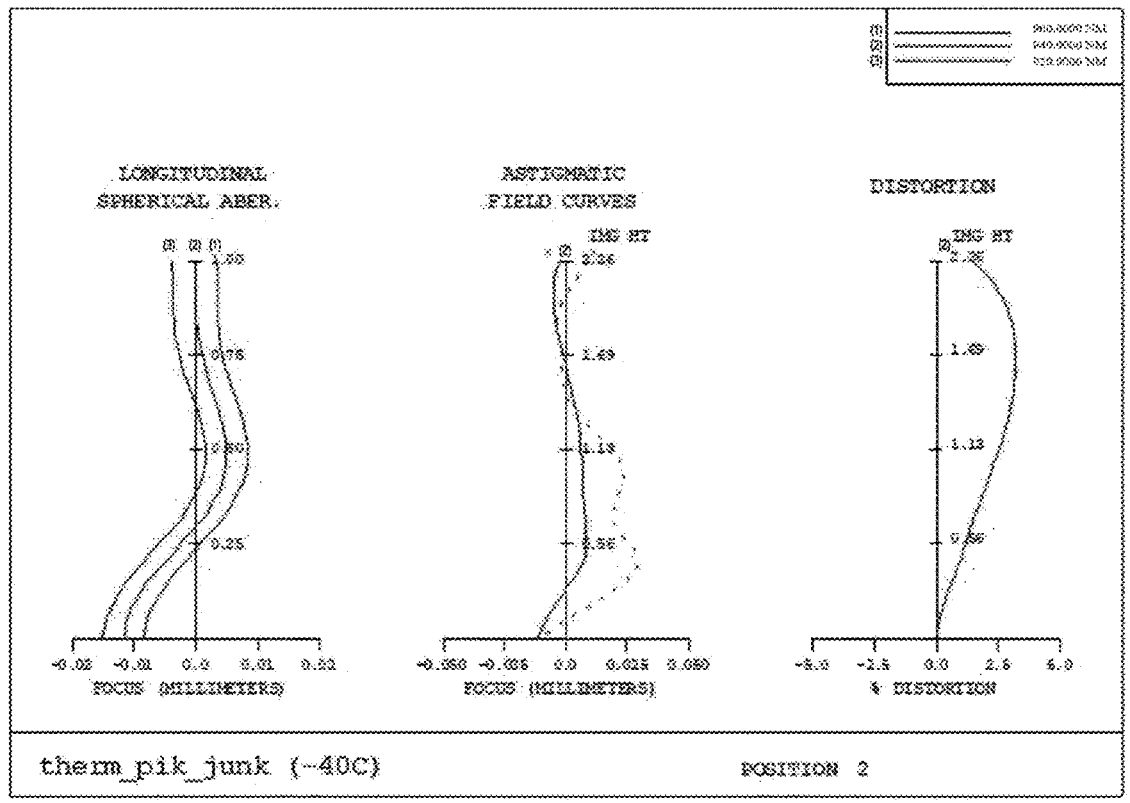
Figure 160:
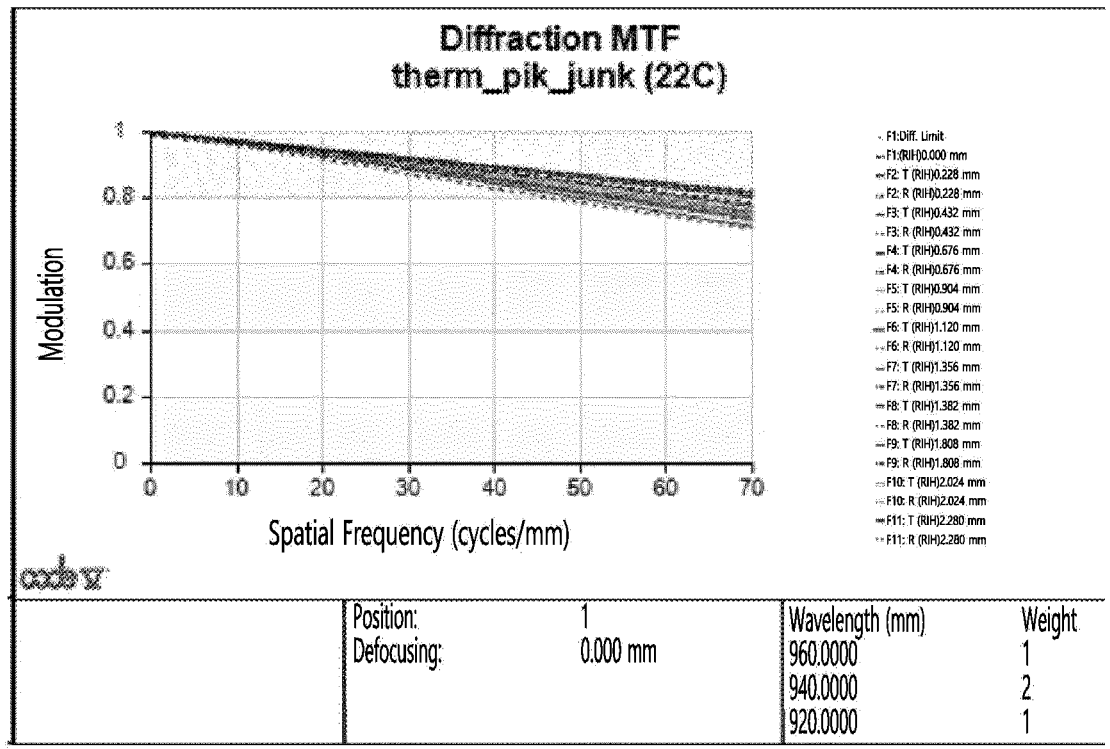
Figure 161:
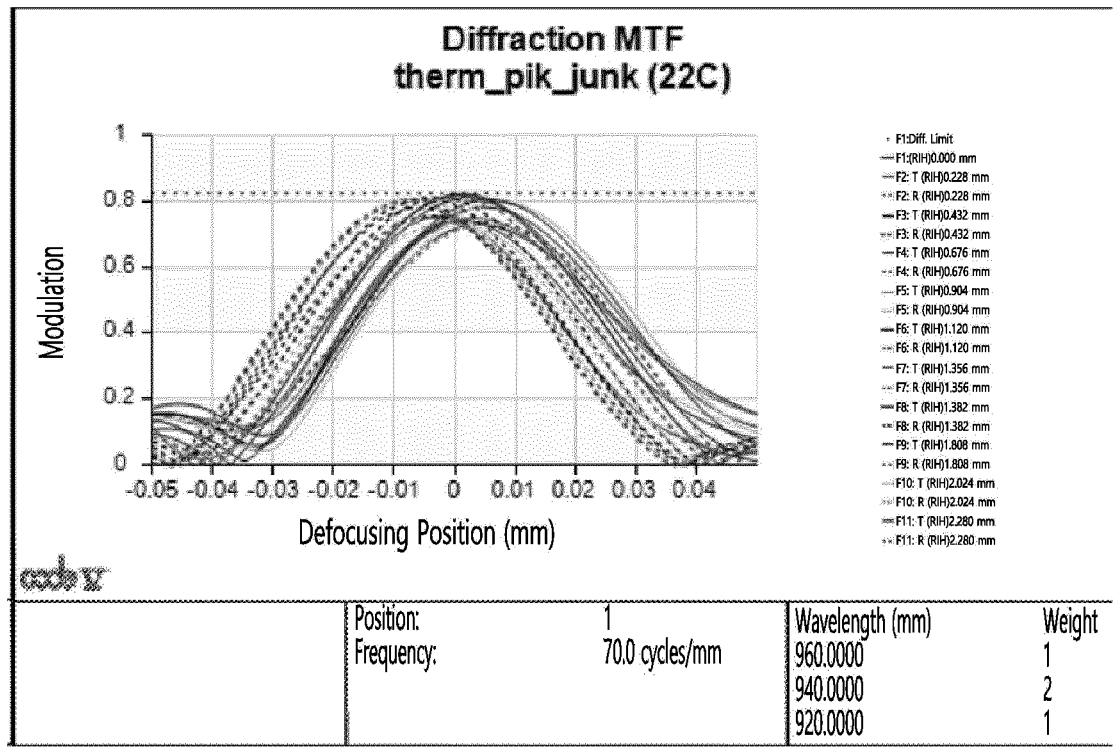
Figure 162:
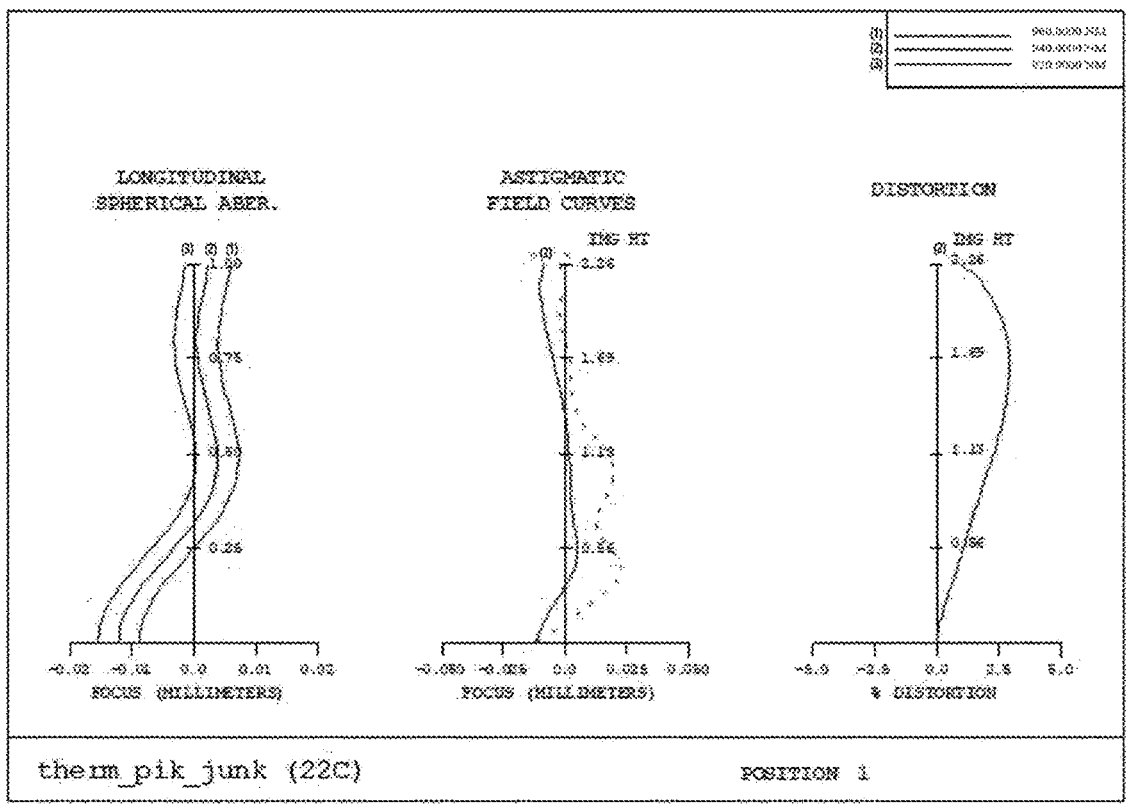
Figure 163:
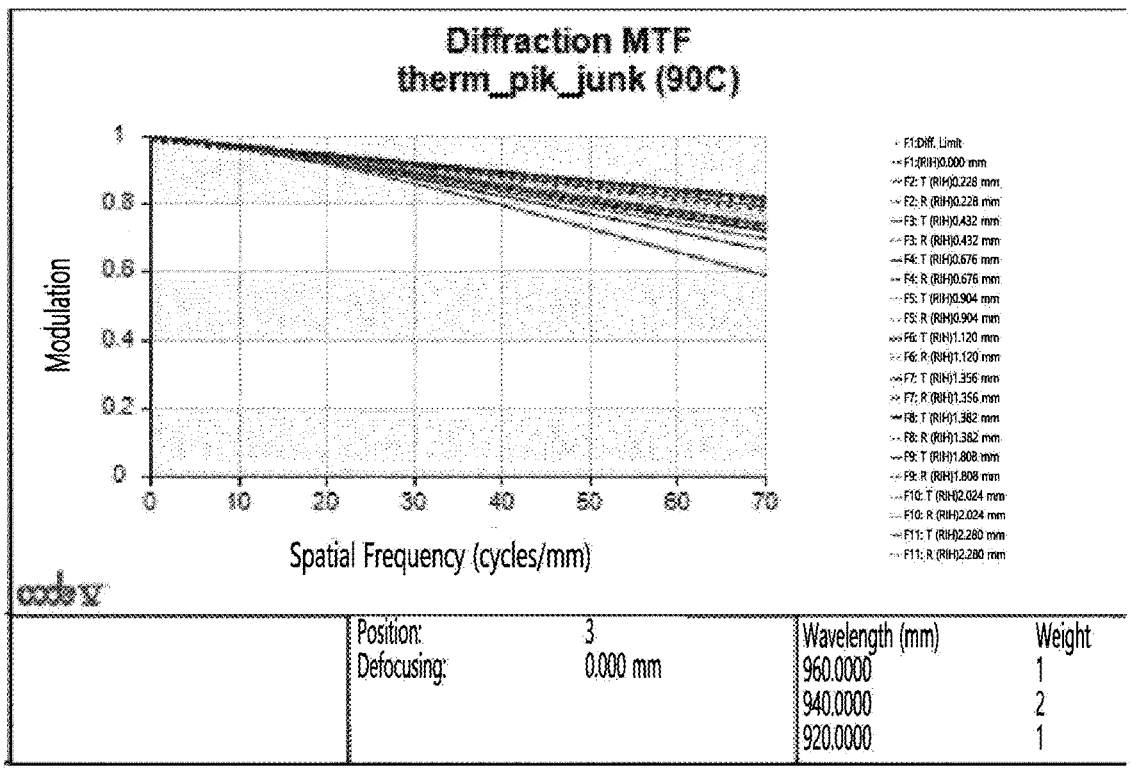
Figure 164:
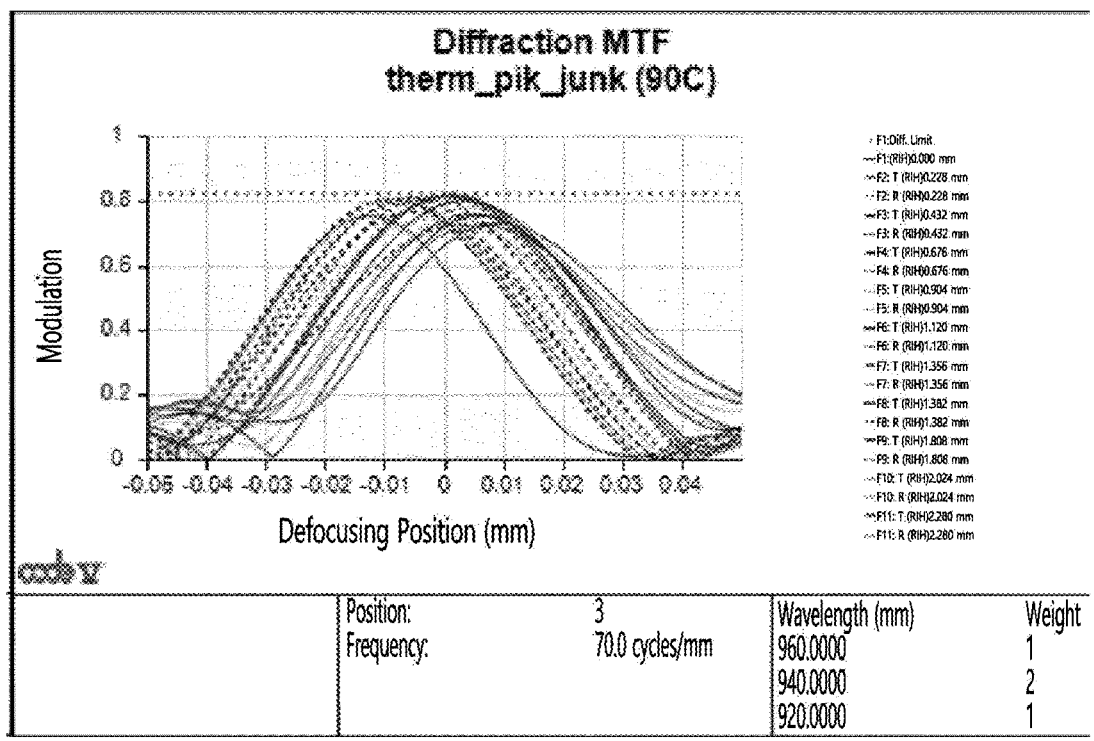
Figure 165:
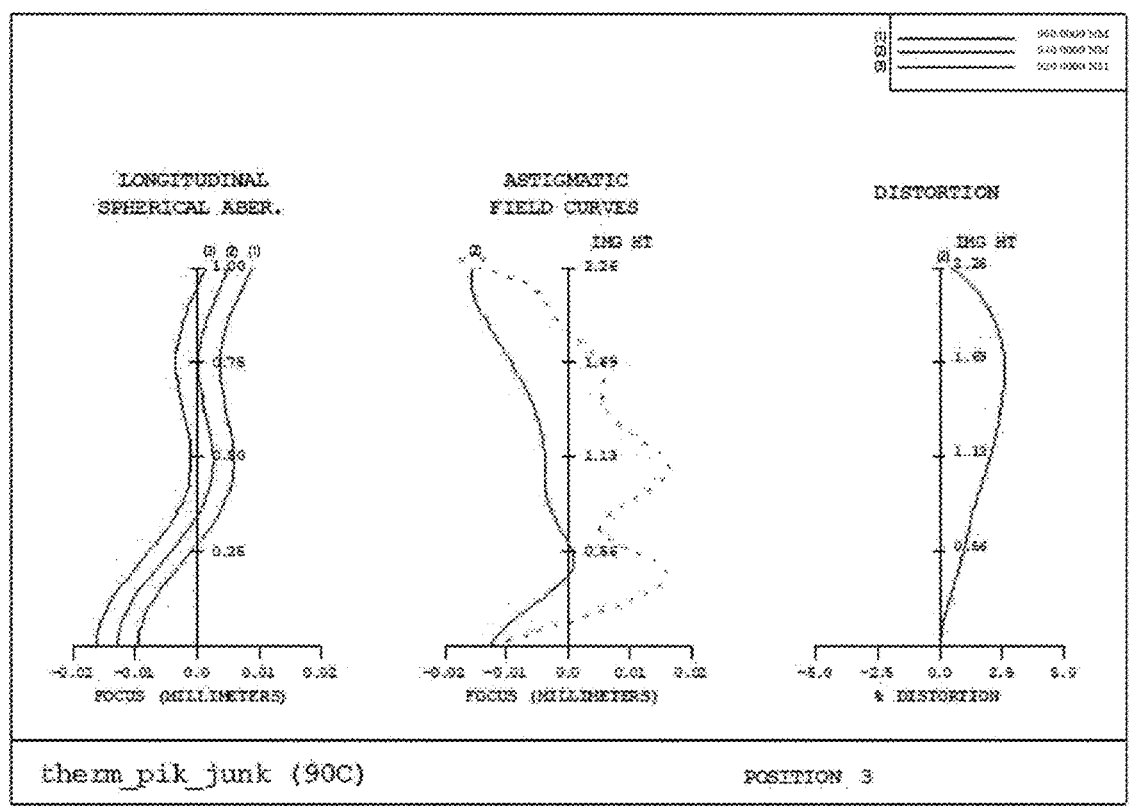

In addition, each of FIGS. 159, 162 and 165 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 159, 162 and 165, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 159, 162 and 165, the closer the curves are to the Y-axis, the better the aberration correction function can be interpreted. Referring to FIGS. 159, 162 and 165, in the optical system 1000 according to the seventh embodiment, measured values are adjacent to the Y-axis in almost all areas.

Referring to FIGS. 157 to 165, in the optical system 1000 according to the seventh embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the seventh embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the seventh embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

Hereinafter, the optical system 1000 according to the eighth embodiment will be described in more detail with reference to FIGS. 166 to 187.

Figure 166:
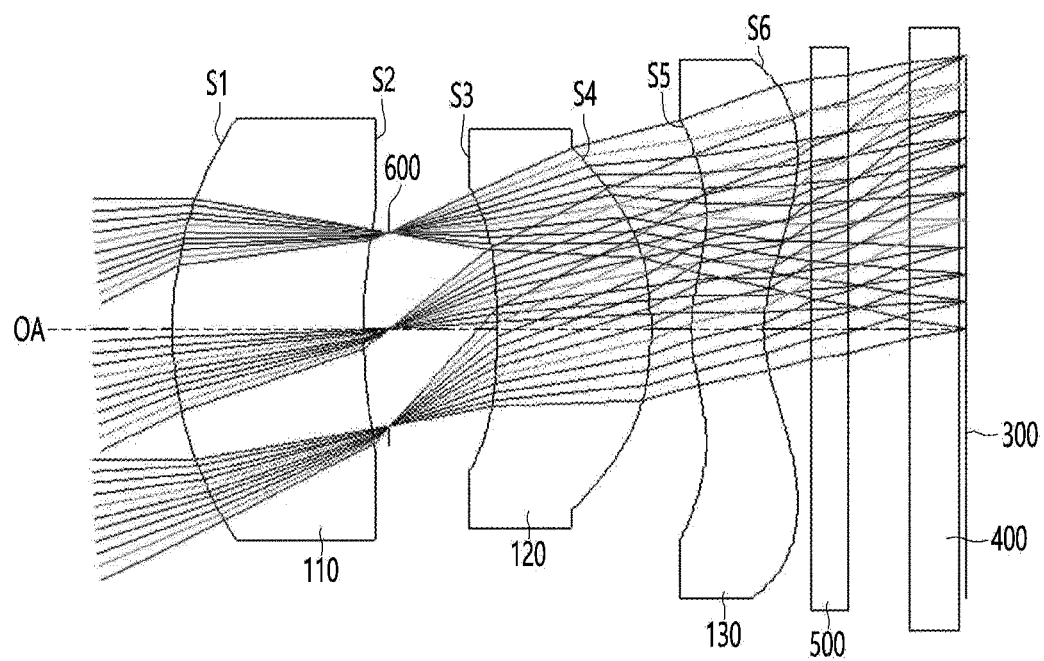
FIG. 166 is a block diagram of an optical system according to the eighth embodiment.

Referring to FIG. 166, the optical system 1000 according to the eighth embodiment may include a first lens 110, a second lens 120, a third lens 130 and an image sensor 300 are sequentially arranged from the object side to the sensor side. The first to third lenses 110, 120, and 130 may be sequentially disposed along the optical axis OA of the optical system 1000.

In addition, in the optical system 1000 according to the eighth embodiment, the aperture 600 may be disposed between the sensor-side surface (second surface S2) of the first lens 110 and the object-side surface (third surface S3) of the second lens 120.

In detail, the aperture 600 may be disposed to be spaced apart from the sensor side surface (the second surface S2) of the first lens 110 at between the sensor-side surface (second surface S2) of the first lens 110 and the object-side surface (third surface S3) of the second lens 120.

For example, the aperture 600 may be disposed to be spaced apart from the sensor-side surface (the second surface S2) of the first lens 110 as shown in Equations 52 and 53 above.

In addition, a filter 500 may be disposed between the plurality of lenses 100 and the image sensor 300, and a cover glass 400 may be disposed between the filter 500 and the image sensor 300.

FIG. 167 is a view showing a radius of curvature of the first to third lenses 110, 120, 130 according to the eighth embodiment, a thickness of each lens in the optical axis OA, a distance between each lens in the optical axis OA, the refractive index for light in the t-line (1013.98 nm) wavelength band, Abbe's Number, and the size of the clear aperture (CA). Here, the lens data described in FIG. 79 is data at room temperature (about 22° C.)

Referring to FIGS. 166 and 167, the first lens 110 of the optical system 1000 according to the eighth embodiment may have a glass material and may have a positive refractive power in the optical axis OA. In addition, in the optical axis OA, the first surface S1 of the first lens 110 may have a convex shape, and the second surface S2 may be concave. The first lens 110 may have a meniscus shape convex from the optical axis OA toward the object. The first surface S1 may be a sphere, and the second surface S2 may be a sphere.

FIG. 168 is sag data according to the vertical height (0.2 mm interval) of the optical axis of each of the object-side surface (first surface, S1) and the sensor-side surface (second surface, S2) of the first lens 110 at room temperature (about 22° C.).

In addition, FIG. 169 is data of the lens thickness according to the vertical height (0.2 mm interval) of the optical axis OA at room temperature (about 22° C.). In detail, D_1 of FIG. 169 is the central thickness of the first lens 110 and is the thickness (mm) of the first lens 110 on the optical axis OA. In addition, D_1_ET of FIG. 169 means a thickness (mm) in the optical axis OA direction at the end of the effective area of the first lens 110. In detail, D_1_ET means a distance (mm) in the optical axis direction between the effective area end of the object-side surface (first surface S1) of the first lens 110 and the effective area end of the sensor-side surface (second surface S2) of the first lens 110.

Referring to FIGS. 167 to 169, the thickness of the first lens 110 in the optical axis OA direction may decrease from the optical axis OA toward the end of the effective diameter of the first lens 110. In detail, in the range from the optical axis OA to the effective diameter end of the second surface S2, the thickness in the optical axis OA direction of the first lens 110 may have a maximum value the optical axis OA the and have a minimum value at the effective diameter end of the second surface S2.

Accordingly, the first lens 110 may have improved aberration control characteristics by controlling the incident light.

The second lens 120 may be made of a plastic material and may have positive (+) refractive power in the optical axis OA. Also, in the optical axis OA, the third surface S3 of the second lens 120 may have a concave shape, and the fourth surface S4 may be convex. The second lens 120 may have a meniscus shape convex from the optical axis OA toward the sensor. The third surface S3 may be an aspherical surface, and the fourth surface S4 may be an aspherical surface.

FIG. 170 is sag data according to the vertical height (0.2 mm interval) of the optical axis of each of the object-side surface (third surface, S3) and the sensor-side surface (fourth surface, S4) of the second lens 120 at room temperature (about 22° C.).

In addition, FIG. 171 is data of the lens thickness according to the vertical height (0.2 mm interval) of the optical axis OA at room temperature (about 22° C.). In detail, D_2 of FIG. 171 is the central thickness of the second lens 120 and is the thickness (mm) of the second lens 120 on the optical axis OA. In addition, D_2_ET of FIG. 171 means a thickness (mm) in the optical axis OA direction at the end of the effective area of the second lens 120. In detail, D_2_ET means a distance (mm) in the optical axis direction between the effective area end of the object-side surface (third surface S3) of the second lens 120 and the effective area end of the sensor-side surface (fourth surface S4) of the second lens 120.

Referring to FIGS. 166, 170 and 171, the thickness of the second lens 120 in the optical axis OA direction may decrease from the optical axis OA toward the end of the effective diameter of the second lens 120. In detail, in the range from the optical axis OA to the effective diameter end of the third surface S3, the thickness in the optical axis OA direction of the second lens 120 may have a maximum value at the optical axis OA the and have a minimum value at the effective diameter end of the third surface S3.

Accordingly, the second lens 120 may inhibit or minimize the change in optical properties depending on the temperature in the low to high temperature range.

The third lens 130 may be made of a plastic material and have negative (−) refractive power in the optical axis OA. Also, in the optical axis OA, the fifth surface S5 of the third lens 130 may have a convex shape, and the sixth surface S6 may be concave. The third lens 130 may have a meniscus shape convex from the optical axis OA toward the object. The fifth surface S5 may be an aspherical surface, and the sixth surface S6 may be an aspherical surface.

FIG. 172 is sag data according to the vertical height (0.2 mm interval) of the optical axis of each of the object-side surface (fifth surface, S5) and the sensor-side surface (sixth surface, S6) of the third lens 130 at room temperature (about 22° C.).

In addition, FIG. 173 is data of the lens thickness according to the vertical height (0.2 mm interval) of the optical axis OA at room temperature (about 22° C.). In detail, D_3 of FIG. 173 is the central thickness of the third lens 130 and is the thickness (mm) of the third lens 130 on the optical axis OA. In addition, D_3_ET of FIG. 173 means a thickness (mm) in the optical axis OA direction at the end of the effective area of the third lens 130. In detail, D_3_ET means a distance (mm) in the optical axis direction between the effective area end of the object-side surface (fifth surface S5) of the third lens 130 and the effective area end of the sensor-side surface (sixth surface S6) of the third lens 130.

Referring to FIGS. 168, 172 and 173, the thickness of the third lens 130 in the optical axis OA direction may increase from the optical axis OA toward the end of the effective diameter of the third lens 130. In detail, in the range from the optical axis OA to the effective diameter end of the fifth surface 53, the thickness in the optical axis OA direction of the third lens 130 may have a maximum value at the effective diameter end of the fifth surface S5 and have a minimum at the optical axis OA.

Accordingly, the third lens 130 may inhibit or minimize the change in optical properties depending on the temperature in the low to high temperature range.

In this case, the refractive index of the first lens 110 may be different from the refractive power of the second lens 120 and the third lens 130. For example, the refractive power of the first lens 110 may be about 1.3 times or more of the refractive power of the second lens 120 and the third lens 130. In detail, the refractive power of the first lens 110 may be greater than or equal to about 1.6 times the refractive power of the second lens 120 and the third lens 130. In more detail, the refractive power of the first lens 110 may be about 1.9 times or more of the refractive power of the second lens 120 and the third lens 130.

Also, the refractive index of the second lens 120 may be different from the refractive power of the third lens 130. For example, the refractive power of the second lens 120 may be about 2 times or more of the refractive power of the third lens 130. In detail, the refractive power of the second lens 120 may be about 3 times or more of the refractive power of the third lens 130. In more detail, the refractive power of the second lens 120 may be about 5 times or more of the refractive power of the third lens 130.

Also, the Abbe's number of the first lens 110 may be different from that of the second lens 120 and the third lens 130. For example, the difference between the Abbe's number of the first lens 110 and the Abbe's number of the second lens 120 and the third lens 130 may be 10 or less. In detail, the Abbe's number of the first lens 110 may be greater than the Abbe's number of the second lens 120 and the third lens 130 within a range of 10 or less.

In the optical system 1000 according to the eighth embodiment, the values of the aspheric coefficients of each lens surface are as shown in FIG. 174.

In addition, in the optical system 1000 according to the eighth embodiment, the interval (first interval) between the first lens 110 and the second lens 120 may be the same as that of FIG. 175 below at room temperature (about 22° C.). And, the interval (second interval) between the second lens 120 and the third lens 130 may be the same as that of FIG. 176 below at room temperature (about 22° C.).

Referring to FIG. 175, the first interval may decrease from the optical axis OA toward the first point L1, which is the end of the effective diameter of the second surface S2. Here, the first point L1 is an approximation value of the effective radius of the second surface S2 having a smaller effective diameter among the sensor-side surface (second surface S2) of the first lens 110 and the object-side surface (third surface, S3) of the second lens 120 facing each other. That is, the first point L1 means an approximate value of ½ of the effective diameter value of the second surface S2 described in FIG. 167.

The first interval may have a maximum value at the optical axis OA and a minimum value at the first point L1. The maximum value of the first interval may be about 1.1 times to about 3 times the minimum value. For example, in the first embodiment, the maximum value of the first interval may be about 1.2 times the minimum value.

Referring to FIG. 176, the second interval may decrease from the optical axis OA toward the second point L2, which is the end of the effective diameter of the fourth surface S4. Here, the second point L2 is an approximation value of the effective radius of the fourth surface S4 having a smaller effective diameter among the sensor-side surface (fourth surface S4) of the second lens 120 and the object-side surface (fifth surface, S5) of the third lens 130 facing each other. That is, the second point L2 means an approximate value of ½ of the effective diameter value of the fourth surface S4 described in FIG. 167.

The second interval may have a maximum value at the second point L2 and a minimum value at the optical axis OA. The maximum value of the second interval may be about 2 times to about 4 times the minimum value. For example, in the third embodiment, the maximum value of the second interval may be about 2.1 times the minimum value.

Accordingly, the optical system 1000 may have improved optical properties. In detail, the first lens 110 and the second lens 120, and the second lens 120 and the third lens 130 are set intervals (first interval, second interval) spaced apart from each other according to the positions, respectively. Accordingly, the optical system 1000 may inhibit or minimize a change in optical properties in a temperature range of low to high temperature. Accordingly, the optical system and the camera module according to the embodiment may maintain improved optical properties in various temperature ranges.

Figure 177:
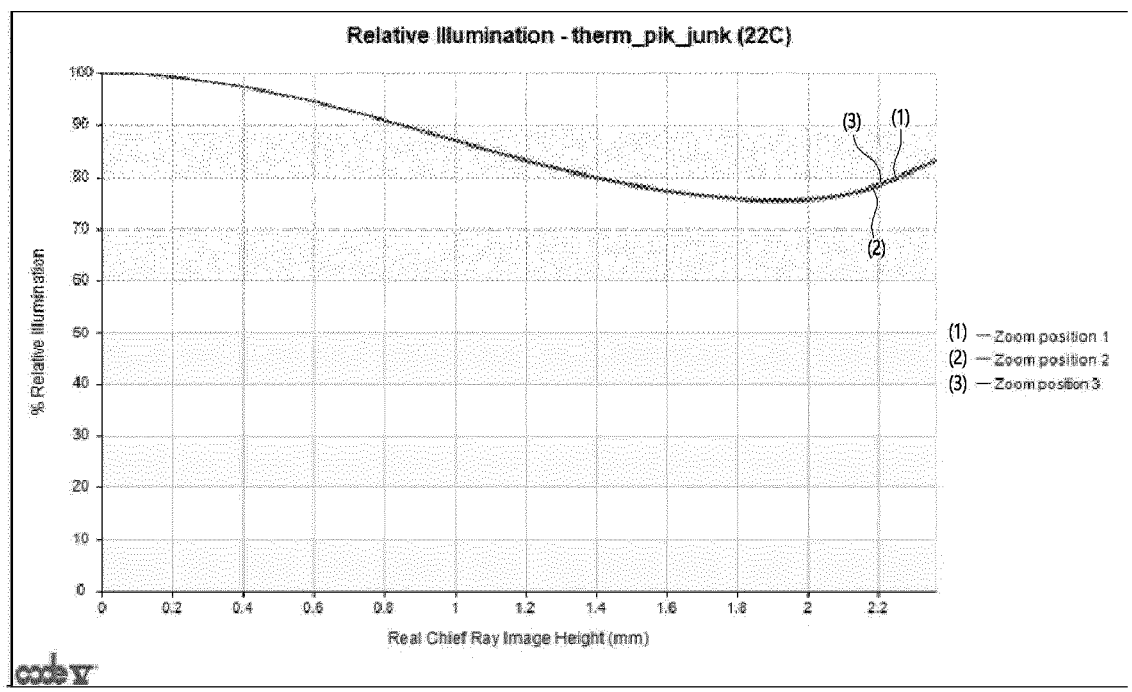
FIG. 177 is a graph of relative illumination for each field of the optical system according to the eighth embodiment.
Figure 178:
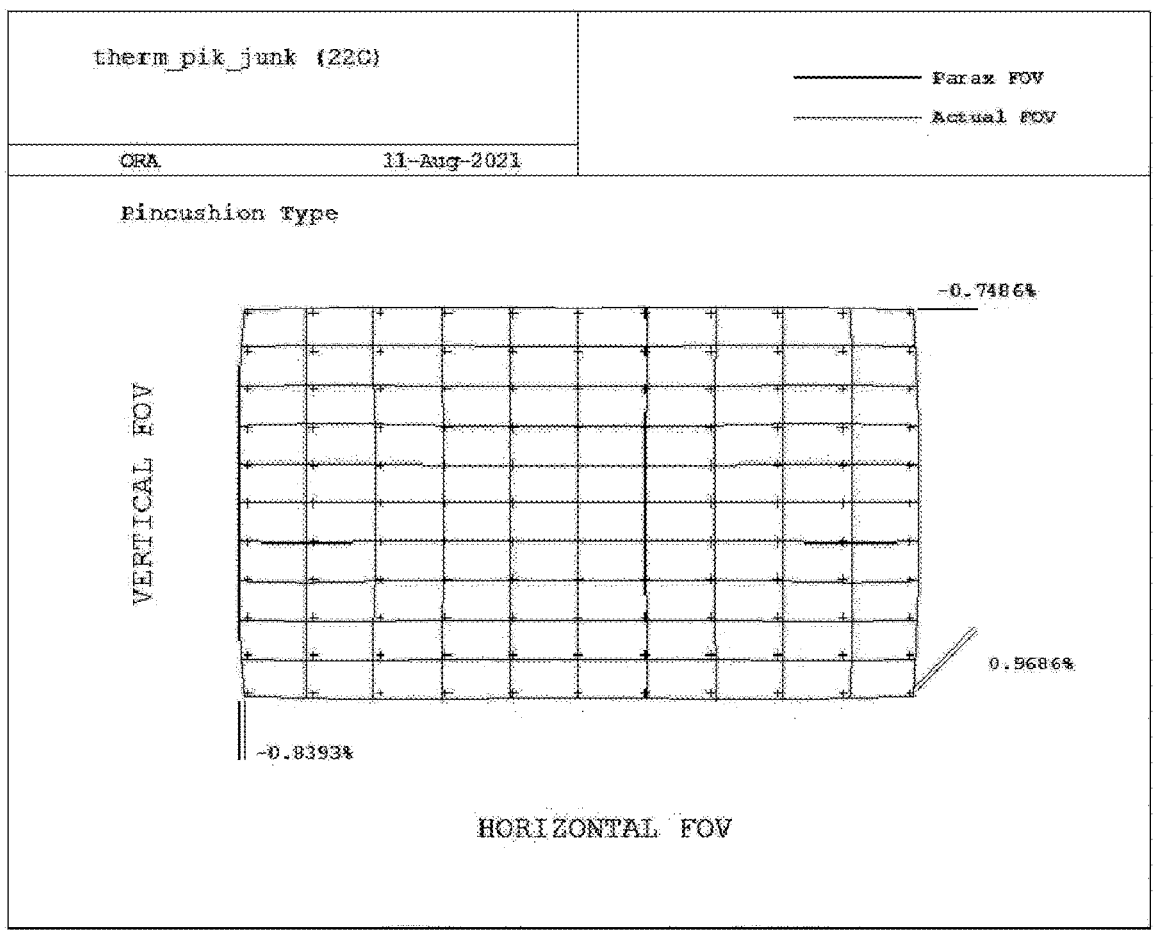
FIG. 178 is data on the distortion characteristics of the optical system according to the eighth embodiment.

FIG. 177 is a graph of relative illumination for each field of the optical system according to the eighth embodiment, and FIG. 178 is data on distortion characteristics of the optical system according to the eighth embodiment. In this case, FIGS. 177 and 178 are data obtained by measuring the optical system 1000 at room temperature (about 22° C.).

Referring to FIG. 177, the optical system 1000 according to the eighth embodiment may have excellent relative illumination characteristics in the 0 field region (center region) to 1.0 field region (edge region) of the image sensor 300. For example, the optical system 1000 may have the relative illumination of about 70% or more. In detail, in the optical system 1000, when the 0 field area is 100%, the relative illumination of the 0.5 field area may be about 80% or more, and the relative illumination of the 1.0 field area may be about 70% or more.

Also, referring to FIG. 178, the optical system 1000 according to the first embodiment may have a barrel distortion shape in which an edge portion of an image is curved outward, and has a distortion of about 0.7615% and a TV-distortion of about −0.9947%.

FIGS. 179 to 187 are graphs of diffraction MTF characteristics and aberration diagrams of the optical system 1000 according to temperature.

Figure 179:
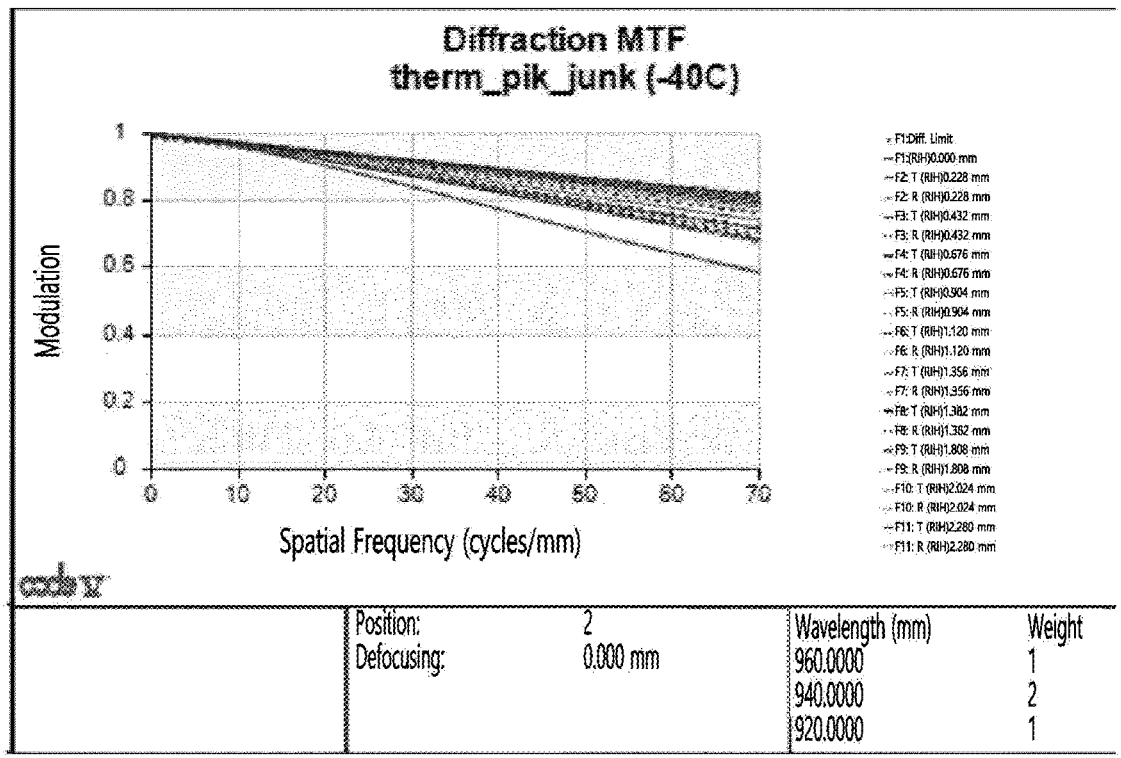
FIGS. 179 to 187 are graphs of diffraction MTF and aberration diagrams according to the temperature of the optical system according to the eighth embodiment.
Figure 180:
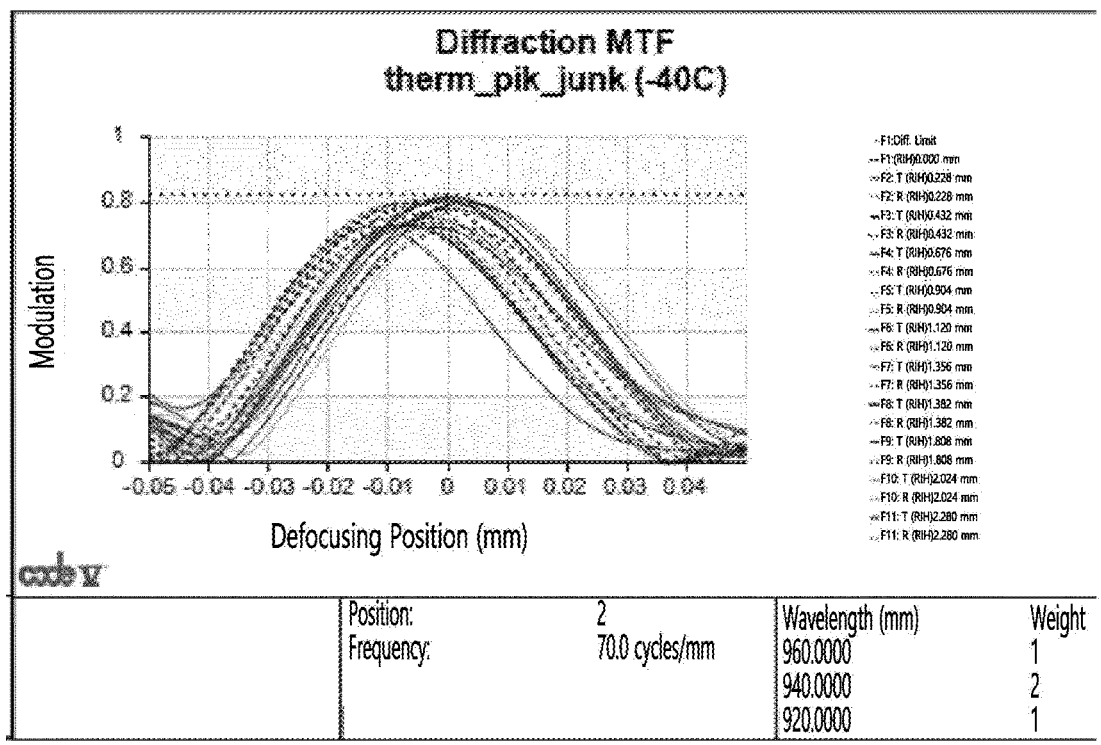
Figure 182:
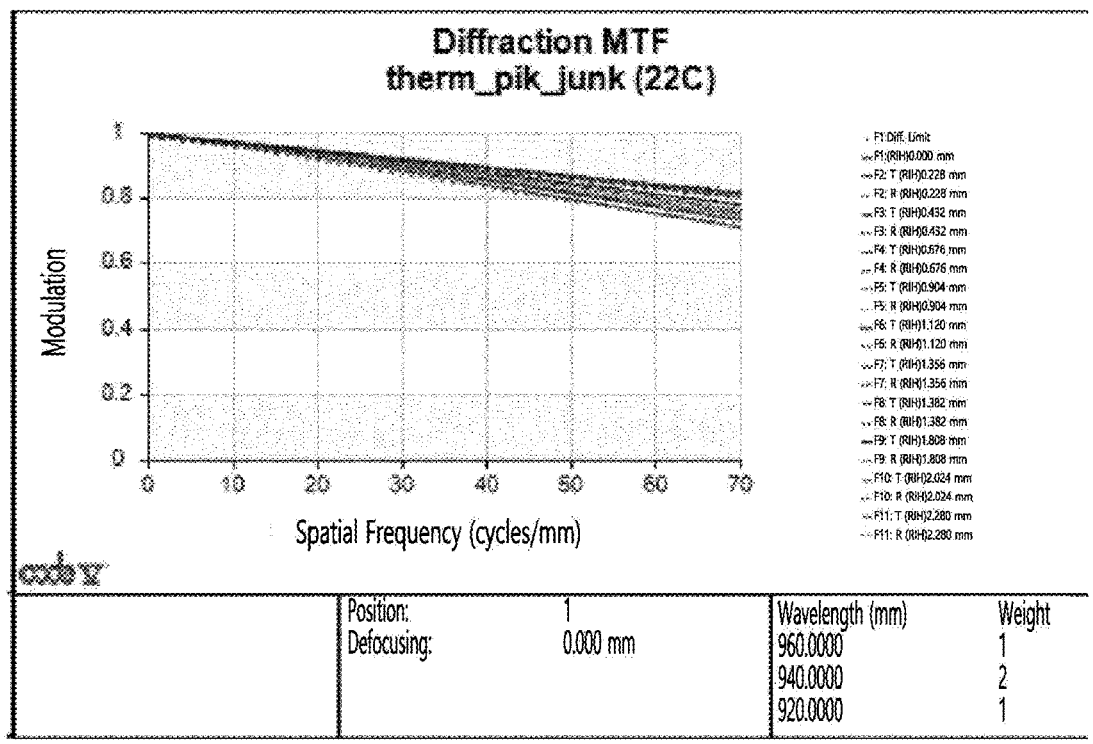
Figure 183:
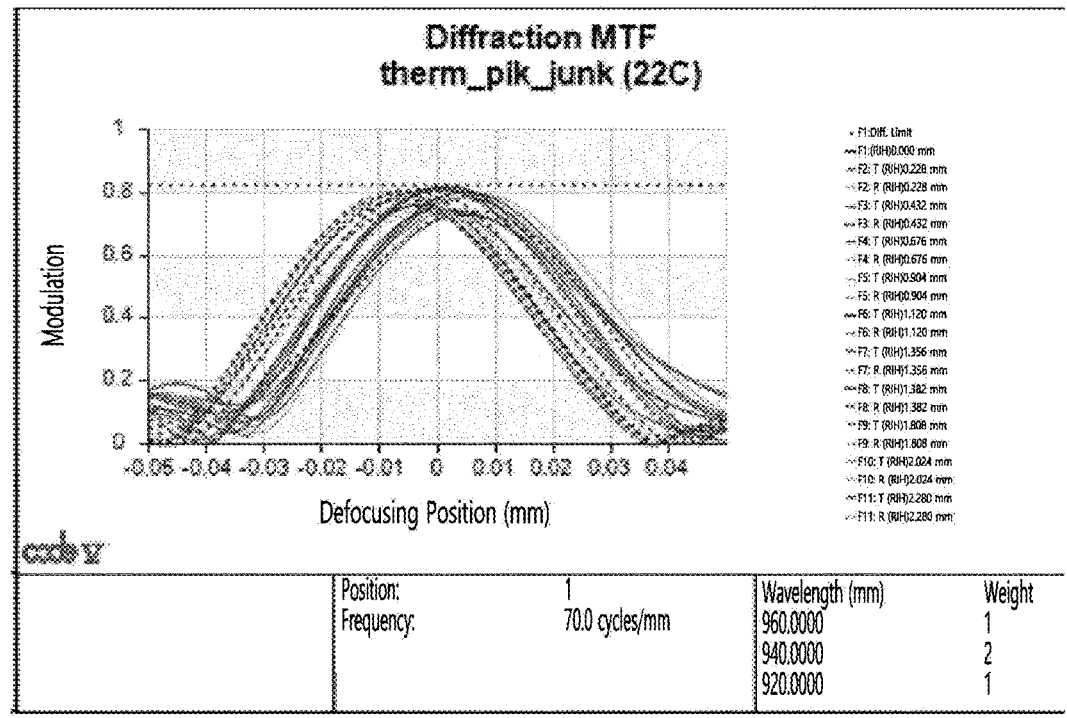
Figure 185:
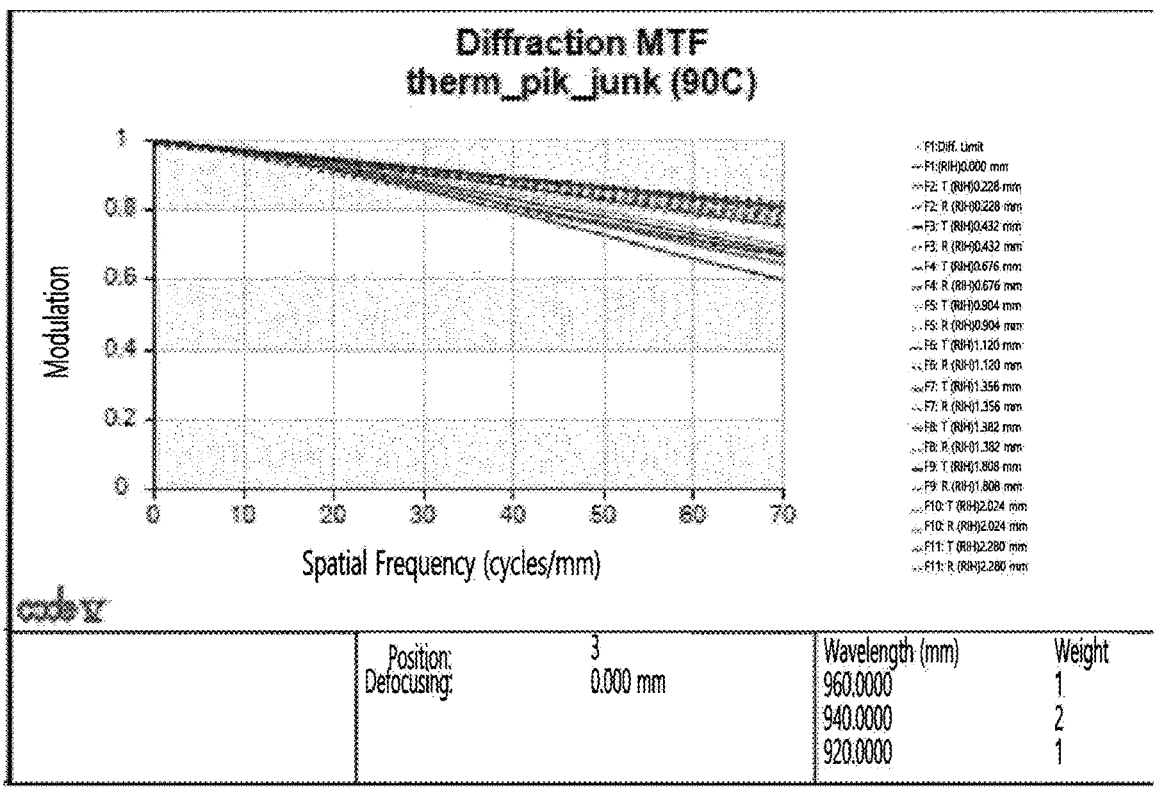
Figure 186:
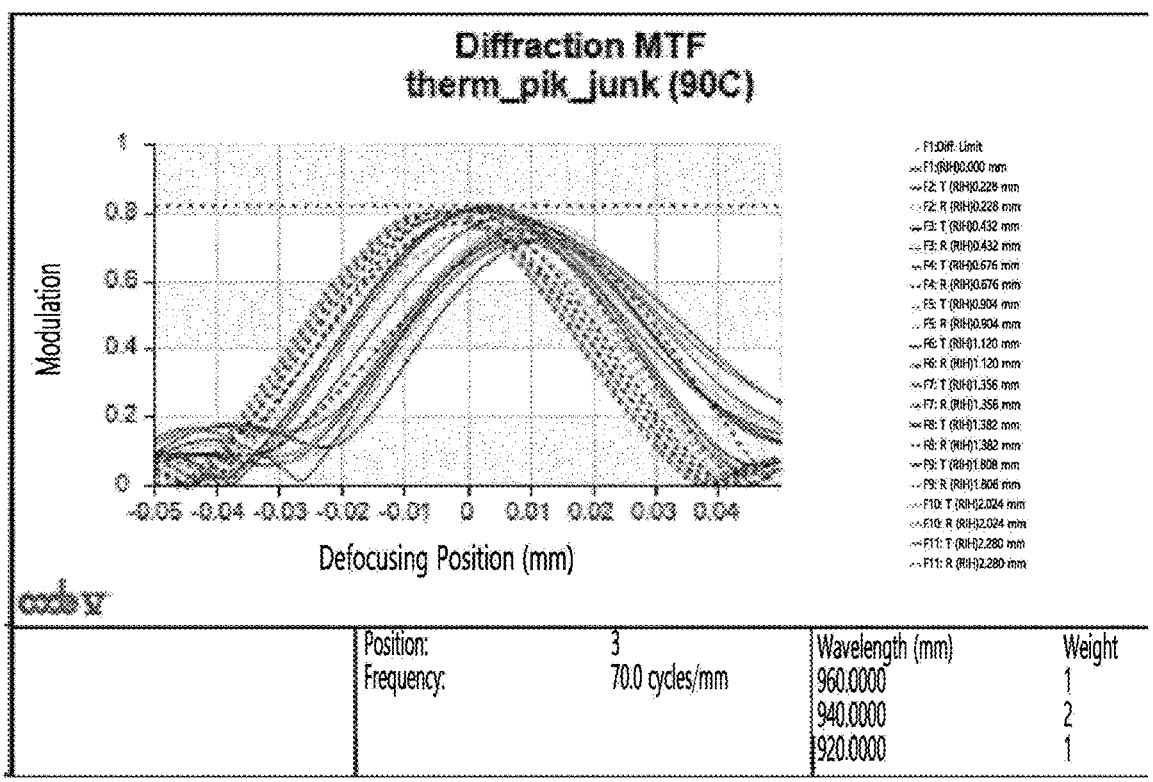

In detail, FIGS. 179 and 180 are graphs of the diffraction MTF characteristics of the optical system 1000 in a low-temperature (−40° C.) environment, and FIGS. 182 and 183 are graphs of the diffraction MTF characteristics of the optical system 1000 in a room temperature (22° C.) environment, and FIGS. 185 and 186 are graphs of diffraction MTF characteristics of the optical system 1000 in a high temperature (99° C.) environment.

Figure 184:
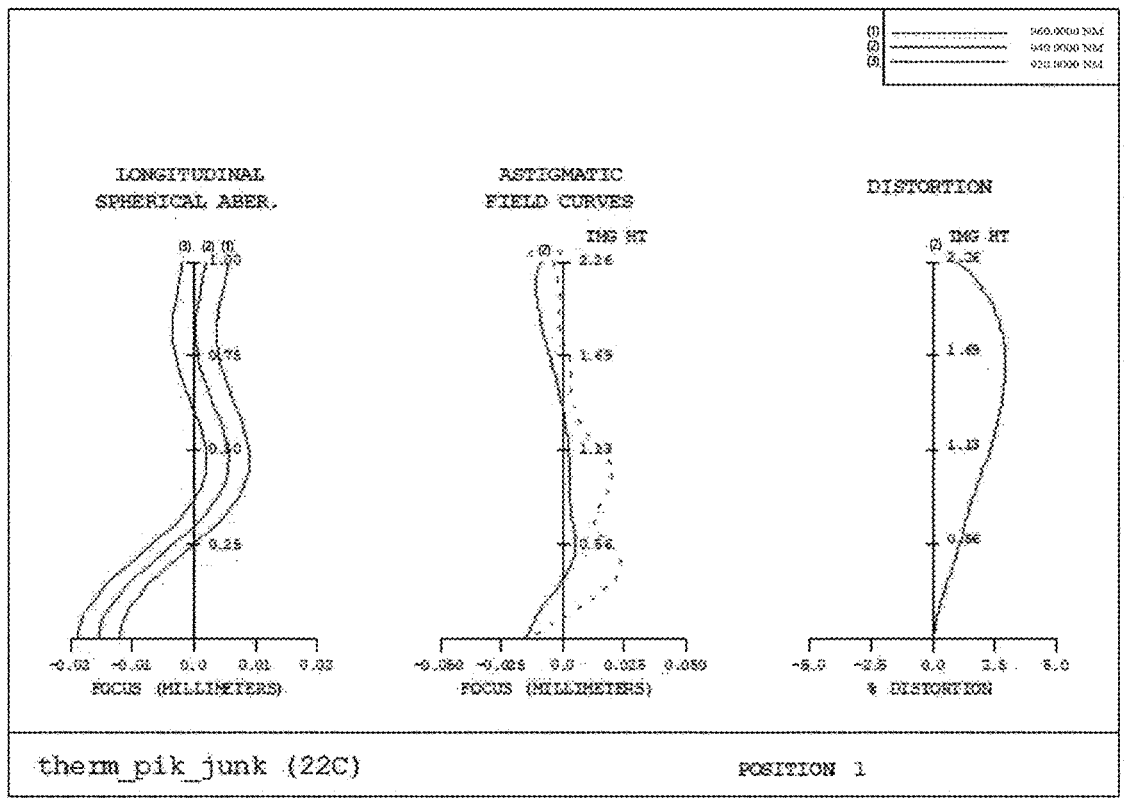
Figure 187:
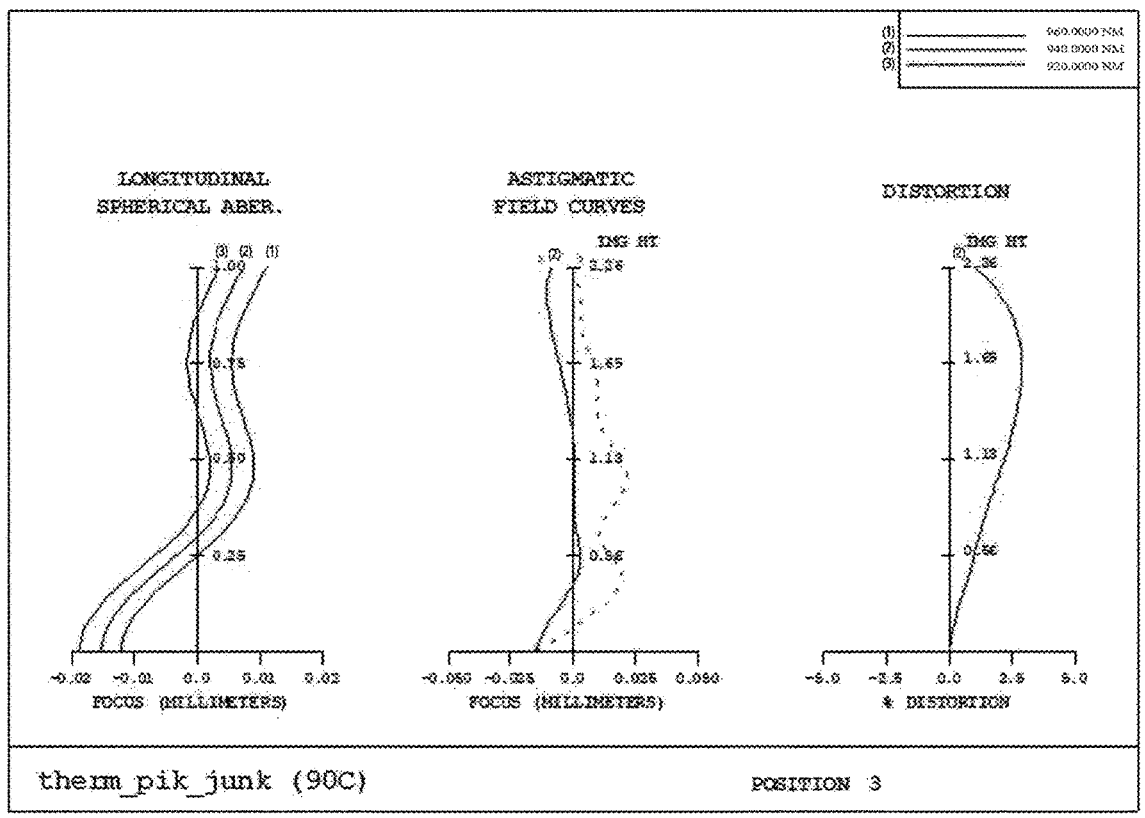

In addition, each of FIGS. 181, 184 and 187 are graphs of aberration diagrams of the optical system 1000 in low temperature (−40° C.), room temperature (22° C.) and high temperature (99° C.) environments, and the graph is on the left longitudinal spherical aberration, astigmatic field curves, and distortion were measured in the right direction. FIGS. 181, 184 and 187, the X-axis may indicate a focal length (mm) or distortion (%), and the Y-axis may indicate the height of an image. In addition, the graph for spherical aberration is a graph for light in a wavelength band of about 920 nm, about 940 nm, and about 960 nm, and a graph for astigmatism and distortion aberration is a graph for light in a wavelength band of 940 nm.

In the aberration diagrams of FIGS. 181, 184 and 187, the closer the curves are to the Y-axis, the better the aberration correction function can be interpreted. Referring to FIGS. 181, 184 and 187, in the optical system 1000 according to the eighth embodiment, measured values are adjacent to the Y-axis in almost all areas.

Referring to FIGS. 179 to 187, in the optical system 1000 according to the eighth embodiment, there is little or no change in MTF characteristics and aberration characteristics even when the temperature is changed in a range of a low temperature (−40° C.) to a high temperature (99° C.). In detail, the change in MTF properties at low temperature (−40° C.) and high temperature (99° C.) is less than 10% with respect to the change in MTF properties at room temperature (22° C.).

That is, the optical system 1000 according to the eighth embodiment may maintain excellent optical properties in various temperature ranges. In detail, in the optical system 1000, the first lens 110 is made of a material different from that of the second lens 120 and the third lens 130, for example, the first lens 110 may include a glass material, and the second lens 120 and the third lens 130 may include a plastic material. Accordingly, when the temperature increases, the refractive index of the first lens 110 may increase, and the refractive index of the second lens 120 and the third lens 130 may decrease.

At this time, the first to third lenses 110, 120, 130 according to the eighth embodiment are provided with a set refractive index, shape, thickness, etc. thereby mutually compensate for a change in focal length caused by a change in refractive index that changes according to temperature.

Accordingly, the optical system 1000 may inhibit or minimize changes in optical properties in a temperature range of low (−40° C.) to high (99° C.), and maintain improved optical properties.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art.

Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical system comprising:
   first to third lenses and an image sensor sequentially arranged along an optical axis from an object side to a sensor side,
   wherein a refractive power of the first lens is positive,
   wherein a refractive power of the second lens is positive,
   wherein an object-side surface and a sensor-side surface of the first lens are spherical,
   wherein the first lens has a convex shape toward the object side,
   wherein a refractive index (nt_1) of the first lens is $1.8 \leq nt\_1 \leq 2.3$,
   wherein a thickness (D_1) of the first lens in the optical axis satisfies $0.2 \leq D\_1/TTL \leq 0.3$,
   wherein the TTL is 7 mm or less,
   wherein at least one of the second lens and the third lens is made of a plastic material,
   wherein ImgH is the diagonal length of the image sensor,
   wherein the TTL and the ImgH satisfy $1 < TTL/ImgH < 1.4$,
   (TTL is the distance in the optical axis from the object-side surface of the first lens to an upper surface of the image sensor).

2. The optical system of claim 1, wherein the first lens is made of glass,
   wherein the second lens and the third lens are made of a plastic material.

3. The optical system of claim 1,
   wherein the first lens to the third lens satisfies the following equation:

$1 \leq |v1-v2| \leq 10$ $1 < |v1-v3| \leq 10$ $50 \leq v1+v2+v3 \leq 200$ or $50 \leq v1+v2+v3 \leq 70$ or $60 \leq v1+v2+v3 \leq 70$ [Equation]

wherein, in the Equation, v1 is an Abbe's number of the first lens, v2 is an Abbe's number of the second lens, and v3 is an Abbe's number of the third lens.

4. The optical system of claim 3, wherein a thickness D_1 of the first lens on the optical axis and a thickness D_2 of the second lens on the optical axis satisfy $1 < D\_1/D\_2 < 1.6$.

5. The optical system of claim 3, wherein a BFL is the distance in the optical axis from an apex of the sensor-side surface of the third lens to the upper surface of the image sensor,
   wherein the BFL and the ImgH satisfy $0.2 < BFL/ImgH < 0.5$.

6. The optical system of claim 3, wherein a focal length f1 of the first lens, a focal length f2 of the second lens, and a focal length f3 of the third lens satisfy $f1 < f2 < f3$.

7. An optical system comprising:
   first to third lenses and an image sensor sequentially arranged along an optical axis from an object side to a sensor side,
   wherein a refractive power of the first lens is positive,
   wherein a refractive power of the second lens is positive,
   wherein the first lens has a convex shape toward the object side,
   wherein at least one of the second lens and the third lens is made of a plastic material,
   wherein a thickness (D_1) of the first lens in the optical axis satisfies $0.20 \leq D\_1/TTL \leq 0.3$,
   wherein the TTL is 7 mm or less,
   wherein when changing 50 to 70 degrees compared to room temperature, the rate of change of the effective focal length is 0 to 10%, and the rate of change of the angle of view is 0 to 10%,
   wherein ImgH is the diagonal length of the image sensor,
   wherein the TTL and the ImgH satisfy $1 < TTL/ImgH < 1.4$,
   (TTL is the distance in the optical axis from an object-side surface of the first lens to an upper surface of the image sensor, and the room temperature is 20 to 30 degrees).

8. The optical system of claim 7, wherein the first lens is made of glass,
   wherein the second lens and the third lens are made of a plastic material.

9. The optical system of claim 8, wherein a Sag value of an object-side surface of the third lens includes an increasing section and a decreasing section,
   wherein the Sag value of the object-side surface of the third lens satisfies $1.5 < d23\_Sag\_L3S1\_max/d23 < 3$,
   (d23_Sag_L3S1_max is distance in the optical axis direction between a maximum Sag of the object-side surface of the third lens and a sensor side of the second lens facing the maximum Sag value, and the d23 is the distance in the optical axis between the second lens and the third lens).

10. An optical system comprising:
    first to third lenses and an image sensor sequentially arranged along an optical axis from an object side to a sensor side,
    wherein a refractive power of the first lens is positive,
    wherein a refractive power of the second lens is positive,
    wherein a first refractive index (nt_1) is $1.8 \leq nt\_1 < 2.3$,
    wherein at least one of the second lens and the third lens is made of a plastic material, wherein a distance (TTL) in the optical axis from an object-side surface of the first lens to an upper surface of the image sensor is 7 mm or less, wherein a Sag value of an object-side surface of the third lens includes an increasing section and a decreasing section, wherein the Sag value of the object-side surface of the third lens is 1.5<d23_Sag_L3S1_max/d23<3 of the optical system, (d23_Sag_L3S1_max is distance in the optical axis direction between a maximum Sag of the object-side surface of the third lens and a sensor side of the second lens facing the maximum Sag value, and the d23 is the distance in the optical axis between the second lens and the third lens).

11. The optical system of claim 7, wherein the first lens to the third lens satisfies the following equation:

$$1 \leq |v1-v2| \leq 10$$

$$1 < ||v1-v3| \leq 10$$

$$50 \leq v1+v2+v3 \leq 200 \text{ or } 50 \leq v1+v2+v3 \leq 70 \text{ or } 60 \leq v1+v2+v3 \leq 70,$$ [Equation]

wherein, in the Equation, v1 is an Abbe's number of the first lens, v2 is an Abbe's number of the second lens, and v3 is an Abbe's number of the third lens.

12. The optical system of claim 7, wherein a thickness $D\_1$ of the first lens at the optical axis and a thickness $D\_2$ of the second lens at the optical axis satisfy $1<D\_1/D\_2<1.6$.

13. The optical system of claim 7, wherein BFL is the distance from a vertex of a sensor side of the third lens to the upper surface of the image sensor, wherein the BFL and the ImgH satisfy 0.2<BFL/ImgH<0.5.

14. The optical system of claim 7, wherein a focal length f1 of the first lens, a focal length f2 of the second lens, and a focal length f3 of the third lens satisfy f1<f2<f3.

15. The optical system of claim 10, wherein the first lens is made of a glass material, wherein the second lens and the third lens are made of a plastic material.

16. The optical system of claim 10, wherein the first lens to the third lens satisfies the following equation:

$$1 \leq |v1-v2| \leq 10$$

$$1 < ||v1-v3| \leq 10$$

$$50 \leq v1+v2+v3 \leq 200 \text{ or } 50 \leq v1+v2+v3 \leq 70 \text{ or } 60 \leq v1+v2+v3 \leq 70,$$ [Equation]

wherein, in the Equation, v1 is an Abbe's number of the first lens, v2 is an Abbe's number of the second lens, and v3 is an Abbe's number of the third lens.

17. The optical system of claim 10, wherein a thickness $D\_1$ of the first lens at the optical axis and a thickness $D\_2$ of the second lens at the optical axis satisfy $1<D\_1/D\_2<1.6$.

18. The optical system of claim 10, wherein BFL is the distance from a vertex of a sensor side of the third lens to the upper surface of the image sensor, wherein ImgH is the diagonal length of the image sensor, and wherein the BFL and the ImgH satisfy 0.2<BFL/ImgH<0.5.

19. The optical system of claim 14, wherein a focal length f1 of the first lens, a focal length f2 of the second lens, and a focal length f3 of the third lens satisfy f1<f2<f3.

20. The optical system of claim 10, wherein ImgH is the diagonal length of the image sensor, wherein the TTL and the ImgH satisfy 1<TTL/ImgH<1.4.

* * * * *